US012527854B2

United States Patent
Billet et al.

(10) Patent No.: US 12,527,854 B2
(45) Date of Patent: Jan. 20, 2026

(54) METHODS OF PRODUCING SHIGA TOXIN B-SUBUNIT (STxB) MONOMERS AND OLIGOMERS, AND USES THEREOF

(71) Applicants: INSTITUT CURIE, Paris (FR); CENTRE NATIONAL DE LA RECHERCHE SCIENTIFIQUE, Paris (FR); INSERM (INSTITUT NATIONAL DE LA SANTÉ ET DE LA RECHERCHE MÉDICALE), Paris (FR); COMMISSARIAT Á L'ÉNERGIE ATOMIQUE ET AUX ÉNERGIES ALTERNATIVES (CEA), Paris (FR); APHP (ASSISTANCE PUBLIQUE—HÔPITAUX DE PARIS), Paris (FR); UNIVERSITE DE PARIS, Paris (FR); UNIVERSITY OF UTAH RESEARCH FOUNDATION, Salt Lake City, UT (US)

(72) Inventors: Anne Billet, Houilles (FR); Frédéric Schmidt, Vincennes (FR); Ludger Johannes, Courbevoie (FR); Denis Servent, Versailles (FR); Gilles Mourier, Villebon-sur-Yvette (FR); Éric Tartour, Paris (FR); Michael Kay, Salt Lake City, UT (US); James M. Fulcher, Pasco, WA (US)

(73) Assignees: INSTITUT CURIE, Paris (FR); CENTRE NATIONAL DE LA RECHERCHE SCIENTIFIQUE, Paris (FR); INSERM (INSTITUT NATIONAL DE LA SANTÉ ET DE LA RECHERCHE MÉDICALE), Paris (FR); COMMISSARIAT Á L'ÉNERGIE ATOMIQUE ET AUX ÉNERGIES ALTERNATIVES (CEA), Paris (FR); APHP (ASSISTANCE PUBLIQUE—HÔPITAUX DE PARIS), Paris (FR); UNIVERSITE DE PARIS, Paris (FR); UNIVERSITY OF UTAH RESEARCH FOUNDATION, Salt Lake City, UT (US)

( * ) Notice: Subject to any disclaimer, the term of this patent is extended or adjusted under 35 U.S.C. 154(b) by 846 days.

(21) Appl. No.: 17/616,512

(22) PCT Filed: Jun. 4, 2020

(86) PCT No.: PCT/EP2020/065561
§ 371 (c)(1),
(2) Date: Dec. 3, 2021

(87) PCT Pub. No.: WO2020/245321
PCT Pub. Date: Dec. 10, 2020

(65) Prior Publication Data
US 2022/0233673 A1    Jul. 28, 2022

(30) Foreign Application Priority Data

Jun. 4, 2019 (EP) .................................. 19305720

(51) Int. Cl.
| | | |
|---|---|---|
| *C07K 14/00* | (2006.01) | |
| *A61K 39/112* | (2006.01) | |
| *A61K 47/64* | (2017.01) | |
| *C07K 14/25* | (2006.01) | |
| *C07K 14/60* | (2006.01) | |
| *C07K 14/605* | (2006.01) | |
| *C12P 21/02* | (2006.01) | |

(52) U.S. Cl.
CPC ...... *A61K 39/0283* (2013.01); *A61K 47/6415* (2017.08); *C07K 14/25* (2013.01); *C07K 14/60* (2013.01); *C07K 14/605* (2013.01); *C12P 21/02* (2013.01); *C07K 2319/55* (2013.01)

(58) Field of Classification Search
CPC ............ A61K 39/0283; A61K 47/6415; C07K 14/25; C07K 2319/55; C07K 2319/00; C12P 21/02; Y02A 50/30; Y02P 20/55
See application file for complete search history.

(56) References Cited

U.S. PATENT DOCUMENTS

2014/0199379 A1* 7/2014 Tartour .................. A61K 39/39
424/85.1

FOREIGN PATENT DOCUMENTS

WO         02060937 A1     8/2002

OTHER PUBLICATIONS

Beddoe et al., "Structure, biological functions and applications of the AB5 toxins." Trends in biochemical sciences; vol. 35, No. 7; 2010; pp. 411-418.
Bhavsar et al., "Manipulation of host-cell pathways by bacterial pathogens." Nature; vol. 449; No. 7164; Oct. 18, 2007; pp. 827-834.

(Continued)

*Primary Examiner* — Jeanette M Lieb
(74) *Attorney, Agent, or Firm* — Maier & Maier, PLLC

(57) ABSTRACT

A method of producing a monomer of a Shiga toxin B-subunit (STxB) protein or of a variant thereof by peptide chemical synthesis, as well as to a method of producing a pentamer of the STxB protein or of the variant thereof. The methods are particularly advantageous as they overcome major issues typically observed in peptide chemical synthesis, including solubility and purity issues.

10 Claims, 15 Drawing Sheets
Specification includes a Sequence Listing.

(56) References Cited

OTHER PUBLICATIONS

Borgia et al., "Chemical synthesis of proteins." Trends in biotechnology; vol. 18, No. 6; Jun. 2000; pp. 243-251.
Brandal et al., "Shiga Toxin 2a in *Escherichia albertii*." Journal of clinical microbiology; vol. 53, No. 4; Apr. 2015; pp. 1454-1455.
Chauhan et al., "Biochemical Characterization of In vitro Reconstituted Biologically Active Recombinant Shiga Toxin." Protein and peptide letters; vol. 26, No. 3; 2019; 1 page, abstract included.
Choi et al., "Oral immunization with a shiga toxin B subunit: rotavirus NSP4(90) fusion protein protects mice against gastroenteritis." Vaccine; vol. 23, No. 44; 2005; pp. 5168-5176.
Distler et al., "Shiga Toxin Receptor Gb3Cer/CD77: Tumor-Association and Promising Therapeutic Target in Pancreas and Colon Cancer"; PLoS One. vol. 4, No. 8; Aug. 2009; pp. 1-10.
El Alaoui et al., "Shiga Toxin-Mediated Retrograde Delivery of a Topoisomerase I Inhibitor Prodrug." Angewandte Chemie; vol. 46, No. 34; 2007; pp. 6469-6472.
Falguières et al., "Human colorectal tumors and metastases express Gb3 and can be targeted by an intestinal pathogen-based delivery tool." Molecular cancer therapeutics; vol. 7, No. 8; Aug. 2008; pp. 2498-2508.
Gupta et al., "Antibodies against recombinant shiga toxin subunit B neutralize shiga toxin toxicity in HeLa cells." Protein and peptide letters; vol. 17, No. 6; 2010; pp. 774-781.
Haicheur et al., "The B subunit of Shiga toxin coupled to full-size antigenic protein elicits humoral and cell-mediated immune responses associated with a Th1-dominant polarization." International immunology; vol. 15, No. 10; Feb. 3, 2003; pp. 1161-1171.
Haicheur et al., "The B Subunit of Shiga Toxin Fused to a Tumor Antigen Elicits CTL and Targets Dendritic Cells to Allow MHC Class I-Restricted Presentation of Peptides Derived from Exogenous Antigens" J Immunol; vol. 165; No. 6; 2000; pp. 3301-3308.
Janssen et al., "In vivo Tumor Targeting Using a Novel Intestinal Pathogen-Based Delivery Approach", Cancer Res. vol. 66, No. 14, 2006; pp. 7230-7236.
Johannes et al., "Retrograde Transport of KDEL-bearing B-fragment of Shiga Toxin", J Biol Chem; vol. 272, No. 31; Aug. 1, 1997; pp. 19554-19561.
Johannes et al., "Shiga toxins—from cell biology to biomedical applications." Nature reviews. Microbiology; vol. 8, No. 2; Feb. 2010; pp. 105-116.
Kovbasnjuk et al., "The glycosphingolipid globotriaosylceramide in the metastatic transformation of colon cancer." Proceedings of the National Academy of Sciences of the United States of America; vol. 102, No. 52; Dec. 27, 2005; pp. 19087-19092.
Lee et al., "Major histocompatibility complex class I presentation of exogenous soluble tumor antigen fused to the B-fragment of Shiga toxin." European journal of immunology; vol. 28, No. 9; 1998; pp. 2726-2737.
Mhidia et al., "Synthesis of Peptide-Protein Conjugates using N-succinimidyl carbamate chemistry." Bioconjugate chemistry; vol. 21, No. 2; 2010; pp. 219-228.
Petsch et al., "Endotoxin removal from protein solutions." Journal of biotechnology; vol. 76, No. 2-3; 2000; pp. 97-119.
Raibaut et al., "Solid Phase Protein Chemical Synthesis." Topics in current chemistry; vol. 363; 2014; pp. 103-254.
Reid et al., "Automated solid-phase peptide synthesis: Use of 2-(1H-benzotriazol-1-yl)-1,1,3,3,-tetramethyluronium tetrafluoroborate for coupling of tert-Butyloxycarbonyl amino acids", Analytical Biochemistry; vol. 200, No. 2, Feb. 1, 1992; p. 301-309.
Sandvig et al., "Endocytosis, intracellular transport, and cytotoxic action of Shiga toxin and ricin." Physiological reviews; vol. 76, No. 4; Oct. 1996; pp. 949-966.
Sandvig et al., "Retrograde transport of endocytosed Shiga toxin to the endoplasmic reticulum." Nature; vol. 358, No. 6386; Aug. 6, 1992; pp. 510-512.
Sharma et al., "Development of a simple fed-batch process for the high-yield production of recombinant shiga toxin B-chain protein." Protein and peptide letters; vol. 19, No. 2; 2012; pp. 228-237.
Smith et al., "Shiga toxin 1 triggers a ribotoxic stress response leading to p38 and JNK activation and induction of apoptosis in intestinal epithelial cells." Infection and immunity; vol. 71, No. 3; Mar. 2003; pp. 1497-1504.
Tesh., "Induction of apoptosis by Shiga toxins." Future microbiology; vol. 5, No. 3; Mar. 2010; pp. 431-453.
Thorpe et al. "Shiga toxins induce, superinduce, and stabilize a variety of C-X-C chemokine mRNAs in intestinal epithelial cells, resulting in increased chemokine expression." Infection and immunity; vol. 69, No. 10; Oct. 2001; pp. 6140-6147.
Thorpe et al., "Shiga toxins stimulate secretion of interleukin-8 from intestinal epithelial cells." Infection and immunity; vol. 67, No. 11; Nov. 1999; pp. 5985-5993.
Tsang-Lin et al., "Studies of Coupling Kinetics and Correlation of Reaction Conversions to Color Tests for Solid-Phase Peptide Synthesis of AMG 416 by NMR", Organic Process Research & Development; vol. 22, No. 8, Jul. 20, 2018; pp. 1007-1014.
Wakelin et al., "Dirty little secrets—endotoxin contamination of recombinant proteins"; Immunol Lett.; vol. 106, No. 1; 2006; pp. 1-7.
Whiteside, "Immune responses to malignancies." The Journal of allergy and clinical immunology; vol. 125, No. 2; 2010; pp. 1-25.
Wohr et al., "Pseudo-Prolines as a Solubilizing, Structure-Disrupting Protection Technique in Peptide Synthesis" Journal of the American Chemical Society, vol. 118, No. 39; 1996; pp. 9218-9227.
(No author) "Solid Phase Peptide Synthesis", May 1, 2020 (May 1, 2020), Retrieved from the Internet: URL: https://www.bachem.com/fileadmin/user_upload/pdf/Catalogs_Brochures/Solid_Phase_Peptide_Synthesis.pdf.

* cited by examiner

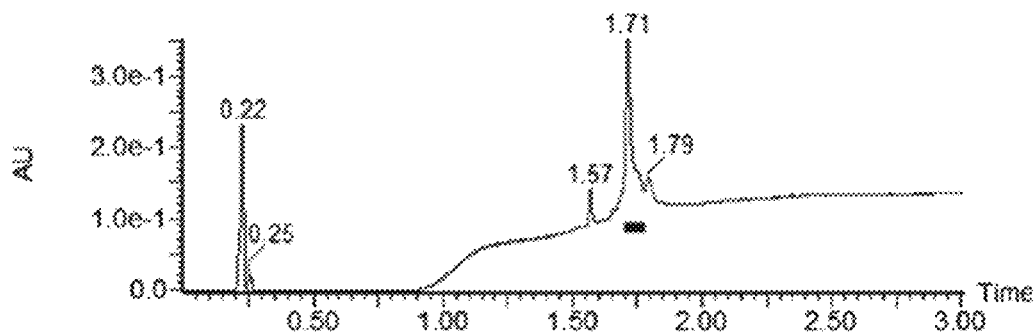
FIG. 1A
FIG. 1B
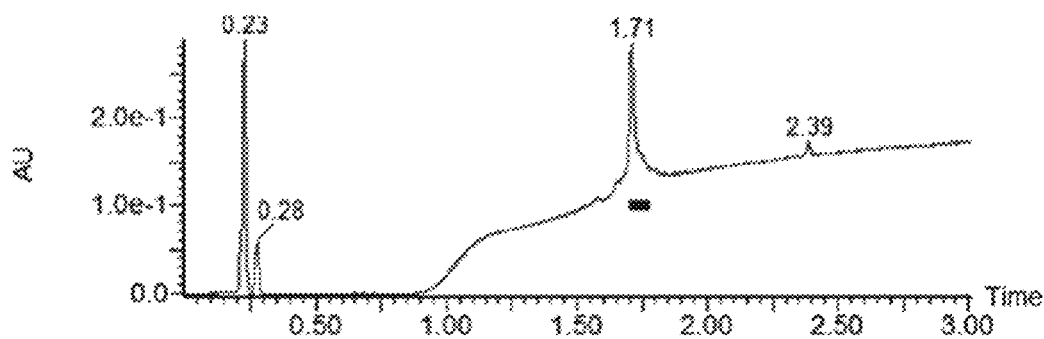
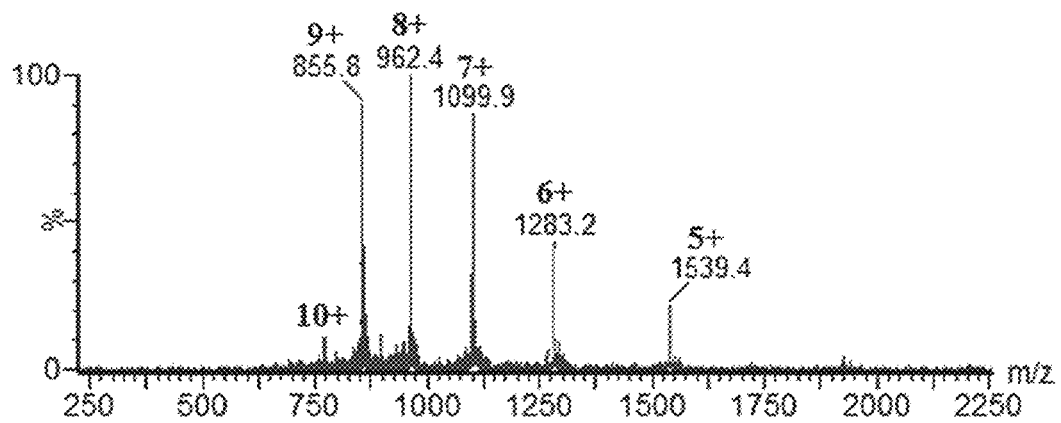
FIG. 1C

METHODS OF PRODUCING SHIGA TOXIN B-SUBUNIT (STxB) MONOMERS AND OLIGOMERS, AND USES THEREOF

FUNDING

This invention was made with government support under grants AI150464 and AI120414 awarded by the National Institutes of Health and grant W81XWH-18-1-0116 awarded by the Department of Defense.

The government has certain rights in this invention.

FIELD

The present invention relates to a method of producing a monomer of a Shiga toxin B-subunit (STxB) protein or of a variant thereof by peptide chemical synthesis, as well as to a method of producing a pentamer of the STxB protein or of the variant thereof. The methods described herein are particularly advantageous as they overcome major issues typically observed in peptide chemical synthesis, including solubility and purity issues.

BACKGROUND

The capacity of antigen presenting cells, such as dendritic cells or macrophages, to process and present antigens on MHC class I and II molecules to T cells determines the successful stimulation of T cell adaptive immune responses. These adaptive immune responses are crucial to fight against infection or cancer cells.

Exogenous antigens internalized by endocytosis are processed within the endosomal system of antigen presenting cells into peptides that are loaded on MHC class II molecules, and transported to the cell surface where they can be recognized by antigen-specific CD4$^+$ T cells.

Antigens which are present or have gained access to the host cell cytosol are processed mostly by proteasome into peptides and transported to the endoplasmic reticulum where they are loaded on MHC class I molecules in a process that has been termed cross-presentation. On the cell surface, MHC class I-peptide complexes are recognized by CD8$^+$ cytotoxic T cells which play a crucial role in the elimination of viruses and intracellular bacteria as well as in the eradication of tumors.

However, many pathogens have evolved sophisticated strategies to elude antigen processing and the presentation machinery of antigen presenting cells, thereby ensuring survival within the host cells (Bhavsar et al., 2007. *Nature.* 449(7164):827-34). Similarly, tumor cells display characteristics which suppress their recognition and elimination from the organism (Whiteside, 2010. *J Allergy Clin Immunol.* 125(2 Suppl 2):S272-83).

There is thereof a need for vectors that are capable of delivering specific antigens into antigen presenting cells, as well as for immunological adjuvants which would boost inefficient host immune responses.

Several bacterial toxins have been intensively studied over the past decades in order to harness their abilities to enter host cells for the stimulation of adaptive T cell responses, direct elimination of cancer cells or to boost immunity as adjuvants.

Shiga toxin (STx) produced by *Shigella dysenteriae* and Shiga-like toxins produced by certain serotypes of *Escherichia coli* and some other bacteria (called STx1 or verotoxin 1; or STx2 or verotoxin 2) are responsible for serious medical conditions like dysentery, hemorrhagic colitis or hemolytic uremic syndrome (for a review, see Johannes & Römer, 2010. *Nat Rev Microbiol.* 8(2):105-16).

All these toxins belong to the AB family of protein toxins. The A-subunit (STxA) is a toxic moiety. After proteolytic activation by the host cell protease furin, it is then translocated into the cytosol of the host cell where it inhibits protein synthesis by modifying a conserved residue of 28S rRNA, thereby causing the cell death (Sandvig & van Deurs, 1996. *Physiol Rev.* 76(4):949-66; Tesh, 2010. *Future Microbiol.* 5(3):431-53). The B-subunit (STxB) is homopentameric and is responsible for STx binding to, and internalization into, target cells by interacting with globotriose-ceramide receptors (Gb3, also known as CD77) expressed on the surface of these cells (Sandvig & van Deurs, 1996. *Physiol Rev.* 76(4):949-66). The toxin is transported in a retrograde fashion from the plasma membrane via endosomes into Golgi apparatus and endoplasmic reticulum (Sandvig et al., 1992. *Nature.* 358(6386):510-2; Johannes et al., 1997. *J Biol Chem.* 272(31):19554-61).

Shiga toxins stimulate production of cytokines, such as IL-1, IL-6, IL-8, TNF-α or GM-CSF, in different cell types via activation of various mitogen-activated protein kinases (Thorpe et al., 1999. *Infect Immun.* 67(11):5985-93; Thorpe et al., 2001. *Infect Immun.* 69(10):6140-7; Smith et al., 2003. *Infect Immun.* 71(3):1497-504; Lee et al., 1998. *Eur J Immunol.* 28(9):2726-37).

Lee et al. (1998. *Eur J Immunol.* 28(9):2726-37) first reported that the non-toxic STxB subunit, carrying an epitope from a model tumor antigen (Mage 1), could be presented by human peripheral blood mononuclear cells in an MHC class-I restricted manner to Mage 1-specific cytotoxic T cells. No additional adjuvant was needed for the induction of specific anti-tumor cytotoxic T cells in mice after immunization with STxB carrying a mouse tumor epitope (Haicheur et al., 2000. *J Immunol.* 165(6):3301-8). It was later shown that vaccination with STxB carrying chemically coupled ovalbumin primed specific anti-OVA cytotoxic T cells and T$_h$1-polarized responses, and induced IgG2a antibodies (Haicheur et al., 2003. *Int Immunol.* 15(10):1161-71). Similarly, it was observed that the oral immunization with a fragment of the immunogenic rotavirus nonstructural protein 4 fragment linked to STxB induced protective humoral and cellular responses in mice (Choi et al., 2005. *Vaccine.* 23(44):5168-76).

Shiga toxin receptor Gb3 was shown to be expressed on malignant, even metastasizing cells (Kavbasnjuk et al., 2005. *Proc Natl Acad Sci USA.* 102(52):19087-92; Distler et al., 2009. *PLoS One.* 4(8):e6813). This can be exploited for the diagnosis of cancer as it was shown that STxB could reach Gb3-expressing digestive tumors in animal models as well as human colorectal tumors and their metastasis (Janssen et al., 2006. *Cancer Res.* 66(14):7230-6; Falguieres et al., 2008. *Mol Cancer Ther.* 7(8):2498-508). A prodrug composition using topoisomerase I inhibitor SN38 coupled to STxB was also designed in order to specifically target cancer cells (El Alaoui et al., 2007. *Angew Chem Int Ed Engl.* 46(34):6469-72).

To date, STxB has been produced recombinantly, but not without difficulties (International patent application WO2002060937; Gupta et al., 2010. *Protein Pept Lett.* 17(6):774-81; Sharma et al., 2012. *Protein Pept Lett.* 19(2): 228-37; Chauhan et al., 2019. *Protein Pept Lett.* 26(3):227-234). This technique, however, suffers drawbacks as any recombinant protein will ultimately be contaminated, at least to some extends, by exogenous impurities (such as process-related and product-related impurities). One such impurity—to name but one—which has raised multiple concerns over the past decades is bacterial endotoxin.

Bacterial endotoxins (also called lipopolysaccharides or LPS) are potent pyrogens that can often produce fever reactions, vasodilatation, changes in physiological functions and, in extreme cases, endotoxic shock, when administered to patients. Fever is a well-known effect, hence the term "pyrogen". About one hour after administration of bacterial endotoxins, a rise in body temperature can be observed. When bacterial endotoxins are injected in sufficient amounts, the fever can be accompanied by chills, body aches, rise in blood pressure, and possibly a state of shock and death. From smaller quantities, the patient may show increased capillary permeability and a wide variety of other circulatory changes. Examples of these changes are shown by a reduction followed by an increase in the number of white cells, tumor hemorrhages, and changes in venous pressures.

The removal of bacterial endotoxins from recombinant therapeutics and the testing to demonstrate endotoxin levels below a minimal threshold require considerable effort, adding significant developmental and manufacturing costs. To date, no post-expression methodologies have been described that can remove endotoxin entirely (Wakelin et al., 2006. *Immunol Lett.* 106(1):1-7). Common endotoxin removal methods, such as ultrafiltration, Triton X phase separation, anion-exchange chromatography, adsorption on activated carbon, or treatment with polymyxin B- or histamine-immobilized affinity resins, are plagued by low efficiency and unsatisfactory selectivity (Petsch & Anspach, 2000. *J Biotechnol.* 76(2-3):97-119). Other methods of minimizing microbial growth and thereby, endotoxin contamination, during purification of recombinant proteins are well known in the art, including the use of sterile solutions and equipment, filtration during purification, working at low temperature, or addition of bacteriostatic agents to the purification. However, the practicality of these methods depends on the specifics of the purification, and do rarely provide endotoxin-free endproducts. Moreover, the cost of sterile purification is often prohibitive.

Despites these difficulties, the FDA has required as early as 1970 that recombinant therapeutics be tested for the presence of impurities, in particular bacterial endotoxins, to ensure sufficiently low levels to be safe upon administration.

There remains therefore a need for the provision of STxB proteins, alone or as conjugates, which are free of impurities, for their safe administration to patients in need.

The development of solid phase peptide synthesis has enabled the production of peptides of pharmaceutical grade purity on a large scale, although this technique still faces many challenges. Indeed, low yields for some peptides due to insolubility issues have been observed, as well as high purification costs required to eliminate byproducts and truncated peptides. STxB is no exception and suffers drawnback when chemically synthesized.

Here, the Inventors provide an improved solution to these remaining issues.

SUMMARY

The present invention relates to a method of producing a monomer of a Shiga toxin B-subunit (STxB) protein or of a variant thereof by peptide chemical synthesis, comprising the steps of:
a) stepwisely coupling amino acid residues onto a support following an amino acid sequence with at least 60% identity to the amino acid sequence set forth in SEQ ID NO: 2 or a fragment thereof,
wherein said amino acid residues comprise α amino-protecting groups and optionally side chain-protecting groups, thereby obtaining a synthetic peptide;
b) deprotecting the synthetic peptide obtained from step a) by removing:
b1) the final α amino-protecting group, and
b2) optionally, the side-chain protecting-groups, thereby obtaining a deprotected synthetic peptide; and
c) cleaving the deprotected synthetic peptide obtained from step b) from the support, thereby obtaining a free monomer of the STxB protein or of the variant thereof.

In one embodiment, step a) comprises the following sequence of substeps:
a1) removing the α amino-protecting group from the support or from the N-terminal amino acid of the synthetic peptide;
a2) optionally, washing the support;
a3) coupling the next amino acid following an amino acid sequence with at least 60% identity to the amino acid sequence set forth in SEQ ID NO: 2 in a linear C- to N-terminal direction;
a4) optionally, washing the support;
a5) optionally, capping unreacted amino groups; and
a6) optionally, washing the support.

In one embodiment,
substep a3) is reiterated more times and/or is carried out for a longer period of time to couple amino acid residues Cys 4, Thr 12, Thr 21, Asn 35, Leu 36, and Ile 45 with respect to SEQ ID NO: 2 numbering than to couple the other amino acid residues of the STxB protein or of the variant thereof; and
dipeptides Val 5-Thr 6, Asp 18-Thr 19, Phe 30-Thr 31, Leu 41-Ser 42, and Val 50-Thr 51 with respect to SEQ ID NO: 2 numbering are coupled in substep a3) in a pseudoproline dipeptide form.

In one embodiment, substep a3) is reiterated more times and/or carried out for a longer period of time to couple amino acid residues Cys 4, Thr 12, Thr 21, Asn 35, Leu 36, Leu 39, Ile 45, Cys 57, and Val 65 with respect to SEQ ID NO: 2 numbering than to couple the other amino acid residues of the STxB protein or of the variant thereof.

In one embodiment, substep a3) is reiterated more times and/or carried out for a longer period of time to couple amino acid residues Cys 4, Thr 12, Thr 21, Asn 35, Leu 36, Leu 39, Ile 45, Thr 49, Cys 57, and Val 65 with respect to SEQ ID NO: 2 numbering than to couple the other amino acid residues of the STxB protein or of the variant thereof.

In one embodiment, substep a3) is reiterated more times and/or carried out for a longer period of time to couple amino acid residues Thr 1, Cys 4, Tyr 11, Thr 12, Thr 21, Asn 35, Leu 36, Leu 39, Ile 45, Thr 46, Thr 49, Cys 57, and Val 65 with respect to SEQ ID NO: 2 numbering than to couple the other amino acid residues of the STxB protein or of the variant thereof.

In one embodiment, dipeptides Val 5-Thr 6, Asp 18-Thr 19, Phe 30-Thr 31, Leu 41-Ser 42, Val 50-Thr 51, and Phe 63-Ser 64 with respect to SEQ ID NO: 2 numbering are coupled in substep a3) in a pseudoproline dipeptide form.

In one embodiment, the method further comprises one or more of the steps of:
d) precipitating the free monomer of the STxB protein or of the variant thereof obtained from step c), and optionally air-drying and/or lyophilizing the precipitated STxB protein or the variant thereof;

e) oxidizing the free monomer of the STxB protein or of the variant thereof obtained from step c) or d) under conditions suitable for the formation of an intramolecular disulfide bond between Cys 4 and Cys 57 with respect to SEQ ID NO: 2 numbering.

In one embodiment, a variant of the Shiga toxin B-subunit (STxB) protein comprises the peptides with SEQ ID NO: 1 and 3 to 21.

In one embodiment, the monomer of the STxB protein or of the variant thereof is produced by peptide chemical synthesis of at least two fragments of said STxB protein or variant thereof, and wherein said at least two fragments are ligated to obtain the monomer of the STxB protein or of the variant thereof.

In one embodiment, said fragments of the STxB protein or of the variant thereof comprise or consist of the peptides with SEQ ID NO: 22 and SEQ ID NO: 23.

The present invention also relates to a method of producing a pentamer of a Shiga toxin B-subunit (STxB) protein or of a variant thereof by peptide chemical synthesis, comprising the steps of:

a) carrying out the method of producing a monomer of a STxB protein or of a variant thereof by peptide chemical synthesis according to the present invention, thereby obtaining a free monomer of the STxB protein or of the variant thereof; and b) refolding the free monomer of the STxB protein or of the variant thereof by dialyzing said protein or the variant thereof against at least one dialysate, thereby obtaining a pentamer of the STxB protein or of the variant thereof.

In one embodiment, the method does not comprise a purification step by chromatography.

The present invention also relates to a monomer or a pentamer of a Shiga toxin B-subunit (STxB) protein or of a variant thereof obtained by the methods according to the present invention.

DETAILED DESCRIPTION

The present invention relates to a monomer of a Shiga toxin B-subunit (STxB) protein or of a variant thereof.

In one embodiment, the STxB protein is STxB from *Shigella dysenteriae*, with Uniprot accession number Q7BQ98-1 (SEQ ID NO: 1).

In one embodiment, the STxB protein is STxB from *Shigella dysenteriae*, with Uniprot accession number Q7BQ98-1, devoid of its signal peptide. The signal peptide of STxB from *Shigella dysenteriae* corresponds to amino acids 1 to 20 of Uniprot accession number Q7BQ98-1 (SEQ ID NO: 1).

In one embodiment, the STxB protein is STxB from *Shigella dysenteriae* devoid of its signal peptide (SEQ ID NO: 2).

```
                                              SEQ ID NO: 1
MKKTLLIAASLSFFSASALATPDCVTGKVEYTKYNDDDTFTVKVGDKEL
FTNRWNLQSLLLSAQITGMTVTIKTNACHNGGGFSEVIFR
```

```
                                              SEQ ID NO: 2
TPDCVTGKVEYTKYNDDDTFTVKVGDKELFTNRWNLQSLLLSAQITGMT
VTIKTNACHNGGGFSEVIFR
```

Unless mentioned otherwise, the term "STxB" is used herein to refer to a STxB protein or a variant thereof, which is devoid of its signal peptide.

In one embodiment, the StxB protein or the variant thereof has an amino acid sequence with at least 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99% identity or more to the amino acid sequence set forth in SEQ ID NO: 2.

As used herein, the term "sequence identity" refers to the number of identical or similar amino acids in a comparison between a test and a reference polypeptide. Sequence identity can be determined by sequence alignment of protein sequences to identify regions of similarity or identity. For purposes herein, sequence identity is generally determined by alignment to identify identical residues. The alignment can be local or global. Matches, mismatches and gaps can be identified between compared sequences. Gaps are null amino acids inserted between the residues of aligned sequences so that identical or similar characters are aligned. Generally, there can be internal and terminal gaps. When using gap penalties, sequence identity can be determined with no penalty for end gaps (e.g., terminal gaps are not penalized). Alternatively, sequence identity can be determined without taking into account gaps as the number of identical positions/lengths of the total aligned sequence× 100.

As used herein, a "global alignment" is an alignment that aligns two sequences from beginning to end, aligning each letter in each sequence only once. An alignment is produced, regardless of whether or not there is similarity or identity between the sequences. For example, 50% sequence identity based on "global alignment" means that in an alignment of the full sequence of two compared sequences, each of 100 nucleotides in length, 50% of the residues are the same. It is understood that global alignment can also be used in determining sequence identity even when the length of the aligned sequences is not the same. The differences in the terminal ends of the sequences will be taken into account in determining sequence identity, unless the "no penalty for end gaps" is selected. Generally, a global alignment is used on sequences that share significant similarity over most of their length. Exemplary algorithms for performing global alignment include the Needleman-Wunsch algorithm (Needleman & Wunsch, 1970. *J Mol Biol.* 48(3):443-53). Exemplary programs and software for performing global alignment are publicly available and include the Global Sequence Alignment Tool available at the National Center for Biotechnology Information (NCBI) website (http://ncbi.nlm.nih.gov), and the program available at deepc2.psi.iastate.edu/aat/align/align.html.

As used herein, a "local alignment" is an alignment that aligns two sequence, but only aligns those portions of the sequences that share similarity or identity. Hence, a local alignment determines if sub-segments of one sequence are present in another sequence. If there is no similarity, no alignment will be returned. Local alignment algorithms include BLAST or Smith-Waterman algorithm (Smith & Waterman, 1981. *Adv Appl Math.* 2(4):482-9). For example, 50% sequence identity based on "local alignment" means that in an alignment of the full sequence of two compared sequences of any length, a region of similarity or identity of 100 nucleotides in length has 50% of the residues that are the same in the region of similarity or identity.

For purposes herein, sequence identity can be determined by standard alignment algorithm programs used with default gap penalties established by each supplier. Default parameters for the GAP program can include:

(1) a unary comparison matrix (containing a value of 1 for identities and 0 for non-identities) and the weighted comparison matrix of Gribskov & Burgess (1986. *Nucleic Acids Res.* 14(16):6745-63), as described by Schwartz & Dayhoff (1979. Matrices for detecting distant relationships. In Dayhoff (Ed.), *Atlas of protein sequences.* 5:353-358. Washington, DC: National Biomedical Research Foundation);

(2) a penalty of 3.0 for each gap and an additional 0.10 penalty for each symbol in each gap; and (3) no penalty for end gaps.

Whether any two polypeptides have amino acid sequences that are at least 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99% or more "identical", or other similar variations reciting a percent identity, can be determined using known computer algorithms based on local or global alignment (see, e.g., wikipedia.org/wiki/Sequence_alignment_software, providing links to dozens of known and publicly available alignment databases and programs).

Generally, for purposes herein, sequence identity is determined using computer algorithms based on global alignment, such as the Needleman-Wunsch Global Sequence Alignment tool available from NCBI/BLAST (http://blast.ncbi.nlm.nih.gov/Blast.cgi?Web&Page_BlastHome); LAlign (William Pearson implementing the Huang and Miller algorithm [Huang & Miller, 1991. *Adv Appl Math.* 12(3):337-57); and program from Xiaoqui Huang available at http://deepc2.psi.iastate.edu/aat/align/align.html.

Typically, the full-length sequence of each of the compared polypeptides is aligned across the full-length of each sequence in a global alignment. Local alignment also can be used when the sequences being compared are substantially the same length.

Therefore, as used herein, the term "identity" represents a comparison or alignment between a test and a reference polypeptide.

In one exemplary embodiment, "at least 60% of sequence identity" refers to percent identities from 60 to 100% relative to the reference polypeptide. Identity at a level of 60% or more is indicative of the fact that, assuming for exemplification purposes a test and reference polypeptide length of 100 amino acids are compared, no more than 40% (i.e., 40 out of 100) of amino acids in the test polypeptide differ from those of the reference polypeptide. Such differences can be represented as point mutations randomly distributed over the entire length of an amino acid sequence or they can be clustered in one or more locations of varying length up to the maximum allowable, e.g., 40/100 amino acid difference (approximately 60% identity). Differences can also be due to deletions or truncations of amino acid residues. Differences are defined as amino acid substitutions, insertions or deletions. Depending on the length of the compared sequences, at the level of homologies or identities above about 85-90%, the result can be independent of the program and gap parameters set; such high levels of identity can be assessed readily, often without relying on software.

Also encompassed in the present invention are variants of the Shiga toxin B-subunit (STxB) protein.

As used herein, the term "variant" is meant to encompass homologs, fragments, mutants, and conjugates of the STxB protein, including combinations thereof.

As used herein, the term "homolog" with reference to the STxB protein from *Shigella dysenteriae*, refers to a distinct protein from another family or species which is determined by functional, structural or genomic analyses to correspond to the original STxB protein from *Shigella dysenteriae*. Most often, homologs will have functional, structural, or genomic similarities. Techniques are known by which homologs of a protein can readily be cloned using genetic probes and PCR. The identity of cloned sequences as homologous can be confirmed using functional assays and/or by genomic mapping of the genes.

In one embodiment, a homolog of the STxB protein from *Shigella dysenteriae* is STxB from bacteria of the genus *Escherichia*. These *Escherichia* bacteria are commonly named "Shiga toxin-producing *Escherichia coli*" or "STEC", although STxB proteins have been identified in at least one other species of the genus *Escherichia* (Brandal et al., 2015. *J Clin Microbiol.* 53(4):1454-5).

STxB proteins from *Escherichia* may be classified in two distinct types: STx1B and STx2B, and further divided into several subtypes: STx1B, STx1cB, STx1 dB, STx2B, STx2cB, STx2 dB, STx2eB, STx2fB and STx2gB.

In one embodiment, a homolog of the STxB protein from *Shigella dysenteriae* is STxB from bacteria of the genus *Escherichia*, selected from the group comprising or consisting of STx1B, STx1cB, STx1 dB, STx2B, STx2cB, STx2 dB, STx2eB, STx2fB and STx2gB.

In one embodiment, a homolog of the STxB protein of the invention is STx1B from *Escherichia coli*, with Uniprot accession number Q8X4M7-1 (SEQ ID NO: 1). In one embodiment, a homolog of the STxB protein of the invention is STx1B from *Escherichia coli*, with Uniprot accession number Q8X4M7-1, devoid of its signal peptide. The signal peptide of STx1B from *Escherichia coli* corresponds to amino acids 1 to 20 of Uniprot accession number Q8X4M7-1 (SEQ ID NO: 1). In one embodiment, a homolog of the STxB protein of the invention is STx1B from *Escherichia coli* devoid of its signal peptide (SEQ ID NO: 2). In one embodiment, a homolog of the STxB protein of the invention has an amino acid sequence with at least 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99% identity or more to the amino acid sequence set forth in SEQ ID NO: 2.

SEQ ID NO: 1
MKKTLLIAASLSFFSASALATPDCVTGKVEYTKYNDDDTFTVKVGDKEL
FTNRWNLQSLLLSAQITGMTVTIKTNACHNGGGFSEVIFR

SEQ ID NO: 2
TPDCVTGKVEYTKYNDDDTFTVKVGDKELFTNRWNLQSLLLSAQITGMT
VTIKTNACHNGGGFSEVIFR

In one embodiment, a homolog of the STxB protein of the invention is STx1cB from *Escherichia coli*, with Uniprot accession number Q47641-1 (SEQ ID NO: 3). In one embodiment, a homolog of the STxB protein of the invention is STx1cB from *Escherichia coli*, with Uniprot accession number Q47641-1, devoid of its signal peptide. The signal peptide of STx1cB from *Escherichia coli* corresponds to amino acids 1 to 20 of Uniprot accession number Q47641-1 (SEQ ID NO: 3). In one embodiment, a homolog of the STxB protein of the invention is STx1cB from *Escherichia coli* devoid of its signal peptide (SEQ ID NO: 4). In one embodiment, a homolog of the STxB protein of the invention has an amino acid sequence with at least 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99% identity or more to the amino acid sequence set forth in SEQ ID NO: 4.

SEQ ID NO: 3
MKKILLIAASLSFFSASVLAAPDCVTGKVEYTKYNDDDTFTVKVGDKEL
FTNRWNLQSLLLSAQITGMTVTIKTNACHNGGGFSEVIFR

SEQ ID NO: 4
APDCVTGKVEYTKYNDDDTFTVKVGDKELFTNRWNLQSLLLSAQITGMT
VTIKTNACHNGGGFSEVIFR

In one embodiment, a homolog of the STxB protein of the invention is STx1 dB from *Escherichia coli*, with Uniprot accession number Q83XK2-1 (SEQ ID NO: 5). In one embodiment, a homolog of the STxB protein of the invention is STx1 dB from *Escherichia coli*, with Uniprot accession number Q83XK2-1, devoid of its signal peptide. The signal peptide of STx1 dB from *Escherichia coli* corresponds to amino acids 1 to 20 of Uniprot accession number Q83XK2-1 (SEQ ID NO: 5). In one embodiment, a homolog of the STxB protein of the invention is STx1 dB from *Escherichia coli* devoid of its signal peptide (SEQ ID NO: 6). In one embodiment, a homolog of the STxB protein of the invention has an amino acid sequence with at least 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99% identity or more to the amino acid sequence set forth in SEQ ID NO: 6.

SEQ ID NO: 5
MKKVLLIAVSLSFLSASVLAAPDCVTGKVEYTKYNDDDTFTVKVADKEL
FTNRWNLQSLLLSAQITGMTVTIKTTACHNGGGFSEVIFR

SEQ ID NO: 6
APDCVTGKVEYTKYNDDDTFTVKVADKELFTNRWNLQSLLLSAQITGMT
VTIKTTACHNGGGFSEVIFR

In one embodiment, a homolog of the STxB protein of the invention is STx2B from *Escherichia coli*, with Uniprot accession number Q8X531-1 (SEQ ID NO: 7). In one embodiment, a homolog of the STxB protein of the invention is STx2B from *Escherichia coli*, with Uniprot accession number Q8X531-1, devoid of its signal peptide. The signal peptide of STx2B from *Escherichia coli* corresponds to amino acids 1 to 19 of Uniprot accession number Q8X531-1 (SEQ ID NO: 7). In one embodiment, a homolog of the STxB protein of the invention is STx2B from *Escherichia coli* devoid of its signal peptide (SEQ ID NO: 8). In one embodiment, a homolog of the STxB protein of the invention has an amino acid sequence with at least 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99% identity or more to the amino acid sequence set forth in SEQ ID NO: 8.

SEQ ID NO: 7
MKKMFMAVLFALASVNAMAADCAKGKIEFSKYNEDDTFTVKVDGKEYWT
SRWNLQPLLQSAQLTGMTVTIKSSTCESGSGFAEVQFNND

SEQ ID NO: 8
ADCAKGKIEFSKYNEDDTFTVKVDGKEYWTSRWNLQPLLQSAQLTGMTV
TIKSSTCESGSGFAEVQFNND

In one embodiment, a homolog of the STxB protein of the invention is STx2cB from *Escherichia coli*, with Uniprot accession number Q07871-1 (SEQ ID NO: 9). In one embodiment, a homolog of the STxB protein of the invention is STx2cB from *Escherichia coli*, with Uniprot accession number Q07871-1, devoid of its signal peptide. The signal peptide of STx2cB from *Escherichia coli* corresponds to amino acids 1 to 19 of Uniprot accession number Q07871-1 (SEQ ID NO: 9). In one embodiment, a homolog of the STxB protein of the invention is STx2cB from *Escherichia coli* devoid of its signal peptide (SEQ ID NO: 10). In one embodiment, a homolog of the STxB protein of the invention has an amino acid sequence with at least 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99% identity or more to the amino acid sequence set forth in SEQ ID NO: 10.

SEQ ID NO: 9
MKKMFMAVLFALVSVNAMAADCAKGKIEFSKYNENDTFTVKVAGKEYWT
SRWNLQPLLQSAQLTGMTVTIKSSTCESGSGFAEVQFNND

SEQ ID NO: 10
ADCAKGKIEFSKYNENDTFTVKVAGKEYWTSRWNLQPLLQSAQLTGMTV
TIKSSTCESGSGFAEVQFNND

In one embodiment, a homolog of the STxB protein of the invention is STx2 dB from *Escherichia coli*, with Uniprot accession number Q8GGL0-1 (SEQ ID NO: 11). In one embodiment, a homolog of the STxB protein of the invention is STx2 dB from *Escherichia coli*, with Uniprot accession number Q8GGL0-1, devoid of its signal peptide. The signal peptide of STx2 dB from *Escherichia coli* corresponds to amino acids 1 to 19 of Uniprot accession number Q8GGL0-1 (SEQ ID NO: 11). In one embodiment, a homolog of the STxB protein of the invention is STx2 dB from *Escherichia coli* devoid of its signal peptide (SEQ ID NO: 12). In one embodiment, a homolog of the STxB protein of the invention has an amino acid sequence with at least 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99% identity or more to the amino acid sequence set forth in SEQ ID NO: 12.

SEQ ID NO: 11
MKKMFMAVLFALVSVNAMAADCAKGKIEFSKYNENDTFTVKVDGKEYWTSR
WNLQPLLQSAQLTGMTVTIKSSTCASGSGFAEVQFNND

SEQ ID NO: 12
ADCAKGKIEFSKYNENDTFTVKVDGKEYWTSRWNLQPLLQSAQLTGMTV
TIKSSTCASGSGFAEVQFNND

In one embodiment, a homolog of the STxB protein of the invention is STx2eB from *Escherichia coli*, with Uniprot accession number Q47644-1 (SEQ ID NO: 13). In one embodiment, a homolog of the STxB protein of the invention is STx2eB from *Escherichia coli*, with Uniprot accession number Q47644-1, devoid of its signal peptide. The signal peptide of STx2eB from *Escherichia coli* corresponds to amino acids 1 to 19 of Uniprot accession number Q47644-1 (SEQ ID NO: 13). In one embodiment, a homolog of the STxB protein of the invention is STx2eB from *Escherichia coli* devoid of its signal peptide (SEQ ID NO: 14). In one embodiment, a homolog of the STxB protein of the invention has an amino acid sequence with at least 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99% identity or more to the amino acid sequence set forth in SEQ ID NO: 14.

SEQ ID NO: 13
MKKMFIAVLFALVSVNAMAADCAKGKIEFSKYNEDNTFTVKVSGREYWTNR
WNLQPLLQSAQLTGMTVTIISNTCSSGSGFAQVKFN

SEQ ID NO: 14
ADCAKGKIEFSKYNEDNTFTVKVSGREYWTNRWNLQPLLQSAQLTGMTVT
IISNTCSSGSGFAQVKFN

In one embodiment, a homolog of the STxB protein of the invention is STx2fB from *Escherichia coli*, with Uniprot accession number Q47646-1 (SEQ ID NO: 15). In one embodiment, a homolog of the STxB protein of the invention is STx2fB from *Escherichia coli*, with Uniprot accession number Q47646-1, devoid of its signal peptide. The signal peptide of STx2fB from *Escherichia coli* corresponds to amino acids 1 to 19 of Uniprot accession number Q47646-1 (SEQ ID NO: 15). In one embodiment, a homolog of the STxB protein of the invention is STx2fB from *Escherichia coli* devoid of its signal peptide (SEQ ID NO: 16). In one embodiment, a homolog of the STxB protein of the invention has an amino acid sequence with at least 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99% identity or more to the amino acid sequence set forth in SEQ ID NO: 16.

SEQ ID NO: 15
MKKMIIAVLFGLFSANSMAADCAVGKIEFSKYNEDDTFTVKVSGREYWTN
RWNLQPLLQSAQLTGMTVTIISNTCSSGSGFAQVKFN

SEQ ID NO: 16
ADCAVGKIEFSKYNEDDTFTVKVSGREYWTNRWNLQPLLQSAQLTGMTVT
IISNTCSSGSGFAQVKFN

In one embodiment, a homolog of the STxB protein of the invention is STx2fB from *Escherichia albertii*, with Uniprot accession number C6L1N1-1 (SEQ ID NO: 17). In one embodiment, a homolog of the STxB protein of the invention is STx2fB from *Escherichia albertii*, with Uniprot accession number C6L1N1-1, devoid of its signal peptide. The signal peptide of STx2fB from *Escherichia albertii* corresponds to amino acids 1 to 19 of Uniprot accession number C6L1N1-1 (SEQ ID NO: 17). In one embodiment, a homolog of the STxB protein of the invention is STx2fB from *Escherichia albertii* devoid of its signal peptide (SEQ ID NO: 18). In one embodiment, a homolog of the STxB protein of the invention has an amino acid sequence with at least 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99% identity or more to the amino acid sequence set forth in SEQ ID NO: 18.

SEQ ID NO: 17
MKKMIIAVLFGLFSANSMAADCAVGKIEFSKYNEDNTFTVRVSGREYWTN
RWNLQPLLQSAQLTGMTVTIISNTCSSGSGFAQVKFN

SEQ ID NO: 18
ADCAVGKIEFSKYNEDNTFTVRVSGREYWTNRWNLQPLLQSAQLTGMTVT
IISNTCSSGSGFAQVKFN

In one embodiment, a homolog of the STxB protein of the invention is STx2gB from *Escherichia coli*, with Uniprot accession number Q8VLE0-1 (SEQ ID NO: 19). In one embodiment, a homolog of the STxB protein of the invention is STx2gB from *Escherichia coli*, with Uniprot accession number Q8VLE0-1, devoid of its signal peptide. The signal peptide of STx2gB from *Escherichia coli* corresponds to amino acids 1 to 19 of Uniprot accession number Q8VLE0-1 (SEQ ID NO: 19). In one embodiment, a homolog of the STxB protein of the invention is STx2gB from *Escherichia coli* devoid of its signal peptide (SEQ ID NO: 20). In one embodiment, a homolog of the STxB protein of the invention has an amino acid sequence with at least 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99% identity or more to the amino acid sequence set forth in SEQ ID NO: 20.

SEQ ID NO: 19
MKKMFMAVLFALVSVNAMAADCAKGKIEFSKYNGDNTFTVKVDGKEYWT
NRWNLQPLLQSAQLTGMTVTIKSNTCESGSGFAEVQFNND

SEQ ID NO: 20
ADCAKGKIEFSKYNGDNTFTVKVDGKEYWTNRWNLQPLLQSAQLTGMTV
TIKSNTCESGSGFAEVQFNND

As used herein, the term "fragment" with reference to the STxB protein or to a variant thereof refers to a portion of the STxB protein or of a variant thereof retaining the same or substantially the same biological function, activity and/or local structure, with respect to the specific biological function, activity and/or local structure identified for the full length STxB protein. A skilled person will understand that the term encompasses peptides of any origin which have a sequence corresponding to the portion of the STxB protein or of a variant thereof.

In one embodiment, a fragment of the STxB protein or of a variant thereof according to the invention comprises more than 10, preferably more than 15, 20, 25, 30, 35, 40, 45, 50, 55, 60 or 65 amino acids of the full length STxB protein. In one embodiment, a fragment of the STxB protein or of a variant thereof according to the invention comprises more than 10, preferably more than 15, 20, 25, 30, 35, 40, 45, 50, 55, 60 or 65 consecutive amino acids of the full length STxB protein.

In one embodiment, a fragment of the STxB protein or of a variant thereof according to the invention comprises 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, or 69 amino acids of the full length STxB protein. In one embodiment, a fragment of the STxB protein or of a variant thereof according to the invention comprises 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, or 69 consecutive amino acids of the full length STxB protein.

In one embodiment, a fragment of the STxB protein or of a variant thereof according to the invention comprises more than 10, preferably more than 15, 20, 25, 30, 35, 40, 45, 50, 55, 60 or 65 amino acids of SEQ ID NO: 1, SEQ ID NO: 3, SEQ ID NO: 5, SEQ ID NO: 7, SEQ ID NO: 9, SEQ ID NO: 11, SEQ ID NO: 13, SEQ ID NO: 15, SEQ ID NO: 17 or SEQ ID NO: 19. In one embodiment, a fragment of the STxB protein or of a variant thereof according to the invention comprises more than 10, preferably more than 15, 20, 25, 30, 35, 40, 45, 50, 55, 60 or 65 consecutive amino acids of SEQ ID NO: 1, SEQ ID NO: 3, SEQ ID NO: 5, SEQ ID NO: 7, SEQ ID NO: 9, SEQ ID NO: 11, SEQ ID NO: 13, SEQ ID NO: 15, SEQ ID NO: 17 or SEQ ID NO: 19.

In one embodiment, a fragment of the STxB protein or of a variant thereof according to the invention comprises 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, or 69 amino acids of SEQ ID NO: 1, SEQ ID NO: 3, SEQ ID NO: 5, SEQ ID NO: 7, SEQ ID NO: 9, SEQ ID NO: 11, SEQ ID NO: 13, SEQ ID NO: 15, SEQ ID NO: 17 or SEQ ID NO: 19.

In one embodiment, a fragment of the STxB protein or of a variant thereof according to the invention comprises 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, or 69 consecutive amino acids of SEQ ID NO: 1, SEQ ID NO: 3, SEQ ID NO: 5, SEQ ID NO: 7, SEQ ID NO: 9, SEQ ID NO: 11, SEQ ID NO: 13, SEQ ID NO: 15, SEQ ID NO: 17 or SEQ ID NO: 19.

In one embodiment, a fragment of the STxB protein or of a variant thereof according to the invention comprises more than 10, preferably more than 15, 20, 25, 30, 35, 40, 45, 50, 55, 60 or 65 amino acids of SEQ ID NO: 2, SEQ ID NO: 4, SEQ ID NO: 6, SEQ ID NO: 8, SEQ ID NO: 10, SEQ ID NO: 12, SEQ ID NO: 14, SEQ ID NO: 16, SEQ ID NO: 18 or SEQ ID NO: 20. In one embodiment, a fragment of the STxB protein or of a variant thereof according to the invention comprises more than 10, preferably more than 15, 20, 25, 30, 35, 40, 45, 50, 55, 60 or 65 consecutive amino acids of SEQ ID NO: 2, SEQ ID NO: 4, SEQ ID NO: 6, SEQ ID NO: 8, SEQ ID NO: 10, SEQ ID NO: 12, SEQ ID NO: 14, SEQ ID NO: 16, SEQ ID NO: 18 or SEQ ID NO: 20.

In one embodiment, a fragment of the STxB protein or of a variant thereof according to the invention comprises 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, or 69 amino acids of SEQ ID NO: 2, SEQ ID NO: 4, SEQ ID NO: 6, SEQ ID NO: 8, SEQ ID NO: 10, SEQ ID NO: 12, SEQ ID NO: 14, SEQ ID NO: 16, SEQ ID NO: 18 or SEQ ID NO: 20.

In one embodiment, a fragment of the STxB protein or of a variant thereof according to the invention comprises 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, or 69 consecutive amino acids of SEQ ID NO: 2, SEQ ID NO: 4, SEQ ID NO: 6, SEQ ID NO: 8, SEQ ID NO: 10, SEQ ID NO: 12, SEQ ID NO: 14, SEQ ID NO: 16, SEQ ID NO: 18 or SEQ ID NO: 20.

As used herein, the term "mutant" with reference to the STxB protein or to a variant thereof refers to a STxB protein or a variant thereof in which one or more amino acids have been altered. Such alterations include addition and/or substitution and/or deletion and/or insertion of one or several amino acids at the N-terminus, and/or the C-terminus, and/or within the native amino acid sequence of the STxB protein according to the present invention.

In one embodiment, a mutant of the STxB protein or of a variant thereof according to the invention comprises 1, 2, 3, 4, 5, 6, 7, 8, 9, 10, 11, 12, 13, 14, 15, 16, 17, 18, 19, 20, 21, 22, 23, 24, 25, 26, 27 or 28 amino acid residues which have been added, substituted, deleted or inserted, at the N-terminus, and/or the C-terminus, and/or within the native amino acid sequence of the STxB protein according to the present invention.

In one embodiment, a mutant of the STxB protein or of a variant thereof according to the invention comprises 1, 2, 3, 4, 5, 6, 7, 8, 9, 10, 11, 12, 13, 14, 15, 16, 17, 18, 19, 20, 21, 22, 23, 24, 25, 26, 27 or 28 amino acid residues which have been added, substituted, deleted or inserted, at the N-terminus, and/or the C-terminus, and/or within the amino acid sequence set forth in SEQ ID NO: 1, SEQ ID NO: 3, SEQ ID NO: 5, SEQ ID NO: 7, SEQ ID NO: 9, SEQ ID NO: 11, SEQ ID NO: 13, SEQ ID NO: 15, SEQ ID NO: 17 or SEQ ID NO: 19.

In one embodiment, a mutant of the STxB protein or of a variant thereof according to the invention comprises 1, 2, 3, 4, 5, 6, 7, 8, 9, 10, 11, 12, 13, 14, 15, 16, 17, 18, 19, 20, 21, 22, 23, 24, 25, 26, 27 or 28 amino acid residues which have been added, substituted, deleted or inserted, at amino acid position 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 56, 57, 58, 59, 60, 61, 62, 63, 64, 65, 66, 67, 68, and/or 69 of the amino acid sequence set forth in SEQ ID NO: 1, SEQ ID NO: 3, SEQ ID NO: 5, SEQ ID NO: 7, SEQ ID NO: 9, SEQ ID NO: 11, SEQ ID NO: 13, SEQ ID NO: 15, SEQ ID NO: 17 or SEQ ID NO: 19.

In one embodiment, a mutant of the STxB protein or of a variant thereof according to the invention comprises 1, 2, 3, 4, 5, 6, 7, 8, 9, 10, 11, 12, 13, 14, 15, 16, 17, 18, 19, 20, 21, 22, 23, 24, 25, 26, 27 or 28 amino acid residues which have been added at the N-terminus, and/or the C-terminus, and/or within the amino acid sequence set forth in SEQ ID NO: 1, SEQ ID NO: 3, SEQ ID NO: 5, SEQ ID NO: 7, SEQ ID NO: 9, SEQ ID NO: 11, SEQ ID NO: 13, SEQ ID NO: 15, SEQ ID NO: 17 or SEQ ID NO: 19.

In one embodiment, a mutant of the STxB protein or of a variant thereof according to the invention comprises 1, 2, 3, 4, 5, 6, 7, 8, 9, 10, 11, 12, 13, 14, 15, 16, 17, 18, 19, 20, 21, 22, 23, 24, 25, 26, 27 or 28 amino acid residues which have been added at amino acid position 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 56, 57, 58, 59, 60, 61, 62, 63, 64, 65, 66, 67, 68, and/or 69 of the amino acid sequence set forth in SEQ ID NO: 1, SEQ ID NO: 3, SEQ ID NO: 5, SEQ ID NO: 7, SEQ ID NO: 9, SEQ ID NO: 11, SEQ ID NO: 13, SEQ ID NO: 15, SEQ ID NO: 17 or SEQ ID NO: 19.

In one embodiment, a mutant of the STxB protein or of a variant thereof according to the invention comprises 1, 2, 3, 4, 5, 6, 7, 8, 9, 10, 11, 12, 13, 14, 15, 16, 17, 18, 19, 20, 21, 22, 23, 24, 25, 26, 27 or 28 amino acid residues which have been substituted at the N-terminus, and/or the C-terminus, and/or within the amino acid sequence set forth in SEQ ID NO: 1, SEQ ID NO: 3, SEQ ID NO: 5, SEQ ID NO: 7, SEQ ID NO: 9, SEQ ID NO: 11, SEQ ID NO: 13, SEQ ID NO: 15, SEQ ID NO: 17 or SEQ ID NO: 19.

In one embodiment, a mutant of the STxB protein or of a variant thereof according to the invention comprises 1, 2, 3, 4, 5, 6, 7, 8, 9, 10, 11, 12, 13, 14, 15, 16, 17, 18, 19, 20, 21, 22, 23, 24, 25, 26, 27 or 28 amino acid residues which have been substituted at amino acid position 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 56, 57, 58, 59, 60, 61, 62, 63, 64, 65, 66, 67, 68, and/or 69 of the amino acid sequence set forth in SEQ ID NO: 1, SEQ ID NO: 3, SEQ ID NO: 5, SEQ ID NO: 7, SEQ ID NO: 9, SEQ ID NO: 11, SEQ ID NO: 13, SEQ ID NO: 15, SEQ ID NO: 17 or SEQ ID NO: 19.

In one embodiment, a mutant of the STxB protein or of a variant thereof according to the invention comprises 1, 2, 3, 4, 5, 6, 7, 8, 9, 10, 11, 12, 13, 14, 15, 16, 17, 18, 19, 20, 21, 22, 23, 24, 25, 26, 27 or 28 amino acid residues which have been deleted at the N-terminus, and/or the C-terminus, and/or within the amino acid sequence set forth in SEQ ID NO: 1, SEQ ID NO: 3, SEQ ID NO: 5, SEQ ID NO: 7, SEQ ID NO: 9, SEQ ID NO: 11, SEQ ID NO: 13, SEQ ID NO: 15, SEQ ID NO: 17 or SEQ ID NO: 19.

In one embodiment, a mutant of the STxB protein or of a variant thereof according to the invention comprises 1, 2, 3, 4, 5, 6, 7, 8, 9, 10, 11, 12, 13, 14, 15, 16, 17, 18, 19, 20, 21, 22, 23, 24, 25, 26, 27 or 28 amino acid residues which have been deleted at amino acid position 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 56, 57, 58, 59, 60, 61, 62, 63, 64, 65, 66, 67, 68, and/or 69 of the amino acid sequence set forth in SEQ ID NO: 1, SEQ ID NO: 3, SEQ ID NO: 5, SEQ ID NO: 7, SEQ ID NO: 9, SEQ ID NO: 11, SEQ ID NO: 13, SEQ ID NO: 15, SEQ ID NO: 17 or SEQ ID NO: 19.

In one embodiment, a mutant of the STxB protein or of a variant thereof according to the invention comprises 1, 2, 3, 4, 5, 6, 7, 8, 9, 10, 11, 12, 13, 14, 15, 16, 17, 18, 19, 20, 21, 22, 23, 24, 25, 26, 27 or 28 amino acid residues which have been inserted at the N-terminus, and/or the C-terminus, and/or within the amino acid sequence set forth in SEQ ID NO: 1, SEQ ID NO: 3, SEQ ID NO: 5, SEQ ID NO: 7, SEQ ID NO: 9, SEQ ID NO: 11, SEQ ID NO: 13, SEQ ID NO: 15, SEQ ID NO: 17 or SEQ ID NO: 19.

In one embodiment, a mutant of the STxB protein or of a variant thereof according to the invention comprises 1, 2, 3, 4, 5, 6, 7, 8, 9, 10, 11, 12, 13, 14, 15, 16, 17, 18, 19, 20, 21, 22, 23, 24, 25, 26, 27 or 28 amino acid residues which have been inserted at amino acid position 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 56, 57, 58, 59, 60, 61, 62, 63, 64, 65, 66, 67, 68, and/or 69 of the amino acid sequence set forth in SEQ ID NO: 1, SEQ ID NO: 3, SEQ ID NO: 5, SEQ ID NO: 7, SEQ ID NO: 9, SEQ ID NO: 11, SEQ ID NO: 13, SEQ ID NO: 15, SEQ ID NO: 17 or SEQ ID NO: 19.

In one embodiment, a mutant of the STxB protein or of a variant thereof according to the invention comprises 1, 2, 3, 4, 5, 6, 7, 8, 9, 10, 11, 12, 13, 14, 15, 16, 17, 18, 19, 20, 21, 22, 23, 24, 25, 26, 27 or 28 amino acid residues which have been added, substituted, deleted or inserted, at the N-terminus, and/or the C-terminus, and/or within the amino acid sequence set forth in SEQ ID NO: 2, SEQ ID NO: 4, SEQ ID NO: 6, SEQ ID NO: 8, SEQ ID NO: 10, SEQ ID NO: 12, SEQ ID NO: 14, SEQ ID NO: 16, SEQ ID NO: 18 or SEQ ID NO: 20.

In one embodiment, a mutant of the STxB protein or of a variant thereof according to the invention comprises 1, 2, 3, 4, 5, 6, 7, 8, 9, 10, 11, 12, 13, 14, 15, 16, 17, 18, 19, 20, 21, 22, 23, 24, 25, 26, 27 or 28 amino acid residues which have been added, substituted, deleted or inserted, at amino acid position 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 56, 57, 58, 59, 60, 61, 62, 63, 64, 65, 66, 67, 68, and/or 69 of the amino acid sequence set forth in SEQ ID NO: 2, SEQ ID NO: 4, SEQ ID NO: 6, SEQ ID NO: 8, SEQ ID NO: 10, SEQ ID NO: 12, SEQ ID NO: 14, SEQ ID NO: 16, SEQ ID NO: 18 or SEQ ID NO: 20.

In one embodiment, a mutant of the STxB protein or of a variant thereof according to the invention comprises 1, 2, 3, 4, 5, 6, 7, 8, 9, 10, 11, 12, 13, 14, 15, 16, 17, 18, 19, 20, 21, 22, 23, 24, 25, 26, 27 or 28 amino acid residues which have been added at the N-terminus, and/or the C-terminus, and/or within the amino acid sequence set forth in SEQ ID NO: 2, SEQ ID NO: 4, SEQ ID NO: 6, SEQ ID NO: 8, SEQ ID NO: 10, SEQ ID NO: 12, SEQ ID NO: 14, SEQ ID NO: 16, SEQ ID NO: 18 or SEQ ID NO: 20.

In one embodiment, a mutant of the STxB protein or of a variant thereof according to the invention comprises 1, 2, 3, 4, 5, 6, 7, 8, 9, 10, 11, 12, 13, 14, 15, 16, 17, 18, 19, 20, 21, 22, 23, 24, 25, 26, 27 or 28 amino acid residues which have been added at amino acid position 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 56, 57, 58, 59, 60, 61, 62, 63, 64, 65, 66, 67, 68, and/or 69 of the amino acid sequence set forth in SEQ ID NO: 2, SEQ ID NO: 4, SEQ ID NO: 6, SEQ ID NO: 8, SEQ ID NO: 10, SEQ ID NO: 12, SEQ ID NO: 14, SEQ ID NO: 16, SEQ ID NO: 18 or SEQ ID NO: 20.

In one embodiment, a mutant of the STxB protein or of a variant thereof according to the invention comprises 1, 2, 3, 4, 5, 6, 7, 8, 9, 10, 11, 12, 13, 14, 15, 16, 17, 18, 19, 20, 21, 22, 23, 24, 25, 26, 27 or 28 amino acid residues which have been substituted at the N-terminus, and/or the C-terminus, and/or within the amino acid sequence set forth in SEQ ID NO: 2, SEQ ID NO: 4, SEQ ID NO: 6, SEQ ID NO: 8, SEQ ID NO: 10, SEQ ID NO: 12, SEQ ID NO: 14, SEQ ID NO: 16, SEQ ID NO: 18 or SEQ ID NO: 20.

In one embodiment, a mutant of the STxB protein or of a variant thereof according to the invention comprises 1, 2, 3, 4, 5, 6, 7, 8, 9, 10, 11, 12, 13, 14, 15, 16, 17, 18, 19, 20, 21, 22, 23, 24, 25, 26, 27 or 28 amino acid residues which have been substituted at amino acid position 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 56, 57, 58, 59, 60, 61, 62, 63, 64, 65, 66, 67, 68, and/or 69 of the amino acid sequence set forth in SEQ ID NO: 2, SEQ ID NO: 4, SEQ ID NO: 6, SEQ ID NO: 8, SEQ ID NO: 10, SEQ ID NO: 12, SEQ ID NO: 14, SEQ ID NO: 16, SEQ ID NO: 18 or SEQ ID NO: 20.

In one embodiment, a mutant of the STxB protein or of a variant thereof according to the invention comprises 1, 2, 3, 4, 5, 6, 7, 8, 9, 10, 11, 12, 13, 14, 15, 16, 17, 18, 19, 20, 21, 22, 23, 24, 25, 26, 27 or 28 amino acid residues which have been deleted at the N-terminus, and/or the C-terminus, and/or within the amino acid sequence set forth in SEQ ID NO: 2, SEQ ID NO: 4, SEQ ID NO: 6, SEQ ID NO: 8, SEQ ID NO: 10, SEQ ID NO: 12, SEQ ID NO: 14, SEQ ID NO: 16, SEQ ID NO: 18 or SEQ ID NO: 20.

In one embodiment, a mutant of the STxB protein or of a variant thereof according to the invention comprises 1, 2, 3, 4, 5, 6, 7, 8, 9, 10, 11, 12, 13, 14, 15, 16, 17, 18, 19, 20, 21, 22, 23, 24, 25, 26, 27 or 28 amino acid residues which have been deleted at amino acid position 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 56, 57, 58, 59, 60, 61, 62, 63, 64, 65, 66, 67, 68, and/or 69 of the amino acid sequence set forth in SEQ ID NO: 2, SEQ ID NO: 4, SEQ ID NO: 6, SEQ ID NO: 8, SEQ ID NO: 10, SEQ ID NO: 12, SEQ ID NO: 14, SEQ ID NO: 16, SEQ ID NO: 18 or SEQ ID NO: 20.

In one embodiment, a mutant of the STxB protein or of a variant thereof according to the invention comprises 1, 2, 3, 4, 5, 6, 7, 8, 9, 10, 11, 12, 13, 14, 15, 16, 17, 18, 19, 20, 21, 22, 23, 24, 25, 26, 27 or 28 amino acid residues which have been inserted at the N-terminus, and/or the C-terminus, and/or within the amino acid sequence set forth in SEQ ID NO: 2, SEQ ID NO: 4, SEQ ID NO: 6, SEQ ID NO: 8, SEQ ID NO: 10, SEQ ID NO: 12, SEQ ID NO: 14, SEQ ID NO: 16, SEQ ID NO: 18 or SEQ ID NO: 20.

In one embodiment, a mutant of the STxB protein or of a variant thereof according to the invention comprises 1, 2, 3, 4, 5, 6, 7, 8, 9, 10, 11, 12, 13, 14, 15, 16, 17, 18, 19, 20, 21, 22, 23, 24, 25, 26, 27 or 28 amino acid residues which have been inserted at amino acid position 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 56, 57, 58, 59, 60, 61, 62, 63, 64, 65, 66, 67, 68, and/or 69 of the amino acid sequence set forth in SEQ ID NO: 2, SEQ ID NO: 4, SEQ ID NO: 6, SEQ ID NO: 8, SEQ ID NO: 10, SEQ ID NO: 12, SEQ ID NO: 14, SEQ ID NO: 16, SEQ ID NO: 18 or SEQ ID NO: 20.

In one embodiment, a mutant of the STxB protein or of a variant thereof according to the invention comprises a cysteine residue which has been added or inserted at the C-terminus of the STxB protein according to the present invention.

In one embodiment, a mutant of the STxB protein or of a variant thereof according to the invention comprises a cysteine residue which has been added or inserted at the C-terminus of the amino acid sequence set forth in SEQ ID NO: 1, SEQ ID NO: 3, SEQ ID NO: 5, SEQ ID NO: 7, SEQ ID NO: 9, SEQ ID NO: 11, SEQ ID NO: 13, SEQ ID NO: 15, SEQ ID NO: 17 or SEQ ID NO: 19.

In one embodiment, a mutant of the STxB protein or of a variant thereof according to the invention comprises a cysteine residue which has been added or inserted at the C-terminus of the amino acid sequence set forth in SEQ ID NO: 2, SEQ ID NO: 4, SEQ ID NO: 6, SEQ ID NO: 8, SEQ ID NO: 10, SEQ ID NO: 12, SEQ ID NO: 14, SEQ ID NO: 16, SEQ ID NO: 18 or SEQ ID NO: 20.

In one embodiment, a mutant of the STxB protein or of a variant thereof according to the invention comprises at least one non-proteinogenic amino acid residue.

In one embodiment, a mutant of the STxB protein or of a variant thereof according to the present invention comprises 1, 2, 3, 4, 5, 6, 7, 8, 9, 10, 11, 12, 13, 14, 15, 16, 17, 18, 19, 20, 21, 22, 23, 24, 25, 26, 27 or 28 non-proteinogenic amino acid residues which have been inserted or added; or 1, 2, 3, 4, 5, 6, 7, 8, 9, 10, 11, 12, 13, 14, 15, 16, 17, 18, 19, 20, 21, 22, 23, 24, 25, 26, 27 or 28 amino acid residues which have been substituted by a non-proteinogenic amino acid residue, at the N-terminus, and/or the C-terminus, and/or within the native amino acid sequence of the STxB protein according to the present invention.

In one embodiment, a mutant of the STxB protein or of a variant thereof according to the present invention comprises 1, 2, 3, 4, 5, 6, 7, 8, 9, 10, 11, 12, 13, 14, 15, 16, 17, 18, 19, 20, 21, 22, 23, 24, 25, 26, 27 or 28 non-proteinogenic amino acid residues which have been inserted or added; or 1, 2, 3, 4, 5, 6, 7, 8, 9, 10, 11, 12, 13, 14, 15, 16, 17, 18, 19, 20, 21, 22, 23, 24, 25, 26, 27 or 28 amino acid residues which have been substituted by a non-proteinogenic amino acid residue, at the N-terminus, and/or the C-terminus, and/or within the amino acid sequence set forth in SEQ ID NO: 1, SEQ ID NO: 3, SEQ ID NO: 5, SEQ ID NO: 7, SEQ ID NO: 9, SEQ ID NO: 11, SEQ ID NO: 13, SEQ ID NO: 15, SEQ ID NO: 17 or SEQ ID NO: 19.

In one embodiment, a mutant of the STxB protein or of a variant thereof according to the invention comprises 1, 2, 3, 4, 5, 6, 7, 8, 9, 10, 11, 12, 13, 14, 15, 16, 17, 18, 19, 20, 21, 22, 23, 24, 25, 26, 27 or 28 non-proteinogenic amino acid residues which have been inserted or added; or 1, 2, 3, 4, 5, 6, 7, 8, 9, 10, 11, 12, 13, 14, 15, 16, 17, 18, 19, 20, 21, 22, 23, 24, 25, 26, 27 or 28 amino acid residues which have been substituted by a non-proteinogenic amino acid residue; at amino acid position 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 56, 57, 58, 59, 60, 61, 62, 63, 64, 65, 66, 67, 68, and/or 69 of the amino acid sequence set forth in SEQ ID NO: 1, SEQ ID NO: 3, SEQ ID NO: 5, SEQ ID NO: 7, SEQ ID NO: 9, SEQ ID NO: 11, SEQ ID NO: 13, SEQ ID NO: 15, SEQ ID NO: 17 or SEQ ID NO: 19.

In one embodiment, a mutant of the STxB protein or of a variant thereof according to the present invention comprises 1, 2, 3, 4, 5, 6, 7, 8, 9, 10, 11, 12, 13, 14, 15, 16, 17, 18, 19, 20, 21, 22, 23, 24, 25, 26, 27 or 28 non-proteinogenic amino acid residues which have been inserted or added; or 1, 2, 3, 4, 5, 6, 7, 8, 9, 10, 11, 12, 13, 14, 15, 16, 17, 18, 19, 20, 21, 22, 23, 24, 25, 26, 27 or 28 amino acid residues which have been substituted by a non-proteinogenic amino acid residue, at the N-terminus, and/or the C-terminus, and/or within the amino acid sequence set forth in SEQ ID NO: 2, SEQ ID NO: 4, SEQ ID NO: 6, SEQ ID NO: 8, SEQ ID NO: 10, SEQ ID NO: 12, SEQ ID NO: 14, SEQ ID NO: 16, SEQ ID NO: 18 or SEQ ID NO: 20.

In one embodiment, a mutant of the STxB protein or of a variant thereof according to the invention comprises 1, 2, 3, 4, 5, 6, 7, 8, 9, 10, 11, 12, 13, 14, 15, 16, 17, 18, 19, 20, 21, 22, 23, 24, 25, 26, 27 or 28 non-proteinogenic amino acid residues which have been inserted or added; or 1, 2, 3, 4, 5, 6, 7, 8, 9, 10, 11, 12, 13, 14, 15, 16, 17, 18, 19, 20, 21, 22, 23, 24, 25, 26, 27 or 28 amino acid residues which have been substituted by a non-proteinogenic amino acid residue; at amino acid position 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 56, 57, 58, 59, 60, 61, 62, 63, 64, 65, 66, 67, 68, and/or 69 of the amino acid sequence set forth in SEQ ID NO: 2, SEQ ID NO: 4, SEQ ID NO: 6, SEQ ID NO: 8, SEQ ID NO: 10, SEQ ID NO: 12, SEQ ID NO: 14, SEQ ID NO: 16, SEQ ID NO: 18 or SEQ ID NO: 20.

As used herein, the terms "non-proteinogenic amino acid residue", "non-natural amino acid residue" and "non-coded amino acid residue" are used interchangeably and refer to any organic compound with an amine (—NH$_2$) and a carboxylic acid (—COOH) functional group, which is not naturally encoded or found in the genetic code of any organism, preferably in eukaryotes. The genetic code encodes 20 standard amino acids in the L conformation (alanine, Ala, A; cysteine, Cys, C; aspartic acid, Asp, D; glutamic acid, Glu, E; phenylalanine, Phe, F; glycine, Gly, G; histidine, His, H; isoleucine, Ile, I; lysine, Lys, K; leucine, Leu, L; methionine, Met, M; asparagine, Asn, N; proline, Pro, P; glutamine, Gln, Q; serine, Ser, S; Threonine, Thr, T; valine, Val, V; tryptophan, Trp, W; tyrosine, Tyr, Y) for incorporation into proteins during translation plus two extra proteinogenic amino acids in the L conformation (selenocysteine, Sec, U; pyrrolysine, Pyl, O). These standard amino acids and extra-proteinogenic amino acids possess a central carbon atom ($\alpha$-) bearing the amino and carboxyl groups, plus a side chain and an $\alpha$-hydrogen (with the exception of glycine—which is achiral—and proline—whose amine group is a secondary amine). Non-proteinogenic amino acid residues are well known in the art. See, e.g., Hunt, 1985 (The non-protein amino acids. In Barrett (Ed.), *Chemistry and biochemistry of the amino acids*. 1$^{st}$ ed., pp. 55-138. London, UK: Chapman & Hall), in particular Tables 4.1 to 4.20 which are herein incorporated by reference in their entirety; and U.S. Pat. Nos. 7,083,970, 7,045,337 and 7,638,299, which are herein incorporated by reference in their entirety.

Examples of non-proteinogenic amino acid residues include, but are not limited to, p-acetyl-L-phenylalanine, p-iodo-L-phenylalanine, p-methoxyphenylalanine, O-methyl-L-tyrosine, p-propargyloxyphenylalanine, p-propargyl-phenylalanine, L-3-(2-naphthyl)alanine, D-3-(2-naphthyl)alanine, 3-methyl-phenylalanine, O-4-allyl-L-tyrosine, 4-propyl-L-tyrosine, tri-O-acetyl-GlcNAc p-serine, L-Dopa, fluorinated phenylalanine, isopropyl-L-phenylalanine, p-azido-L-phenylalanine, p-acyl-L-phenylalanine, p-benzoyl-L-phenylalanine, 4-boronophenylalanine, O-propargyltyrosine, L-phosphoserine, phosphonoserine, phosphonotyrosine, p-bromophenylalanine, selenocysteine, p-amino-L-phenylalanine, isopropyl-L-phenylalanine, azido-lysine, 6-azidonorleucine, 4-fluorophenylglycine, methyllysine, dimethyllysine, hydroxyproline, mercaptopropionic acid, 3-nitro-tyrosine, norleucine, pyro-glutamic acid, F-acetyl-lysine, β-alanine, aminobutyric acid, citrulline, aminohexanoic acid, aminoisobutyric acid, cyclohexylalanine, nitro-arginine, nitro-phenylalanine, norvaline, octahydroindole carboxylate, ornithine, penicillamine, tetrahydroisoquinoline, 3-aminotyrosine, 3-nitrotyrosine, 3,4-dihydroxy-phenylalanine, 3-iodotyrosine, phenylselenocysteine, and dehydroalanine.

Further examples of non-proteinogenic amino acid residues include, but are not limited to, acetyl-, acyl-, aldehyde-, alkenyl-, alkyl-, alkynyl-, amino-, aryl-, azido-, benzophenonyl-, benzoyl-, borate-, boronate-, cyano-, enone-, ester-, ether-, halo-, heterocyclic-, hydrazide-, hydrazine-, hydroxyl-, hydroxylamine-, imine-, iodide-, keto-, methoxy-, phosphine-, phospho-, phosphono-, seleno-, sulfonyl-, thioacid-, thiol-substituted amino acid residues, or any combination thereof.

Non-proteinogenic amino acid residues also include, without limitation, D-enantiomers of amino acid residues, whether proteinogenic or non-proteinogenic. In particular, D-enantiomers of amino acid residues include, without limitation, D-alanine, D-cysteine, D-aspartic acid, D-glutamic acid, D-phenylalanine, D-glycine, D-histidine, D-isoleucine, D-lysine, D-leucine, D-methionine, D-asparagine, D-proline, D-glutamine, D-serine, D-Threonine, D-valine, D-tryptophan, and D-tyrosine.

Non-proteinogenic amino acid residues also include, without limitation, amino acid residues with a photoactivatable cross-linker; spin-labeled amino acid residues; fluorescent amino acid residues; metal-binding amino acid residues; metal-containing amino acid residues; amino acid residues that are amidated at a site that is not naturally amidated; radioactive amino acid residues; photocaged amino acid residues; photoisomerizable amino acid residues; glycosylated amino acid residues; carbohydrated amino acid residues; biotin- or biotin analogue-containing amino acid residues; keto-containing amino acid residues; amino acid residues comprising polyethylene glycol or polyether; heavy atom-substituted amino acid residues (including, e.g., amino acid residues containing deuterium, tritium, $^{13}C$, $^{15}N$, or $^{18}O$); chemically cleavable amino acid residues; photocleavable amino acid residues; amino acid residues with an elongated side chain; amino acid residues containing a toxic group; sugar-substituted amino acid residues; carbon-linked sugar-containing amino acid residues; redox-active amino acid residues; $\alpha$-hydroxy-containing acid residues; amino-thio acid residues; $\alpha,\alpha$-disubstituted amino acid residues; β-amino acid residues; cyclic amino acid residues other than proline or histidine; aromatic amino acid residues other than phenylalanine, tyrosine or tryptophan.

Non-proteinogenic amino acid residues also include, without limitation, amino acid residues comprising a selective reactive group, or a reactive group for site-selective labeling of the STxB protein or a variant thereof according to the invention. In some instances, the chemistry is a biorthogonal reaction (e.g., biocompatible and selective reactions). In some cases, the chemistry is a Cu(I)-catalyzed or "copper-free" alkyne-azide triazole-forming reaction, Staudinger ligation, inverse-electron-demand Diels-Alder (IEDDA) reaction, "photo-click" chemistry, or a metal-mediated process, such as olefin metathesis and Suzuki-Miyaura or Sonogashira cross-coupling.

Non-proteinogenic amino acid residues also include, without limitation, amino acid residues comprising a photoreactive group which crosslinks, upon irradiation with, e.g., UV.

Non-proteinogenic amino acid residues also include, without limitation, para-substituted, meta-substituted, or ortho-substituted amino acid residues.

Non-proteinogenic amino acid residues also include, without limitation, amino acid residues comprising a Michael-acceptor group. In some instances, Michael-acceptor groups comprise an unsaturated moiety capable of forming a covalent bond through a 1,2-addition reaction. In some instances, Michael-acceptor groups comprise electron-deficient alkenes or alkynes. In some instances, Michael-acceptor groups include, but are not limited to, $\alpha,\beta$-unsaturated ketones, aldehydes, sulfoxides, sulfones, nitriles, imines, or aromatics.

In one embodiment, the non-proteinogenic amino acid residues are not naturally-occuring post-translationally modified amino acid residues.

In one embodiment, the non-proteinogenic amino acid residues are not pseudoproline dipeptides.

In one embodiment, a mutant of the STxB protein or of a variant thereof according to the present invention, does not comprise an $N^6$-[(2-azidoethoxy)carbonyl]-L-lysine residue which has been inserted or added; or a lysine residue which has been substituted by an $N^6$-[(2-azidoethoxy)carbonyl]-L-lysine residue, in position 8 of the amino acid sequence set forth in SEQ ID NO: 2.

As used herein, the term "conjugate" with reference to the STxB protein or to a variant thereof refers to a chimeric STxB protein or a variant thereof which is bound to a payload, optionally through a linker, thereby forming a single molecule.

Examples of suitable payloads include, but are not limited to, peptides, polypeptides, proteins, polymers, nucleic acid molecules, small molecules, mimetic agents, synthetic drugs, inorganic molecules, organic molecules and radioisotopes.

Alternatively or additionally, examples of suitable payloads include, but are not limited to, chemotherapeutic agents, targeted therapy agents, cytotoxic agents, antibiotics, antivirals, cell cycle-synchronizing agents, ligands for cellular receptor(s), immunomodulatory agents, pro-apoptotic agents, anti-angiogenic agents, cytokines, growth factors, antibodies or antigen-binding fragments thereof, antigens, hormones, coding or non-coding oligonucleotides, photodetectable labels, contrast agents, radiolabels, and the like.

It will be apparent that some payloads may fall into more than one category.

In one embodiment, the payload is a chemotherapeutic agent.

As used herein, the term "chemotherapeutic agent" refers to any molecule that is effective in inhibiting tumor growth.

Suitable examples of chemotherapeutic agents include those described under subgroup L01 of the Anatomical Therapeutic Chemical Classification System.

Suitable examples of chemotherapeutic agents include, but are not limited to:
  alkylating agents, such as, e.g.:
    nitrogen mustards, including chlormethine, cyclophosphamide, ifosfamide, trofosfamide, chlorambucil, melphalan, prednimustine, bendamustine, uramustine, chlornaphazine, cholophosphanide, estrarnustine, mechlorethamine, mechlorethamine oxide hydrochloride, novembichin, phenesterine, uracil mustard and the like;
    nitrosoureas, including carmustine, lomustine, semustine, fotemustine, nimustine, ranimustine, streptozocin, chlorozotocin, and the like;
    alkyl sulfonates, including busulfan, mannosulfan, treosulfan, and the like;
    aziridines, including carboquone, thiotepa, triaziquone, triethylenemelamine, benzodopa, meturedopa, uredopa, and the like; hydrazines, including procarbazine, and the like;
    triazenes, including dacarbazine, temozolomide, and the like: ethyleneimines and methylamelamines, including altretamine, triethylenemelamine, trietylenephosphoramide, triethylenethiophosphaorarnide, trimethylolomelanine and the like;
    and others, including mitobronitol, pipobroman, actinomycin, bleomycin, mitomycins (including mitomycin C, and the like), plicamycin, and the like:
  acetogenins, such as, e.g., bullatacin, bullatacinone, and the like;
  benztodiazepines, such as, e.g., 2-oxoquazepan, 3-hydroxyphenazepam, bromazepam, camazepam, carburazepam, chlordiazepoxide, cinazepam, cinolazepam, clonazepam, cloniprazepam, clorazepate, cyprazepam, delorazepam, demoxepam, desmethylflunitrazepain, devazepide, diazepam, diclazepam, difludiazepam, doxefazepam, elfazepam, ethyl carfluzepate, ethyl dirazepate, ethyl loflazepate, flubromazepam, fletazepam, fludiazepam, flunitrazepam, flurazepam, flutemazepam, flutoprazepam, fosazepam, gidazepam, halazepan, iclazepan, irazepine, kenazepine, ketazolam, lorazepam, lormetazepam, lufuradom, meclonazepam, medazepam, menitrazepam, metaclazepanm, motrazepam, N-desalkylflurazepam, nifoxipam, nimetazepam, nitemazepam, nitrazepam, nitrazepate, nordazepam, nortetrazepan, oxazepam, phenazepam, pinazepam, pivoxazepam, prazepam, protlazepam, quazepam, QH-II-66, reclazepam, R04491533, Ro5-4864. SH-I-048A, sulazepam, temazepam, tetrazepam, tifluadom, tolufazepam, triflunordazepam, tuclazepam, uldazepam, arfendazan, clobazani, CP-1414S, lofendazam, triflubazam, girisopam, GYKI-52466, GYKI-52895, nerisopam, talampanel, totisopam, adinazolam, alprazolam, bromazolam, clonazolam, estazolam, flualprazolam, flubomazolam, flunitrazolam, nitrazolam, pyrazolam, triazolam, bretazenil, climazolam, EVT-201. FG-8205, flumazenil, GL-II-73, imidazenil, $^{123}$I-iomazenil, L-655,708, loprazolam, midazolam, PWZ-029, remimazolam, Ro15-4513, Ro48-6791, Ro48-8684, Ro4938581, sarmazenil, SH-053-R-CH3.2'F, cloxazolam, flutazolam, haloxazolam, mexazolam, oxazolam, bentazepam, clotiazepam, brotizolam, ciclotizolam, deschloroetizolam, etizolam, fluclotizolam, israpafant, JQ1, metizolam, olanzapine, telenzepine, lopirazepam, zapizolam, razobazan, ripazepan, zolazepam, zomebazam, zometapine, premazepan, clazolam, anthramycin, avizafone, rilmazafone, and the like;
antimetabolites, such as, e.g.:
  antifolates, including aminopterin, methotrexate, pemetrexed, pralatrexate, pteropterin, raltitrexed, denopterin, trimetrexate, pemetrexed, and the like;
  purine analogues, including pentostatin, cladribine, clofarabine, fludarabine, nelarabine, tioguanine, mercaptopurine, and the like;
  pyrimidine analogues, including fluorouracil, capecitabine, doxifluridine, tegafur, tegafur/gimeracil/oteracil, carmofur, floxuridine, cytarabine, gemcitabine, azacytidine, decitabine, and the like; and
  hydroxycarbamide;
androgens, such as, e.g., calusterone, dromostanolone propionate, epitiostanol, mepitiostane, testolactone, and the like;
anti-adrenals, such as, e.g., aminoglutethimide, mitotane, trilostane, and the like;
folic acid replenishers, such as, e.g., frolinic acid, and the like;
maytansinoids, such as, e.g., maytansine, ansamitocins, and the like;
platinum analogs, such as, e.g., platinum, carboplatin, cisplatin, dicycloplatin, nedaplatin, oxaliplatin, satraplatin, and the like;
antihormonal agents, such as, e.g.;
  anti-estrogens, including tamoxifen, raloxifene, aromatase inhibiting 4(5)-imidazoles, 4-hydroxytamoxifen, trioxifene, keoxifene, LY117018, onapristone, toremifene, and the like;
  anti-androgens, including flutamide, nilutamide, bicalutamide, leuprolide, goserelin, and the like;
trichothecenes, such as, e.g., T-2 toxin, verracurin A, roridinA, anguidine and the like;
toxoids, such as, e.g., cabazitaxel, docetaxel, larotaxel, ortataxel, paclitaxel, tesetaxel, and the like;
others, such as, e.g., camptothecin (including the synthetic analogue topotecan); bryostatin; callystatin; CC-1065 (including its adozelesin, carzelesin and bizelesin synthetic analogues); cryptophycins (including cryptophycin 1 and cryptophycin 8); dolastatin; duocarmycin (including its synthetic analogues KW-2189 and CBI-TMI); eleutherobin; pancratistatin: sarcodictyin; spongistatin; aclacinomysins; authramycin; azaserine; bleomycin: cactinomycin; carabicin; canninomvcin; carzinophilin; chromomycins; dactinomycin; daunorubicin; detorubicin; 6-diazo-5-oxo-L-norleucine: doxorubicin (including morpholino-doxorubicin, cyanomorpholino-doxorubicin, 2-pyrrolino-doxorubicin, deoxydoxorubicin, and the like); epirubicin; esorubicin: idanrbicin; marcellomycin: mycophenolic acid; nogalarnycin; olivomycins: peplomycin: potfiromycin: puromycin; quelamycin; rodorubicin; streptomgrin; streptozocin; tubercidin: ubenimex; zinostatin; zorubicin; aceglatone: aldophospharnide glycoside; aminolevulinic acid; amsacrine: bestrabucil; bisantrene; edatraxate: defofamine; demecolcine; diaziquone: elfornithine; elliptinium acetate; epothilone; etoglucid; gallium nitrate; hydroxyurea; lentinan: lonidanine; mitoguazone; mitoxantrone; mopidamol; nitracrine: phenamet; pirarubicin; podophyllinic acid; 2-ethylhydrazide: PSK®; razoxane: rhizoxin; sizofiran: spirogennanium; tenuazonic acid; 2,2',2"-trichlorotriethylamine; urethan; vindesine; dacarbazine; mannomustine; mitobromtol; mitolactol; pipobroman: gacytosine; arabinoside; 6-thioguanine; vinblastine; etoposide; vincristine; vinorelbine; navelbine; novantrone; teniposide; daunomycin; xeloda; ibandronate; CPT-11; topoisomerase inhibitor RFS 2000; topoisomerase I inhibitor SN38; difluoromethylornithine: retinoic acid; and the like.

In one embodiment, the payload is a targeted therapy agent.

As used herein, the term "targeted therapy agent" refers to any molecule which aims at one or more particular target molecules (such as, e.g., proteins) involved in tumor genesis, tumor progression, tumor metastasis, tumor cell proliferation, cell repair, and the like.

Suitable examples of targeted therapy agents include, but are not limited to, tyrosine-kinase inhibitors, serine/threonine kinase inhibitors, monoclonal antibodies and the like. Suitable examples of targeted therapy agents include, but are not limited to, HER1/EGFR inhibitors (such as, e.g., brigatinib, erlotinib, gefitinib, olmutinib, osimertinib, rociletinib, vandetanib, and the like); HER2/neu inhibitors (such as, e.g., afatinib, lapatinib, neratinib, and the like): C-kit and PDGFR inhibitors (such as, e.g., axitinib, masitinib, pazopanib, sunitinib, sorafenib, toceranib, and the like); FLT3 inhibitors (such as, e.g., lestaurtinib, and the like); VEGFR inhibitors (such as, e.g., axitinib, cediranib, lenvatinib, nintedanib, pazopanib, regorafenib, semaxanib, sorafenib, sunitinib, tivozanib, toceranib, vandetanib, and the like): RET inhibitors (such as, e.g., vandetanib, entrectinib, and the like); c-MET inhibitors (such as, e.g., cabozantinib, and the like): bcr-abl inhibitors (such as, e.g., imatinib, dasatinib, nilotinib, ponatinib, radotinib, and the like); Src inhibitors (such as, e.g., bosutinib, dasatinib, and the like); Janus kinase inhibitors (such as, e.g., lestautrtinib, momelotinib, ruxolitinib, pacritinib, and the like); MAP2K inhibitors (such as, e.g., cobimetinib, selumetinib, tranetinib, binimetinib, and the like); EML4-ALK inhibitors (such as, e.g., alectinib, brigatinib, ceritinib, crizotinib, and the like); Bruton's inhibitors (such as, e.g., ibrutinib, and the like); nTOR inhibitors (such as, e.g., everolimus, temsirolimus, and the like); hedgehog inhibitors (such as, e.g., sonidegib, vismodegib, and the like); CDK inhibitors (such as, e.g., palbociclib, ribociclib, and the like); anti-HER1/EGFR monoclonal antibodies (such as, e.g., cetuximab, necitumumab, panitumumab, and the like): anti-HER2/neu monoclonal antibodies (such as, e.g., ado-trastuzumab emtansine, pertuzumab, trastuzumab, trastuzumab-dkst, and the like); anti-EpCAM monoclonal antibodies (such as, e.g., catumaxomab, edrecolomab, and the like); anti-VEGF monoclonal antibodies (such as, e.g., bevacizumab, bevacizumab-awwb, and the like); anti-CD20 monoclonal antibodies (such as, e.g., ibritumomab, obinutuzumab, ocrelizumab, ofatumumab, rituximab, tositunomab, and the like); anti-CD30 monoclonal antibodies (such as, e.g., brentuximab, and the like): anti-CD33 monoclonal antibodies (such as, e.g., gemtuzumab, and the like); and anti-CD52 monoclonal antibodies (such as, e.g., alemtuzumab, and the like).

In one embodiment, the payload is a cytotoxic agent.

As used herein, the term "cytotoxic agent" refers to any molecule that results in cell death by any mechanism.

Suitable examples of cytotoxic agents include, but are not limited to, taxanes, anthracyclines, alkylating agents, *vinca* alkaloids, antimetabolites, platinum agents, steroids, and chemotherapeutic agents.

Suitable examples of taxanes include, but are not limited to, cabazitaxel, docetaxel, larotaxel, ortataxel, paclitaxel and tesetaxel.

Suitable examples of anthracyclines include, but are not limited to, aclarubicin, animrubicin, daunorubicin, doxorubicin, epirubicin, idarubicin, pirarubicin, valrubicin and zorubicin.

Suitable examples of alkylating agent include, but are not limited to, nitrogen mustards (such as, e.g., chlormethine, cyclophosphamide, ifosfamide, trofosfamide, chlorambucil, melphalan, prednimustine, bendamustine, uramustine, and the like), nitrosoureas (such as, e.g., carmustine, lomustine, semustine, fotemustine, nimustine, ranimustine, streptozocin, and the like), alkyl sulfonates (such as, e.g., busulfan, mannosulfan, treosulfan, and the like), aziridines (such as, e.g., carboquone, thiotepa, triaziquone, triethylenemelamine, benzmdopa, meturedopa, uredopa, and the like), hydrazines (such as, e.g., procarbazine, and the like), triazenes (such as, e.g., dacarbazine, temozolomide, and the like), altretamine, mitobronitol, pipobroman, actinomycin, bleomycin, mitomycins and plicamycin.

Suitable examples of *vinca* alkaloids include, but are not limited to, vinblastine, vincristine, vinflunine, vindesine and vinorelbine.

Suitable examples of antimetabolites include, but are not limited to, antifolates (such as, aminopterin, methotrexate, pemetrexed, pralatrexate, raltitrexed, pemetrexed, and the like), purine analogues (such as, e.g., pentostatin, cladribine, clofarabine, fludarabine, nelarabine, tioguanine, mercaptopurine, and the like), pyrimidine analogues (such as, e.g., fluorouracil, capecitabine, doxifluridine, tegafur, tegafur/gimeracil/oteracil, carmofur, floxuridine, cytarabine, gemcitabine, azacytidine, decitabine, and the like), and hydroxycarbamide.

Suitable examples of platinum agents include, but are not limited to, carboplatin, cisplatin, dicycloplatin, nedaplatin, oxaliplatin and satraplatin.

Suitable examples of steroids include, but are not limited to, estrogen receptor modulators, androgen receptor modulators and progesterone receptor modulators.

Suitable examples of chemotherapeutic agents have been described hereinabove.

In one embodiment, the payload is an antibiotic.

Suitable examples of antibiotics include those described under subgroup J01 of the Anatomical Therapeutic Chemical Classification System.

Suitable examples of antibiotics include, but are not limited to:
- aminoglycosides, such as, e.g., amikacin, gentamicin, kanamycin, neomycin, netilmicin, streptomycin, tobramycin, paromycin, and the like;
- ansamycins, such as, e.g., geldanamycin, herbimycin and the like;
- carbacephems, such as, e.g., loracarbef and the like;
- carbapenems, such as, e.g., ertapenum, doripenem, imipenem, cilastatin, meropenem, and the like;
- first generation cephalosporins, such as, e.g., cefadroxil, cefazolin, cefalotin, cephalexin, and the like;
- second generation cephalosporins, such as, e.g., ceflaclor, cefamandole, cefoxitin, cefprozil, cefuroxime, and the like;
- third generation cephalosporins, such as, e.g., cefixime, cefdinir, cefditoren, cefoperazone, cefotaxime, cefpodoxime, ceftazidime, ceftibuten, ceftizoxime, ceftriaxone, and the like;
- fourth generation cephalosporins, such as, e.g., cefepime and the like;
- fifth generation cephalosporins, such as, e.g., ceftobiprole, and the like;
- glycopeptides, such as, e.g., teicoplanin, vancomycin, and the like;
- macrolides, such as, e.g., axithromycin, clarithromycin, dirithromycine, erythromycin, roxithromycin, troleandomycin, telithromycin, spectinomycin, and the like;
- monobactams, such as, e.g., axtreonam, and the like;
- penicilins, such as, e.g., amoxicillin, ampicillin, axlocillin, carbenicillin, cloxacillin, dicloxacillin, flucloxacillin, mezlocillin, meticillin, nafcilin, oxacillin, penicillin, peperacillin, ticarcillin, and the like;
- antibiotic polypeptides, such as, e.g., bacitracin, colistin, polymyxin B, and the like;
- quinolones, such as, e.g., ciprofloxacin, enoxacin, gatifloxacin, levofloxacin, lemefloxacin, moxifloxacin, norfloxacin, orfloxacin, trovafloxacin, and the like;
- sulfonamides, such as, e.g., mafenide, prontosil, sulfacetamide, sulfamethizole, sulfanilamide, sulfasalazine, sulfisoxazole, trimethoprim, trimethoprim-sulfamethoxazole, and the like;
- tetracyclines, such as, e.g., demeclocycline, doxycycline, minocycline, oxytetracycline, tetracycline, and the like; and
- others such as, e.g., arspenamine, chloramphenicol, clindamycin, lincomycin, ethambutol, fosfomycin, fusidic acid, furazolidone, isoniazid, linezolid, metronidazole, mupirocin, nitrofurantoin, platensimycin, pyrazinamide, quinupristin/dalfopristin, rifampin/rifampicin, tinidazole, and the like.

In one embodiment, the payload is an antiviral.

Suitable examples of antivirals include those described under subgroup J05 of the Anatomical Therapeutic Chemical Classification System.

Suitable examples of antivirals include, but are not limited to, acemannan, acyclovir, acyclovir sodium, adamantanamine, adefovir, adenine arabinoside, alovudine, alvircept sudotox, amantadine hydrochloride, aranotin, arildone, atevirdine mesylate, avridine, cidofovir, cipamfylline, cytarabine hydrochloride, BMS 806, C31G, carrageenan, zinc salts, cellulose sulfate, cyclodextrins, dapivirine, delavirdine mesylate, desciclovir, dextrin 2-sulfate, didanosine, disoxaril, dolutegravir, edoxudine, enviradene, envirozime, etravirine, famciclovir, famotine hydrochloride, fiacitabine, fialuridine, fosarilate, foscarnet sodium, fosfonet sodium, FTC, ganciclovir, ganciclovir sodium, GSK 1265744, 9-2-hydroxy-ethoxy methylguanine, ibalizumab, idoxuridine, interferon, 5-iodo-2'-deoxyuridine, IQP-0528, kethoxal, lamivudine, lobucavir, maraviroc, memotine pirodavir, penciclovir, raltegravir, ribavirin, rimantadine hydrochloride, rilpivirine (TMC-278), saquinavir mesylate, SCH—C, SCH-D, somantadine hydrochloride, sorivudine, statolon, stavudine, T20, tilorone hydrochloride, TMC120, TMC125, trifluridine, trifluorothymidine, tenofovir, tenofovir 41alcitabine, tenofovir 41alcitabin fumarate, prodrugs of tenofovir, UC-781, UK-427, UK-857, valacyclovir, valacyclovir hydrochloride, vidarabine, vidarabine phosphate, vidarabine sodium phosphate, viroxime, 41alcitabine, zidovudine, and zinviroxime.

In one embodiment, the payload is a cell cycle-synchronizing agent.

As used herein, the term "cell cycle-synchronizing agent" refers to any molecule able to for unify the cell cycle of a population of cells to the same phase upon administration.

Suitable examples of cell cycle-synchronizing agents include, but are not limited to, aphidicolin, butyrolactone I, colchicine, cycloheximide, demecolcine, dimethyl sulfoxide, 5-fluorodeoxyuridine. Hoechst 33342, mimosine, nocodazole, roscovitine, and thymidine.

In one embodiment, the payload is a ligand for a cellular receptor.

As used herein, the term "ligand for a cellular receptor" refers to any molecule binding to a cellular receptor (such as a cell surface receptor, an intracellular receptor or a co-receptor, including transcription factors and the like), including agonists and antagonists, as well as partial agonists, inverse agonists, and allosteric modulators.

Suitable examples of ligands for cellular receptors include, but are not limited to, ligands binding to the AATYK receptors, the acetylcholine receptors, the ADGRG receptors, the adiponectin receptors, the adrenergic α1 receptors, the adrenergic α2 receptors, the adrenergic β1 receptors, the adrenergic β2 receptors, the adrenergic β3 receptors, the adrenomedullin receptor, the AMPA receptors, the anaphylatoxin receptors, the angiopoietin receptors, the angiotensin receptors, the anti-MUllerian hormone receptor, the apelin receptor, the asialoglycoprotein receptors, the AXL receptors, the benzodiazepine receptor, the bile acid receptor, the bombesin receptors, the bone morphogenetic protein receptors, the bradykinin receptors, the brain-specific angiogenesis inhibitors, the cadherin receptors, the calcitonin receptor, the calcitonin receptor-like receptor, the calcium-sensing receptor, the cannabinoid receptors, the CD97 receptor, the chemokine receptors, the cholecystokinin receptors, the complement receptors, the corticotropin-releasing hormone receptors, the CysLT receptors, the cytokine receptors, the DDR receptors, the dopamine receptors, the EBI2 receptor, the ectodysplasin A receptor, the EGF module-containing mucin-like hormone receptors, the EGF receptors, the endothelin receptors, the EPH receptors, the estrogen receptor, the FOF receptors, the free fatty acid receptors, the frizzled receptors, the FSI receptor, the GABAB receptors, the galanin receptors, the GHB receptor, the ghrelin receptor, the glucagon receptors, the glucagon-like peptide receptors, the glutamate receptors, the glycine receptors, the gonadotropin receptors, the gonadotropin-releasing hormone receptors, the GPRC6A receptor, the growth factor receptors, the growth hormone receptors, the growth-hormone-releasing hormone receptor, the guanylate cyclase-coupled receptors, the HGF receptors, the histamine receptors, the hydroxycarboxylic acids receptors, the immunoglobulin immune receptors, the insulin receptors, the kainate receptors, the KiSSI-derived peptide receptor, the latrophilin receptors, the leptin receptor, the leukotriene B4 receptors, the lipoprotein receptor-related protein receptors, the LTK receptors, the luteinizing hormone/choriogonadotropin receptor, the lysophosphatidic acid receptors, the lysophospholipid receptors, the mannose receptor, the MAS receptors, the melanin-concentrating hormone receptors, the melanocortin receptors, the melatonin receptors, the methuselah-like proteins receptors, the motilin receptor, the MuSK receptors, the N-acetylglucosamine receptor, the neuromedin receptors, the neuropeptide B/W receptors, the neuropeptide FF receptors, the neuropeptide S receptor, the neuropeptide Y receptors, the neuropilins receptor, the neurotensin receptors, the N-formyl peptide receptor, the nicotinic acetylcholine receptors, the NMDA receptors, the nuclear receptors, the olfactory receptor, the opioid receptors, the opsin receptors, the orexin receptors, the oxoeicosanoid receptor, the oxoglutarate receptor, the oxytocin receptor, the parathyroid hormone receptors, the PDGF receptors, the pituitary adenylate cyclase-activating polypeptide type I receptor, the platelet-activating factor receptor, the progestin and adipoQ receptors, the prokineticin receptors, the prolactin receptor, the prolactin-releasing peptide receptor, the prostacyclin receptor, the prostaglandin receptors, the protease-activated receptor, the PTK7 receptors, the purinergic adenosine receptors, the purinergic P2X receptors, the purinergic P2Y receptors, the relaxin receptors, the RET receptors, the retinoic acid-inducible orphan G-protein-coupled receptors, the ROR receptors, the ROS receptors, the RYK receptors, the scavenger receptors, the secretin receptor, the serine/threonine-specific protein kinase receptors, the serotonine receptors, the smoothened receptor, the somatostatin receptors, the sphingosine-1-phosphate receptors, the SREB receptors, the stimulator of interferon genes (STLNG) receptor, the succinate receptor, the tachykinin receptors, the thronboxane receptor, the thyrotropin receptor, the thyrotropin-releasing hormone receptor, the toll-like receptors, the trace-amine associated receptors, the transferrin receptor, the Trk receptors, the tumor necrosis factor receptors, the tyrosine phosphatase receptors, the urotensin-II receptor, the vasoactive intestinal peptide receptors, the vasoactive intestine peptide receptors, the vasopressin receptors, the VEGF receptors, the vomeronasal receptor, and the zinc-activated ion channel receptor.

In one embodiment, the payload is an immunomodulatory agent.

Suitable examples of immunomodulatory agents include, but are not limited to, immunostimulatory agents and immunosuppressor agents.

Suitable examples of immunostimulatory agents include those described under subgroup L03 of the Anatomical Therapeutic Chemical Classification System.

Suitable examples of immunostimulatory agents include, but are not limited to, cytokines (such as, e.g., filgrastim, pegfilgrastim, lenograstim, molgramostim, sargramostim, ancestim, albinterferon, interferon alfa natural, interferon alfa 2a, peginterferon alfa-2a, interferon alfa 2b, peginterferon alfa-2b, interferon alfa n1, interferon alfacon-1, interferon alpha-n3, interferon beta natural, interferon beta 1a, interferon beta 1b, interferon gamma, aldesleukin, oprelvekin, and the like); immune checkpoint inhibitors (such as, e.g., inhibitors of CTLA4, PD-1. PD-L1, LAG-3, B7-H3, B7-H4, TIM3, A2AR, and/or IDO, including nivolumab, pembrolizumab, pidilizumab, AMP-224, MPDL3280A, MDX-1105, MEDI-4736, arelumab, ipilimumab, tremelimumab, pidilizumab, IMP321. MGA271, BMS-986016, lirilumab, urelumab, PF-05082566, IPH2101, MEDI-6469, CP-870,893, mogamulizumab, varlilumab, avelumab, galiximab, AMP-514, AUNP 12, indoximod, NLG-919, INCB024360, and die like); toll-like receptor agonists (such as, e.g., buprenorphine, carbamazepine, ethanol, fentanyl. GS-9620, imiqimod, lefitolimod, levorphanol, methadone, morphine, (+)-morphine, morphine-3-glucuronide, oxcarbazepine, oxycodone, pethidine, resiquimod, SD-101, tapentadol, tilsotolimod, VTX-2337, glucuronoxylomannan from *Cryptococcus*, MALP-2 from *Mycoplasma*, MALP-404 from Mvcoplasrna, OspA from *Borrelia*, porin from *Neisseria* or *Haemophilus*, hsp60, hemmaglutinin, LcrV from *Yersinia*, bacterial flagellin, lipopolysaccharide, lipoteichoic acid, lipomannan from *Mycobacterium*, glycosylphosphatidylinositol, lysophosphatidylserine, lipophosphoglycan from *Leishmania*, zymosan from *Saccharomyces*, Pam2CGDPKHPKSF, Pam3CSK4, CpG oligodeoxynucleotides, poly(1:C) nucleic acid sequences, poly(A:U) nucleic acid sequences, double-stranded viral RNA, and die like); STING receptor agonists (such as, e.g., those described in WO2017100305, vadimezan, CL656, ADU-S100, 3'3'-cGAMP, 2'3'-cGAMP, ML RR-S2 CDG. ML RR-S2 cGAMP, cyclic di-GMP, DMXAA, DiABZI, and the like); CD1 ligands; growth hormone; imnunocyanin; pegademase; prolactin: tasonermin; female sex steroids: histamine dihydrochloride; poly ICLC; vitamin D: lentinan; plerixafor: roquinimex: mifamurtide: glatiramer acetate; thymopentin; thymosin 0.1; thymulin; polyinosinic:polycytidylic acid; pidotimod; *Bacillus* Calmette-Gu6rin; melanoma vaccine; sipuleucel-T; and the like.

Suitable examples of immunosuppressor agents include diose described under subgroup L04 of the Anatomical Therapeutic Chemical Classification System.

Suitable examples of immunosuppressor agents include, but are not limited to:
  antimetabolites, such as, e.g.:
    antifolates, including aminopterin, methotrexate, pemetrexed, pralatrexate, pteropterin, raltitrexed, denopterin, trimetrexate, pemetrexed, and the like;
    purine analogues, including pentostatin, cladribine, clofarabine, fludarabine, nelarabine, tioguanine, mercaptopurine, and the like;
    pyrimidine analogues, including fluorouracil, capecitabine, doxifluridine, tegafur, tegafur/gimeracil/oteracil, carmofur, floxuridine, cytarabine, gemcitabine, azacytidine, decitabine, and the like; and
  hydroxycarbamide):
  macrolides, such as, e.g., tacrolimus, ciclosporin, pimecrolimus, abetimus, gusperimus, and the like;
  immunomodulatory imide drugs, such as, e.g., lenalidomide, pomalidomide, thalidomide, apremilast, and the like;
  IL-1 receptor antagonists, such as, e.g., anakinra, and the like);
  mTOR inhibitors, such as, e.g., sirolimus, everolimus, ridaforolimus, temsirolimus, umirolimus, zotarolimus, and the like):
  serum-targeting antibodies, such as, e.g., eculizumab, adalimumab, afelimomab, certolizumab pegol, golimumab, infliximab, nerelimomab, mepolizumab, omalizumab, faralimomab, elsilimomab, lebrikizumab, ustekinumab, secukinumab, and the like;
  cell-targeting antibodies, such as, e.g., muromonab-CD3, otelixizumab, teplizumab, visilizumab, clenoliximab, keliximab, zanolimumab, efalizumab, erlizumab, obinutuzumab, rituximab, ocrelizumab, pascolizumab, gomiliximab, lumiliximab, teneliximab, toralizumab, aselizumab, galiximab, gavilimomah, ruplizumab, belimumab, blisibimod, ipilimumah, tremelimumab, bertilimumah, lerdelimumab, metelimumab, natalizumab, tocilizumab, odulimomab, basiliximab, daclizumab, inolimomab, zolimomab aritox, atorolimumab, cedelizumab, fontolizumab, maslimomah, morolimumab, pexelizumab, reslizumab, rovelizumab, siplizumab, talizumab, telimomab aritox, vapaliximab, vepalimomab, and the like;

fusion antibodies, such as, e.g., abatacept, belatacept, etanercept, pegsunercept, aflibercept, alefacept, rilonacept and the like.

In one embodiment, the payload is a pro-apoptotic agent.

As used herein, the term "pro-apoptotic agent" refers to any molecule able to induce apoptosis or programmed cell death in a cell upon administration.

Suitable examples of pro-apoptotic agents include, but are not limited to, histone deacetylase inhibitors (such as, e.g., sodium butyrate, depsipeptide and the like), bortezonib, deguelin, favopiridol, fenretinide, fludarabine, kaempferol, miltefosine, narciclasine, obatoclax, oblimersen, and oncrasin.

In one embodiment, the payload is an anti-angiogenic agent.

As used herein, the term "anti-angiogenic agent" refers to a molecule that reduces or prevents angiogenesis, which is responsible for the growth and development of blood vessels.

Suitable examples of anti-angiogenic agents include, but are not limited to, inhibitors of any of the vascular endothelial growth factor VEGF-A, VEGF-B, VEGF-C, or VEGF-D, which are major inducers of angiogenesis in normal and pathological conditions, and are essential in embryonic vasculogenesis.

Additionally or alternatively, an anti-angiogenic agent also can inhibit other angiogenic factors, such as, without limitation, a member of the fibroblast growth factor (FGF) family such as FGF-1 (acidic), FGF-2 (basic), FGF-4 or FGF-5: or angiopoietin-1, a factor that signals through the endothelial cell-specific Tie2 receptor tyrosine kinase; or the receptor of any of these angiogenic factors.

In one embodiment, the payload is a cytokine.

Suitable examples of cytokines include, but are not limited to, chemokines, tumor necrosis factors, interleukins, and colony-stimulating factors.

Suitable examples of chemokines include, but are not limited to, chemokine C—C motif ligand (CCL) 1, CCL2, CCL3, CCL4, CCL5, CCL6, CCL7, CCL8, CCL9, CCL11, CCL12, CCL13, CCL14, CCL15, CCL16, CCL17, CCL18, CCL19, CCL20, CCL21, CCL22, CCL23, CCL24, CCL25, CCL26, CCL27, CCL28, chemokine C—X—C motif ligand (CXCL) 1, CXCL2, CXCL3, CXCL4, CXCL5, CXCL6, CXCL7, CXCL8, CXCL9, CXCL10, CXCL 11, CXCL12, CXCL13, CXCL14, CXCL15, CXCL16, CXCL17, fractalkine, chemokine C motif ligand (XCL) 1, and XCL2.

Suitable examples of tumor necrosis factors include, but are not limited to, tumor necrosis factor (TNF) α, lymphotoxin, OX40L, CD40LG, Fas ligand, CD70, CD153, 4-1BB ligand, TNF-related apoptosis-inducing ligand (TRAIL), receptor activator of nuclear factor κ-B ligand (RANKL), a proliferation-inducing ligand (APRIL), B-cell activating factor (BAFF), and ectodysplasin A (EDA).

Suitable examples of interleukins include, but are not limited to, interleukin- (IL-) 1α, IL-1β, IL-1Ra, IL-2, IL-3, IL-4, IL-5, IL-6, IL-7, IL-9, IL-10, IL-11, IL-12, IL-13, IL-14, IL-15, IL-16, IL-17, IL-18, IL-19, IL-20, IL-21, IL-22, IL-23, IL-24, IL-25, IL-26, IL-27, IL-28, IL-29, IL-30, IL-31, IL-32, IL-33, IL-34, IL-35, IL-36α, IL-36β, IL-36γ, IL-36Ra, IL-37, IL-38, interferon (IFN) α, IFNβ, IFNκ, and IFNω.

Suitable examples of colony-stimulating factors include, but are not limited to, granulocyte-macrophage colony-stimulating factor (GM-CSF) (including granulocyte-colony stimulating factor (G-CSF) and macrophage colony-stimulating factor (M-CSF)), haematopoietin, and thrombopoietin.

In one embodiment, the payload is a growth factor.

Suitable examples of growth factors include, but are not limited to, fibroblast growth factor (FGF) 1, FGF2, FGF3, FGF4, FGF5, FGF6, FGF7, FGF8. FGF9, FGF10, FGF11, FGF12, FGF13, FGF14, FGF16, FGF17, FGF18, FGF19, FGF20. FGF21, FGF23, transforming growth factor (TGF) α, epidermal growth factor (EGF), heparin-binding EGF-like growth factor (HB-EGF), transforming growth factor (TGF) β, insulin-like growth factor (IGF) 1, IGF2, Platelet-derived growth factor (PDGF) subunit A (PDGFA), PDGF subunit B (PDGFB), PDGF subunit C (PDGFC), PDGF subunit D (PDGFD), vascular endothelial growth factor (VEGF)-A, VEGF-B. VEGF-C, VEGF-D, placental growth factor (IGF), nerve growth factor (NGF), and hepatocyte growth factor (HGF).

In one embodiment, the payload is an antibody or an antigen-binding fragment thereof.

Suitable examples of antibodies or antigen-binding fragments thereof include, but are not limited to, monoclonal antibodies, polyclonal antibodies, bispecific antibodies, multispecific antibodies, antibody fragments, and antibody mimetics, such as, e.g., scFv, di-scFv, tri-scFv, single domain antibodies, nanohodies, hispecific T-cell engagers (BiTEs), Fab, F(ab')2, Fab', chemically linked Fab, X-Link Fab, tandem-scFv/BiTE, diabodies, tandem diabodies, diabody-Fc fusions, tandem diabody-Fc fusion, tandem diabody-CH3 fusion, tetra scFv-Fc fusion, dual variable domain immunoglobulin, knob-hole, strand exchange engineered domain. CrossMab, quadoma-derived bispecific antibody, single domain based antibody, affibodies, affilins, affimers, affitins, alphabodies, anticalins, avimer, DARPins, Kunitz domain peptides, monobodies and nanoCLAMPs.

In one embodiment, the payload is an antigen.

As used herein, the term "antigen" refers to any substance that induces a state of sensitivity and/or immune responsiveness after any latent period (normally, days to weeks in humans) and that reacts in a demonstrable way with antibodies and/or immune cells of the sensitized subject in vivo or in vitro.

Suitable examples of antigens include, but are not limited to, pathogen-related antigens (such as, e.g., antigens of viruses, fungi or bacteria, or immunogenic molecules derived from them), self-antigens (such as, e.g., cellular antigens including cells containing normal transplantation antigens and/or tumor-related antigens, RR-Rh antigens, and antigens characteristic of, or specific to particular cells or tissues or body fluids), allergen-related antigens (such as, e.g., those associated with environmental allergens, including grasses, pollens, molds, dust, insects, dander, venoms, and the like; occupational allergens, including latex, dander, urethanes, epoxy resins, and the like; food, including shellfish, peanuts, eggs, milk products, and the like; and drugs, including antibiotics, anesthetics, and the like), and vaccines.

Suitable examples of pathogen-related antigens include, but are not limited to, antigens derived from vaccinia, avipox virus, turkey influenza virus, bovine leukemia virus, feline leukemia virus, avian influenza, chicken pneumovirus virus, canine parvovirus, equine influenza, FHV, Newcastle Disease Virus (NDV), Chicken/Pennsylvania/1/83 influenza virus, infectious bronchitis virus, Dengue virus, measles virus, Rubella virus, pseudorabies, Epstein-Barr Virus, HIV, SIV, EHV, BHV, HCMV, Hantaan, *C. tetani*, mumps, Morbillivirus, Herpes Simplex Virus type 1, Herpes Simplex Virus type 2, Human cytomegalovirus, Hepatitis A Virus, Hepatitis B Virus, Hepatitis C Virus, Hepatitis E Virus, Respiratory Syncytial Virus, Human Papilloma Virus, Influenza Virus, *Salmonella, Neisseria, Borrelia, Chlamydia, Bordetella, Plasmodium, Toxoplasma, Cryptococcus, Streptococcus, Staphylococcus, Haemophilus, Diptheria, Tetanus, Pertussis, Escherichia, Candida, Aspergillus, Entamoeba, Giardia,* and *Trypanasoma*.

Suitable examples of self-antigens include, but are not limited to, lupus autoantigen, Smith, Ro, La, U1-RNP, fibrillin, nuclear antigens, histones, glycoprotein gp70, ribosomal proteins, pyruvate dehydrogenase, dehydrolipoamide acetyltransferase (PCD-E2), hair follicle antigens, human tropomyosin isoform 5 (hTM5), proinsulin, insulin, IA2, GAD65, collagen type II, human cartilage gp 39 (HCgp39), gp130-RAPS, dnaJp1, citrullinated proteins and peptides (including citrullinated type II collagen, citrullinated vimentin and citrullinated fibrinogen), myelin basic protein, proteolipid protein (PLP), myelin oligodendrocyte glycoprotein (MOG), thyroid stimulating factor receptor (TSH-R), acetylcholine receptor (AchR), gliadin, PLP, glucose-6-phosphate isomerase, thyroglobulin, various tRNA synthetases, proteinase-3, and myeloperoxidase, and the like, including fragments thereof.

Suitable examples of tumor-related antigens include, but are not limited to, MART-1/Melan-A, gplOO, dipeptidyl peptidase IV (DPPIV), adenosine deaminase-binding protein (ADAbp), cyclophilin b, colorectal associated antigen (CRC)-C017-1A/GA733, carcinoembryonic antigen (CEA) and its immunogenic epitopes CAP-1 and CAP-2, etv6, amll, prostate specific antigen (PSA) and its immunogenic epitopes PSA-1, PSA-2, and PSA-3, prostate-specific membrane antigen (PSMA), T-cell receptor/CD3-zeta chain, MAGE-family of tumor antigens (e.g., MAGE-A1, MAGE-A2, MAGE-A3, MAGE-A4, MAGE-A5, MAGE-A6, MAGE-A7, MAGE-A8, MAGE-A9, MAGE-A10, MAGE-All, MAGE-A12, MAGE-Xp2 (MAGE-B2), MAGE-Xp3 (MAGE-B3), MAGE-Xp4 (MAGE-B4), MAGE-C1, MAGE-C2, MAGE-C3, MAGE-C4, MAGE-C5), GAGE-family of tumor antigens (e.g., GAGE-1, GAGE-2, GAGE-3, GAGE-4, GAGE-5, GAGE-6, GAGE-7, GAGE-8, GAGE-9), BAGE, RAGE, LAGE-1, NAG, GnT-V, MUM-1, CDK4, tyrosinase, p53, MUC family (e.g. MUC1, MUC16, etc.), HER2/neu, p21ras, RCAS1, alpha-fetoprotein, E-cadherin, alpha-catenin, beta-catenin and gamma-catenin, pl20ctn, gpl00.sup.Pmelll7, PRAME, NY-ESO-1, cdc27, adenomatous polyposis *coli* protein (APC), fodrin, connexin 37, Ig-idiotype, pl5, gp75, GM2 and GD2 gangliosides, Smad family of cancer antigens brain glycogen phosphorylase, SSX-1, SSX-2 (HOM-MEL-40), SSX-1, SSX-4, SSX-5, SCP-1 and CT-7, and c-erbB-2 and viral antigens such as the HPV-16 and HPV-18 E6 and E7 antigens and the EBV-encoded nuclear antigen (EBNA)-1, and the like, including fragments thereof. Further examples of tumor-related antigens are described in, e.g., Li et al., 2004. *Cancer Immunol Immunother.* 53(3):139-43; Novellino et al., 2005. *Cancer Immunol Immunother.* 54(3):187-20; which are herein incorporated by reference in their entirety.

In one embodiment, the payload is a hormone.

Suitable examples of hormones include, but are not limited to, GnRH, TRH, dopamine, CRH, GHRH, somatostatin, MCH, oxytocin, vasopressin, FSH, LH, TSH, prolactin, POMC, CLIP, ACTH, MSH, endorphins, lipotropin, GH, aldosterone, cortisol, cortisone. DHEA. DHEA-S, androstenedione, epinephrine, norepinephrine, thyroid hormone T3, thyroid hormone T4, calcitonin, PTH, testosterone, AMH, inhibin, estradiol, progesterone, activin, relaxin. GnSAF, hCG, HPL, estrogen, glucagon, insulin, amylin, pancreatic polypeptide, melatonin, N,N-dimethyltryptamine, 5-methoxy-N,N-dimethyltryptamine, thymosin α1, beta thymosins, thymopoietin, thymulin, gastrin, ghrelin, CCK, GIP, GLP-1, secretin, motilin, VIP, enteroglucagon, peptide YY, IGF-1, IGF-2, leptin, adiponectin, resistin, osteocalcin, renin, EPO, calcitriol, prostaglandin. ANP, and BNP.

In one emtbodiment, the payload is a coding or non-coding oligonucleotide.

Suitable examples of coding or non-coding oligonucleotides include, but are not limited to, messenger RNA (mRNA), antisense RNA (asRNA), small interfering RNA (siRNA), microRNA (miRNA), long non-coding RNA (lncRNA) (such as, e.g., transfer RNA [tRNA], ribosomal RNA [rRNA], and the like), small temporal RNA (stRNA), trans-acting siRNA, short hairpin RNA (shRNA), cis-natural antisense transcripts (NATs), CRISPR RNA, long noncoding RNA, piwi-interacting RNA (piRNA), repeat-associated siRNA (rasiRNA), RNA aptamers, ribozymes, and the like.

Further suitable examples of coding or non-coding oligonucleotides include, but are not limited to, recapuldencel-T, TriMix, BI-1361849, nusinersen, volanesorsen sodium, eteplirsen, AT I1105, ASM-8, inclisiran, patisiran, RXI-109, fitusiran, cemdisiran, QPI-1002, BMS-986263, PF-655, pegaptanib, avacincaptad pegol sodium, olaptesed pegol, emapticap pegol, SPC3649, bevasiranib, AGN-745, QPI-1007, TD101, SYLO40012, SYLIM00, Excellair, ALN-RSVO1, CEQ508, siG12D LODER, TKM-ApoB, TKM-PLKI, ALN-VSPO2, ALN-TTR01, Bcr-Abl siRNA, Atu027, TSNP, CALAA-01, FANG vaccine, iPsiRNA, Tat/Rev shRNA. ARC1779, ARC19499. AS1411 (AGRO001), Fovista, NOX-A12, NOX-E36, NOX-194, NU172, RB006 plus RBO07, ARC1905, as well as those described in Table 1 and Table 2 of Crooke et al., 2018 (*Cell Metab.* 27(4): 714-739), herein incorporated by reference.

In one embodiment, the payload is a photodetectable label.

As used herein, the terms "photodetectable label" or "fluorophore" refer to a moiety that can re-emit light upon light excitation.

Suitable examples of photodetectable labels include, but are not limited to, Alexa Fluor® dyes, BODIPY® dyes, fluorescein, 5-carboxyfluorescein, 5-(4,6-dichlorotriazin-2-yl) aminofluorescein, 2'7'-dimethoxy-4'5'-dichloro-6-carboxyfluorescein, fluorescein isothiocyanate (FITC), QFITC, Oregon Green® 488, Oregon Green® 514, rhodamine and derivatives thereof (such as, e.g., rhodamine green, rhodamine green-X, rhodamine red-X, X-rhodamine, 6-carboxy-X-rfiodamine (ROX), 6-carboxyrhodamine (R6G), N,N,N', N'-tetramethyl-6-carboxyrhcodamine (TAMRA), lissamine rhodamine B, rhodamine 123, rhodamine X isothiocyanate, sulforhodamine B, sulforhodamine 101 (Texas Red), tetramethyl rhodamine, tetramethyl rhodamine isothiocyanate (TRITC)), eosin, eosin isothiocyanate, erythrosine, erythrosine B, erythrosin isothiocyanate, Texas Red®, Texas Red® X, naphthofluorescein, malachite green, malachite green isothiocyanate, coumarin derivatives, Pacific Orange, cascade blue, cascade yellow, dansyl chloride, dapoxyl dye, 1-dimethylamine-N(2-azido-ethyl)naphthalene-5-sulfonamide, 6-(6-amino-2-(2-azidoethyl)-1,3-dioxo-1H-benzo (de)-2(3H)isoquinoline, 6-(6-amino-2-(2-propinyl)-1,3-dioxo-1H-benzo(de)-2(3H)isoquinoline, 8-(4-azidoethyloxyphenyl)-2,6-diethyl-1,3,5,7-tetramethyl-4,4-diiluoro-4-bora-3a,4a-diaza-s-indacene, 8-(4-propynyioxyphenyl)-2,6-diethyl-1,3,5,7-tetramethyl-4,4-difluoro-4-bora-3a,4a-diaza-s-indacene, 1-(3-azido-propoxy)-7-methylaminophenoxazin-3-one, 1-(2-propynyl)-7-methylaminophenoxazm-3-one, N-(5-(3-azidopropylamino)-9H-benzo(a)-phenoxa-2-in-9-ylidene)-N-methyl-methanaminium chloride, N-(5-(3-propynyl-amino)-9H-benzo(a)-phenoxazin-9-ylene)-N-methyl-methanaminium chloride. (9-(3-azido-propoxy)-7-piperidin-1-yl-phenoxazin-3-ylidene)-dimethyl-ammonium perchlorate, 4-acetamido-4'-isothiocyanatostilbene-2,2'-disulfonic acid, acridine, acridine isothiocyanate, 5-(2'-aminoethyl)aminonaphthalene-1-sulfonic acid, 4-amino-N-[3-vinylsulfonyl)phenyl] naphthalimide-3.5 disulfonate, N-(4-anilino-1-naphthyl)maleimide, anthranilamide, Brilliant Yellow, coumarin, coumarin derivatives, 7-amino-4-methylcoumarin, 7-aminotriiluoromethylcouluarin, cyanosine, 4',6-diaminidino-2-phenvlindole, 5',5'-dibrnmopyrogallol-sulfonephthalein, 7-diethylamino-3-(4'-isothiocyanatophenyl)-4-methylcoumarin-4,4'-diisothiocyanatodihydro-stilbene-2.2'-disulfonic acid, 4,4'-diisothiocyanatostilbene-2,2'-disulfonic acid, ethidium, IR144, IR1446, 4-methylunbelliferone, o-cresolphthalein, nitrotyrosine, pararosaniline, Phenol Red, B-phycoerythrin, o-phthaldialdehyde, pyrene, pyrene butyrate, succinimidyl 1-pyrene butyrate, Reactive Red 4, riboflavin, rosolic acid, lanthanide chelates, quantum dots, cyanines, pyrelium dyes, and squaraines.

In one embodiment, the payload is a contrast agent.

As used herein, the term "contrast agent" refers to any molecule used to increase the contrast of structures or fluids within the body in medical imaging. Contrast agents absorb or alter external electromagnetism or ultrasound (which differs from radiolabels which emit radiation themselves).

Suitable examples of radiolabels include those described under subgroup V08 of the Anatomical Therapeutic Chemical Classification System.

Suitable examples of contrast agents include, but are not limited to, diatrizoic acid, metrizoic acid, iodamide, iotalamic acid, ioxitalamic acid, ioglicic acid, acetrizoic acid, iocarmic acid, methiodal, diodone, metrizamide, iohexol, ioxaglic acid, iopamidol, iopromide, iotrolan, ioversol, iopentol, iodixanol, iomeprol, iobitridol, ioxilan, iodoxamic acid, iotroxic acid, ioglycamic acid, adipiodone, iobenzamic acid, iopanoic acid, iocetamic acid, sodium iopodate, tyropanoic acid, calcium iopodate, iopydol, propyliodone, iofendylate, lipiodol, barium sulfate, gadobenic acid, gadobutrol, gadodiamide, gadofosveset, gadolinium, gadopentetic acid, gadoteric acid, gadoteridol, gadoversetamide, gadoxetic acid, ferric ammonium citrate, mangafodipir, ferumoxsil, ferristene, perflubron, microspheres of human albumin, microparticles of galactose, perflenapent, microspheres of phospholipids, sulfur hexafluoride, and the like.

In one embodiment, the payload is a radiolabel.

As used herein, the terms "radiolabel" or "radiopharmaceutical" refer to any molecule which emits radiation. Radiolabels can be used for therapeutics or diagnostic purposes.

Suitable examples of radiolabels include those described under subgroups V09 and V10 of the Anatomical Therapeutic Chemical Classification System.

Suitable examples of radiolabels include, but are not limited to, $^{99m}$Tc compounds (such as, e.g., exametazime, medronic acid, macroaggregated albumin. sestamibi, tetroftsmin, exametazime, sulesomab, tilmanocept, arcitumomab, votumumab, hynic-octreotide, and the like): $^{123}$I, $^{125}$I or $^{131}$I compounds (such as, e.g., ioflupane, iofetamine, iomazenil, sodium iodohippurate, iobenguane, iodocholesterol, minretumomab, tositumomab, and the like); ISF compounds (such as, e.g., florbetapir, ilutemetamol, fluciclovine, fludeoxyglucose, fluoroethyltyrosine, sodium Iluoride, and the like); $^{64}$Cu compounds (such as, e.g., Cu-ETS2, and the like); $^{75}$Se compounds (such as, e.g., SeHCAT); $^{111}$In compounds (such as, e.g., imciromab, capromab pendetide, satumomab pendetide, and the like); $^{82}$Rb compounds (such as, e.g., rubidium chloride); $^{153}$Sm compounds (such as, e.g., lexidronam, and the like); $^{89}$Sr compounds (such as, e.g., strontium-89 chloride, and the like); $^{90}$Y compounds (such as, e.g., ibritumomab tiuxetan, and the like); $^{223}$Ra compounds (such as, e.g., radium-223 chloride, and the like); $^{177}$Lu compounds (such as, e.g,, oxodotreotide, and the like); and any compounds comprising at least one $^{2}$H, $^{3}$H, $^{11}$C, $^{13}$N, $^{14}$C, $^{15}$O, $^{18}$F, $^{22}$Na, $^{24}$Na, $^{32}$P, $^{47}$Ca, $^{51}$Cr, $^{57}$Co, $^{53}$Co, $^{59}$Fe, $^{64}$Cu, $^{67}$Ga, $^{68}$Ga, $^{75}$Se, $^{81m}$Kr, $^{82}$Rb, $^{89}$Sr, $^{90}$Y, $^{99m}$Tc, $^{111}$In, $^{123}$I, $^{125}$I, $^{131}$I, $^{133}$Xe, $^{153}$Sm, $^{165}$Dy, $^{169}$Er, $^{177}$Lu, $^{186}$Re, $^{198}$Au, $^{201}$Tl and/or $^{223}$Ra atom, In one embodiment, the STxB protein or the variant thereof according to the present invention is not a recombinant protein. In one embodiment, the STxB protein or the variant thereof according to the present invention is not obtained by recombinant protein production, in particular, is not obtained by a cell-based protein production system. Common cell-based protein production systems include, but are not limited to, those derived from bacteria, yeast, filamentous fungi, insect cells, and mammalian cells.

In one embodiment, the STxB protein or the variant thereof according to the present invention is a synthetic protein. In one embodiment, the STxB protein or the variant thereof according to the present invention is obtained by chemical protein synthesis.

The present invention also relates to an oligomer of a Shiga toxin B-subunit (STxB) protein or of a variant thereof, comprising at least one monomer of the STxB protein or a variant thereof of the invention.

As used herein, the term "oligomer", when used in the context of a protein and/or polypeptide, is intended to include, but is not limited to, a protein or polypeptide structure having at least two subunits. More particularly in the context of the present invention, the term "oligomer" is intended to include a protein or polypeptide structure having at least two subunits, at least one of these subunits being a monomer of the STxB protein or a variant thereof of the invention. In one embodiment, the at least two subunits forming the oligomer according to the present invention are non-covalently associated (such as, e.g., by electrostatic interactions, π-effects, van der Waals forces, and/or hydrophobic effects). In one embodiment, the at least two subunits forming the oligomer according to the present invention are covalently associated (such as, e.g., by disulfide bonds between cysteine residues of two subunits). Oligomers include, but are not limited to, dimers, trimers, tetramers, pentamers, hexamers, heptamers, octamers, nonamers, decamers and dodecamers. Greek prefixes are often used to designate the number of monomer units in the oligomer, e.g., a pentamer being composed of five units, a hexamer of six units, etc. An oligomer can further be defined as "homomer" or "heteromer". As used herein, the term "homomer" refers to an oligomer comprising or consisting of at least two subunits, where these at least two subunits are identical (i.e., with identical amino acid sequences and if applicable, bearing identical mutations, and if applicable, bearing identical payloads), and where these at least two subunits correspond to the monomer of the STxB protein or a variant thereof of the invention. As used herein, the term "heteromer" refers to an oligomer comprising or consisting of at least two subunits, where at least two of these at least two subunits are different (i.e., with different amino acid sequences and if applicable, bearing identical or different mutations and/or identical or different payloads; or with identical amino acid sequences but bearing different mutations and/or different payloads; or with identical amino acid sequences and bearing identical mutations but different payloads; or with identical amino acid sequences but bearing different mutations and identical payloads), and where at least one of these at least two subunits corresponds to the monomer of the STxB protein or a variant thereof of the invention. The term "heteromer" is also intended to include an oligomer comprising or consisting of at least two subunits, where at least two of these at least two subunits are different (i.e., with different amino acid sequences, or with identical amino acid sequences but bearing different mutations), and where these at least two subunits correspond to the monomer of the STxB protein or a variant thereof of the invention.

In one embodiment, the oligomer according to the present invention is a dimer comprising at least 1, preferably 2 monomers of a Shiga toxin B-subunit (STxB) protein or of a variant thereof according to the present invention.

In one embodiment, the oligomer according to the present invention is a homodimer comprising 2 monomers of a Shiga toxin B-subunit (STxB) protein or of a variant thereof according to the present invention with identical amino acid sequences and, if applicable, bearing identical mutations (in particular, identical non-proteinogenic amino acid residues), and, if applicable, bearing identical payloads.

In one embodiment, the oligomer according to the present invention is a heterodimer comprising 1 monomer of a Shiga toxin B-subunit (STxB) protein or of a variant thereof according to the present invention.

In one embodiment, the oligomer according to the present invention is a heterodimer comprising 2 monomers of a Shiga toxin B-subunit (STxB) protein or of a variant thereof according to the present invention with different amino acid sequences and if applicable, bearing identical or different mutations (in particular, identical or different non-proteinogenic amino acid residues) and/or, if applicable, identical or different payloads.

In one embodiment, the oligomer according to the present invention is a heterodimer comprising 2 monomers of a Shiga toxin B-subunit (STxB) protein or of a variant thereof according to the present invention with identical amino acid sequences but bearing different mutations (in particular, different non-proteinogenic amino acid residues).

In one embodiment, the oligomer according to the present invention is a heterodimer comprising 2 monomers of a Shiga toxin B-subunit (STxB) protein or of a variant thereof according to the present invention with identical amino acid sequences but bearing different payloads.

In one embodiment, the oligomer according to the present invention is a heterodimer comprising 2 monomers of a Shiga toxin B-subunit (STxB) protein or of a variant thereof according to the present invention with identical amino acid sequences and bearing identical mutations (in particular, identical non-proteinogenic amino acid residues), but bearing different payloads.

In one embodiment, the oligomer according to the present invention is a heterodimer comprising 2 monomers of a Shiga toxin B-subunit (STxB) protein or of a variant thereof according to the present invention with identical amino acid sequences but bearing different mutations (in particular, different non-proteinogenic amino acid residues) and identical payloads.

In one embodiment, the oligomer according to the present invention is a trimer comprising at least 1, preferably 2 or 3 monomers of a Shiga toxin B-subunit (STxB) protein or of a variant thereof according to the present invention.

In one embodiment, the oligomer according to the present invention is a homotrimer comprising 3 monomers of a Shiga toxin B-subunit (STxB) protein or of a variant thereof according to the present invention with identical amino acid sequences and, if applicable, bearing identical mutations (in particular, identical non-proteinogenic amino acid residues), and, if applicable, bearing identical payloads.

In one embodiment, the oligomer according to the present invention is a heterotrimer comprising 1 monomer of a Shiga toxin B-subunit (STxB) protein or of a variant thereof according to the present invention.

In one embodiment, the oligomer according to the present invention is a heterotrimer comprising 2 monomers of a Shiga toxin B-subunit (STxB) protein or of a variant thereof according to the present invention.

In one embodiment, the oligomer according to the present invention is a heterotrimer comprising 3 monomers of a Shiga toxin B-subunit (STxB) protein or of a variant thereof according to the present invention, wherein at least 2 or 3 of the 3 monomers have different amino acid sequences and if applicable, bear identical or different mutations (in particular, identical or different non-proteinogenic amino acid residues) and/or, if applicable, identical or different payloads.

In one embodiment, the oligomer according to the present invention is a heterotrimer comprising 3 monomers of a Shiga toxin B-subunit (STxB) protein or of a variant thereof according to the present invention, wherein at least 2 or 3 of the 3 monomers have identical amino acid sequences but bear different mutations (in particular, different non-proteinogenic amino acid residues).

In one embodiment, the oligomer according to the present invention is a heterotrimer comprising 3 monomers of a Shiga toxin B-subunit (STxB) protein or of a variant thereof according to the present invention, wherein at least 2 or 3 of the 3 monomers have identical amino acid sequences but bear different payloads.

In one embodiment, the oligomer according to the present invention is a heterotrimer comprising 3 monomers of a Shiga toxin B-subunit (STxB) protein or of a variant thereof according to the present invention, wherein at least 2 or 3 of the 3 monomers have identical amino acid sequences and bear identical mutations (in particular, identical non-proteinogenic amino acid residues), but bear different payloads.

In one embodiment, the oligomer according to the present invention is a heterotrimer comprising 3 monomers of a Shiga toxin B-subunit (STxB) protein or of a variant thereof according to the present invention, wherein at least 2 or 3 of the 3 monomers have identical amino acid sequences but bear different mutations (in particular, different non-proteinogenic amino acid residues) and identical payloads.

In one embodiment, the oligomer according to the present invention is a tetramer comprising at least 1, preferably 2, 3 or 4 monomers of a Shiga toxin B-subunit (STxB) protein or of a variant thereof according to the present invention.

In one embodiment, the oligomer according to the present invention is a homotetramer comprising 4 monomers of a Shiga toxin B-subunit (STxB) protein or of a variant thereof according to the present invention with identical amino acid sequences and, if applicable, bearing identical mutations (in particular, identical non-proteinogenic amino acid residues), and, if applicable, bearing identical payloads.

In one embodiment, the oligomer according to the present invention is a heterotetramer comprising 1 monomer of a Shiga toxin B-subunit (STxB) protein or of a variant thereof according to the present invention.

In one embodiment, the oligomer according to the present invention is a heterotetramer comprising 2 monomers of a Shiga toxin B-subunit (STxB) protein or of a variant thereof according to the present invention.

In one embodiment, the oligomer according to the present invention is a heterotetramer comprising 3 monomers of a Shiga toxin B-subunit (STxB) protein or of a variant thereof according to the present invention.

In one embodiment, the oligomer according to the present invention is a heterotetramer comprising 4 monomers of a Shiga toxin B-subunit (STxB) protein or of a variant thereof according to the present invention, wherein at least 2, 3 or 4 of the 4 monomers have different amino acid sequences and if applicable, bear identical or different mutations (in particular, identical or different non-proteinogenic amino acid residues) and/or, if applicable, identical or different payloads.

In one embodiment, the oligomer according to the present invention is a heterotetramer comprising 4 monomers of a Shiga toxin B-subunit (STxB) protein or of a variant thereof according to the present invention, wherein at least 2, 3 or 4 of the 4 monomers have identical amino acid sequences but bear different mutations (in particular, different non-proteinogenic amino acid residues).

In one embodiment, the oligomer according to the present invention is a heterotetramer comprising 4 monomers of a Shiga toxin B-subunit (STxB) protein or of a variant thereof according to the present invention, wherein at least 2, 3 or 4 of the 4 monomers have identical amino acid sequences but bear different payloads.

In one embodiment, the oligomer according to the present invention is a heterotetramer comprising 4 monomers of a Shiga toxin B-subunit (STxB) protein or of a variant thereof according to the present invention, wherein at least 2, 3 or 4 of the 4 monomers have identical amino acid sequences and bear identical mutations (in particular, identical non-proteinogenic amino acid residues), but bear different payloads.

In one embodiment, the oligomer according to the present invention is a heterotetramer comprising 4 monomers of a Shiga toxin B-subunit (STxB) protein or of a variant thereof according to the present invention, wherein at least 2, 3 or 4 of the 4 monomers have identical amino acid sequences but bear different mutations (in particular, different non-proteinogenic amino acid residues) and identical payloads.

In a preferred embodiment, the oligomer according to the present invention is a pentamer comprising at least 1, preferably 2, 3, 4 or 5 monomers of a Shiga toxin B-subunit (STxB) protein or of a variant thereof according to the present invention.

In a preferred embodiment, the oligomer according to the present invention is a homopentamer comprising 5 monomers of a Shiga toxin B-subunit (STxB) protein or of a variant thereof according to the present invention with identical amino acid sequences and, if applicable, bearing identical mutations (in particular, identical non-proteinogenic amino acid residues), and, if applicable, bearing identical payloads.

In a preferred embodiment, the oligomer according to the present invention is a heteropentamer comprising 1 monomer of a Shiga toxin B-subunit (STxB) protein or of a variant thereof according to the present invention.

In a preferred embodiment, the oligomer according to the present invention is a heteropentamer comprising 2 monomers of a Shiga toxin B-subunit (STxB) protein or of a variant thereof according to the present invention.

In a preferred embodiment, the oligomer according to the present invention is a heteropentamer comprising 3 monomers of a Shiga toxin B-subunit (STxB) protein or of a variant thereof according to the present invention.

In a preferred embodiment, the oligomer according to the present invention is a heteropentamer comprising 4 monomers of a Shiga toxin B-subunit (STxB) protein or of a variant thereof according to the present invention.

In a preferred embodiment, the oligomer according to the present invention is a heteropentamer comprising 5 monomers of a Shiga toxin B-subunit (STxB) protein or of a variant thereof according to the present invention, wherein at least 2, 3, 4 or 5 of the 5 monomers have different amino acid sequences and if applicable, bear identical or different mutations (in particular, identical or different non-proteinogenic amino acid residues) and/or, if applicable, identical or different payloads.

In a preferred embodiment, the oligomer according to the present invention is a heteropentamer comprising 5 monomers of a Shiga toxin B-subunit (STxB) protein or of a variant thereof according to the present invention, wherein at least 2, 3, 4 or 5 of the 5 monomers have identical amino acid sequences but bear different mutations (in particular, different non-proteinogenic amino acid residues).

In a preferred embodiment, the oligomer according to the present invention is a heteropentamer comprising 5 monomers of a Shiga toxin B-subunit (STxB) protein or of a variant thereof according to the present invention, wherein at least 2, 3, 4 or 5 of the 5 monomers have identical amino acid sequences but bear different payloads.

In a preferred embodiment, the oligomer according to the present invention is a heteropentamer comprising 5 monomers of a Shiga toxin B-subunit (STxB) protein or of a variant thereof according to the present invention, wherein at least 2, 3, 4 or 5 of the 5 monomers have identical amino acid sequences and bear identical mutations (in particular, identical non-proteinogenic amino acid residues), but bear different payloads.

In a preferred embodiment, the oligomer according to the present invention is a heteropentamer comprising 5 monomers of a Shiga toxin B-subunit (STxB) protein or of a variant thereof according to the present invention, wherein at least 2, 3, 4 or 5 of the 5 monomers have identical amino acid sequences but bear different mutations (in particular, different non-proteinogenic amino acid residues) and identical payloads.

In one embodiment, the oligomer according to the present invention (such as the dimer, homodimer or heterodimer; the trimer, homotrimer or heterotrimer; the tetramer, homotetramer or heterotetramer, preferably the pentamer, homopentamer or heteropentamer as described hereinabove) binds to the glycosphingolipid Gb3/CD77.

As used herein, the terms "glycosphingolipid Gb3/CD77", "Gb3", "CD77", "globotriaosylceramide" or "ceramide trihexoside" are used interchangeably to refer to a globoside (i.e., a type of glycosphingolipid) formed by the α-linkage of galactose to a lactosylceramide, catalyzed by lactosylceramide 4-alpha-galactosyltransferase, an enzyme encoded by the A4GALT gene (with Uniprot accession number Q9NPC4 for human A4GALT). The lactosylceramide moiety of Gb3 bears a sphingosine alkyl chain which remains, in most cases, homogenous (mainly C18:1); and a fatty acid chain which exhibits a high degree of heterogeneity among Gb3 isoforms (with different fatty acid chain length and degree of saturation from C12 to C24).

Although not fully characterized to date, Gb3 has been shown to be expressed in normal human tissues, on the cell surface of various cells, including antigen-presenting cells (APC) such as monocytes, monocyte-derived macrophages, dendritic cells and B cells (Murray et al., 1985. *Int J Cancer.* 36(5):561-5; Gregory et al., 1988. *Int J Cancer.* 42(2):213-20; Mangeney et al., 1991. *Eur J Immunol.* 21(5):1131-40; van Setten et al., 1996. *Blood.*88(1):174-83; Falguières et al., 2001. *Mol Biol Cell.* 12(8):2453-68). Studies have also shown expression of Gb3 in kidney epithelium and endothelium (Lingwood, 1994. *Nephron.* 66(1):21-8; Khan et al., 2009. *Kidney Int.* 75(11):1209-1216), in microvascular endothelial cells in intestinal lamina propria (Miyamoto et al., 2006. *Cell Microbiol.* 8(5):869-79; Schüller et al., 2007. *Microbes Infect.* 9(1):35-9), in platelets (Cooling et al., 1998. *Infect Immun.* 66(9):4355-66), in intestinal pericryptal myofibroblasts (Schüller et al., 2007. *Microbes Infect.* 9(1):35-9), in neurons (Obata et al., 2008. *J Infect Dis.* 198(9):1398-406), and in endothelial cells in the central nervous system (Johansson et al., 2006. *Cancer Biol Ther.* 5(9):1211-7; Obata et al., 2008. *J Infect Dis.* 198(9):1398-406).

Gb3 has been further shown to be highly expressed on the surface of cancer cells in various types of cancer. To cite but a few, without limitation: fibrosarcoma (Ito et al., 1984. *Int J Cancer.* 34(5):689-97), Burkitt's lymphoma (Nudelman et al., 1983. *Science.* 220(45%):509-11), primary Burkitt-like B cell lymphomas (Nudelman et al., 1983. *Science.* 220 (45%):509-11; Wiels et al., 1981. *Proc Natl Acad Sci USA.* 78(10):6485-8), other types of B cell lymphomas (Murray et al., 1985. *Int J Cancer.* 36(5):561-5; LaCasse et al., 19%. *Blood.* 88(5):1561-7; LaCasse et al., 1999. *Blood.* 94(8):2901-10), testicular tumor (Ohyama et al., 1990. *Int J Cancer.* 45(6):1040-4; Ohyama et al., 1992. *J Urol.* 148(1):72-5), colorectal carcinoma (Kovbasnjuk et al., 2005. *Proc Natl Acad Sci USA.* 102(52):19087-92; Falguières et al., 2008. *Mol Cancer Ther.* 7(8):2498-508; Distler et al., 2009. *PLoS One.* 4(8):e6813), ovary cancer (Farkas-Himsley et al., 1995. *Proc Nat Acad Sci USA.* 92(15):6996-7000; Arab et al., 1997. *Oncol Res.* 9(10):553-63), breast cancer (LaCasse et al., 1999. *Blood.* 94(8):2901-10; Johansson et al., 2009. *BMC Cancer.* 9:67), pancreatic cancer (Distler et al., 2009. *PLoS One.* 4(8):e6813), glioma (Arab et al., 1999. *Oncol Res.* 11(1):33-9; Johansson et al., 2006. *Cancer Biol Ther.* 5(9):1211-7), malignant meningiomas (Salhia et al., 2002. *Neoplasia.* 4(4):304-11), acute non-lymphocytic leukaemia (Cooling et al., 2003. *Blood.* 101(2):711-21).

In one embodiment, the oligomer according to the present invention binds to the glycosphingolipid Gb3/CD77 with a dissociation constant ($K_D$) ranging from about $10^{-6}$ M to about $10^{-12}$ M, preferably from about $10^{-7}$ M to about $10^{-12}$ M, from about $10^{-8}$ M to about $10^{-12}$ M, from about $10^{-9}$ M to about $10^{-12}$ M, from about $10^{-10}$ M to about $10^{-12}$ M, from about $10^{-11}$ M to about $10^{-12}$ M.

In one embodiment, the oligomer according to the present invention binds to the glycosphingolipid Gb3/CD77 with a dissociation constant ($K_D$) ranging from about $10^{-6}$ M to about $10^{-11}$ M, preferably from about $10^{-7}$ M to about $10^{-11}$ M, from about $10^{-8}$ M to about $10^{-11}$ M, from about $10^{-9}$ M to about $10^{-11}$ M, from about $10^{-10}$ M to about $10^{-11}$ M.

In one embodiment, the oligomer according to the present invention binds to the glycosphingolipid Gb3/CD77 with a dissociation constant ($K_D$) ranging from about $10^{-6}$ M to about $10^{-10}$ M, preferably from about $10^{-7}$ M to about $10^{-10}$ M, from about $10^{-8}$ M to about $10^{-10}$ M, from about $10^{-9}$ M to about $10^{-10}$ M.

In one embodiment, the oligomer according to the present invention binds to the glycosphingolipid Gb3/CD77 with a dissociation constant ($K_D$) ranging from about $10^{-6}$ M to about $10^{-9}$ M, preferably from about $10^{-7}$ M to about $10^{-9}$ M, from about $10^{-8}$ M to about $10^{-9}$ M.

In one embodiment, the oligomer according to the present invention binds to the glycosphingolipid Gb3/CD77 with a dissociation constant ($K_D$) of about 1 nM, about 2 nM, about 3 nM, about 4 nM, about 5 nM, about 6 nM, about 7 nM, about 8 nM, about 9 nM, about 10 nM, about 15 nM, about 20 nM, about 25 nM, about 30 nM, about 35 nM, about 40 nM, about 45 nM, about 50 nM, about 55 nM, about 60 nM, about 65 nM, about 70 nM, about 75 nM, about 80 nM, about 85 nM, about 90 nM, about 95 nM, about 100 nM, about 125 nM, about 150 nM, about 175 nM, about 200 nM, about 225 nM, about 250 nM, about 275 nM, about 300 nM, about 325 nM, about 350 nM, about 375 nM, about 400 nM, about 425 nM, about 450 nM, about 475 nM, about 500 nM, about 525 nM, about 550 nM, about 575 nM, about 600 nM, about 625 nM, about 650 nM, about 675 nM, about 700 nM, about 725 nM, about 750 nM, about 775 nM, about 800 nM, about 825 nM, about 850 nM, about 875 nM, about 900 nM, about 925 nM, about 950 nM, about 975 nM, or about 1 µM.

Techniques for determining the dissociation constant ($K_D$) of the oligomer according to the present invention binding to Gb3 are well known by the skilled artisan, and include, without limitation, enzyme linked immunosorbent assays (ELISA), surface plasmon resonance (SPR), isothermal titration calorimetry (ITC), biolayer interferometry (BLI), affinity capillary electrophoresis (ACE), electrophoretic mobility shift assay (EMSA), gel-shift assays, pull-down assays, equilibrium dialysis, analytical ultracentrifugation, spectroscopic assays, and the like.

The present invention further relates to a composition comprising at least one monomer of a Shiga toxin B-subunit (STxB) protein or of a variant thereof as defined hereinabove.

The present invention further relates to a composition comprising at least one oligomer of a Shiga toxin B-subunit (STxB) protein or of a variant thereof, comprising at least one monomer of the STxB protein or a variant thereof of the invention, as defined hereinabove.

In one embodiment, the composition according to the present invention comprises at least one dimer comprising at least one monomer of the STxB protein or a variant thereof of the invention as defined hereinabove (such as, e.g., at least one homodimer or at least one heterodimer as defined hereinabove).

In one embodiment, the composition according to the present invention comprises at least one trimer comprising at least one monomer of the STxB protein or a variant thereof of the invention as defined hereinabove (such as, e.g., at least one homotrimer or at least one heterotrimer as defined hereinabove).

In one embodiment, the composition according to the present invention comprises at least one tetramer comprising at least one monomer of the STxB protein or a variant thereof of the invention as defined hereinabove (such as, e.g., at least one homotetramer or at least one heterotetramer as defined hereinabove).

In a preferred embodiment, the composition according to the present invention comprises at least one pentamer comprising at least one monomer of the STxB protein or a variant thereof of the invention as defined hereinabove (such as, e.g., at least one homopentamer or at least one heteropentamer as defined hereinabove).

The present invention further relates to a pharmaceutical composition comprising at least one monomer of a Shiga toxin B-subunit (STxB) protein or of a variant thereof as defined hereinabove; and at least one pharmaceutically acceptable excipient.

The present invention further relates to a pharmaceutical composition comprising at least one oligomer of a Shiga toxin B-subunit (STxB) protein or of a variant thereof, comprising at least one monomer of the STxB protein or a variant thereof of the invention, as defined hereinabove; and at least one pharmaceutically acceptable excipient.

In one embodiment, the pharmaceutical composition according to the present invention comprises at least one dimer comprising at least one monomer of the STxB protein or a variant thereof of the invention as defined hereinabove (such as, e.g., at least one homodimer or at least one heterodimer as defined hereinabove); and at least one pharmaceutically acceptable excipient.

In one embodiment, the pharmaceutical composition according to the present invention comprises at least one trimer comprising at least one monomer of the STxB protein or a variant thereof of the invention as defined hereinabove (such as, e.g., at least one homotrimer or at least one heterotrimer as defined hereinabove); and at least one pharmaceutically acceptable excipient.

In one embodiment, the pharmaceutical composition according to the present invention comprises at least one tetramer comprising at least one monomer of the STxB protein or a variant thereof of the invention as defined hereinabove (such as, e.g., at least one homotetramer or at least one heterotetramer as defined hereinabove); and at least one pharmaceutically acceptable excipient.

In a preferred embodiment, the pharmaceutical composition according to the present invention comprises at least one pentamer comprising at least one monomer of the STxB protein or a variant thereof of the invention as defined hereinabove (such as, e.g., at least one homopentamer or at least one heteropentamer as defined hereinabove); and at least one pharmaceutically acceptable excipient.

The term "pharmaceutically acceptable excipient" refers to a solid, semi-solid or liquid component of a pharmaceutical composition or a vaccine composition that is not an active ingredient, and that does not produce an adverse, allergic or other untoward reaction when administered to an animal, preferably to a human. The most of these pharmaceutically acceptable excipients are described in detail in, e.g., Allen (Ed.), 2017. *Ansel's pharmaceutical dosage forms and drug delivery systems* ($11^{th}$ ed.). Philadelphia, PA: Wolters Kluwer; Remington, Allen & Adeboye (Eds.), 2013. *Remington: The science and practice of pharmacy* ($22^{nd}$ ed.). London: Pharmaceutical Press; and Sheskey, Cook & Cable (Eds.), 2017. *Handbook of pharmaceutical excipients* ($8^{th}$ ed.). London: Pharmaceutical Press; each of which is herein incorporated by reference in its entirety.

Pharmaceutically acceptable excipients include, but are not limited to, water, saline, Ringer's solution, dextrose solution, and solutions of ethanol, glucose, sucrose, dextran, mannose, mannitol, sorbitol, polyethylene glycol (PEG), phosphate, acetate, gelatin, collagen, Carbopol®, vegetable oils, and the like. One may additionally include suitable preservatives, stabilizers, antioxidants, antimicrobials, and buffering agents, such as, e.g., BHA, BHT, citric acid, ascorbic acid, tetracycline, and the like.

Other examples of pharmaceutically acceptable excipients that may be used in the composition of the invention include, but are not limited to, ion exchangers, alumina, aluminum stearate, lecithin, serum proteins, such as human serum albumin, buffer substances such as phosphates, glycine, sorbic acid, potassium sorbate, partial glyceride mixtures of saturated vegetable fatty acids, water, salts or electrolytes, such as protamine sulfate, disodium hydrogen phosphate, potassium hydrogen phosphate, sodium chloride, zinc salts, colloidal silica, magnesium trisilicate, polyvinyl pyrrolidone, cellulose-based substances, polyethylene glycol, sodium carboxymethylcellulose, polyacrylates, waxes, polyethylene-polyoxypropylene-block polymers, polyethylene glycol and wool fat.

In addition, some pharmaceutically acceptable excipients may include, surfactants (e.g., hydroxypropylcellulose); suitable carriers, such as, e.g., solvents and dispersion media containing, e.g., water, ethanol, polyol (e.g., glycerol, propylene glycol, and liquid polyethylene glycol, and the like), suitable mixtures thereof, and vegetable oils, such as, e.g., peanut oil and sesame oil; isotonic agents, such as, e.g., sugars or sodium chloride; coating agents, such as, e.g., lecithin; agents delaying absorption, such as, e.g., aluminum monostearate and gelatin; preservatives, such as, e.g., benzalkonium chloride, benzethonium chloride, chlorobutanol, thimerosal and the like; buffers, such as, e.g., boric acid, sodium and potassium bicarbonate, sodium and potassium borates, sodium and potassium carbonate, sodium acetate, sodium biphosphate and the like; tonicity agents, such as, e.g., dextran 40, dextran 70, dextrose, glycerin, potassium chloride, propylene glycol, sodium chloride; antioxidants and stabilizers, such as, e.g., sodium bisulfite, sodium metabisulfite, sodium thiosulfite, thiourea and the like; nonionic wetting or clarifying agents, such as, e.g., polysorbate 80, polysorbate 20, poloxamer 282 and tyloxapol; viscosity modifying agents, such as, e.g., dextran 40, dextran 70, gelatin, glycerin, hydroxyethylcellulose, hydroxymethylpropylcellulose, lanolin, methylcellulose, petrolatum, polyethylene glycol, polyvinyl alcohol, polyvinylpyrrolidone, carboxymethylcellulose; and the like.

The present invention further relates to a vaccine composition comprising at least one monomer of a Shiga toxin B-subunit (STxB) protein or of a variant thereof as defined hereinabove; and at least one pharmaceutically acceptable excipient.

The present invention further relates to a vaccine composition comprising at least one oligomer of a Shiga toxin B-subunit (STxB) protein or of a variant thereof, comprising at least one monomer of the STxB protein or a variant thereof of the invention, as defined hereinabove; and at least one pharmaceutically acceptable excipient.

As used herein, the term "vaccine composition" refers to compositions comprising at least one antigen or immunogen in a pharmaceutically acceptable excipient, and which are useful for inducing an immune response in a subject upon administration.

In one embodiment, the vaccine composition according to the present invention comprises at least one dimer comprising at least one monomer of the STxB protein or a variant thereof of the invention as defined hereinabove (such as, e.g., at least one homodimer or at least one heterodimer as defined hereinabove); and at least one pharmaceutically acceptable excipient.

In one embodiment, the vaccine composition according to the present invention comprises at least one trimer comprising at least one monomer of the STxB protein or a variant thereof of the invention as defined hereinabove (such as, e.g., at least one homotrimer or at least one heterotrimer as defined hereinabove); and at least one pharmaceutically acceptable excipient.

In one embodiment, the vaccine composition according to the present invention comprises at least one tetramer comprising at least one monomer of the STxB protein or a variant thereof of the invention as defined hereinabove (such as, e.g., at least one homotetramer or at least one heterotetramer as defined hereinabove); and at least one pharmaceutically acceptable excipient.

In a preferred embodiment, the vaccine composition according to the present invention comprises at least one pentamer comprising at least one monomer of the STxB protein or a variant thereof of the invention as defined hereinabove (such as, e.g., at least one homopentamer or at least one heteropentamer as defined hereinabove); and at least one pharmaceutically acceptable excipient.

In one embodiment, the vaccine composition according to the present invention comprises at least one antigen. Suitable antigens have been described in details hereinabove.

In one embodiment, the vaccine composition according to the present invention comprises at least one conjugate comprising or consisting of at least one monomer of a Shiga toxin B-subunit (STxB) protein or of a variant as defined hereinabove; and at least one antigen as defined hereinabove.

In one embodiment, the vaccine composition according to the present invention comprises at least one conjugate comprising or consisting of at least one monomer of a Shiga toxin B-subunit (STxB) protein or of a variant as defined hereinabove; and at least one antigen as defined hereinabove.

In one embodiment, the vaccine composition according to the present invention comprises at least one oligomer of a Shiga toxin B-subunit (STxB) protein or of a variant thereof, comprising at least one monomer of the STxB protein or a variant thereof of the invention, as defined hereinabove; and at least one antigen as defined hereinabove.

The present invention further relates to a medicament comprising at least one monomer of a Shiga toxin B-subunit (STxB) protein or of a variant thereof as defined hereinabove.

The present invention further relates to a medicament comprising at least one oligomer of a Shiga toxin B-subunit (STxB) protein or of a variant thereof, comprising at least one monomer of the STxB protein or a variant thereof of the invention, as defined hereinabove.

In one embodiment, the medicament according to the present invention comprises at least one dimer comprising at least one monomer of the STxB protein or a variant thereof of the invention as defined hereinabove (such as, e.g., at least one homodimer or at least one heterodimer as defined hereinabove).

In one embodiment, the medicament according to the present invention comprises at least one trimer comprising at least one monomer of the STxB protein or a variant thereof of the invention as defined hereinabove (such as, e.g., at least one homotrimer or at least one heterotrimer as defined hereinabove).

In one embodiment, the medicament according to the present invention comprises at least one tetramer comprising at least one monomer of the STxB protein or a variant thereof of the invention as defined hereinabove (such as, e.g., at least one homotetramer or at least one heterotetramer as defined hereinabove).

In a preferred embodiment, the medicament according to the present invention comprises at least one pentamer comprising at least one monomer of the STxB protein or a variant thereof of the invention as defined hereinabove (such as, e.g., at least one homopentamer or at least one heteropentamer as defined hereinabove).

In one embodiment, the composition, the pharmaceutical composition, the vaccine composition or the medicament according to the present invention is substantially free of impurities.

As used herein, the term "Impurities" broadly refers to any substance other than (1) the STxB protein or a variant thereof, and (2) desired substances (such as pharmaceutically acceptable excipients). Examples of common impurities include, but are not limited to, host cell protein, host cell DNA, cell culture residues (including inducers, antibiotics, serum, media components), downstream processing residues (enzymes, chemical and biochemical processing reagents, inorganic salts, solvents, carriers, ligands), microbial species, endotoxins, pro-inflammatory contaminants, and degradation products. As used herein, the term "substantially free" with reference to impurities refers to a composition, pharmaceutical composition, vaccine composition or medicament which does not include impurities at all or can include them in a residual amount.

In one embodiment, the composition, the pharmaceutical composition, the vaccine composition or the medicament according to the present invention comprises less than 20%, preferably less than 19%, 18%, 17%, 16%, 15%, 14%, 13%, 12%, 11%, 10%, 9%, 8%, 7%, 6%, 5%, 4%, 3%, 2%, 1% or less of impurities.

In one embodiment, the composition, the pharmaceutical composition, the vaccine composition or the medicament according to the present invention comprises impurities in a concentration that is below a level acceptable to regulatory authorities (including, but not limited to, European Medicines Agency [EMA], Food and Drug Administration [FDA], Pharmaceuticals and Medical Devices Agency [PMDA] and the like) for safe administration to a human or non-human animal.

In one embodiment, the composition, the pharmaceutical composition, the vaccine composition or the medicament according to the present invention is substantially free of impurities following guidelines set forth in any of the International Pharmacopoeia $8^{th}$ edition, the European Pharmacopoeia 9.8, the United States Pharmacopoeia USP 42-NF 37 and/or the Japanese Pharmacopoeia $17^{th}$ edition.

In one embodiment, the composition, the pharmaceutical composition, the vaccine composition or the medicament according to the present invention is substantially free of host cell proteins (HCP) following guidelines set forth in any of the International Pharmacopoeia $8^{th}$ edition, the European Pharmacopoeia 9.8, the United States Pharmacopoeia USP 42-NF 37 and/or the Japanese Pharmacopoeia $17^{th}$ edition.

In one embodiment, the composition, the pharmaceutical composition, the vaccine composition or the medicament according to the present invention is substantially free of host cell proteins (HCP) following guidelines set forth in the European Pharmacopoeia 9.8 (section 2.6.34). The description of apparatuses, reagents, test solutions, preparations, procedures, calculations and interpretations used to detect and/or quantify host cell proteins (HCP) in section 2.6.34 of the European Pharmacopoeia 9.8 is herein incorporated by reference in its entirety.

In one embodiment, the composition, the pharmaceutical composition, the vaccine composition or the medicament according to the present invention comprises less than about 100 ng of host cell proteins per mg of STxB protein or of a variant thereof, preferably less than about 90, about 80, about 70, about 60, about 50, about 40, about 30, about 20, about 10 or less ng of host cell proteins per mg of STxB protein or of a variant thereof.

In one embodiment, the composition, the pharmaceutical composition, the vaccine composition or the medicament according to the present invention is substantially free of bacterial endotoxins following guidelines set forth in any of the International Pharmacopoeia 8$^{th}$ edition, the European Pharmacopoeia 9.8, the United States Pharmacopoeia USP 42-NF 37 and/or the Japanese Pharmacopoeia 17$^{th}$ edition.

Bacterial Endotoxins Test (BET) is completely harmonized according to the Q4B annex 14 published by the International Council for Harmonisation in 2012 (International Conference on Harmonisation of Technical Requirements for Registration of Pharmaceuticals for Human Use, 2012. *Evaluation and Recommendation of Pharmacopoeial Texts for Use in the ICH Regions on Bacterial Endotoxins Test. General Chapter. Q4b Annex* 14. Available online at www.ich.org).

In one embodiment, the composition, the pharmaceutical composition, the vaccine composition or the medicament according to the present invention is substantially free of bacterial endotoxins following guidelines set forth in any of the International Pharmacopoeia 8$^{th}$ edition (section 3.4), the European Pharmacopoeia 9.8 (section 2.6.14), the United States Pharmacopoeia USP 42-NF 37 (general chapter <85>) and/or the Japanese Pharmacopoeia 17$^{th}$ edition (section 4.01). The descriptions of apparatuses, reagents, test solutions, preparations, procedures, calculations and interpretations used to detect and/or quantify bacterial endotoxins in these four Pharmacopoeias under their relevant section as described hereinabove are herein incorporated by reference in their entirety.

In the International Pharmacopoeia and the United States Pharmacopoeia, three possible alternatives for BET are described: the gel-clot technique, which is based on gel formation; the turbidimetric technique, based on the development of turbidity after cleavage of an endogenous substrate; and the chromogenic technique, based on the development of color after cleavage of a synthetic peptide-chromogen complex.

The Japanese Pharmacopoeia outlines two detailed assays: the gel-clot techniques, which are based on gel formation by the reaction of the lysate TS with endotoxins and the photometric techniques, based on endotoxin-induced optical changes of the lysate TS. In the European Pharmacopoeia, six methods are described:
  method A: gel-clot method limit test;
  method B: gel-clot method quantitative test;
  method C: turbidimetric kinetic method;
  method D: chromogenic kinetic method;
  method E: chromogenic end-point method; and
  method F: turbidimetric end-point method.

In one embodiment, the composition, the pharmaceutical composition, the vaccine composition or the medicament according to the present invention fulfills the requirements for compliance with any of methods A, B, C, D, E, and/or F of the European Pharmacopoeia 9.8 section 2.6.14.

In one embodiment, the composition, the pharmaceutical composition, the vaccine composition or the medicament according to the present invention fulfills the requirements for compliance with method A of the European Pharmacopoeia 9.8 section 2.6.14. In one embodiment, the composition, the pharmaceutical composition, the vaccine composition or the medicament according to the present invention fulfills the requirements for compliance with method B of the European Pharmacopoeia 9.8 section 2.6.14. In one embodiment, the composition, the pharmaceutical composition, the vaccine composition or the medicament according to the present invention fulfills the requirements for compliance with method C of the European Pharmacopoeia 9.8 section 2.6.14. In one embodiment, the composition, the pharmaceutical composition, the vaccine composition or the medicament according to the present invention fulfills the requirements for compliance with method D of the European Pharmacopoeia 9.8 section 2.6.14. In one embodiment, the composition, the pharmaceutical composition, the vaccine composition or the medicament according to the present invention fulfills the requirements for compliance with method E of the European Pharmacopoeia 9.8 section 2.6.14. In one embodiment, the composition, the pharmaceutical composition, the vaccine composition or the medicament according to the present invention fulfills the requirements for compliance with method F of the European Pharmacopoeia 9.8 section 2.6.14.

In one embodiment, the composition, the pharmaceutical composition, the vaccine composition or the medicament according to the present invention comprises less than 50 endotoxin units (EU) per mg of STxB protein or of a variant thereof, preferably less than 45, 40, 35, 30, 25, 20, 15, 10, 9, 8, 7, 6, 5, 4, 3, 2, 1 or less EU/mg of STxB protein or of a variant thereof.

In one embodiment, the composition, the pharmaceutical composition, the vaccine composition or the medicament according to the present invention comprises endotoxins in an amount ranging from about 50 to 0 EU/mg of STxB protein or of a variant thereof, preferably from about 40 to 0, from about 30 to 0, from about 20 to 0, from about 15 to 0, from about 10 to 0, or from about 5 to 0 EU/mg of STxB protein or of a variant thereof.

In one embodiment, at least 50%, preferably at least 55%, 60%, 65%, 70%, 80%, 85%, 90%, 95%, 96%, 97%, 98%, 99% or more of the monomers of a STxB protein or of a variant thereof in the composition, the pharmaceutical composition, the vaccine composition or the medicament comprise at least one non-proteinogenic amino acid residue, as described hereinabove.

In one embodiment, at least 50%, preferably at least 55%, 60%, 65%, 70%, 80%, 85%, 90%, 95%, 96%, 97%, 98%, 99% or more of the oligomers (such as the homomers or heteromers as described hereinabove, or a mixture thereof) of a STxB protein or of a variant thereof in the composition, the pharmaceutical composition, the vaccine composition or the medicament comprise at least one monomer of the STxB protein or a variant thereof comprising at least one non-proteinogenic amino acid residue, as described hereinabove.

In one embodiment, at least 50%, preferably at least 55%, 60%, 65%, 70%, 80%, 85%, 90%, 95%, 96%, 97%, 98%, 99% or more of the dimers (such as the homodimers or heterodimers as described hereinabove, or a mixture thereof) of a STxB protein or of a variant thereof in the composition, the pharmaceutical composition, the vaccine composition or the medicament comprise at least one or two monomers of the STxB protein or a variant thereof comprising at least one non-proteinogenic amino acid residue, as described hereinabove.

In one embodiment, at least 50%, preferably at least 55%, 60%, 65%, 70%, 80%, 85%, 90%, 95%, 96%, 97%, 98%, 99% or more of the trimers (such as the homotrimers or heterotrimers as described hereinabove, or a mixture thereof) of a STxB protein or of a variant thereof in the composition, the pharmaceutical composition, the vaccine composition or the medicament comprise at least one, two or three monomers of the STxB protein or a variant thereof comprising at least one non-proteinogenic amino acid residue, as described hereinabove.

In one embodiment, at least 50%, preferably at least 55%, 60%, 65%, 70%, 80%, 85%, 90%, 95%, 96%, 97%, 98%, 99% or more of the tetramers (such as the homotetramers or heterotetramers as described hereinabove, or a mixture thereof) of a STxB protein or of a variant thereof in the composition, the pharmaceutical composition, the vaccine composition or the medicament comprise at least one, two, three or four monomers of the STxB protein or a variant thereof comprising at least one non-proteinogenic amino acid residue, as described hereinabove.

In a preferred embodiment, at least 50%, preferably at least 55%, 60%, 65%, 70%, 80%, 85%, 90%, 95%, 96%, 97%, 98%, 99% or more of the pentamers (such as the homopentamers or heteropentamers as described hereinabove, or a mixture thereof) of a STxB protein or of a variant thereof in the composition, the pharmaceutical composition, the vaccine composition or the medicament comprise at least one, two, three, four or five monomers of the STxB protein or a variant thereof comprising at least one non-proteinogenic amino acid residue, as described hereinabove.

In one embodiment, the composition, the pharmaceutical composition, the vaccine composition or the medicament according to the present invention is formulated for administration to a subject.

In one embodiment, the composition, the pharmaceutical composition, the vaccine composition or the medicament according to the present invention is formulated for systemic or local administration to a subject.

In one embodiment, the composition, the pharmaceutical composition, the vaccine composition or the medicament according to the present invention is formulated for administration by injection, oral administration, topical administration, nasal administration, buccal administration, rectal administration, vaginal administration, intratracheal administration, administration by endoscopy, transmucosal administration, percutaneous administration, or intratumoral administration.

In one embodiment, the composition, the pharmaceutical composition, the vaccine composition or the medicament according to the present invention is formulated for administration by injection, preferably by systemic injection.

Examples of formulations adapted for injection include, but are not limited to, solutions, such as, e.g., sterile aqueous solutions, gels, dispersions, emulsions, suspensions, solid forms suitable for using to prepare solutions or suspensions upon the addition of a liquid prior to use, such as, for example, powder, liposomal forms and the like.

Examples of systemic injections include, but are not limited to, intravenous (iv), subcutaneous (sq), intradermal (id), intramuscular (im), intraarterial, intraparenteral, intranodal, intralymphatic, intraperitoneal (ip), intracranial, intracardiac, intralesional, intraprostatic, intravaginal, intrarectal, intrathecal, intranasal, intratumoral (it), intravesicular, and perfusion.

In one embodiment, when injected, the composition, the pharmaceutical composition, the vaccine composition or the medicament according to the present invention is sterile. Methods for obtaining a sterile composition include, but are not limited to, GMP synthesis (where GMP stands for "Good manufacturing practice").

Sterile injectable forms of a composition may be aqueous or oleaginous. These suspensions may be formulated according to techniques known in the art using suitable dispersing or wetting agents and suspending agents. The sterile injectable preparation may also be a sterile injectable solution or suspension in a non-toxic parenterally acceptable diluent or solvent. Among the acceptable vehicles and solvents that may be employed are water, Ringer's solution and isotonic sodium chloride solution. In addition, sterile, fixed oils are conventionally employed as a solvent or suspending medium. For this purpose, any bland fixed oil may be employed including synthetic mono- or diglycerides. Fatty acids, such as oleic acid and its glyceride derivatives are useful in the preparation of injectables, as are natural pharmaceutically acceptable oils, such as olive oil or castor oil, especially in their polyoxyethylated versions. These oil solutions or suspensions may also contain a long-chain alcohol diluent or dispersant, such as carboxymethyl cellulose or similar dispersing agents that are commonly used in the formulation of pharmaceutically acceptable dosage forms including emulsions and suspensions. Other commonly used surfactants, such as Tweens, Spans and other emulsifying agents or bioavailability enhancers which are commonly used in the manufacture of pharmaceutically acceptable solid, liquid, or other dosage forms may also be used for the purposes of formulation.

It will be understood that other suitable routes of administration are also contemplated in the present invention, and the administration mode will ultimately be decided by the attending physician within the scope of sound medical judgment.

In one embodiment, the composition, the pharmaceutical composition, the vaccine composition or the medicament according to the present invention is to be administered to a subject in need thereof before, concomitantly with, or after administration of at least one additional therapeutic or diagnostic agent.

Suitable additional therapeutic or diagnostic agents include all those described hereinabove as payloads of the chimeric STxB protein or a variant thereof, including, but not limited to, chemotherapeutic agents, targeted therapy agents, cytotoxic agents, antibiotics, antivirals, cell cycle-synchronizing agents, ligands for cellular receptor(s), immunomodulatory agents, pro-apoptotic agents, anti-angiogenic agents, cytokines, growth factors, antibodies or antigen-binding fragments thereof, antigens, hormones, coding or non-coding oligonucleotides, photodetectable labels, contrast agents, radiolabels, and the like.

Consistently, the present invention also relates to a composition, a pharmaceutical composition, a vaccine composition or a medicament according to the present invention comprising at least one monomer of a Shiga toxin B-subunit (STxB) protein or of a variant thereof as defined hereinabove; and at least one additional therapeutic or diagnostic agent as defined hereinabove.

Consistently, the present invention also relates to a composition, a pharmaceutical composition, a vaccine composition or a medicament according to the present invention comprising at least one oligomer of a Shiga toxin B-subunit (STxB) protein or of a variant thereof, comprising at least one monomer of the STxB protein or a variant thereof of the invention, as defined hereinabove; and at least one additional therapeutic or diagnostic agent as defined hereinabove.

In one embodiment, the composition, the pharmaceutical composition, the vaccine composition or the medicament according to the present invention, optionally further comprising at least one additional therapeutic or diagnostic agent, is to be administered to a subject in need thereof before, concomitantly with, or after at least one regimen of radiation therapy, such as 1, 2, 3, 4, 5, 6, 7, 8, 9, 10, 11, 12, 13, 14, 15, 20, 25, 30, or more than 30 regimens of radiation therapy.

Suitable examples of radiation therapies include, but are not limited to, external beam radiotherapy (such as, e.g., superficial X-rays therapy, orthovoltage X-rays therapy, megavoltage X-rays therapy, radiosurgery, stereotactic radiation therapy, cobalt therapy, electron therapy, fast neutron therapy, neutron-capture therapy, proton therapy, and the like); brachytherapy; unsealed source radiotherapy; tomotherapy; and the like.

As will be further detailed hereafter, the monomer or the oligomer of the STxB protein or of the variant thereof, as well as the composition, the pharmaceutical composition, the vaccine composition or the medicament according to the present invention, optionally further comprising at least one additional therapeutic or diagnostic agent, are useful for a wide range of therapeutic and diagnostic purposes. For a review, see Johannes & Romer, 2010. *Nat Rev Microbiol.* 8(2):105-16; Engedal et al., 2011. *Microb Biotechnol.* 4(1): 32-46; Adkins et al., 2012. *Curr Pharm Biotechnol.* 13(8): 1446-73; Bergan et al., 2012. *Toxicon.* 60(6):1085-107; Lee et al., 2016. *Toxins (Basel)*, 8(3); Luginbuehl et al., 2018. *Biotechnol Adv.* 36(3):613-623; the content of each of these being herein incorporated by reference in its entirety.

The present invention further relates to a method of treating a disease in a subject in need thereof, comprising or consisting of administering to said subject the monomer or the oligomer of the STxB protein or of the variant thereof, the composition, the pharmaceutical composition, the vaccine composition or the medicament according to the present invention.

Alternatively, the present invention relates to the monomer or the oligomer of the STxB protein or of the variant thereof, the composition, the pharmaceutical composition, the vaccine composition or the medicament according to the present invention, for use in a method of treating a disease in a subject in need thereof.

In one embodiment, the method of treating a disease in a subject in need thereof further comprises administering to said subject at least one additional therapeutic or diagnostic agent as defined hereinabove. In one embodiment, the at least one additional therapeutic or diagnostic agent is to be administered before, concomitantly with, or after administration of the monomer or the oligomer of the STxB protein or of the variant thereof, the composition, the pharmaceutical composition, the vaccine composition or the medicament according to the present invention.

In one embodiment, the method of treating a disease in a subject in need thereof further comprises administering to said subject at least one regimen of radiation therapy as defined hereinabove. In one embodiment, the at least one regimen of radiation therapy is to be administered before, concomitantly with, or after administration of the monomer or the oligomer of the STxB protein or of the variant thereof, the composition, the pharmaceutical composition, the vaccine composition or the medicament according to the present invention.

In one embodiment, the method of treating a disease in a subject in need thereof further comprises administering to said subject at least one additional therapeutic or diagnostic agent as defined hereinabove; and at least one regimen of radiation therapy as defined hereinabove. In one embodiment, the at least one additional therapeutic or diagnostic agent and the at least one regimen of radiation therapy are each to be administered before, concomitantly with, or after administration of the monomer or the oligomer of the STxB protein or of the variant thereof, the composition, the pharmaceutical composition, the vaccine composition or the medicament according to the present invention.

In one embodiment, the disease is cancer, an infectious disease, an immune disorder and/or an inflammatory disorder.

In one embodiment, the disease is cancer.

Examples of cancers include those listed in the 10 revision of the International Statistical Classification of Diseases and Related Health Problems (ICD), under chapter II, blocks C00 to D48.

Further examples of cancers include, but are not limited to, recurrent, metastatic or multi-drug resistant cancer.

Further examples of cancers include, but are not limited to, adenofibroma, adenoma, agnogenic myeloid metaplasia, AIDS-related malignancies, ameloblastoma, anal cancer, angiofollicular mediastinal lymph node hyperplasia, angiokeratoma, angiolymphoid hyperplasia with eosinophilia, angiomatosis, anhidrotic ectodermal dysplasia, anterofacial dysplasia, apocrine metaplasia, apudoma, asphyxiating thoracic dysplasia, astrocytoma (including, e.g., cerebellar astrocytoma and cerebral astrocytoma), atriodigital dysplasia, atypical melanocytic hyperplasia, atypical metaplasia, autoparenchymatous metaplasia, basal cell hyperplasia, benign giant lymph node hyperplasia, bile duct cancer (including, e.g., extrahepatic bile duct cancer), bladder cancer, bone cancer, brain tumor (including, e.g., brain stem glioma, cerebellar astrocytoma glioma, malignant glioma, supratentorial primitive neuroectodermal tumors, visual pathway and hypothalamic glioma, ependymoma, medulloblastoma, gestational trophoblastic tumor glioma, and paraganglioma), branchionia, female breast cancer, male breast cancer, bronchial adenomas/carcinoids, bronchopulmonary dysplasia, cancer growths of epithelial cells, pre-cancerous growths of epithelial cells, metastatic growths of epithelial cells, carcinoid heart disease, carcinoid tumor (including, e.g., gastrointestinal carcinoid tumor), carcinoma (including, e.g., carcinoma of unknown primary origin, adrenocortical carcinoma, islet cells carcinoma, adeno carcinoma, adeoncortical carcinoma, basal cell carcinoma, basosquamous carcinoma, bronchiolar carcinoma, Brown-Pearce carcinoma, cystadenocarcinoma, ductal carcinoma, hepatocarcinoma, Krebs carcinoma, papillary carcinoma, oat cell carcinoma, small cell lung carcinoma, non-small cell lung carcinoma, squamous cell carcinoma, transitional cell carcinoma, Walker carcinoma, Merkel cell carcinoma, and skin carcinoma), cementoma, cementum hyperplasia, cerebral dysplasia, cervical cancer, cervical dysplasia, cholangioma, cholesteatoma, chondroblastoma, chondroectodermal dysplasia, chordoma, choristoma, chrondroma, cleidocranial dysplasia, colon cancer, colorectal cancer, local metastasized colorectal cancer, congenital adrenal hyperplasia, congenital ectodermal dysplasia, congenital sebaceous hyperplasia, connective tissue metaplasia, craniocarpotarsal dysplasia, craniodiaphysial dysplasia, craniometaphysial dysplasia, craniopharyngioma, cylindroma, cystadenoma, cystic hyperplasia (including, e.g., cystic hyperplasia of the breast), cystosarconia phyllodes, dentin dysplasia, denture hyperplasia, diaphysial dysplasia, ductal hyperplasia, dysgenninoma, dysplasia epiphysialis hemimelia, dysplasia epiphysialis multiplex, dysplasia epiphysialis punctate, ectodermal dysplasia, Ehrlich tumor, enamel dysplasia, encephaloophthalmic dysplasia, endometrial cancer (including, e.g., ependymoma and endometrial hyperplasia), ependymoma, epithelial cancer, epithelial dysplasia, epithelial metaplasia, esophageal cancer, Ewing's family of tumors (including, e.g., Ewing's sarcoma), extrahepatic bile duct cancer, eye cancer (including, e.g., intraocular melanoma and retinoblastoma), faciodigitogenital dysplasia, familial fibrous dysplasia of jaws, familial white folded dysplasia, fibroma, fibromuscular dysplasia, fibromuscular hyperplasia, fibrous dysplasia of bone, florid osseous dysplasia, focal epithelial hyperplasia, gall bladder cancer, ganglioneuroma, gastric cancer (including, e.g., stomach cancer), gastrointestinal carcinoid tumor, gastrointestinal tract cancer, gastrointestinal tumors, Gaucher's disease, germ cell tumors (including, e.g., extracranial germ cell tumors, extragonadal germ cell tumors, and ovarian germ cell tumors), giant cell tumor, gingival hyperplasia, glioblastoma, glomangioma, granulosa cell tumor, gynandroblastoma, hamartoma, head and neck cancer, hemangioendothelioma, hemangioma, hemangiopericytoma, hepatocellular cancer, hepatoma, hereditary renal-retinal dysplasia, hidrotic ectodermal dysplasia, histiocytonia, histiocytosis, hypergammaglobulinemia, hypohidrotic ectodermal dysplasia, hypopharyngeal cancer, inflammatory fibrous hyperplasia, inflammatory papillary hyperplasia, intestinal cancers, intestinal metaplasia, intestinal polyps, intraocular melanoma, intravascular papillary endothelial hyperplasia, kidney cancer, laryngeal cancer, leiomyoma, leukemia (including, e.g., acute lymphoblastic leukemia, acute lymphocytic leukemia, acute myeloid leukemia, acute myelogenous leukemia, acute hairy cell leukemia, acute B-cell leukemia, acute T-cell leukemia, acute HTLV leukemia, chronic lymphoblastic leukemia, chronic lymphocytic leukemia, chronic myeloid leukemia, chronic myelogenous leukemia, chronic hairy cell leukemia, chronic B-cell leukemia, chronic T-cell leukemia, and chronic HTLV leukemia), Leydig cell tumor, lip and oral cavity cancer, lipoma, liver cancer, lung cancer (including, e.g., small cell lung cancer and non-small cell lung cancer), lymphangiomyoma, lymphaugioma, lymphoma (including, e.g., AIDS-related lymphoma, central nervous system lymphoma, primary central nervous system lymphoma, Hodgkin's lymphoma, non-Hodgkin's lymphoma, Hodgkin's lymphoma during pregnancy, non-Hodgkin's lymphoma during pregnancy, mast cell lymphoma, B-cell lymphoma, adenolymphoma, Burkitt's lymphoma, cutaneous T-cell lymphoma, large cell lymphoma, and small cell lymphoma), lymphopenic thymic dysplasia, lymphoproliferative disorders, macroglobulinemia (including, e.g., Waldenstrom's macroglobulinemia), malignant carcinoid syndrome, malignant mesothelioma, malignant thymoma, mammary dysplasia, mandibulofacial dysplasia, medulloblastoma, meningioma, mesenchymoma, mesonephroma, mesothelioma (including, e.g., malignant mesothelioma), metaphysial dysplasia, metaplastic anemia, metaplastic ossification, metaplastic polyps, metastatic squamous neck cancer (including, e.g., metastatic squamous neck cancer with occult primary), Mondini dysplasia, monostotic fibrous dysplasia, mucoepithelial dysplasia, multiple endocrine neoplasia syndrome, multiple epiphysial dysplasia, multiple myeloma/plasma cell neoplasm, mycosis fungoides, myelodysplastic syndrome, myeloid metaplasia, myeloproliferative disorders, chronic myeloproliferative disorders, myoblastoma, myoma, myxoma, nasal cavity and paranasal sinus cancer, nasopharyngeal cancer, prostatic neoplasm, colon neoplasm, abdomen neoplasm, bone neoplasm, breast neoplasm, digestive system neoplasm, liver neoplasm, pancreas neoplasm, peritoneum neoplasm, endocrine glands neoplasm (including, e.g., adrenal neoplasm, parathyroid neoplasm, pituitary neoplasm, testicles neoplasm, ovary neoplasm, thymus neoplasm, and thyroid neoplasm), eye neoplasm, head and neck neoplasm, nervous system neoplasm (including, e.g., central nervous system neoplasm and peripheral nervous system neoplasm), lymphatic system neoplasm, pelvic neoplasm, skin neoplasm, soft tissue neoplasm, spleen neoplasm, thoracic neoplasm, urogenital tract neoplasm, neurilemmoma, neuroblastoma, neuroepithelioma, neurofibroma, neurofibromatosis, neuroma, nodular hyperplasia of prostate, nodular regenerative hyperplasia, oculoauriculovertebral dysplasia, oculodentodigital dysplasia, oculovertebral dysplasia, odontogenic dysplasia, odontoma, opthalmomandibulomelic dysplasia, oropharyngeal cancer, osteoma, ovarian cancer (including, e.g., ovarian epithelial cancer and ovarian low malignant potential tumor), pancreatic cancer (including, e.g., islet cell pancreatic cancer and exocrine pancreatic cancer), papilloma, paraganglioma, nonchromaffin paraganglioma, paranasal sinus and nasal cavity cancer, paraproteinemias, parathyroid cancer, periapical cemental dysplasia, pheochromocytoma (including, e.g., penile cancer), pineal and supratentorial primitive neuroectodermal tumors, pinealoma, pituitary tumor, plasma cell neoplasm/multiple myeloma, plasmacytoma, pleuropulmonary blastoma, polyostotic fibrous dysplasia, polyps, pregnancy cancer, preneoplastic disorders (including, e.g., benign dysproliferative disorders such as benign tumors, fibrocystic conditions, tissue hypertrophy, intestinal polyps, colon polyps, esophageal dysplasia, leukoplakia, keratoses, Bowen's disease, Farmer's skin, solar cheilitis, and solar keratosis), primary hepatocellular cancer, primary liver cancer, primary myeloid metaplasia, prostate cancer, pseudoachondroplastic spondyloepiphysial dysplasia, pseudoepitheliomatous hyperplasia, purpura, rectal cancer, renal cancer (including, e.g., kidney cancer, renal pelvis, ureter cancer, transitional cell cancer of the renal pelvis and ureter), reticuloendotheliosis, retinal dysplasia, retinoblastoma, salivary gland cancer, sarcomas (including, e.g., uterine sarcoma, soft tissue sarcoma, carcinosarcoma, chondrosarcoma, fibrosarcoma, hemangiosarcoma, Kaposi's sarcoma, leiomyosarcoma, liposarcoma, lymphangiosarcoma, myosarcoma, myxosarcoma, rhabdosarcoma, sarcoidosis sarcoma, osteosarcoma, Ewing sarcoma, malignant fibrous histiocytoma of bone, and clear cell sarcoma of tendon sheaths), sclerosing angioma, secondary myeloid metaplasia, senile sebaceous hyperplasia, septooptic dysplasia, Sertoli cell tumor, Sezary syndrome, skin cancer (including, e.g., melanoma skin cancer and non-melanoma skin cancer), small intestine cancer, spondyloepiphysial dysplasia, squamous metaplasia (including, e.g., squamous metaplasia of amnion), stomach cancer, supratentorial primitive neuroectodermal and pineal tumors, supratentorial primitive neuroectodermal tumors, symptomatic myeloid metaplasia, teratoma, testicular cancer, theca cell tumor, thymoma (including, e.g., malignant thymoma), thyroid cancer, trophoblastic tumors (including, e.g., gestational trophoblastic tumors), ureter cancer, urethral cancer, uterine cancer, vaginal cancer, ventriculoradial dysplasia, verrcous hyperplasia, vulvar cancer, Waldenstrom's macroglobulinemia, and Wilms' tumor.

In one embodiment, the disease is an infectious disease.

Examples of infectious diseases include those listed in the $10^{th}$ revision of the International Statistical Classification of Diseases and Related Health Problems (ICD), under chapter I, blocks A00 to B99.

Further examples of infectious diseases include, but are not limited to, bacterial infections, viral infections, fungal infections, parasitic infections, ectoparasitic infections, and the like.

In one embodiment, the disease is an immune disorder.

Examples of immune disorders include those listed in the $10^{th}$ revision of the International Statistical Classification of Diseases and Related Health Problems (ICD), under chapter III, blocks D80 to D89.

Further examples of immune disorders include, but are not limited to, lymphoid immunodeficiencies, complement immunodeficiencies, monocyte immunodeficiencies, granulocyte immunodeficiencies, and phagocyte bactericidal dysfunctions.

Further examples of immune disorders include, but are not limited to, hypogammaglobulinemia (such as, e.g., X-linked agammaglobulinemia, transient hypogammaglobulinemia of infancy, and the like); dysgammaglobulinemia (such as, e.g., IgA deficiency, IgG deficiency, IgM deficiency, hyper IgM syndrome type 1, hyper IgM syndrome type 2, hyper IgM syndrome type 3, hyper IgM syndrome type 4, hyper IgM syndrome type 5, Wiskott-Aldrich syndrome, hyper-IgE syndrome, and the like); common variable immunodeficiency; ICF syndrome; thymic hypoplasia (such as, e.g., Di George's syndrome, Nezelof syndrome, ataxia-telangiectasia, and the like); purine nucleoside phosphorylase deficiency; X-linked severe combined immunodeficiency; adenosine deaminase deficiency; Omenn syndrome; ZAP70 deficiency; Bare lymphocyte syndrome; lymphocytopenia (such as, e.g., T lymphocytopenia, B lymphocytopenia, NK lymphocytopenia, and the like); complement deficiency (such as, e.g., angioedema, hereditary angioedema, complement 2 deficiency/complement 4 deficiency, MBL deficiency, properdin deficiency, complement 3 deficiency, terminal complement pathway deficiency, paroxysmal nocturnal hemoglobinuria, complement receptor deficiency, and the like); histiocytosis; chronic granulomatous disease; monocytosis; monocytopenia; granulocytosis (such as, e.g., neutrophilia, eosinophilia, hypereosinophilic syndrome, basophilia, bandemia, and the like); granulocytopenia and agranulocytosis (such as, e.g., neutropenia, Kostmann syndrome, eosinopenia, basopenia, and the like); phagocyte bactericidal dysfunctions (such as, e.g., leukocyte adhesion deficiency-1, leukocyte adhesion deficiency-2, Chédiak-Higashi syndrome, neutrophil-specific granule deficiency, chronic granulomatous disease, neutrophil immunodeficiency syndrome, myeloperoxidase deficiency, and the like).

In one embodiment, the disease is an inflammatory disorder.

Examples of inflammatory disorders include, but are not limited to, abdominal aortic aneurysm (AAA), acne, acute disseminated encephalomyelitis, acute leukocyte-mediated lung injury, Addison's disease, adult respiratory distress syndrome, AIDS dementia, allergic asthma, allergic conjunctivitis, allergic rhinitis, allergic sinusitis, alopecia areata, Alzheimer's disease, anaphylaxis, angioedema, ankylosing spondylitis, antiphospholipid antibody syndrome, asthma, atopic dermatitis, autoimmune hemolytic anemia, autoimmune hepatitis, autoimmune inner ear disease, Behcet's syndrome, blepharitis, bronchitis, bullous pemphigoid, Chagas' disease, chronic inflammatory diseases, chronic obstructive pulmonary disease, coagulative necrosis, coeliac disease, collagenous colitis, conjunctivitis, contact dermatitis, coronary heart disease, cutaneous necrotizing venulitis, cystic fibrosis, dermatitis, dermatomyositis, diabetes mellitus type 1, diabetes mellitus type 2, distal proctitis, diversion colitis, dry eye, eczema, encephalitis, endometriosis, endotoxin shock, epilepsy, erythema multiforme, erythema nodosum, fibrinoid necrosis, fibromyalgia, giant-cell arteritis (Horton's disease), goodpasture's syndrome, gouty arthritis, graft-versus-host disease (such as, e.g., acute graft-versus-host disease, chronic graft-versus-host disease, and the like), Graves' disease, Guillain-Barre syndrome, Hashimoto's disease, hay fever, hyperacute transplant rejection, hyperlipidemia, idiopathic thrombocytopenic purpura, indeterminate colitis, infective colitis, inflammatory bowel disease (IBD) (such as, e.g., Crohn's disease, ulcerative colitis, colitis, and the like), inflammatory liver disorder, insect bite skin inflammation, interstitial cystitis, iritis, ischaemic colitis, lichen planus, liquefactive necrosis, lupus erythematosus, lymphocytic colitis, meningitis, metabolic syndrome, multiple sclerosis, myasthenia gravis, myocarditis, narcolepsy, nephritis, obesity, pancreatitis, Parkinson's disease, pemphigus vulgaris, periodontal gingivitis, periodontitis, pernicious anaemia, polymyalgia rheumatica, polymyositis, postmenopausal-induced metabolic syndrome, primary biliary cirrhosis, psoriasis, retinitis, rheumatoid arthritis, rheumatoid spondylitis, rhinoconjunctivitis, scleroderma, shingles, Sjogren's syndrome, smooth muscle proliferation disorders, solar dermatitis, steatosis, systemic lupus erythematosus (SLE), tuberculosis, urticaria, uveitis, vasculitis, vitiligo, and Wegener's granulomatosis.

In one embodiment, the monomer or the oligomer of the STxB protein or of the variant thereof is conjugated to at least one payload.

In one embodiment, the monomer or the oligomer of the STxB protein or of the variant thereof is conjugated to at least one payload selected from the group comprising or consisting of chemotherapeutic agents, targeted therapy agents, cytotoxic agents, antibiotics, antivirals, cell cycle-synchronizing agents, ligands for cellular receptor(s), immunomodulatory agents, pro-apoptotic agents, anti-angiogenic agents, cytokines, growth factors, antibodies or antigen-binding fragments thereof, antigens, hormones, coding or non-coding oligonucleotides, photodetectable labels, contrast agents and radiolabels.

In one embodiment, the monomer or the oligomer of the STxB protein or of the variant thereof is conjugated to at least one payload selected from the group comprising or consisting of chemotherapeutic agents, cytotoxic agents, cell cycle-synchronizing agents, ligands for cellular receptor(s), immunomodulatory agents, pro-apoptotic agents, anti-angiogenic agents, cytokines, antibodies or antigen-binding fragments thereof, and hormones.

The present invention further relates to a method of vaccinating a subject in need thereof, comprising or consisting of administering to said subject the monomer or the oligomer of the STxB protein or of the variant thereof, the composition, the pharmaceutical composition, the vaccine composition or the medicament according to the present invention.

Alternatively, the present invention relates to the monomer or the oligomer of the STxB protein or of the variant thereof, the composition, the pharmaceutical composition, the vaccine composition or the medicament according to the present invention, for use in a method of vaccinating in a subject in need thereof.

In one embodiment, the method of vaccinating in a subject in need thereof further comprises administering to said subject at least one additional therapeutic or diagnostic agent as defined hereinabove. In one embodiment, the at least one additional therapeutic or diagnostic agent is to be administered before, concomitantly with, or after administration of the monomer or the oligomer of the STxB protein or of the variant thereof, the composition, the pharmaceutical composition, the vaccine composition or the medicament according to the present invention.

In one embodiment, the monomer or the oligomer of the STxB protein or of the variant thereof is conjugated to at least one payload.

In one embodiment, the monomer or the oligomer of the STxB protein or of the variant thereof is conjugated to at least one payload selected from the group comprising or consisting of chemotherapeutic agents, targeted therapy agents, cytotoxic agents, antibiotics, antivirals, cell cycle-synchronizing agents, ligands for cellular receptor(s), immunomodulatory agents, pro-apoptotic agents, anti-angiogenic agents, cytokines, growth factors, antibodies or antigen-binding fragments thereof, antigens, hormones, coding or non-coding oligonucleotides, photodetectable labels, contrast agents and radiolabels.

In one embodiment, the monomer or the oligomer of the STxB protein or of the variant thereof is conjugated to an antigen.

The present invention further relates to a method of combinatorial immunotherapy in a subject in need thereof, comprising or consisting of administering to said subject the monomer or the oligomer of the STxB protein or of the variant thereof, the composition, the pharmaceutical composition, the vaccine composition or the medicament according to the present invention.

Alternatively, the present invention relates to the monomer or the oligomer of the STxB protein or of the variant thereof, the composition, the pharmaceutical composition, the vaccine composition or the medicament according to the present invention, for use in a method of combinatorial immunotherapy in a subject in need thereof.

In one embodiment, the monomer or the oligomer of the STxB protein or of the variant thereof is conjugated to at least two payloads.

In one embodiment, the monomer or the oligomer of the STxB protein or of the variant thereof is conjugated to at least two payloads independently selected from the group comprising or consisting of chemotherapeutic agents, targeted therapy agents, cytotoxic agents, antibiotics, antivirals, cell cycle-synchronizing agents, ligands for cellular receptor(s), immunomodulatory agents, pro-apoptotic agents, anti-angiogenic agents, cytokines, growth factors, antibodies or antigen-binding fragments thereof, antigens, hormones, coding or non-coding oligonucleotides, photodetectable labels, contrast agents and radiolabels.

In one embodiment, at least one payload is selected from the group comprising or consisting of chemotherapeutic agents, cytotoxic agents, cell cycle-synchronizing agents, ligands for cellular receptor(s), immunomodulatory agents, pro-apoptotic agents, anti-angiogenic agents, cytokines, antibodies or antigen-binding fragments thereof, and hormones; and at least another payload is an antigen.

Such combination immunotherapies are well known to the one skilled in the art. See, e.g., Swart et al., 2016. *Front Oncol.* 6:233; and Collins et al., 2018. *Expert Rev Vaccines.* 17(8):697-705.

The present invention further relates to the use of the monomer or the oligomer of the STxB protein or of the variant thereof, the composition, the pharmaceutical composition, the vaccine composition or the medicament according to the present invention, as a contrast agent.

In one embodiment, the use as a contrast agent further comprises administering at least one additional therapeutic or diagnostic agent as defined hereinabove. In one embodiment, the at least one additional therapeutic or diagnostic agent is to be administered before, concomitantly with, or after administration of the monomer or the oligomer of the STxB protein or of the variant thereof, the composition, the pharmaceutical composition, the vaccine composition or the medicament according to the present invention.

In one embodiment, the use as a contrast agent further comprises administering at least one regimen of radiation therapy as defined hereinabove. In one embodiment, the at least one regimen of radiation therapy is to be administered before, concomitantly with, or after administration of the monomer or the oligomer of the STxB protein or of the variant thereof, the composition, the pharmaceutical composition, the vaccine composition or the medicament according to the present invention.

In one embodiment, the use as a contrast agent further comprises administering at least one additional therapeutic or diagnostic agent as defined hereinabove; and at least one regimen of radiation therapy as defined hereinabove. In one embodiment, the at least one additional therapeutic or diagnostic agent and the at least one regimen of radiation therapy are each to be administered before, concomitantly with, or after administration of the monomer or the oligomer of the STxB protein or of the variant thereof, the composition, the pharmaceutical composition, the vaccine composition or the medicament according to the present invention.

In one embodiment, the monomer or the oligomer of the STxB protein or of the variant thereof is conjugated to at least one payload.

In one embodiment, the monomer or the oligomer of the STxB protein or of the variant thereof is conjugated to at least one payload selected from the group comprising or consisting of chemotherapeutic agents, targeted therapy agents, cytotoxic agents, antibiotics, antivirals, cell cycle-synchronizing agents, ligands for cellular receptor(s), immunomodulatory agents, pro-apoptotic agents, anti-angiogenic agents, cytokines, growth factors, antibodies or antigen-binding fragments thereof, antigens, hormones, coding or non-coding oligonucleotides, photodetectable labels, contrast agents and radiolabels.

In one embodiment, the monomer or the oligomer of the STxB protein or of the variant thereof is conjugated to at least one payload selected from the group comprising or consisting of photodetectable labels, contrast agents and radiolabels.

In one embodiment, the use as a contrast agent according to the present invention allows to detect Gb3-expressing cells in a subject. In particular, the use as a contrast agent according to the present invention allows to detect Gb3-expressing tumor cells in a subject.

The present invention further relates to a method of diagnosing a disease in a subject in need thereof, comprising or consisting of administering to said subject the monomer or the oligomer of the STxB protein or of the variant thereof, the composition, the pharmaceutical composition, the vaccine composition or the medicament according to the present invention.

Alternatively, the present invention relates to the monomer or the oligomer of the STxB protein or of the variant thereof, the composition, the pharmaceutical composition, the vaccine composition or the medicament according to the present invention, for use in an in vivo method of diagnosis of a disease in a subject in need thereof.

In one embodiment, the disease is cancer, an infectious disease and/or an immune disorder.

Suitable examples of cancer, an infectious disease and/or an immune disorder have been described hereinabove.

As used herein, the term "diagnosis" broadly refers to the diagnosis per se, i.e., the identification of a disease by observation of signs and/or symptoms; but also includes the prognosis and recurrence monitoring of the disease. The term "prognosis" refers to a prediction of the course and outcomes of a disease, including whether the signs and symptoms will improve or worsen (and how quickly) or remain stable over time; expectations of quality of life, such as the ability to carry out daily activities; the potential for complications and associated health issues; and the likelihood of survival (including life expectancy). The term "prognosis" also encompass the prediction of the course and outcomes of the disease during a therapy, and the assessment of the efficiency of a therapy to treat the given disease. The term "recurrence" refers to the reappearance of a disease.

In one embodiment, the monomer or the oligomer of the STxB protein or of the variant thereof is conjugated to at least one payload.

In one embodiment, the monomer or the oligomer of the STxB protein or of the variant thereof is conjugated to at least one payload selected from the group comprising or consisting of chemotherapeutic agents, targeted therapy agents, cytotoxic agents, antibiotics, antivirals, cell cycle-synchronizing agents, ligands for cellular receptor(s), immunomodulatory agents, pro-apoptotic agents, anti-angiogenic agents, cytokines, growth factors, antibodies or antigen-binding fragments thereof, antigens, hormones, coding or non-coding oligonucleotides, photodetectable labels, contrast agents and radiolabels.

In one embodiment, the monomer or the oligomer of the STxB protein or of the variant thereof is conjugated to at least one payload selected from the group comprising or consisting of photodetectable labels, contrast agents and radiolabels.

The present invention further relates to a method of producing a monomer of the STxB protein or of the variant thereof according to the present invention, including homologs, fragments, mutants, conjugates and combinations thereof of the STxB protein, as defined hereinabove.

It also relates to a method of producing an oligomer (including homomers and heteromers), such as a dimer (including homodimers and heterodimers), trimer (including homotrimers and heterotrimers), tetramer (including homotetramers and heterotetramers) or preferably, a pentamer (including homopentamers and heteropentamers), of the STxB protein or of the variant thereof according to the present invention.

It also relates to a method of producing a composition comprising an oligomer (including homomers and heteromers), such as a dimer (including homodimers and heterodimers), trimer (including homotrimers and heterotrimers), tetramer (including homotetramers and heterotetramers) or preferably, a pentamer (including homopentamers and heteropentamers), of the STxB protein or of the variant thereof according to the present invention.

In one embodiment, the methods of producing a monomer or an oligomer, preferably a dimer, trimer, tetramer or more preferably, pentamer, of the STxB protein or of the variant thereof encompass the production of monomers or oligomers, preferably dimers, trimers, tetramers or more preferably, pentamers, of a fragment of the STxB protein or of a variant thereof as defined hereinabove, i.e., a portion of the STxB protein or of a variant thereof retaining the same or substantially the same biological function, activity and/or local structure, with respect to the specific biological function, activity and/or local structure identified for the full length STxB protein.

In one embodiment, the methods of producing a monomer or an oligomer, preferably a dimer, trimer, tetramer or more preferably, pentamer, of the STxB protein or of the variant thereof encompass the production of monomers or oligomers, preferably dimers, trimers, tetramers or more preferably, pentamers, of a mutant of the STxB protein or of a variant thereof as defined hereinabove, i.e., a STxB protein or a variant thereof in which one or more amino acids have been altered.

In one embodiment, the methods of producing a monomer or an oligomer, preferably a dimer, trimer, tetramer or more preferably, pentamer, of the STxB protein or of the variant thereof encompass the production of monomers or oligomers, preferably dimers, trimers, tetramers or more preferably, pentamers, of a mutant of the STxB protein or of a variant thereof comprising at least one non-proteinogenic amino acid residue as defined hereinabove, i.e., a STxB protein or a variant thereof in which one or more non-proteinogenic amino acids have been inserted or added and/or in which one or more amino acid residues have been substituted by one or more non-proteinogenic amino acid residues.

In one embodiment, the methods of producing a monomer or an oligomer, preferably a dimer, trimer, tetramer or more preferably, pentamer, of the STxB protein or of the variant thereof encompass the production of monomers or oligomers, preferably dimers, trimers, tetramers or more preferably, pentamers, of a conjugate of the STxB protein or of a variant thereof as defined hereinabove, i.e., a chimeric STxB protein or a variant thereof which is bound to a payload, optionally through a linker, thereby forming a single molecule.

In one embodiment, the monomer or the oligomer, preferably the dimer, trimer, tetramer or more preferably, pentamer, is produced by peptide chemical synthesis. Techniques and strategies for peptide chemical synthesis are well known in the art, and readily accessible by the skilled artisan.

Examples of peptide chemical synthesis strategies include, without limitation, liquid-phase peptide synthesis, solid-phase peptide synthesis and hybrid liquid/solid-phase peptide synthesis.

In one embodiment, the monomer or the oligomer, preferably the dimer, trimer, tetramer or more preferably, pentamer, is produced by liquid-phase peptide synthesis. In one embodiment, the monomer or the oligomer, preferably the dimer, trimer, tetramer or more preferably, pentamer, is produced by solid-phase peptide synthesis. In one embodiment, the monomer or the oligomer, preferably the dimer, trimer, tetramer or more preferably, pentamer, is produced by hybrid liquid/solid-phase peptide synthesis.

Examples of solid-phase peptide synthesis strategies include, without limitation, stepwise solid-phase peptide synthesis, native chemical ligation, fragment condensation in solution, solid-phase fragment condensation, and click chemistry.

In one embodiment, the monomer or the oligomer, preferably the dimer, trimer, tetramer or more preferably, pentamer, is produced by stepwise solid-phase peptide synthesis. In one embodiment, the monomer or the oligomer, preferably the dimer, trimer, tetramer or more preferably, pentamer, is produced by native chemical ligation. In one embodiment, the monomer or the oligomer, preferably the dimer, trimer, tetramer or more preferably, pentamer, is produced by fragment condensation in solution. In one embodiment, the monomer or the oligomer, preferably the dimer, trimer, tetramer or more preferably, pentamer, is produced by solid-phase fragment condensation. In one embodiment, the monomer or the oligomer, preferably the dimer, trimer, tetramer or more preferably, pentamer, is produced by click chemistry.

In a preferred embodiment, the monomer or the oligomer, preferably the dimer, trimer, tetramer or more preferably, pentamer, is produced by stepwise solid-phase peptide synthesis or by native chemical ligation.

In one embodiment, the methods of producing a monomer or an oligomer, preferably a dimer, trimer, tetramer or more preferably, pentamer, of the STxB protein or of the variant thereof, comprise a step of stepwisely coupling amino acids following the amino acid sequence of the STxB protein or of the variant thereof, thereby obtaining a synthetic peptide.

As used herein, the expression "stepwisely coupling amino acids following an/the amino acid sequence . . . " is intended to mean that the step shall be partially or completely, preferably completely, reiterated until the desired amino acid sequence has been synthetized, i.e., until all amino acids of the desired amino acid sequence have been coupled. In this context, each iteration of the step of stepwisely coupling amino acids allows to couple the next amino acid residue following the desired amino acid sequence to the growing peptide.

In one embodiment, the methods of producing a monomer or an oligomer, preferably a dimer, trimer, tetramer or more preferably, pentamer, of the STxB protein or of the variant thereof, comprise a step of stepwisely coupling amino acids following the amino acid sequence of the STxB protein or of the variant thereof, wherein at least one (such as 1, 2, 3, 4, 5, 6, 7, 8, 9, 10, 11, 12, 13, 14, 15, 16, 17, 18, 19, 20, 21, 22, 23, 24, 25, 26, 27 or 28) non-proteinogenic amino acid residue has been inserted or added; or at least one (such as 1, 2, 3, 4, 5, 6, 7, 8, 9, 10, 11, 12, 13, 14, 15, 16, 17, 18, 19, 20, 21, 22, 23, 24, 25, 26, 27 or 28) amino acid residue has been substituted by a non-proteinogenic amino acid residue, at the N-terminus, and/or the C-terminus, and/or within the amino acid sequence of the STxB protein or of the variant thereof, thereby obtaining a synthetic peptide.

In one embodiment, the methods of producing a monomer or an oligomer, preferably a dimer, trimer, tetramer or more preferably, pentamer, of the STxB protein or of the variant thereof, comprise a step of stepwisely coupling amino acids following an amino acid sequence with at least 60% identity to the amino acid sequence set forth in SEQ ID NO: 1, SEQ ID NO: 3, SEQ ID NO: 5, SEQ ID NO: 7, SEQ ID NO: 9, SEQ ID NO: 11, SEQ ID NO: 13, SEQ ID NO: 15, SEQ ID NO: 17 or SEQ ID NO: 19 or a variant thereof (including fragments, mutants and/or conjugates).

In one embodiment, the methods of producing a monomer or an oligomer, preferably a dimer, trimer, tetramer or more preferably, pentamer, of the STxB protein or of the variant thereof, comprise a step of stepwisely coupling amino acids following an amino acid sequence with at least 60% identity to the amino acid sequence set forth in SEQ ID NO: 1, SEQ ID NO: 3, SEQ ID NO: 5, SEQ ID NO: 7, SEQ ID NO: 9, SEQ ID NO: 11, SEQ ID NO: 13, SEQ ID NO: 15, SEQ ID NO: 17 or SEQ ID NO: 19 or a variant thereof (including fragments, mutants and/or conjugates), wherein at least one (such as 1, 2, 3, 4, 5, 6, 7, 8, 9, 10, 11, 12, 13, 14, 15, 16, 17, 18, 19, 20, 21, 22, 23, 24, 25, 26, 27 or 28) non-proteinogenic amino acid residue has been inserted or added; or at least one (such as 1, 2, 3, 4, 5, 6, 7, 8, 9, 10, 11, 12, 13, 14, 15, 16, 17, 18, 19, 20, 21, 22, 23, 24, 25, 26, 27 or 28) amino acid residue has been substituted by a non-proteinogenic amino acid residue, at the N-terminus, and/or the C-terminus, and/or within the amino acid sequence set forth in SEQ ID NO: 1, SEQ ID NO: 3, SEQ ID NO: 5, SEQ ID NO: 7, SEQ ID NO: 9, SEQ ID NO: 11, SEQ ID NO: 13, SEQ ID NO: 15, SEQ ID NO: 17 or SEQ ID NO: 19 or a variant thereof.

In one embodiment, the methods of producing a monomer or an oligomer, preferably a dimer, trimer, tetramer or more preferably, pentamer, of the STxB protein or of the variant thereof, comprise a step of stepwisely coupling amino acids following an amino acid sequence with at least 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99% identity or more to the amino acid sequence set forth in SEQ ID NO: 1, SEQ ID NO: 3, SEQ ID NO: 5, SEQ ID NO: 7, SEQ ID NO: 9, SEQ ID NO: 11, SEQ ID NO: 13, SEQ ID NO: 15, SEQ ID NO: 17 or SEQ ID NO: 19 or a variant thereof (including fragments, mutants and/or conjugates).

In one embodiment, the methods of producing a monomer or an oligomer, preferably a dimer, trimer, tetramer or more preferably, pentamer, of the STxB protein or of the variant thereof, comprise a step of stepwisely coupling amino acids following an amino acid sequence with at least 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99% identity or more to the amino acid sequence set forth in SEQ ID NO: 1, SEQ ID NO: 3, SEQ ID NO: 5, SEQ ID NO: 7, SEQ ID NO: 9, SEQ ID NO: 11, SEQ ID NO: 13, SEQ ID NO: 15, SEQ ID NO: 17 or SEQ ID NO: 19 or a variant thereof (including fragments, mutants and/or conjugates), wherein at least one (such as 1, 2, 3, 4, 5, 6, 7, 8, 9, 10, 11, 12, 13, 14, 15, 16, 17, 18, 19, 20, 21, 22, 23, 24, 25, 26, 27 or 28) non-proteinogenic amino acid residue has been inserted or added; or at least one (such as 1, 2, 3, 4, 5, 6, 7, 8, 9, 10, 11, 12, 13, 14, 15, 16, 17, 18, 19, 20, 21, 22, 23, 24, 25, 26, 27 or 28) amino acid residue has been substituted by a non-proteinogenic amino acid residue, at the N-terminus, and/or the C-terminus, and/or within the amino acid sequence set forth in SEQ ID NO: 1, SEQ ID NO: 3, SEQ ID NO: 5, SEQ ID NO: 7, SEQ ID NO: 9, SEQ ID NO: 11, SEQ ID NO: 13, SEQ ID NO: 15, SEQ ID NO: 17 or SEQ ID NO: 19 or a variant thereof.

In one embodiment, the methods of producing a monomer or an oligomer, preferably a dimer, trimer, tetramer or more preferably, pentamer, of the STxB protein or of the variant thereof, comprise a step of stepwisely coupling amino acids following an amino acid sequence with at least 60% identity to the amino acid sequence set forth in SEQ ID NO: 2, SEQ ID NO: 4, SEQ ID NO: 6, SEQ ID NO: 8, SEQ ID NO: 10, SEQ ID NO: 12, SEQ ID NO: 14, SEQ ID NO: 16, SEQ ID NO: 18 or SEQ ID NO: 20 or a variant thereof (including fragments, mutants and/or conjugates).

In one embodiment, the methods of producing a monomer or an oligomer, preferably a dimer, trimer, tetramer or more preferably, pentamer, of the STxB protein or of the variant thereof, comprise a step of stepwisely coupling amino acids following an amino acid sequence with at least 60% identity to the amino acid sequence set forth in SEQ ID NO: 2, SEQ ID NO: 4, SEQ ID NO: 6, SEQ ID NO: 8, SEQ ID NO: 10, SEQ ID NO: 12, SEQ ID NO: 14, SEQ ID NO: 16, SEQ ID NO: 18 or SEQ ID NO: 20 or a variant thereof (including fragments, mutants and/or conjugates), wherein at least one (such as 1, 2, 3, 4, 5, 6, 7, 8, 9, 10, 11, 12, 13, 14, 15, 16, 17, 18, 19, 20, 21, 22, 23, 24, 25, 26, 27 or 28) non-proteinogenic amino acid residue has been inserted or added; or at least one (such as 1, 2, 3, 4, 5, 6, 7, 8, 9, 10, 11, 12, 13, 14, 15, 16, 17, 18, 19, 20, 21, 22, 23, 24, 25, 26, 27 or 28) amino acid residue has been substituted by a non-proteinogenic amino acid residue, at the N-terminus, and/or the C-terminus, and/or within the amino acid sequence set forth in SEQ ID NO: 2, SEQ ID NO: 4, SEQ ID NO: 6, SEQ ID NO: 8, SEQ ID NO: 10, SEQ ID NO: 12, SEQ ID NO: 14, SEQ ID NO: 16, SEQ ID NO: 18 or SEQ ID NO: 20 or a variant thereof.

In one embodiment, the methods of producing a monomer or an oligomer, preferably a dimer, trimer, tetramer or more preferably, pentamer, of the STxB protein or of the variant thereof, comprise a step of stepwisely coupling amino acids following an amino acid sequence with at least 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99% identity or more to the amino acid sequence set forth in SEQ ID NO: 2, SEQ ID NO: 4, SEQ ID NO: 6, SEQ ID NO: 8, SEQ ID NO: 10, SEQ ID NO: 12, SEQ ID NO: 14, SEQ ID NO: 16, SEQ ID NO: 18 or SEQ ID NO: 20 or a variant thereof (including fragments, mutants and/or conjugates).

In one embodiment, the methods of producing a monomer or an oligomer, preferably a dimer, trimer, tetramer or more preferably, pentamer, of the STxB protein or of the variant thereof, comprise a step of stepwisely coupling amino acids following an amino acid sequence with at least 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99% identity or more to the amino acid sequence set forth in SEQ ID NO: 2, SEQ ID NO: 4, SEQ ID NO: 6, SEQ ID NO: 8, SEQ ID NO: 10, SEQ ID NO: 12, SEQ ID NO: 14, SEQ ID NO: 16, SEQ ID NO: 18 or SEQ ID NO: 20 or a variant thereof (including fragments, mutants and/or conjugates), wherein at least one (such as 1, 2, 3, 4, 5, 6, 7, 8, 9, 10, 11, 12, 13, 14, 15, 16, 17, 18, 19, 20, 21, 22, 23, 24, 25, 26, 27 or 28) non-proteinogenic amino acid residue has been inserted or added; or at least one (such as 1, 2, 3, 4, 5, 6, 7, 8, 9, 10, 11, 12, 13, 14, 15, 16, 17, 18, 19, 20, 21, 22, 23, 24, 25, 26, 27 or 28) amino acid residue has been substituted by a non-proteinogenic amino acid residue, at the N-terminus, and/or the C-terminus, and/or within the amino acid sequence set forth in SEQ ID NO: 2, SEQ ID NO: 4, SEQ ID NO: 6, SEQ ID NO: 8, SEQ ID NO: 10, SEQ ID NO: 12, SEQ ID NO: 14, SEQ ID NO: 16, SEQ ID NO: 18 or SEQ ID NO: 20 or a variant thereof.

In one embodiment, the amino acid sequence of the STxB protein or of the variant thereof additionally comprises a protein tag.

As used herein, the term "protein tag" referts to a short peptide sequence inserted at the N-terminus, and/or the C-terminus, and/or within the amino acid sequence of a protein, such as, of the STxB protein. Protein tags have various uses, including, but not limited to, purification, detection, solubilization, localization, protease protection, and the like.

In one embodiment, the protein tag is cleavable, i.e., it can be removed from the synthetized protein.

The use and choice of protein tags, as well as means and method to cleave such protein tags, are well known in the art.

In one embodiment, the coupling of the amino acids is carried out onto a support. In one embodiment, the coupling of the amino acids is carried out onto a solid support.

The support may be any support known in the art which is suitable for use in solid-phase peptide synthesis. See for example, James, 1999. *Tetrahedron.* 55(16):4855-4946; Guillier et al., 2000. *Chem Rev.* 100(6):2091-158; and Kates & Albericio (Eds.), 2000. *Solid-phase synthesis: A practical guide* ($1^{st}$ ed.). New York, NY: CRC Press; the content of each of these being herein incorporated by reference in its entirety.

Typically, the support comprises a matrix polymer-based resin, optionally with a linker group to which the growing peptide is attached during synthesis and which can be cleaved under desired conditions to release the synthetic peptide from the support. Typically, the matrix polymer-based resin may be made from one or more polymers, copolymers or combinations of polymers, including, but not limited to, crosslinked polystyrene (PS-), crosslinked polyamide (PA-), crosslinked polyethylene glycol (PEG-), crosslinked polylysine, composite PS-PEG- or composite PA-PEG-based resins.

Suitable linker groups may link the C-terminal function of the first amino acid residue to the support through an ester or an amide bond depending on the C-terminal functional group of the growing peptide (respectively peptide-acid or peptide-amide). Suitable linker groups may comprise trityl moieties, amino moieties, hydroxy moieties and combinations thereof.

As used herein, the term "peptide-acid" refers to a peptide bearing an acid C-terminal function (—COOH) after cleavage of the synthetic peptide from the support. As used herein, the term "peptide-amide" refers to a peptide bearing an amine C-terminal function (—$NH_2$) after cleavage of the synthetic peptide from the support.

Suitable supports for the synthesis of peptide-acids may include, without limitation, Wang resin (i.e., p-alkoxybenzyl alcohol resin on polystyrene), DHPP resin (i.e., 4-(1',1'-dimethyl-1'-hydroxypropyl)phenoxyacetylalanylaminomethyl polystyrene), PDDM-resin (i.e., diphenyldiazomethane resin) and combinations thereof.

Further suitable supports for the synthesis of peptide-acids may include, without limitation, 4-hydroxymethylphenoxymethyl polystyrene Wang resin (Wang, 1973. *J Am Chem Soc.* 95(4):1328-33; Wang, 1975. *J Org Chem.* 40(9): 1235-39; Albericio & Barany, 1985. *Int J Pept Protein Res.* 26(1):92-7); Wang ChemMatrix resin; HMPB polystyrene resin; HMPB ChemMatrix resin; NovaPEG HMPB resin; 4-hydroxymethylphenoxyacetyl-poly(dimethylacrylamide) Atherton resin (Atherton et al., 1978. *J Chem Soc Chem Comm.* 13:537-9); benzhydryl bromide resins; SASRIN resin (Mergler et al., 1988. *Tetrahedron Lett.* 29(32):4009-12); 2-chlorotritylchloride (CTC) Barlos resin (Barlos et al., 1991. *Int J Pept Protein Res.* 37(6):513-20); trityl ChemMatrix; and the like.

Suitable supports for the synthesis of peptide-amides may include, without limitation tricyclic amide linker resins, Rink amine resins, 4,4'-dialkoxybenzhydrylamine resins, PAL resins (i.e., 4-alkoxy-2,6-dimethoxybenzylamine resin), Further suitable supports for the synthesis of peptide-amides may include, without limitation, NovaSyn® TGR resin; Rink amide resin; Rink amide MBHA resin; Rink amide AM resin; Rink amide PEGA resin; Rink amide NovaGel® resin; Rink amide ChemMatrix resin; PAL ChemMatrix; Sieber amide resin; NovaSyn® TG Sieber resin; Sieber amide ChemMatrix resin; Ramage amide resin; Ramage amide MBHA resin; Ramage amide PEGA resin; Ramage amide AM resin; Ramage amide ChemMatrix resin; and the like.

In a preferred embodiment, the support is selected from the group comprising or consisting of Wang resin and Rink amide resin, preferably the support is a Wang resin.

In one embodiment, the support may be unloaded (i.e., with no amino acid residue attached to the support) or pre-loaded (i.e., with the first amino acid already attached to the support). Both unloaded and pre-loaded supports are commercially available. In the case of pre-loaded supports, commercially available are supports bearing any of the proteinogenic amino acid residues. In such case, the pre-loaded resin must be chosen such as to bear the C-terminal amino acid residue of the peptide sequence to be synthetized (i.e., the last amino acid of the sequence when reading in the usual N- to C-terminal direction).

In one embodiment, the support is unloaded. In one embodiment, the support is pre-loaded.

In a preferred embodiment, the support is a pre-loaded arginine-Wang resin. In a preferred embodiment, the support is a pre-loaded aspartic acid-Wang resin. In a preferred embodiment, the support is a pre-loaded glutamic acid-Wang resin.

In an alternative embodiment, the support is a Rink amide ChemMatrix resin.

In one embodiment, prior to carrying out the step of stepwisely coupling amino acids, it may be desirable to swell the support with at least one solvent.

As used herein, the expression "swell the support" refers to the addition of a solvent to the support, which is capable of diffusing into said support to produce a "swollen support".

Examples of suitable solvents include, but are not limited to, N-methyl-2-pyrrolidone (NMP), dimethylformamide (DMF), dimethylsulfoxide (DMSO), dioxane, dichloromethane (DCM), 1-methylpyrrolidine, hexamethylenimine, $H_2O$, 2,2,2-trifluoroethanol (TFE), acetic acid (AcOH) methanol (MeOH), and mixtures thereof.

In a preferred embodiment, the support is swelled in DCM. In one embodiment, the swollen support is further swelled in another solvent. Preferably, the second solvent is the same than the solvent used during the step of stepwisely coupling amino acids.

In a preferred embodiment, the support is swelled in DCM, then in NMP.

In one embodiment, the coupling of the amino acids is carried out in a linear N- to C-terminal direction with respect to the amino acid sequence of the STxB protein or of the variant thereof.

In a preferred embodiment, the coupling of the amino acids is carried out in a linear C- to N-terminal direction with respect to the amino acid sequence of the STxB protein or of the variant thereof.

In one embodiment, the amino acids comprise at least one protecting group.

As used herein, the term "protecting group", with reference to amino acid residues, may refer to side chain-protecting groups, a carboxy-protecting groups, or a amino-protecting groups for the amino acid residues used in the methods according to the present invention.

Suitable protecting groups are well known by the skilled person in the art. For instance, general reviews of protecting groups in organic chemistry are provided by Wuts & Greene, 2006. *Greene's protective groups in organic synthesis* ($4^{th}$ ed.). New York, NY: John Wiley & Sons; and Kocienski, 2005. *Protecting groups* ($3^{rd}$ ed.). Stuttgart: Georg Thieme Verlag. These references provide sections on protecting groups for hydroxyl (including 1,2-diols), carboxyl, amino, amide and thiol groups. The nature and use of protecting groups for amino acids in peptide synthesis is well known in the art. See, e.g., Isidro-Llobet et al., 2009. *Chem Rev.* 109(6):2455-504.

In one embodiment, protecting groups are chosen following an orthogonal protecting scheme. As used herein, the term "orthogonal protecting scheme" refers to a scheme based on completely different classes of protecting groups, such that each class of protecting groups (e.g., side chain-protecting groups, a carboxy-protecting groups and α amino-protecting groups) can be removed in any order and in presence of all other classes of protecting groups (Barany & Albericio, 1985. *J Am Chem Soc.* 107(17):4936-42). Therefore, the α amino-protecting groups and the side chain-protecting groups are typically not the same. It also applies when -carboxy-protection is needed.

In some cases, and depending on the type of reagents used in solid-phase synthesis and other peptide processing, an amino acid may not require the presence of a side-chain protecting group.

As used herein, the term "α amino-protecting group" refers to a chemical moiety coupled to the α amino group of an amino acid residue. Typically, the α amino-protecting group is removed in a deprotection reaction prior to the coupling of the next amino acid to be incorporated to the growing peptide. Additionally, the term "α amino-protecting group" also refers to a chemical moiety coupled to the α amino group of an unloaded support, prior to the first cycle of stepwise synthesis.

Examples of α amino-protecting groups include, but are not limited to, 9-fluorenylmethoxycarbonyl (Fmoc); 2-(4-nitrophenylsulfonyl)ethoxycarbonyl (Nsc); (1,1-dioxobenzo[fo]thiphene-2-yl)methyloxycarbonyl (Bsmoc); (1,1-dioxonaphtol[1,2-b]thiophene-2-yl)mehyloxycarbonyl (a-Nsmoc); 1-(4,4-dimethyl-2,6-dioxocyclohex-1-ylidine)-3-methylbutyl (ivDde); 2,7-di-t-butyl-Fmoc (Fmoc*); 2-fluoro-Fmoc (Fmoc(2F)); 2-monoisooctyl-Fmoc (mio-Fmoc); 2,7-diisooctyl-Fmoc (dio-Fmoc); tetrachloronaphtaloyl (TCP); 2-[phenyl(methyl)sulfonio]ethyloxycarbonyltetrafluoroborate (Pms); ethanesulfonylethoxycarbonyl (Esc); 2-(4-sulfophenylsulfonyl)ethoxycarbonyl (Sps); t-butyloxycarbonyl (Boc); triphenylmethyl (Trt); 2-(4-biphenyl)isopropoxycarbonyl (Bpoc); 2-nitrophenylsulfenyl (Nps); benzyloxycarbonyl (Z); a,a-dimethyl-3,5-dimethoxybenzyloxycarbonyl (Ddz); allyloxycarbonyl (Alloc); o-nitrobemzenesulfonyl (oNBS); 2,4-dinitrobenzenesulfonyl (dNBS); benzothiazole-2-sulfonyl (Bts); 2,2,2-trichloroethyloxycarbonyl (Troc); dithiasuccinoyl (Dts); p-nitrobenzyloxycarbonyl (pNZ); a-azidoacids; propargyloxycarbonyl (Poc); o-nitrobenzyloxycarbonyl (oNZ); 4-nitroveratryloxycarbonyl (NVOC); 2-(2-nitrophenyl)propyloxycarbonyl (NPPOC); 2-(3,4-methylenedioxy-6-nitrophenyl)propyloxycarbonyl (MNPPOC); 9-(4-bromophenyl)-9-fluorenyl (BrPhF); azidomethoxycarbonyl (Azoc); and hexafluoroacetone (HFA).

In a preferred embodiment, the α amino-protecting group is 9-fluorenylmethoxycarbonyl (Fmoc).

As used herein, the term "a carboxy-protecting group" refers to a chemical moiety coupled to the α carboxy group of an amino acid residue. Typically in solid-phase peptide synthesis, the terminal a carboxy group is usually linked to the support or the growing peptide, i.e., the linker or peptide bond acts itself as protecting group. However, in some synthetic strategies such as strategies where the peptide is linked to the support by an amino acid side chain and/or where peptide synthesis proceeds in a linear N- to C-terminal direction (such as described in, e.g., Thieriet et al., 2000. *Org Let.* 2(13):1815-7), a carboxy protection is needed. Additionally, the term "α carboxy-protecting group" also refers to a chemical moiety coupled to the α carboxy group of an unloaded support, prior to the first cycle of stepwise synthesis.

Examples of α carboxy-protecting groups include, but are not limited to, t-butyl (t-Bu); benzyl (Bn); 2-chlorotrityl (2-Cl-Trt); 2,4-dimethoxybenzyl (Dmb); 2-phenylisopropyl (2-PhiPr: 5-phenyl-3,4-ethylenedioxythenyl derivatives (Phenyl-EDOT$_n$); 9-fluorenylmethyl (Fm); 4-(N-[1-(4,4-dimethyl-2,6-dioxocyclohexylidene)-3-methylbutyl]amino) benzyl (Dmab); methyl (Me); ethyl (Et); carbamoylmethyl (Cam); allyl; phenacyl (Pac); nitrobenzyl (pNB); 2-trimethylsilylethyl (TMSE); (2-phenyl-2-trimethylsilyl)ethyl (PTMSE); 2-(trimethylsilyl)isopropyl (Tmsi); 2,2,2-trichloroethyl (Tce); hydroxyphenacyl (HP): 4,5-dimethoxy-2-nitrobenzyl (Dmnb); 1,1-dimethylallyl (Dma); and pentaamine cobalt (III).

As used herein, the term "side chain-protecting group" refers to a chemical moiety coupled to the side chain of an amino acid residue, that prevents a portion of the side chain from reacting with chemicals used in steps of peptide synthesis, processing, etc. Side chain-protecting groups may refer to protecting groups for, without limitation, hydroxyl (including 1,2-diols), carboxyl, amino, amide or thiol side chain groups. Additionally, side chain-protecting groups may refer to protecting groups for side chains of non-proteinogenic amino acid residues, such as, without limitation, acetyl-, acyl-, aldehyde-, alkenyl-, alkyl-, alkynyl-, amino-, aryl-, azido-, benzophenonyl-, benzoyl-, borate-, boronate-, cyano-, enone-, ester-, ether-, halo-, heterocyclic-, hydrazide-, hydrazine-, hydroxyl-, hydroxylamine-, imine-, iodide-, keto-, methoxy-, phosphine-, phospho-, phosphono-, seleno-, sulfonyl-, thioacid- and thiol-substituted amino acid residues. Typically, only amino acids having a reactive side chain require side chain protection, i.e., aliphatic amino acid residues (alanine, isoleucine, leucine, proline and valine) do generally not require side chain protection.

Examples of hydroxyl side chain-protecting groups include, but are not limited to, benzyl (Bn); 2,6-dichlorobenzyl (Deb); 2-bromobenzyl (BrBn); o-nitrobenzyl (oNB); benzyloxycarbonyl (Z); 2-bromobenzyloxycarbonyl (BrZ); 4-(3,6,9-trioxadecyl)oxybenzyl (TEGBn); t-butyloxycarbonyl (Boc); Boc-N-methyl-N-[2-(methylamino)ethyl]carbamoyl (Boc-Nmec); 3-pentyl (Pen); cyclohexyl (cHx); t-butyl ($^t$Bu); allyl; triphenylmethyl (Trt); 2-chlorotriphenylmethyl (2-Cl-Trt); t-butyldimethylsilyl (TBDMS); t-butyldiphenylsilyl (TBDPS); 4,5-dimethoxy-2-nitrobenzyloxycarbonyl (Dmnb); propargyloxycarbonyl (Poc); and pseudoprolines (ΨPro), such as dimethyloxazolidines (Ψ$^{Me,Me}$Pro).

Examples of amino side chain-protecting groups include, but are not limited to, formyl; benzyloxycarbonyl (Z); 2-chlorobenzyloxycarbonyl (Cl-Z); t-butyloxycarbonyl (Boc); cyclohexyloxycarbonyl (Hoc); triphenylmethyl (Trt); 4-methyltriphenylmethyl (Mtt); monomethoxytriphenymethyl (Mmt); dimethoxytriphenylmethyl (Dmt); 9-fluorenylmethoxycarbonyl (Fmoc); 1-(4,4-dimethyl-2,6-dioxocyclohex-1-ylidene)-3-methyl-butyl (ivDde); 2-(methylsulfonyl)ethoxycarbonyl (Msc); tetrachlorophthaloyl (TCP); allyloxycarbonyl (Alloc); 2-chlorobenzyloxycarbonyl (Cl-Z); nitrobenzyloxycarbonyl (NZ); 2-nitrobenzyloxycarbonyl (oNZ); 6-nitroveratryloxycarbonyl (NVOC); phenyldisulfanylethyloxycarbonyl (Phdec); and 2-pyridyldisulfanylethyloxycarbonyl (Pydec).

Examples of carboxy side chain-protecting groups include, but are not limited to, benzyl (Bn); cyclohexyl (cHx); t-butyl ($^t$Bu) menthyl (Men); 3-3-methylpen-3-yl (Mpe); 2-phenylisopropyl (2-PhiPr); 4-(3,6,9-trioxadecyl) oxybenzyl (TEGBn); 9-fluorenylmethyl (Fm); 4-(N-[1-(4,4-dimethyl-2,6-dioxocyclohexylidene)-3-methylbutyl]amino) benzyl (Dmab); allyl; nitrobenzyl (pNB); 2-(trimethylsilyl) ethyl (TMSE); (2-phenyl-2-uimethylsilylyl)ethyl (PTMSE); and 4,5-dimethoxy-2-nitrobenzyl (Dmnb).

Examples of amide side chain-protecting groups include, but are not limited to, 9-xanthenyl (Xan); triphenylmethyl (Trt); 4-methyltriphenylmethyl (Mtt); cyclopropyldimethylcarbinyl (Cpd); 4,4'-dimethoxybenzhydryl (Mbh); and 2,4,6-trimethoxybenzyl (Tmob).

Examples of thiol side chain-protecting groups include, but are not limited to, alkyl; acetamidomethyl (Acm); phenylacetamidomethyl (PhAcm); benzyl (Bn); methylbenzyl (Meb); p-methoxybenzyl (Mob); 2,4,6-trimethoxybenzyl (Tmob); o-nitrobenzyl (oNB); 9-fluorenylmethyl (Fm); 9-xanthenyl (Xan); triphenylmethyl (Trityl, Trt); monomethoxytrityl (Mmt); S-alkyl disulfide; 2,2,4,6,7-pentamethyl-5-dihydrobenzofuranylmethyl (Pmbf); 2-(2,4-dinitrophenyl)ethyl (Dnpe); 2-quinolyl; 4-picolyl; t-butyl ($^t$Bu); t-butylmercapto (S$^t$Bu); I-adamantyl (I-Ada); t-butoxycarbonyl (Boc); allyloxycarbonyl (Alloc); N-allyloxycarbonyl-N-[2,3,5,6-tetrafluoro-4-(phenylthio)phenyl]aminomethyl (Fsam); 9-fluorenylmethoxycarbonyl (Fmoc); 3-nitro-2-pyridinesulfenyl (Npys); 2-piridinesulfenyl (S-Pyr); and ninhydrin (Nin).

A particular example of side-chain protecting group for serine, threonine and cysteine residues is pseudoproline (ΨPro). As will be further detailed below, it is conveivable that where the next amino acid residue to be coupled is selected from a threonine (Thr, T), a serine (Ser, S) or a cysteine (Cys, C), at least one of these amino acid residues is coupled in a pseudoproline dipeptide form.

In one embodiment, the coupling of the amino acids is carried out in presence of at least one coupling agent. In one embodiment, the coupling of the amino acids is carried out in further presence of at least one base and/or one additive.

Suitable coupling agents, bases and additives for peptide synthesis are well known in the art. See, e.g., Han & Kim, 2004. *Tetrahedron.* 60(11):2447-67; El-Faham & Albericio, 2011. *Chem Rev.* 111(11):6557-602; each of these being herein incorporated by reference in its entirety.

Suitable examples of coupling agents include, but are not limited to:

(1) carbodiimide coupling agents;
(2) active ester coupling agents;
(3) acylazole coupling agents;
(4) acyl azide coupling agents;
(5) acid halide coupling agents;
(6) phosphonium salt coupling agents;
(7) aminium/uronium salt coupling agents;
(8) organophosphorus coupling agents;
(9) organosulfur coupling agents;
(10) triazine coupling agents; and
(11) pyridinium coupling agents.

In one embodiment, the coupling of the amino acids is carried out in the presence of at least one carbodiimide coupling agent.

Suitable examples of carbodiimide coupling agents include, but are not limited to, dicyclohexylcarbodiimide (DCC), diisopropylcarbodiimide (DIC), N-ethyl-N'-(3-dimethylaminopropyl)carbodimide (EDC), N-cyclohexyl-N'-isopropylcarbodiimide (CIC), N-tert-butyl-N'-methylcarbodiimide (BMC), N-tert-butyl-N'-ethylcarbodiimide (BEC), N,N'-dicyclopentylcarbodiimide (CPC), bis[[4-(2,2-dimethyl-1,3-dioxolyl)]methyl]carbodiimide (BDDC), N-ethyl-N-phenylcarbodiimide (PEC), and N-phenyl-N-isopropylcarbodiimide (PIC).

In one embodiment, the coupling of the amino acids is carried out in the presence of at least one active ester coupling agent.

Suitable examples of active ester coupling agents include, but are not limited to, p-nitrophenyl active ester, 2,4,5-trichlorophenyl active ester, pentafluoro active ester, o-phtalimido active ester, N-succinimide active ester, N-hydroxy-5-norbornene-endo-2,3-dicarboxyimide, 4-oxo-3,4-dihydrobenzotriazinyl esters and 2,2-bis(trifluoromethyl)-1,3-oxazolidin-5-ones.

In one embodiment, the coupling of the amino acids is carried out in the presence of at least one acylazole coupling agent.

Suitable examples of acylazole coupling agents include, but are not limited to, acylimidazoles (such as, e.g., carbonyl diimidazole (CDI)) and acylbenzotriazoles.

In one embodiment, the coupling of the amino acids is carried out in the presence of at least one acyl azide coupling agent.

In one embodiment, the coupling of the amino acids is carried out in the presence of at least one acid halide coupling agent.

Suitable examples of acid halide coupling agents include, but are not limited to, acid chlorides (such as, e.g., pivaloyl chloride, phthaloyl chloride, thionyl chloride, oxalyl chloride, phosgene, cyanuric chloride, 2-chloro-4,6-dimethyl-1,3,5-triazine (DMCT), triphenylphosphine (TPP), tetramethyl-α-chloroenamine, and bis(trichloromethyl)carbonate (BTC)) and acid fluorides (such as, e.g., cyanuric fluoride, 2-fluoro-1-ethyl-pyridinium tetrafluoroborate (FEP), 2-fluoro-1-ethylpyridinium hexachloroantimonate (FEPH), tetramethylfluoroformamidinium hexafluorophosphate (TFFH), bis(tetramethylene)fluoroformamidinium hexafluorophosphate (BTFFH), 2-fluoro-1,3-dimethylimidazolidinium hexafluorophosphate (FIP), tetraethylfluoroformamidinium hexafluorophosphate (TEFFH), 1-dimethyl-3,3-tetramethylene fluoroformamidinium hexafluorophosphate (DMFFH), 1,1-diethyl-3,3-tetramethylene hexafluorophosphate (DEFFH), N-(fluoro(morpholino)methylene)-N-methylmethanaminium hexafluorophosphate (DMFH), and benzyltriphenylphosphonium dihydrogen trifluoride (PTF)).

In one embodiment, the coupling of the amino acids is carried out in the presence of at least one phosphonium salt coupling agent.

Suitable examples of phosphonium salt coupling agents include, but are not limited to, benzotriazol-1-yloxy)tris(dimethylamino)-phosphonium hexafluorophosphate (BOP), bromotris(dimethylamino)phosphonium hexafluorophosphate (BroP), chlorotri(pyrrolidino)phosphonium hexafluorophosphate (PyCloP), bromotri(pyrrolidino)phosphonium hexafluorophosphate (PyBroP), chlorotris(dimethylamino)phosphonium hexafluorophosphate (CloP), benzotriazole-1-yloxytri(pynrolidino) hexafluorophosphate (PyBOP), (7-azabenzotriazol-1-yl)oxytris(dimethylamino) phosphonium hexafluorophosphate (AOP), [(7-azabenzotriazol-1-yl)oxy]tris(pynrolidino) phosphonium hexafluorophosphate (PyAOP), O-[(cyano-(ethoxycarbonyl)methylidene)-amino]-yloxytripynrolidinophosphonium hexafluorophosphate (PyOxm), [(6-nitrobenzotriazol-1-yl)oxy]tris(pyrrolidino) phosphonium hexafluorophosphate (PyNOP), [[6-(trifluoromethyl)benzotriazol-1-yl]oxy]tris(pyrrolidino) phosphonium hexafluorophosphate (PyFOP), [4-nitro-6-(trifluoromethyl)benzotriazol-1-yl)-oxy]tris(pyrrolidino) phosphonium hexafluorophosphate (PyFNBOP), (6-chloro-benzotriazol-1-yloxy)tris(pyrrolidino) phosphonium hexafluorophosphate (PyCloK), (pentafluorophenyloxy)tris(pyrrolidino) phosphonium hexafluorophosphate (PyPOP), (pyridyl-2-thio)tris(pyrrolidino) phosphonium hexafluorophosphate (PyTOP), [(3,4-dihydro-4-oxo-1,2,3-benzotriazin-3-yl)oxy]tris(pyrrolidino) phosphonium hexafluorophosphate (PyDOP), and [(3,4-dihydro-4-oxo-5-azabenzo-1,2,3-triazin3-yl]tris(pyrrolidino) phosphonium hexafluorophosphate (PyDAOP).

In one embodiment, the coupling of the amino acids is carried out in the presence of at least one aminium/uronium salt coupling agent.

Suitable examples of aminium/uronium salt coupling agents include, but are not limited to, O-(1H-6-chlorobenzotriazole-1-yl)-1,1,3,3-tetramethyluronium hexafluorophosphate (HCTU), O-(1H-6-chlorobenzotriazole-1-yl)-1,1,3,3-tetramethyluronium tetrafluoroborate (TCTU), N-[(1H-benzotriazol-1-yl)(dimethylamino)-methylene]-N-methylmethanaminium hexafluorophosphate N-oxide (N-HBTU), N-[(1H-benzotriazol-1-yl)(dimethylamino)-methylene]-N-methylmethanaminium tetrafluoroborate N-oxide (N-TBTU), 2-(3,4-dihydro-4-oxo-1,2,3-benzotriazin-3-yl)-1,1,3,3-tetramethyluronium tetrafluoroborate (TDTU), O-(3,4-dihydro-4-oxo-1,2,3-benzotriazin-3-yl)-1,1,3,3-tetramethyluronium hexafluorophosphate (HDTU), O-(3,4-dihydro-4-oxo-5-azabenzo-1,2,3-triazin3-yl)-1,1,3,3-tetramethyluronium tetrafluoroborate (TDATU), 0-(3,4-dihydro-4-oxo-5-azabenzo-1,2,3-triazin3-yl)-1,1,3,3-tetramethyluronium hexafluorophosphate (HDATU), 2-(2-oxo-1(2H)-pyridyl-1,1,3,3-tetramethyluronium tetrafluoroborate (TPTU), 2-(2-oxo-1(2H)-pyridyl-1,1,3,3-tetramethyluronium hexafluorophosphate (HPTU), 2-succinimido-1,1,3,3-tetramethyluronium tetrafluoroborate (TSTU), 2-succinimido-1,1,3,3-tetramethyluronium hexafluorophosphate (HSTU), N,N,N',N'-bis(tetramethylene)-O-pentafluorophenyluronium tetrafluoroborate (TPFTU), N,N,N',N'-bis(tetramethylene)-O-pentafluorophenyluronium hexafluorophosphate (HPFTU), N-[6-trifluoromethyl(1H-benzotriazol-1-yl)-(dimethylamino)methylene]-N-methylmethanaminium tetrafluoroborate N-oxide (N—CF₃-TBTU), N-[6-trifluoromethyl(1H-benzotriazol-1-yl)-(dimethylamino)methylene]-N-methylmethanaminium hexafluorophosphate N-oxide (N—CF₃—HBTU), N-[(dimethylamino)-1H-1,2,3-triazolo[4,5-b]-pyridin-1-ylmethylene]-N-methylmethanaminium hexafluorophosphate N-oxide (N-HATU), N-[(dimethylamino)-1H-1,2,3-triazolo[4,5-b]-pyridin-1-ylmethylene]-N-methylmethanaminium tetrafluoroborate N-oxide (N-TATU), N-[(dimethylamino)-1H-1,2,3-triazolo[4,5-b]-pyridin-1-ylmethylene]-N-methylmethanaminium hexafluorophosphate N-sulfide (N-HATTU), S-(1-oxido-2-pyridinyl)-1,1,3,3-tetramethylthiouronium hexafluorophosphate (HOTT), O-[cyano(ethoxycarbonyl)methyleneamino]-N,N,N',N'-tetramethyluronium tetrafluoroborate (TOTU), 0-[cyano(ethoxycarbonyl)methyleneamino]-N,N,N',N'-tetramethyluronium hexafluorophosphate (HOTU), 0-[(dicyanomethylidene)-amino]-1,1,3,3-tetramethyluronium hexafluorophosphate (HTODC), 0-[(diethoxycarbonylmethylidene)amino]-1,1,3,3-tetramethyluronium hexafluorophosphate (HTODeC), N-[(cyano(pyridine-2-yl)methyleneaminooxy)-(dimethylamino)methylene)-N-methyl methanaminium hexafluorophosphate (HTOPC), 2-(5-norbornene-2,3-dicarboximido)-1,1,3,3-tetramethyluronium tetrafluoroborate (TNTU), 2-phthalimido-1,1,3,3-tetramethyluronium tetrafluoroborate (TPhTU), bis(tetramethylene)chlororformamidinium hexafluorophosphate (PyC1U), O-(benzotriazol-1-yl)oxybis (pyrrolidino)-uronium hexafluorophosphate (HBPyU), 1-(1-pyrrolidinyl-1H-1,2,3-triazolo[4,5-b]-pyridin-1-ylmethylene) pyrrolidinmium hexafluorophosphate N-oxide (HAPyU), O-(3,4-dihydro-4-oxo-1,2,3-benzotriazin-3-yl)-1,1,3,3-bis(tetramethylene)uronium hexafluorophosphate (HDPyU), O-(3,4-dihydro-4-oxo-5-azabenzo-1,2,3-triazin-3-yl)-1,1,3,3-bis(tetramethylene)uranium hexafluorophosphate (HDAPyU), N,N,N',N'-bis(tetramethylene)-O-pentafluorophenyluronium hexafluorophosphate (HPyOPfp), N,N,N',N'-bis(tetramethylene)-S-pentafluorothiophenyluronium hexafluorophosphate (HPySPfp), 1-(1-pyrrolidinyl-1H-1,2,3-triazolo[4,5-b]-pyridin-1-ylmethylene) pyrrolidinmium hexafluorophosphate N-sulfide (HAPyTU), N,N,N',N'-bis(tetramethylene)-O-2-nitrophenyluronium hexafluorophosphate (HPyONP), N,N,N',N'-bis(tetramethylene)-O-pentafluorophenyluronium hexafluorophosphate (HPyOTCp), O-(benzotriazol-1-yl)-1,1,3,3-bis(pentamethylene) uronium hexafluorophosphate (HBPipU), O-(7-azabenzotriazol-1-yl)-1,1,3,3-bis(pentamethylene) uronium hexafluorophosphate (HAPipU), 2-[2-oxo-1(2H)-pyridyl]-1,1,3,3-bis(pentamethylene)uranium tetrafluoroborate (TOPPipU), 2-chloro-1,3-dimethylimidazolidinium hexafluorophosphate (CIP), O-(benzotriazol-1-yl)-1,3-dimethyl-1,3-dimethyleneuronium hexafluorophosphate (HBMDU), O-(7-azabenzotriazol-1-yl)-1,3-dimethyl-1,3-dimethyleneuronium hexafluorophosphate (HAMDU), 2-chloro-1,3-dimethylpyrimidinium hexafluorophosphate (CPP), O-(benzotriazol-1-yl)-1,3-dimethyl-1,3-trimethyleneuronium hexafluorophosphate (HBMTU), O-(7-azabenzotriazol-1-yl)-1,3-dimethyl-1,3-trimethyleneuronium hexafluorophosphate hexafluorophosphate (HAMTU), (7-benzotriazol-yl)-1,1,3-trimethyl-1-phenyluronium hexafluorophosphate (HBPTU), (7-azabenzotriazol-yl)-1,1,3-trimethyl-1-phenyluronium hexafluorophosphate (HAPTU), O-(1H-benzotriazol-1-yl)-1,1-dimethyl-3,3-tetramethyleneuronium hexafluorophosphate (HBM$_2$PyU), O-(1H-1,2,3-triazolo[4,5-b]pyridin-1-yl)-1,1-dimethyl-3,3-tetramethyleneuronium hexafluorophosphate (HAM$_2$PyU), O-(1H-benzotriazol-1-yl)-1,1-dimethyl-3,3-pentamethyleneuronium hexafluorophosphate (HBM$_2$PipU), O-(1H-1,2,3-triazolo[4,5-b]pyridin-1-yl)-1,1-dimethyl-3,3-pentamethyleneuronium hexafluorophosphate (HAM$_2$PipU), O-(1H-benzotriazol-1-yl)-1,1-diethyl-3,3-tetramethyleneuronium hexafluorophosphate (HBE$_2$PyU), O-(1H-1,2,3-triazolo[4,5-b]pyridin-1-yl)-1,1-diethyl-3,3-tetramethyleneuronium hexafluorophosphate (HAE$_2$PyU), O-(1H-benzotriazol-1-yl)-1,1-diethyl-3,3-pentamethyleneuronium hexafluorophosphate (HBE$_2$PipU), O-(1H-1,2,3-triazolo[4,5-b]pyridin-1-yl)-1,1-diethyl-3,3-pentamethyleneuronium (HAE$_2$PipU), O-(1H-benzotriazol-1-yl)-1,1,3,3-tetraethyluronium hexafluorophosphate (HBTeU), O-(1H-1,2,3-triazolo[4,5-b]pyridin-1-yl)-1,1,3,3-tetraethyluronium hexafluorophosphate (HATeU), N-(chloro(morpholino)methylene)-N-methylmethanaminium hexafluorophosphate (DMCH), 1-((dimethylamino)(morpholino)methylene)-1H-benzotriazolium hexafluorophosphate-3-oxide (HDMB), 1-((dimethylamino)-(morpholino)methylene)-1H-[1,2,3]triazolo[4,5-b]pyridinium hexafluorophosphate-3-oxide (HDMA), 6-chloro-1-((dimethylamino)(morpholino)-methylene)-1H-benzotriazolium hexafluorophosphate-3-oxide (HDMC), 3-((dimethylamino)-(morpholino)methylene)-1H-[1,2,3]triazolo[4,5-b]pyridinium hexafluorophosphate-1-oxide (4-HDMA), 6-trifluoromethyl-1-((dimethylamino)(morpholino)methylene)-1H-benzotriazolium hexafluorophosphate-3-oxide (6-HDMFB), 1-((dimethyamino)-(morpholino))oxypentafluorophenylmetheniminium hexafluorophosphate (HDMFp), 1-((dimethyamino)(morpholino))oxypynrolidine-2,5-dione methanaminium hexafluorophosphate (HDMP), 1-((dimethylamino)(thiomorpholino)methylene)-1H-[1,2,3]triazolo[4,5-b]pyridinium hexafluorophosphate-3-oxide (HDTMA), 1-((dimethylamino)(thiomorpholino)methylene)-1H-benzotriazolium hexafluorophosphate-3-oxide (HDTMB), 1-[(1-(cyano-2-ethoxy-2-oxoethylideneaminooxy)-dimethylamino-morpholinomethylene)] methanaminium hexafluorophosphate (COMU), 1-[(1-(dicyanomethyleneaminooxy)-dimethylaminomorpholinomethylene)]methanaminium hexafluorophosphate (HDMODC), 1-[(1,3-diethyoxy-1,3-dioxopropan-2-ylideneaminooxy)-dimethylamino-morpholinomethylene)]methanaminium hexafluorophosphate (HDMODeC), N-[(cyano(pyridine-2-yl)methyleneaminooxy)-(dimethylamino)methylene]-N-morpholinomethanaminiumhexafluorophosphate (HDMOPC), 1-[(1-(cyano-2-ethoxy-2-oxoethylideneaminooxy)-dimethylaminopynrolodino methylene)]methanaminium hexafluorophosphate (HDmPyODC), 1-((dicyanomethyleneaminooxy) morpholinomethylene)pyrrolidinium hexafluorophosphoate (HMPyODC), 1-[(1,3-diethyoxy-1,3-dioxopropan-2-ylideneaminooxy)-dimethylamino pyrrolodinomethylene)]methanaminium hexafluorophosphate (HDmPyODeC), 1-[(1-(cyano-2-ethoxy-2-oxoethylideneaminooxy)-dimethylamino-pyrrolodinomethylene)]methanaminium hexafluorophosphate (HDmPyOC), 1-((1-cyano-2-ethoxy-2-oxoethylideneaminooxy)(morpholino)methylene) pyrrolidinium hexafluorophosphate (HMPyOC), benzotriazol-1-yl-oxy-N,N-dimethylmethaniminium hexachloroantimoniate (BOMI), 5-(1H-benzotriazol-1-yloxy)-3,4-dihydro-1-methyl 2H-pyrrolium hexachloroantimonate (BDMP), 5-(7-azabenzotriazol-1-yloxy)-3,4-dihydro-1-methyl 2H-pynrolium hexachloroantimonate (AOMP), 1-(1H-benzotriazol-1-yloxy)phenylmethylene pyrrolidinium hexachloroantimonate (BPMP), 5-(pentafluorophenyloxy)-3,4-dihydro-1-methyl-2H-pyrrolium hexachloroantimonate (FOMP), 5-(succinimidyloxy)-3,4-dihydro-1-methyl-2H-pyrrolium hexachloroantimonate (SOMP) and 5-(3',4'-dihydro-4'-oxo-1',2',3'-benzotriazin-3'-yloxy)-3,4-dihydro-1-methyl-2H-pynrolium hexachloroantimonate (DOMP).

In one embodiment, the coupling of the amino acids is carried out in the presence of at least one organophosphorus coupling agent.

Suitable examples of organophosphorus coupling agents include, but are not limited to, diethylcyanophosphonate (DECP), diethyl phosphorobromidate (DEPB), diphenyl phosphorochloridate (DEPC), diphenylphosphoryl azide (DPPA), dimethylphosphinothioyl azide (MPTA), 3-dimethylphosphinothioyl-2(3H)-oxazolone (MPTO), 2,5-dioxopyrrolidin-1-yl diphenylphosphate, norborn-5-ene-2,3-dicarboximidodiphenylphosphate (NDPP), 3,5-dioxo-10-oxo-4-azatricyclo[5.2.1.02,6]dec-8-en-4-yl diphenylphosphate (FNDPP), 1-oxo-chlorophospholane (Cpt-Cl), N,N'-bismorpholinophosphinic chloride (BMP-Cl), diethyl 2-(3-oxo-2,3-dihydro-1,2-benzisosulfonazolyl) phosphonate (DEBP), benzotriazol-1-yl diethylphosphate (BDP), bis(2-nitrophenyl) phenylphosphonate, (5-nitro-pyridyl)diphenylphosphinate, diphenyl 2-oxo-3-oxazolinyl phosphonate (DPOOP), 1,2-benzisoxazol-3-yl diphenyl phosphate (BIODPP), 7-azabenzotriazol-1-yl diethylphosphate (ADP), benzotriazole-1-yl diphenylphosphate (BDOP), 7-azabenzotriazol-1-yl diphenylphosphate (ADOP), 1H-benzo[d][1,2,3]triazol-1-yl di-o-tolylphosphinate (BDTP), 3H-[1,2,3]triazolo[4,5-b]pyridine-3-yl di-o-tolylphosphinate (ADTP), diphenylphosphinic chloride (DPPCl), pentafluorophenyl diphenyl phosphinate (FDPP), N-diethoxyphosphorylbenzoxazolone (DEBPO), N-(2-oxo-1,3,2-dioxaphosphorinanyl)-benzoxazolone (DOPBO), 3-[0-(2-oxo-1,3,2-dioxaphosphorinanyl)-oxy]-1,2,3-benzotriazin-4(3H)-one (DOPBT), 3-(diethoxyphosphoryloxy)-1,2,3-benzotriazin-4(3H)-one (DEPBT), N,N'-bis(2-oxo-3-oxazolidinyl)phosphinic chloride (BOP-Cl), 2-propanephosphonic acid anhydride (T3P), 3-(diethoxyphosphoryloxy)-1,2,3-pyridino-[b]triazin-4-(3H)-one (DEPAT), 3-(diphenoxyphosphoryloxy)-1,2,3-pyridino-[b] triazin-4-(3H)-one (DPPAT), diphenyl-4-oxobenzo[d][1,2,3]triazine-3(4H)-ylphosphonate, phosphoric acid diethyl ester 2-phenylbenzimidazol-1-yl ester (DOEPBI), phosphoric acid diphenyl-2-phenylbenzimidazol-1-yl ester (DOPPBI), diphenylphosphinic acid 2-phenylbenzimidazol-1-yl ester (DPPBI), tris(4-nitrophenyl)phosphonate, ethyl-bis(2-nitrophenyl)phosphonate, tripyrimidin-2-yl phosphonate, pentachlorophenyl diphenyl phosphate (CDPOP), pentachlorophenyl diphenyl phosphinate (CDPP), dipyrimidin-2-yl phenylphosphonate, bis(4-nitrophenyl) phenylphosphonate, bis(4-cyaonophenyl) phenylphosphonate, 4-nitrophenyl phenyl phenylphosphonate, 3-nitrophenyl phenyl phenylphosphonate, 4-nitrophenyl methyl(phenyl) phosphinate, 4-nitrophenyl methoxymethyl(phenyl)phosphinate, 4-nitrophenyl-dimethylphosphinate, 4-nitrophenyl-diethylphosphinate, 3,5-bis(trifluoromethylphenyl)phenyl diphenylphosphinate (FDMP), diphenyl-2-oxopyridin-1-(2H)-yl phosphonate (PyDPP), and diphenyl(trifluoromethylsulfonyl)phosphoramidate (TFMS-DEP).

In one embodiment, the coupling of the amino acids is carried out in the presence of at least one organosulfur coupling agent.

Suitable examples of organosulfur coupling agents include, but are not limited to, 1-((naphthalen-2-ylsulfonyl)methyl)-1H-benzo-[d][1,2,3]triazole (NBs), 3-((naphthalen-2-ylsulfonyl)methyl)-3H-[1,2,3]-triazolo[4,5-b]pyridine (NAs), 1H-benzo[d][1,2,3]triazol-1-yl 4-nitrobenzenesulfonate (4-NBs), 3H-[1,2,3]triazolo[4,5-b]pyridin-3-yl 4-nitrobenzenesulfonate (4-NAs), 1H-benzo[d][1,2,3]triazol-1-yl 4-methylbenzenesulfonate (TBs), 3H-[1,2,3]triazolo[4,5-b]pyridin-3-yl 4-methylbenzenesulfonate (TAs), 1H-benzo[d][1,2,3]triazol-1-yl 2-nitrobenzenesulfonate (2-NBs), 3H-[1,2,3]triazolo[4,5-b]pyridin-3-yl 2-nitrobenzenesulfonate (2-NAs), 1H-benzo[d][1,2,3]triazol-1-yl 2,4-dinitrobenzenesulfonate (DNBs), 3H-[1,2,3]triazolo[4,5-b]pyridin-3-yl 2,4-dinitrobenzenesulfonate (DNAs), 6-chloro-1H-benzo[d][1,2,3]triazol-1-yl benzenesulfonate (HCSP), 6-chloro-1H-benzo[d][1,2,3]triazol-1-yl 4-chlorobenzenesulfonate (HCSCP), pentafluorophenyl-4-nitrobenzenesulfonate (PFNB), 4-oxobenzo[d][1,2,3]triazine-3(4H)-yl methanesulfonate (SMDOP), 4-oxobenzo[d][1,2,3]triazine-3(4H)-yl benzenesulfonate (SPDOP) and ethyl-2-cyano-2-(methylsulfonyloxyimino)acetate (MSOxm).

In one embodiment, the coupling of the amino acids is carried out in the presence of at least one triazine coupling agent.

Suitable examples of triazine coupling agents include, but are not limited to, 2-chloro-4,6-dimethyl-1,3,5-triazine (DMCT), 4-(4,6-dimethoxy[1,3,5]triazin-2-yl)-4-methylmorpholinium chloride (DMTMM), 4-(4,6-dimethoxy-1,3,5-triazin-2-yl)-4-methylmorpholinium tetrafluoroborate (TBCR$_1$), 1-(4,6-dimethoxy-1,3,5-triazin-2-yl)-1-methylpiperydinium tetrafluoroborate (TBCR$_2$), 1-(4,6-dimethoxy-1,3,5-triazin-2-yl)quinuclidinium tetrafluoroborate (TBCR$_3$), and 1-(4,6-dibenzyloxy-1,3,5-triazin-2-yl)quinuclidinium tetrafluoroborate (TBCR$_4$).

In one embodiment, the coupling of the amino acids is carried out in the presence of at least one pyridinium coupling agent.

Suitable examples of pyridinium coupling agents include, but are not limited to, 2-chloro-1-methylpyridinium iodide (Mykaiyama's reagent), 2-bromo-3-ethyl-4-methyl thiazolium tetrafluoroborate (BEMT), 2-bromo-1-ethyl pyridinium tetrafluoroborate (BEP), 2-fluoro-1-ethyl pyridinium tetrafluoroborate (FEP), 2-bromo-1-ethyl pyridinium hexachloroantimonate (BEPH), and 2-fluoro-1-ethyl pyridinium hexachloroantimonate (FEPH).

In a preferred embodiment, the coupling agent is O-(1H-6-chlorobenzotriazole-1-yl)-1,1,3,3-tetramethyluronium hexafluorophosphate (HCTU).

In one embodiment, the coupling of the amino acids is carried out in the presence of at least one coupling agent, and further in the presence of at least one base.

The one skilled in art is familiar with the use of bases in combination with coupling agents, and readily knows when to use a base, what base to use, and in what concentration to use it, in combination with a given coupling agent, as explained in, e.g., Han & Kim, 2004. *Tetrahedron.* 60(11): 2447-67; El-Faham & Albericio, 2011. *Chem Rev.* 111(11): 6557-602.

Suitable examples of bases used with coupling agents include, but are not limited to, N—N-methylmorpholine (NMM), diisopropylethylamine (DIEA), collidine (TMP), and triethylamine.

In a preferred embodiment, the at least one base is N-methylmorpholine (NMM).

In one embodiment, the ratio between the at least one coupling agent and the at least one base ranges from about 1:2 to about 1:4, preferably the ratio is about 1:2.

In one embodiment, the coupling of the amino acids is carried out in the presence of at least one coupling agent, and further in the presence of at least one additive.

The one skilled in art is familiar with the use of additives in combination with coupling agents, and readily knows when to use an additive, what additive to use, and in what concentration to use it, in combination with a given coupling agent, as explained in, e.g., Han & Kim, 2004. *Tetrahedron.* 60(11):2447-67; El-Faham & Albericio, 2011. *Chem Rev.* 111(11):6557-602.

Suitable examples of additives used with coupling agents include, but are not limited to, 1-hydroxybenzotrialzole (HOBt), 1-hydroxy-6-nitrobenzotrialzole (6-NO2-HOBt), 6-trifluoromethyl-1-hydroxylbenzotrialzole (6-CF$_3$—HOBt), 1-hydroxy-7-azabenzotrialzole (HOAt), 6-chloro-1-hydroxybenzotrialzole (6-Cl-HOBt), 5-aza-1-hydroxybenzotrialzole (6-HOAt), 6-aza-1-hydroxybenzotrialzole (5-HOAt), 4-aza-1-hydroxybenzotrialzole (4-HOAt), 3,4-dihydro-3-hydroxy-4-oxo-1,2,3-benzotrialzole (HODhbt), 3-hydroxy-4-oxo-3,4-dihydro-5-azabenzo-1,2,3-triazene (HODhad), N-hydroxysuccinimide (HOSu), N-hydroxy-5-norborene-endo-2,3-dicarboxyimide (HONB), 1-hydroxy-1H-1,2,3-triazole, 5-chloro-1-hydroxy-1H-1,2,3-triazole, 5-acetyl-1-hydroxy-1H-1,2,3-triazole, 1-(1-hydroxy-1H-1,2,3-triazol-5yl)propan-2-one, ethyl-1-hydroxy-1H-1,2,3-triazol-4-carboxylate (HOCt), 1-hydroxy-1H-1,2,3,5-tetrazole, 1-hydroxy-2-pyridinone (HOPy), N-hydroxy-2-phenylbenzimidazole (HOBI), N-hydroxyindolin-2-one (HOI), 6-chloro-N-hydroxy-2-phenylbenzimidazole (6-Cl-HOBI) and ethyl-2-cyano-2-(hydroxyamino)acetate (Oxyma).

In one embodiment, the coupling of the amino acids is carried out in the presence of at least one coupling agent, and further in the presence of at least one base and at least one additive.

In one embodiment, the step of stepwisely coupling amino acids comprises a substep of removing the α amino-protecting group.

α amino-protecting groups have been described in details hereinabove.

In one embodiment, the substep of removing the α amino-protecting group comprises the removal of the α amino-protecting group from the support. In other words, the substep of removing the α amino-protecting group comprises the deprotection of the support. This embodiment applies in particular (1) in the first iteration of the step of stepwisely coupling amino acids and/or (2) when the support is unloaded.

In one embodiment, the substep of removing the α amino-protecting group comprise the removal of the α amino-protecting group from the N-terminal amino acid residue of the growing peptide. In other words, the substep of removing the α amino-protecting group comprises the deprotection of the N-terminal amino acid residue of the growing peptide. This embodiment applies in particular (1) in all but the first iteration of the step of stepwisely coupling amino acids (i.e., when at least a first amino acid residue has been coupled to the resin) and/or (2) when the support is pre-loaded.

In one embodiment, the substep of removing the α amino-protecting group is carried out in presence of a base or an acid, optionally in a solvent.

Examples of suitable solvents include, but are not limited to, N-methyl-2-pyrrolidone (NMP), dimethylformamide (DMF), dimethylsulfoxide (DMSO), dioxane, dichloromethane (DCM), 1-methylpynrolidine, hexamethylenimine, $H_2O$, 2,2,2-trifluoroethanol (TFE), acetic acid (AcOH) methanol (MeOH), and mixtures thereof.

Examples of suitable bases for removing a amino-protecting groups include, but are not limited to, piperidine, 1,8-diazabicyclo[5.4.0]undec-7-ene (DBU), morpholine, 1-hydroxybenzotrialzole (HOBt), hexamethyleneimine, N-methylpyrrolidine, tris(2-aminoethyl)amine (TAEA), hydrazine ($N_2H_4$), sodium carbonate hydrate ($NaHCO_3$), sodium hydroxide (NaOH), tetra-n-butylammonium fluoride (TBAF), disodium carbonate ($Na_2CO_3$), and combinations thereof.

In a particular embodiment where the α amino-protecting group is Fmoc, suitable conditions for removing said α amino-protecting group include, without limitation, about 20% piperidine in NMP or DMF; about 20% piperidine in DMF/0.1 M HOBt; from about 1 to about 5% DBU in NMP or DMF; morpholine in NMP or DMF (1:1); about 2% HOBt in DMSO:NMP (1:1); about 2% hexamethyleneimine in DMSO-NMP (1:1); or about 25% N-methylpynrolidine in DMSO-NMP (1:1).

In a particular embodiment where the α amino-protecting group is Nsc, suitable conditions for removing said α amino-protecting group include, without limitation, about 20% piperidine in NMP or DMF; about 20% piperidine in DMF:dioxane (1:1); about 1% DBU in NMP or DMF; or about 1% DBU in DMF:dioxane (1:1).

In a particular embodiment where the α amino-protecting group is Bsmoc or α-Nsmoc, suitable conditions for removing said α amino-protecting group include, without limitation, from about 2 to about 5% piperidine in NMP or DMF; or about 2% TAEA in DCM.

In a particular embodiment where the α amino-protecting group is Dde or ivDde, suitable conditions for removing said α amino-protecting group include, without limitation, about 2% $N_2H_4$ hydrate in NMP or DMF.

In a particular embodiment where the α amino-protecting group is Fmoc*, mio-Fmoc or dio-Fmoc, suitable conditions for removing said α amino-protecting group include, without limitation, about 20% piperidine in NMP or DMF.

In a particular embodiment where the α amino-protecting group is Fmoc(2F), suitable conditions for removing said α amino-protecting group include, without limitation, about 4% HOBt in 1-methylpynrolidine:hexamethylenimine:NMP:DMSO (25:2:50:50).

In a particular embodiment where the α amino-protecting group is TCP, suitable conditions for removing said α amino-protecting group include, without limitation, about 15% hydrazine in NMP or DMF.

In a particular embodiment where the α amino-protecting group is Pms, suitable conditions for removing said α amino-protecting group include, without limitation, about 5% $NaHCO_3$ hydrate.

In a particular embodiment where the α amino-protecting group is Esc, suitable conditions for removing said α amino-protecting group include, without limitation, about 0.025 M NaOH in $H_2O$:EtOH (1:1); or about 0.05 M TBAF in NMP or DMF.

In a particular embodiment where the α amino-protecting group is Sps, suitable conditions for removing said α amino-protecting group include, without limitation, about 5% $Na_2CO_3$ in $H_2O$.

Examples of suitable acids for removing a amino-protecting groups include, but are not limited to, trifluoroacetic acid (TFA), trimethylsilyl chloride (TMS-Cl) phenol, hydrogen chloride (HCl), methanesulfonic acid (MsOH), 1-hydroxybenzotrialzole (HOBt), trichloroacetic acid (TCA), 2-mercaptopyridine, Raney nickel (Ni Raney), and combinations thereof.

In a particular embodiment where the α amino-protecting group is Boc, suitable conditions for removing said α amino-protecting group include, without limitation, from about 25 to about 50% TFA in DCM; about 1 M TMS-Cl phenol in DCM; about 4 M HCl in dioxane; or about 2 M MsOH in dioxane.

In a particular embodiment where the α amino-protecting group is Trt, suitable conditions for removing said α amino-protecting group include, without limitation, about 1% TFA in DCM; about 0.1 M HOBt in TFE; about 0.2% TFA/1% $H_2O$ in DCM; or about 3% TCA in DCM.

In a particular embodiment where the α amino-protecting group is Ddz, suitable conditions for removing said α amino-protecting group include, without limitation, from about 1 to about 5% TFA in DCM. Alternatively, suitable conditions for removing a Ddz a amino-protecting group include, without limitation, photolysis at wavelengths above 280 nm.

In a particular embodiment where the α amino-protecting group is Bpoc, suitable conditions for removing said α amino-protecting group include, without limitation, from about 0.2 to about 0.5% TFA.

In a particular embodiment where the α amino-protecting group is Nps, suitable conditions for removing said α amino-protecting group include, without limitation, diluted solutions of HCl in AcOH; 2-mercaptopyridine/AcOH in MeOH; 2-mercaptopyridine/AcOH in NMP or DMF; 2-mercaptopyridine/AcOH in DCM; or a Ni Raney column in DMF.

In a preferred embodiment, the substep of removing the α amino-protecting group is carried out in presence of a base. In a preferred embodiment, the substep of removing the α amino-protecting group is carried out in the presence of piperidine. In a preferred embodiment, the substep of removing the α amino-protecting group is carried out in the presence of 20% piperidine. In a preferred embodiment, the substep of removing the α amino-protecting group is carried out in the presence of 20% piperidine in NMP or DMF, preferably in NMP.

In one embodiment, the step of stepwisely coupling amino acids comprises a substep of coupling the next amino acid residue, following the amino acid sequence of the STxB protein or of the variant thereof (including fragments, mutants and/or conjugates), thereby obtaining a synthetic peptide.

In one embodiment, the step of stepwisely coupling amino acids comprises a substep of coupling the next amino acid residue, following an amino acid sequence with at least 60% identity to the amino acid sequence set forth in SEQ ID NO: 1, SEQ ID NO: 3, SEQ ID NO: 5, SEQ ID NO: 7, SEQ ID NO: 9, SEQ ID NO: 11, SEQ ID NO: 13, SEQ ID NO: 15, SEQ ID NO: 17 or SEQ ID NO: 19 or a variant thereof (including fragments, mutants and/or conjugates), thereby obtaining a synthetic peptide.

In one embodiment, the step of stepwisely coupling amino acids comprises a substep of coupling the next amino acid residue, following an amino acid sequence with at least 60% identity to the amino acid sequence set forth in SEQ ID NO: 2, SEQ ID NO: 4, SEQ ID NO: 6, SEQ ID NO: 8, SEQ ID NO: 10, SEQ ID NO: 12, SEQ ID NO: 14, SEQ ID NO: 16, SEQ ID NO: 18 or SEQ ID NO: 20 or a variant thereof (including fragments, mutants and/or conjugates), thereby obtaining a synthetic peptide.

In one embodiment, at least one (such as 1, 2, 3, 4, 5, 6, 7, 8, 9, 10, 11, 12, 13, 14, 15, 16, 17, 18, 19, 20, 21, 22, 23, 24, 25, 26, 27 or 28) amino acid residues coupled during the substep of coupling the next amino acid residue is a non-proteinogenic amino acid residue.

Non-proteinogenic amino acid residues have been described in details hereinabove.

In one embodiment, amino acid residues used in this step bear an a amino-protecting group and optionally, a side chain-protecting group, as described in details hereinabove.

In one embodiment where the next amino acid residue to be coupled is selected from a threonine (Thr, T), a serine (Ser, S) or a cysteine (Cys, C), at least one of these amino acid residues is coupled in a pseudoproline dipeptide form.

As used herein, the term "pseudoproline dipeptide" refers to temporary proline mimics, more specifically to threonine- (oxa(5-Me)) or serine- (Oxa) derived oxazolidines and cysteine-derived thiazolidines (THz) with proline-like ring structure. Their use in solid-phase peptide synthesis has been well documented over the years, such as, e.g., in Mutter et al., 1995. *Pept Res.* 8 (3):145-53; Wohr et al., 1996. *J Am Chem Soc.* 118 (39):9218-27; Dumy et al., 1996. *J Am Chem Soc.* 119 (5):918-25; Sampson et al., 1999. *J Pept Sci.* 5 (9):403-9; White et al., 2004. *J Pept Sci.* 10 (1):18-26; Abedini & Raleigh, 2005. *Org Lett.* 7 (4):693-6; Postma & Albericio, 2014. *Org Lett.* 16 (6):1772-5. Pseudoproline dipeptides are commercially available, including threonine, serine and cysteine derivatives with all the proteinogenic amino acids (see, e.g., the brochure "Pseudoproline Dipeptides Bachem—Pioneering Partnerfor Peptides", published by Global Marketing, Bachem Group, November 2015).

In one embodiment, at least one dipeptide selected from the group comprising or consisting of Asp 3-Cys 4, Val 5-Thr 6, Tyr 11-Thr 12, Asp 18-Thr 19, Phe 20-Thr 21, Phe 30-Thr 31, Gln 37-Ser 38, Leu 41-Ser 42, Ile 45-Thr 46, Met 48-Thr 49, Val 50-Thr 51, Lys 53-Thr 54, Ala 56-Cys 57, and Phe 63-Ser 64 with respect to SEQ ID NO: 2 numbering, such as 1, 2, 3, 4, 5, 6, 7, 8, 9, 10, 11, 12, 13, or 14 dipeptides, is coupled in a pseudoproline dipeptide form.

In one embodiment, at least one dipeptide selected from the group comprising or consisting of Val 5-Thr 6, Asp 18-Thr 19, Phe 30-Thr 31, Leu 41-Ser 42, Val 50-Thr 51, and Phe 63-Ser 64 with respect to SEQ ID NO: 2 numbering, such as 1, 2, 3, 4, 5, or 6 dipeptides, is coupled in a pseudoproline dipeptide form.

In one embodiment, Val 5-Thr 6, Asp 18-Thr 19, Phe 30-Thr 31, Leu 41-Ser 42, Val 50-Thr 51, and Phe 63-Ser 64 with respect to SEQ ID NO: 2 numbering are coupled in a pseudoproline dipeptide form.

In one embodiment, at least one dipeptide selected from the group comprising or consisting of Val 5-Thr 6, Asp 18-Thr 19, Phe 30-Thr 31, Leu 41-Ser 42, and Val 50-Thr 51 with respect to SEQ ID NO: 2 numbering, such as 1, 2, 3, 4, or 5 dipeptides, is coupled in a pseudoproline dipeptide form.

In one embodiment, Val 5-Thr 6, Asp 18-Thr 19, Phe 30-Thr 31, Leu 41-Ser 42, and Val 50-Thr 51 with respect to SEQ ID NO: 2 numbering are coupled in a pseudoproline dipeptide form.

In one embodiment, the substep of coupling the next amino acid residue for a given amino acid residue (including embodiments where an amino acid residue is coupled in a pseudoproline dipeptide form) is repeated, e.g., twice, three times, four times or more, to ensure full effectiveness of the coupling of said given amino acid residue to the growing peptide.

In one embodiment, the substep of coupling the next amino acid residue for a given amino acid residue is repeated once for each amino acid residue following the amino acid sequence of the STxB protein or of the variant thereof (including fragments, mutants and/or conjugates); following an amino acid sequence with at least 60% identity to the amino acid sequence set forth in SEQ ID NO: 1, SEQ ID NO: 3, SEQ ID NO: 5, SEQ ID NO: 7, SEQ ID NO: 9, SEQ ID NO: 11, SEQ ID NO: 13, SEQ ID NO: 15, SEQ ID NO: 17 or SEQ ID NO: 19 or a variant thereof (including fragments, mutants and/or conjugates); or following an amino acid sequence with at least 60% identity to the amino acid sequence set forth in SEQ ID NO: 2, SEQ ID NO: 4, SEQ ID NO: 6, SEQ ID NO: 8, SEQ ID NO: 10, SEQ ID NO: 12, SEQ ID NO: 14, SEQ ID NO: 16, SEQ ID NO: 18 or SEQ ID NO: 20 or a variant thereof (including fragments, mutants and/or conjugates).

In a preferred embodiment, the substep of coupling the next amino acid residue for a given amino acid residue is repeated twice for each amino acid residue following the amino acid sequence of the STxB protein or of the variant thereof (including fragments, mutants and/or conjugates); following an amino acid sequence with at least 60% identity to the amino acid sequence set forth in SEQ ID NO: 1, SEQ ID NO: 3, SEQ ID NO: 5, SEQ ID NO: 7, SEQ ID NO: 9, SEQ ID NO: 11, SEQ ID NO: 13, SEQ ID NO: 15, SEQ ID NO: 17 or SEQ ID NO: 19 or a variant thereof (including fragments, mutants and/or conjugates); or following an amino acid sequence with at least 60% identity to the amino acid sequence set forth in SEQ ID NO: 2, SEQ ID NO: 4, SEQ ID NO: 6, SEQ ID NO: 8, SEQ ID NO: 10, SEQ ID NO: 12, SEQ ID NO: 14, SEQ ID NO: 16, SEQ ID NO: 18 or SEQ ID NO: 20 or a variant thereof (including fragments, mutants and/or conjugates).

In one embodiment, the substep of coupling the next amino acid residue for a given amino acid residue is repeated three times for each amino acid residue following the amino acid sequence of the STxB protein or of the variant thereof (including fragments, mutants and/or conjugates); following an amino acid sequence with at least 60% identity to the amino acid sequence set forth in SEQ ID NO: 1, SEQ ID NO: 3, SEQ ID NO: 5, SEQ ID NO: 7, SEQ ID NO: 9, SEQ ID NO: 11, SEQ ID NO: 13, SEQ ID NO: 15, SEQ ID NO: 17 or SEQ ID NO: 19 or a variant thereof (including fragments, mutants and/or conjugates); or following an amino acid sequence with at least 60% identity to the amino acid sequence set forth in SEQ ID NO: 2, SEQ ID NO: 4, SEQ ID NO: 6, SEQ ID NO: 8, SEQ ID NO: 10, SEQ ID NO: 12, SEQ ID NO: 14, SEQ ID NO: 16, SEQ ID NO: 18 or SEQ ID NO: 20 or a variant thereof (including fragments, mutants and/or conjugates).

In one embodiment, the substep of coupling the next amino acid residue for a given amino acid residue is repeated four times for each amino acid residue following the amino acid sequence of the STxB protein or of the variant thereof (including fragments, mutants and/or conjugates); following an amino acid sequence with at least 60% identity to the amino acid sequence set forth in SEQ ID NO: 1, SEQ ID NO: 3, SEQ ID NO: 5, SEQ ID NO: 7, SEQ ID NO: 9, SEQ ID NO: 11, SEQ ID NO: 13, SEQ ID NO: 15, SEQ ID NO: 17 or SEQ ID NO: 19 or a variant thereof (including fragments, mutants and/or conjugates); or following an amino acid sequence with at least 60% identity to the amino acid sequence set forth in SEQ ID NO: 2, SEQ ID NO: 4, SEQ ID NO: 6, SEQ ID NO: 8, SEQ ID NO: 10, SEQ ID NO: 12, SEQ ID NO: 14, SEQ ID NO: 16, SEQ ID NO: 18 or SEQ ID NO: 20 or a variant thereof (including fragments, mutants and/or conjugates).

In one embodiment, the substep of coupling the next amino acid residue for a given amino acid residue is carried out once for each amino acid residue, except for at least one amino acid residue selected from the group comprising or consisting of Thr 1, Cys 4, Tyr 11, Thr 12, Thr 21, Asn 35, Lu 36, Leu 39, Ile 45, Thr 46, Thr 49, Cys 57, and Val 65 with respect to SEQ ID NO: 2 numbering, for which the substep of coupling the next amino acid residue for a given amino is repeated twice.

In one embodiment, the substep of coupling the next amino acid residue for a given amino acid residue is carried out once or twice for each amino acid residue, except for at least one amino acid residue selected from the group comprising or consisting of Thr 1, Cys 4, Tyr 11, Thr 12, Thr 21, Asn 35, Leu 36, Leu 39, Ile 45, Thr 46, Thr 49, Cys 57, and Val 65 with respect to SEQ ID NO: 2 numbering, for which the substep of coupling the next amino acid residue for a given amino is repeated three times.

In one embodiment, the substep of coupling the next amino acid residue for a given amino acid residue is carried out once, twice or three times for each amino acid residue, except for at least one amino acid residue selected from the group comprising or consisting of Thr 1, Cys 4, Tyr 11, Thr 12, Thr 21, Asn 35, Leu 36, Leu 39, le 45, Thr 46, Thr 49, Cys 57, and Val 65 with respect to SEQ ID NO: 2 numbering, for which the substep of coupling the next amino acid residue for a given amino is repeated four times.

In one embodiment, the substep of coupling the next amino acid residue for a given amino acid residue is carried out once for each amino acid residue, except for at least one amino acid residue selected from the group comprising or consisting of Cys 4, Thr 12, Thr 21, Asn 35, Lu 36, Leu 39, Ile 45, Thr 49, Cys 57, and Val 65 with respect to SEQ ID NO: 2 numbering, for which the substep of coupling the next amino acid residue for a given amino is repeated twice.

In one embodiment, the substep of coupling the next amino acid residue for a given amino acid residue is carried out once or twice for each amino acid residue, except for at least one amino acid residue selected from the group comprising or consisting of Cys 4, Thr 12, Thr 21, Asn 35, Leu 36, Leu 39, Ile 45, Thr 49, Cys 57, and Val 65 with respect to SEQ ID NO: 2 numbering, for which the substep of coupling the next amino acid residue for a given amino is repeated three times.

In one embodiment, the substep of coupling the next amino acid residue for a given amino acid residue is carried out once, twice or three times for each amino acid residue, except for at least one amino acid residue selected from the group comprising or consisting of Cys 4, Thr 12, Thr 21, Asn 35, Leu 36, Leu 39, Ile 45, Thr 49, Cys 57, and Val 65 with respect to SEQ ID NO: 2 numbering, for which the substep of coupling the next amino acid residue for a given amino is repeated four times.

In one embodiment, the substep of coupling the next amino acid residue for a given amino acid residue is carried out once for each amino acid residue, except for at least one amino acid residue selected from the group comprising or consisting of Cys 4, Thr 12, Thr 21, Asn 35, Leu 36, Leu 39, Ile 45, Cys 57, and Val 65 with respect to SEQ ID NO: 2 numbering, for which the substep of coupling the next amino acid residue for a given amino is repeated twice.

In one embodiment, the substep of coupling the next amino acid residue for a given amino acid residue is carried out once or twice for each amino acid residue, except for at least one amino acid residue selected from the group comprising or consisting of Cys 4, Thr 12, Thr 21, Asn 35, Leu 36, Leu 39, Ile 45, Cys 57, and Val 65 with respect to SEQ ID NO: 2 numbering, for which the substep of coupling the next amino acid residue for a given amino is repeated three times.

In one embodiment, the substep of coupling the next amino acid residue for a given amino acid residue is carried out once, twice or three times for each amino acid residue, except for at least one amino acid residue selected from the group comprising or consisting of Cys 4, Thr 12, Thr 21, Asn 35, Leu 36, Leu 39, Ile 45, Cys 57, and Val 65 with respect to SEQ ID NO: 2 numbering, for which the substep of coupling the next amino acid residue for a given amino is repeated four times.

In one embodiment, the substep of coupling the next amino acid residue for a given amino acid residue is carried out once for each amino acid residue, except for at least one amino acid residue selected from the group comprising or consisting of Thr 1, Cys 4, Tyr 11, Thr 12, Thr 21, Asn 35, Lu 36, le 45 and Thr 46 with respect to SEQ ID NO: 2 numbering, for which the substep of coupling the next amino acid residue for a given amino is repeated twice.

In one embodiment, the substep of coupling the next amino acid residue for a given amino acid residue is carried out once or twice for each amino acid residue, except for at least one amino acid residue selected from the group comprising or consisting of Thr 1, Cys 4, Tyr 11, Thr 12, Thr 21, Asn 35, Leu 36, Ile 45 and Thr 46 with respect to SEQ ID NO: 2 numbering, for which the substep of coupling the next amino acid residue for a given amino is repeated three times.

In one embodiment, the substep of coupling the next amino acid residue for a given amino acid residue is carried out once, twice or three times for each amino acid residue, except for at least one amino acid residue selected from the group comprising or consisting of Thr 1, Cys 4, Tyr 11, Thr 12, Thr 21, Asn 35, Leu 36, Ile 45 and Thr 46 with respect to SEQ ID NO: 2 numbering, for which the substep of coupling the next amino acid residue for a given amino is repeated four times.

In one embodiment, the substep of coupling the next amino acid residue for a given amino acid residue is carried out once for each amino acid residue, except for at least one amino acid residue selected from the group comprising or consisting of Thr 1, Cys 4, Tyr 11, Thr 12, Thr 21, Asn 35, Leu 36, Ile 45, Thr 46, Cys 57, and Val 65 with respect to SEQ ID NO: 2 numbering, for which the substep of coupling the next amino acid residue for a given amino is repeated twice.

In one embodiment, the substep of coupling the next amino acid residue for a given amino acid residue is carried out once or twice for each amino acid residue, except for at least one amino acid residue selected from the group comprising or consisting of Thr 1, Cys 4, Tyr 11, Thr 12, Thr 21, Asn 35, Leu 36, le 45, Thr 46, Cys 57, and Val 65 with respect to SEQ ID NO: 2 numbering, for which the substep of coupling the next amino acid residue for a given amino is repeated three times.

In one embodiment, the substep of coupling the next amino acid residue for a given amino acid residue is carried out once, twice or three times for each amino acid residue, except for at least one amino acid residue selected from the group comprising or consisting of Thr 1, Cys 4, Tyr 11, Thr 12, Thr 21, Asn 35, Leu 36, Ile 45, Thr 46, Cys 57, and Val 65 with respect to SEQ ID NO: 2 numbering, for which the substep of coupling the next amino acid residue for a given amino is repeated four times.

In one embodiment, the substep of coupling the next amino acid residue for a given amino acid residue is carried out once for each amino acid residue, except for at least one amino acid residue selected from the group comprising or consisting of Cys 4, Thr 12, Thr 21, Asn 35, Leu 36, and Ile 45 with respect to SEQ ID NO: 2 numbering, for which the substep of coupling the next amino acid residue for a given amino is repeated twice.

In one embodiment, the substep of coupling the next amino acid residue for a given amino acid residue is carried out once or twice for each amino acid residue, except for at least one amino acid residue selected from the group comprising or consisting of Cys 4, Thr 12, Thr 21, Asn 35, Leu 36, and Ile 45 with respect to SEQ ID NO: 2 numbering, for which the substep of coupling the next amino acid residue for a given amino is repeated three times.

In one embodiment, the substep of coupling the next amino acid residue for a given amino acid residue is carried out once, twice or three times for each amino acid residue, except for at least one amino acid residue selected from the group comprising or consisting of Cys 4, Thr 12, Thr 21, Asn 35, Leu 36, and Ile 45 with respect to SEQ ID NO: 2 numbering, for which the substep of coupling the next amino acid residue for a given amino is repeated four times.

In one additional or alternative embodiment, the substep of coupling the next amino acid residue for a given amino acid residue (including embodiments where an amino acid residue is coupled in a pseudoproline dipeptide form) is carried out for a longer period of time than for the other amino acid residues, e.g., 1.5 times, twice, three times, four times or more longer than for the other amino acid residues, to ensure full effectiveness of the coupling of said given amino acid residue to the growing peptide.

In one embodiment, the substep of coupling the next amino acid residue for a given amino acid residue is carried out for a period of time being 1.5 times, twice, three times, four times or more longer for at least one amino acid residue selected from the group comprising or consisting of Thr 1, Cys 4, Tyr 11, Thr 12, Thr 21, Asn 35, Lu 36, Leu 39, Ile 45, Thr 46, Thr 49, Cys 57, and Val 65 with respect to SEQ ID NO: 2 numbering, than for the other amino acid residues.

In one embodiment, the substep of coupling the next amino acid residue for a given amino acid residue is carried out for a period of time being 1.5 times, twice, three times, four times or more longer for at least one amino acid residue selected from the group comprising or consisting of Cys 4, Thr 12, Thr 21, Asn 35, Leu 36, Leu 39, Ile 45, Thr 49, Cys 57, and Val 65 with respect to SEQ ID NO: 2 numbering, than for the other amino acid residues.

In one embodiment, the substep of coupling the next amino acid residue for a given amino acid residue is carried out for a period of time being 1.5 times, twice, three times, four times or more longer for at least one amino acid residue selected from the group comprising or consisting of Cys 4, Thr 12, Thr 21, Asn 35, Lu 36, Leu 39, Ile 45, Cys 57, and Val 65 with respect to SEQ ID NO: 2 numbering, than for the other amino acid residues.

In one embodiment, the substep of coupling the next amino acid residue for a given amino acid residue is carried out for a period of time being 1.5 times, twice, three times, four times or more longer for at least one amino acid residue selected from the group comprising or consisting of Thr 1, Cys 4, Tyr 11, Thr 12, Thr 21, Asn 35, Leu 36, Ile 45 and Thr 46 with respect to SEQ ID NO: 2 numbering, than for the other amino acid residues.

In one embodiment, the substep of coupling the next amino acid residue for a given amino acid residue is carried out for a period of time being 1.5 times, twice, three times, four times or more longer for at least one amino acid residue selected from the group comprising or consisting of Thr 1, Cys 4, Tyr 11, Thr 12, Thr 21, Asn 35, Leu 36, Ile 45, Thr 46, Cys 57, and Val 65 with respect to SEQ ID NO: 2 numbering, than for the other amino acid residues.

In one embodiment, the substep of coupling the next amino acid residue for a given amino acid residue is carried out for a period of time being 1.5 times, twice, three times, four times or more longer for at least one amino acid residue selected from the group comprising or consisting of Cys 4, Thr 12, Thr 21, Asn 35, Leu 36, and Ile 45 with respect to SEQ ID NO: 2 numbering, than for the other amino acid residues. In other words, the substep of coupling the next amino acid residue may be reiterated more times and/or carried out for a longer period of time for at least one amino acid residue as listed hereinabove with respect to SEQ ID NO: 2 numbering than for the other amino acid residues of the STxB protein or of the variant thereof.

The one skilled in the art, who is familiar with amino acid sequence alignments, can readily determine the corresponding amino acid residues in any of SEQ ID NO: 1 or SEQ ID NO: 3 to SEQ ID NO: 20, including variants thereof.

In one embodiment, the step of stepwisely coupling amino acids comprises a substep of capping unreacted amino groups.

As used herein, the term "capping" refers to the addition of a protecting group that prevents the further reaction of the molecule to which it is attached. Additionally or alternatively, the term "capping" may also refer to the chemical modification of a reacting group on a given molecule, to prevent the further reaction of said molecule.

As used herein, the term "unreacted amino groups" refers to those amino groups of free amino acid residues that have not been coupled to the growing peptide. Capping of these unreacted amino acids may be desirable to prevent undesirable coupling of these amino acid residues during subsequent iterations of the step of coupling amino acids.

In one embodiment, the substep of capping unreacted amino groups is carried out in the presence of anhydride acetic or ethanolamine, preferably in the presence of anhydride acetic.

In one embodiment, the substep of capping unreacted amino groups is carried out in the further presence of at least one base.

Suitable examples of bases used the substep of capping unreacted amino groups include, but are not limited to, N—N-methylmorpholine (NMM), diisopropylethylamine (DIEA), collidine (TMP), and triethylamine.

In a preferred embodiment, the at least one base is N-methylmorpholine (NMM).

In one embodiment, the step of stepwisely coupling amino acids comprises one or several substep(s) of washing the support, such as one, two or three substeps of washing the support.

In one embodiment, the substep of washing the support may be carried out before or after any of the substeps of removing the α amino-protecting group, coupling the next amino acid residue, and capping unreacted amino groups. In one embodiment, the substep of washing the support is carried out after each of the substeps of removing the α amino-protecting group, coupling the next amino acid residue, and capping unreacted amino groups.

In one embodiment, the substep of washing the support is carried out in the presence of a solvent.

Examples of suitable solvents for washing the support include, but are not limited to, N-methyl-2-pyrrolidone (NMP), dimethylformamide (DMF), dimethylsulfoxide (DMSO), dioxane, dichloromethane (DCM), 1-methylpyrrolidine, hexamethylenimine, $H_2O$, 2,2,2-trifluoroethanol (TFE), acetic acid (AcOH) methanol (MeOH), and mixtures thereof.

In one embodiment, the solvent for washing the support is the same than the solvent used during the substep of removing the α amino-protecting group, coupling the next amino acid residue, and/or capping unreacted amino groups.

In a preferred embodiment, the substep of washing the support is carried out in the presence of N-methyl-2-pynolidone (NMP).

In one embodiment, each substep of washing the support before or after removing the α amino-protecting group, coupling the next amino acid residue, and/or capping unreacted amino groups may be repeated more than once, such as twice, three times or more, to ensure to ensure full effectiveness of the washing.

In one embodiment, the substep of washing the support after removing the α amino-protecting group is repeated twice, three times or more, preferably is repeated three times.

In one embodiment, the substep of washing the support after coupling the next amino acid residue is repeated twice, three times or more, preferably is repeated twice.

In one embodiment, the substep of washing the support after capping unreacted amino groups is repeated twice, three times or more, preferably is repeated three times.

In one embodiment, each substep of washing the support before or after removing the α amino-protecting group, coupling the next amino acid residue, and/or capping unreacted amino groups is carried out for about 10 seconds, 20 seconds, 30 seconds, 40 seconds, 50 seconds, 60 seconds, 90 seconds, 120 seconds, 3 minutes, 4 minutes, 5 minutes, 6 minutes, 7 minutes, 8 minutes, 9 minutes, 10 minutes or more.

In one embodiment, the methods of producing a monomer or an oligomer, preferably a dimer, trimer, tetramer or more preferably, pentamer, of the STxB protein or of the variant thereof, comprise a step of deprotecting the synthetic peptide, thereby obtaining a deprotected synthetic peptide.

As previously mentioned, amino acid residues can bear protecting groups, including side chain-protecting groups, a carboxy-protecting groups, or a amino-protecting groups.

In one embodiment, the step of deprotecting the synthetic peptide comprises the removal of the α amino-protecting group of the N-terminal amino acid residue of the synthetic peptide. In one embodiment, the step of deprotecting the synthetic peptide comprises the removal of side chain-protecting groups.

In a preferred embodiment, the step of deprotecting the synthetic peptide comprises the removal of the α amino-protecting group of the N-terminal amino acid residue of the synthetic peptide.

In one embodiment, the step of deprotecting the synthetic peptide is carried out in in presence of a base or an acid, optionally in a solvent.

Examples of suitable solvents include, but are not limited to, N-methyl-2-pyrrolidone (NMP), dimethylformamide (DMF), dimethylsulfoxide (DMSO), dioxane, dichloromethane (DCM), 1-methylpyrrolidine, hexamethylenimine, $H_2O$, 2,2,2-trifluoroethanol (TFE), acetic acid (AcOH) methanol (MeOH), and mixtures thereof.

Examples of suitable bases and acids, and suitable conditions for removing a amino-protecting groups have been fully detailed hereinabove, and apply mutatis mutandis to the step of deprotecting the synthetic peptide, including for removing side chain-protecting groups.

In a preferred embodiment, the step of deprotecting the synthetic peptide is carried out in presence of a base. In a preferred embodiment, the step of deprotecting the synthetic peptide is carried out in the presence of piperidine. In a preferred embodiment, the step of deprotecting the synthetic peptide is carried out in the presence of 20% piperidine. In a preferred embodiment, the step of deprotecting the synthetic peptide is carried out in the presence of 20% piperidine in NMP or DMF, preferably in NMP.

In one embodiment, the step of deprotecting the synthetic peptide comprises one or several substep(s) of washing the support, such as one, two or three, four, five, substeps of washing the support.

In one embodiment, the substep(s) of washing the support may be carried out before or after the removal of side chain-protecting groups, a carboxy-protecting groups, and/or a amino-protecting groups. In a preferred embodiment, the substep(s) of washing the support are carried out after the removal of side chain-protecting groups, a carboxy-protecting groups, and/or a amino-protecting groups.

In one embodiment, the substep(s) of washing the support is carried out in the presence of a solvent.

Examples of suitable solvents for washing the support include, but are not limited to, N-methyl-2-pyrrolidone (NMP), dimethylformamide (DMF), dimethylsulfoxide (DMSO), dioxane, dichloromethane (DCM), 1-methylpyrrolidine, hexamethylenimine, $H_2O$, 2,2,2-trifluoroethanol (TFE), acetic acid (AcOH) methanol (MeOH), and mixtures thereof.

In one embodiment, the substep of washing the support is carried out in the presence of dichloromethane (DCM). In one embodiment, the substep of washing the support with DCM is carried out once, twice, three times, four times or five times, preferably is carried out once.

In a preferred embodiment, the substep of washing the support is carried out in the presence of N-methyl-2-pynrolidone (NMP). In one embodiment, the substep of washing the support with NMP is carried out once, twice, three times, four times or five times, preferably is carried out once.

In one embodiment, the solvent for washing the support is the same than the solvent used during the step of stepwisely coupling amino acids.

In one embodiment, the substep of washing the support is carried out in a first solvent, then in a second solvent. Preferably, the first solvent is the same than the solvent used during the step of stepwisely coupling amino acids.

In a preferred embodiment, the substep of washing the support is carried out in a first solvent, being N-methyl-2-pyrrolidone (NMP). In one embodiment, the substep of washing the support with NMP is carried out once, twice, three times, four times or five times, preferably is carried out once.

In a preferred embodiment, the substep of washing the support is further carried out in a second solvent, being dichloromethane (DCM). In one embodiment, the substep of washing the support with DCM is carried out once, twice, three times, four times or five times, preferably is carried out four times.

In one embodiment, each substep of washing the support is carried out for about 10 seconds, 20 seconds, 30 seconds, 40 seconds, 50 seconds, 60 seconds, 90 seconds, 120 seconds, 3 minutes, 4 minutes, 5 minutes, 6 minutes, 7 minutes, 8 minutes, 9 minutes, 10 minutes or more.

In one embodiment, the methods of producing a monomer or an oligomer, preferably a dimer, trimer, tetramer or more preferably, pentamer, of the STxB protein or of the variant thereof, comprise a step of cleaving the deprotected synthetic peptide from the support, thereby obtaining a free synthetic peptide.

In one embodiment, the step of cleaving the deprotected synthetic peptide from the support allows concomitant removal of side chain-protecting groups from the synthetic peptide.

In particular, where at least one pseudoproline dipeptide was inserted in the STxB sequence during synthesis, the step of cleaving the deprotected synthetic peptide from the support allows concomitant cleavage of the pseudoproline ring and conversion to the native amino acid dipeptide.

The one skilled in art is familiar with "cleavage cocktails" suitable for cleaving deprotected synthetic peptides from their support. In particular, the selection of a suitable cleavage cocktail is based upon the nature of the linker group to which the growing peptide is attached during synthesis.

Examples of suitable reagents for cleavage cocktails include, but are not limited to, water ($H_2O$), trifluoroacetic acid (TFA), hydrogen fluoride (HF), dichloromethane (DCM), phenol, triisopropylsilane (TIS), triethylsilane (TES), thioanisole, anisole, methanesulfonic acid (MsOH), trifluoromethanesulfonic acid (TFMSA), indole, thiols (such as, e.g., 1,2-ethanedithiol (EDT), 1-dodecanethiol, dithiothreitol (DTT), and the like), and mixtures thereof.

Examples of suitable cleavage cocktails and conditions for cleaving the deprotected synthetic peptide from the support include, but are not limited to:

- TFA:DCM in a ratio ranging from about 1:15 to about 1:25, preferably about 1:19 for about 30 minutes to about 2 hours, preferably about 1 hour, followed by
- TFA:DCM in a ratio ranging from about 1:0.5 to about 1:2, preferably about 1:1 for about 30 minutes to about 2 hours, preferably about 1 hour;
- TFA:phenol:$H_2O$:TIS, with from about 80% to about 95% v/v TFA, from about 2.5% to about 7.5% v/v phenol, from about 2.5% to about 7.5% v/v $H_2O$ and from about 1% to about 5% v/v TIS, preferably in a ratio of about 88:5:5:2, for about 1 to about 4 hours;
- TFA:phenol:$H_2O$:thioanisole:EDT, with from about 75% to about 90% v/v TFA, from about 2.5% to about 7.5% v/v phenol, from about 2.5% to about 7.5% v/v $H_2O$, from about 2.5% to about 7.5% v/v thioanisole and from about 2.5% to about 7.5% v/v EDT, preferably in a ratio of about 82.5:5:5:5:2.5, for about 1 to about 4 hours;
- TFA:phenol:$H_2O$:thioanisole:1-dodecanethiol, with from about 75% to about 90% v/v TFA, from about 2.5% to about 7.5% v/v phenol, from about 2.5% to about 7.5% v/v $H_2O$, from about 2.5% to about 7.5% v/v thioanisole and from about 2.5% to about 7.5% v/v 1-dodecanethiol, preferably in a ratio of about 82.5:5:5:5:2.5, for about 1 to about 4 hours;
- TFA:DT:$H_2O$:TIS, with from about 80% to about 95% v/v TFA, from about 2.5% to about 7.5% v/v DTT, from about 2.5% to about 7.5% v/v $H_2O$ and from about 1% to about 5% v/v TIS, preferably in a ratio of about 88:5:5:2, for about 1 to about 4 hours;
- TFA:EDT:$H_2O$:TIS, with from about 80% to about 95% v/v TFA, from about 2.5% to about 7.5% v/v EDT, from about 2.5% to about 7.5% v/v $H_2O$ and from about 2.5% to about 7.5% v/v TIS, preferably in a ratio of about 92.5:2.5:2.5:2.5), (90:2.5:5:2.5) or (88.5:5:5:2.5), for about 1 to about 4 hours;
- TFA:TIS:$H_2O$, with from about 80% to about 95% v/v TFA, from about 2.5% to about 7.5% v/v TIS and from about 2.5% to about 7.5% v/v $H_2O$, preferably in a ratio of about 95:2.5:2.5, for about 1 to 4 hours;
- TFA:phenol, with from about 90% to about 98% v/v TFA and from about 2% to about 10% v/v phenol, preferably in a ratio of about 95:5, for about 1 to about 4 hours;
- TFA:phenol:MsOH, with from about 80% to about 95% v/v TFA, from about 2.5% to about 7.5% v/v phenol and from about 2.5% to about 7.5% v/v MsOH, preferably in a ratio of about 95:2.5:2.5, for about 15 minutes;
- TFA:thioanisole:EDT:anisole, with from about 80% to about 95% v/v TFA, from about 2.5% to about 7.5% v/v thioanisole, from about 2.5% to about 7.5% v/v EDT and from about 1% to about 5% v/v anisole, preferably in a ratio of about 90:5:3:2, for about 1 to about 8 hours;
- TFA:TES, with from about 90% to about 98% v/v TFA and from about 2% to about 10% v/v TES, preferably in a ratio of about 95:5, for about 1 to about 4 hours;
- TFA:$H_2O$, with from about 90% to about 98% v/v TFA and from about 2% to about 10% v/v $H_2O$, preferably in a ratio of about 95:5, for about 1 to about 4 hours;
- TFA:DCM:indole, with from about 60% to about 80% v/v TFA, from about 20% to about 40% v/v DCM and from about 1% to about 10% v/v indole, preferably in a ratio of about 70:28:2, for about 1 to about 4 hours; or
- TFA:thioanisole:anisole:TIS:$H_2O$, with from about 75% to about 90% v/v TFA, from about 2.5% to about 7.5% v/v thioanisole, from about 2.5% to about 7.5% v/v anisole, from about 2.5% to about 7.5% v/v TIS and from about 2.5% to about 7.5% v/v $H_2O$, preferably in a ratio of about 82.5:5:5:2.5:5, for about 1 to about 4 hours.

In a preferred embodiment, the step of cleaving the deprotected synthetic peptide from the support is carried out in the presence of TFA:thioanisole:anisole:TIS:$H_2O$, in a ratio of about 82.5:5:5:2.5:5, for about 1 to about 4 hours, preferably for about 2 hours.

As defined hereinabove, a variant of the STxB protein includes fragments thereof, and the above-mentioned steps of a) stepwisely coupling amino acids following the amino acid sequence of the STxB protein or of the variant thereof, b) deprotecting the synthetic peptide, and c) cleaving the deprotected synthetic peptide from the support apply mutatis mutandis to peptide fragments of the STxB protein. Such peptide fragments can then be ligated together to obtain a full length STxB protein or a variant thereof.

Hence, in one embodiment, the methods of producing a monomer or an oligomer, preferably a dimer, trimer, tetramer or more preferably, pentamer, of the STxB protein or of the variant thereof, comprise a step of ligating free synthetic peptide fragments together, e.g., by native chemical ligation (NCL), thereby obtaining a free synthetic peptide.

As used herein, the term "nadve chemical ligation" or "NCL" relates to a ligation technique which involves reacting a C-terminal peptide thioester (or a thioester surrogate, such as, e.g., a hydrazide) with an N-terminal cysteinyl peptide (or a cysteinyl surrogate) to produce a native peptide bond between the two fragments.

The one skilled in the art is familiar with native chemical ligation techniques. Example 4 of the present disclosure describes an exemplary, suitable technique for performing native chemical ligation of two fragments of the STxB protein.

In an exemplary embodiment, fragments of the STxB protein may comprise or consist of the amino acid sequences set forth in SEQ ID NO: 22 and SEQ ID NO: 23.

SEQ ID NO: 22
TPDCVTGKVEYTKYNDDDTFTVKVGDKELFTNRWNLQSLLLSAQITGMTV
TIKTNA

SEQ ID NO: 23
CHNGGGFSEVIFR

In one embodiment, the methods of producing a monomer or an oligomer, preferably a dimer, trimer, tetramer or more preferably, pentamer, of the STxB protein or of the variant thereof, comprise a step of precipitating the free synthetic peptide.

In one embodiment, the step of precipitating the free synthetic peptide is carried out in the presence of a precipitating agent.

Suitable examples of precipitating agents include ethers, such as, e.g., diethyl ether (DEE), methyl tert-butyl ether (MTBE), and mixtures thereof.

In a preferred embodiment, the precipitating agent is DEE.

In a preferred embodiment, the precipitating agent is cold (i.e., below room temperature, such as, below 20° C., below 15° C., below 10° C., below 5° C., below 0° C., below –5° C., below –10° C., below –15° C., below –20° C., preferably at about 4° C. or –20° C.).

In a preferred embodiment, the precipitating agent is cold DEE.

In one embodiment, the step of precipitating the free synthetic peptide may comprise a substep of air drying the precipitated free synthetic peptide.

In one embodiment, the step of precipitating the free synthetic peptide may comprise a substep of resuspending the precipitated free synthetic peptide. Resuspension of the precipitated free synthetic peptide may be carried out in any solvent known by the one skilled in the art. In one embodiment, resuspension of the precipitated free synthetic peptide is carried out in acetic acid, preferably 10% acetic acid in $H_2O$/acetonitrile.

In one embodiment, the step of precipitating the free synthetic peptide may comprise a substep of lyophilizing the precipitated free synthetic peptide. Methods and techniques to lyophilize a product, such as the free synthetic peptide, are well known to the one skilled in the art.

In one embodiment, the methods of producing a monomer or an oligomer, preferably a dimer, trimer, tetramer or more preferably, pentamer, of the STxB protein or of the variant thereof, comprise a step of oxidizing the free synthetic peptide.

As used herein, the term "oxidizing" refers to the formation of disulfide bonds between the thiol groups of cysteine residues in the free synthetic peptide. In the context of the present invention, the step of oxidizing the free synthetic peptide allows the formation of a disulfide bond between Cys 4 and Cys 57 of the free synthetic peptide with SEQ ID NO: 2. The one skilled in the art, who is familiar with amino acid sequence alignments, can readily determine the corresponding amino acid residues in any of SEQ ID NO: 1 or SEQ ID NO: 3 to SEQ ID NO: 20, including variants thereof.

In one embodiment, the step of oxidizing the free synthetic peptide is carried out in the presence of an oxidizing buffer. Alternatively, the step of oxidizing the free synthetic peptide may be carried out in absence of an oxidizing buffer, e.g., solely with the surrounding oxygen and/or oxygen present in any buffer solution used throughout the method.

Such oxidizing buffer may comprise or consist of dimethylsulfoxide (DMSO). The use of dimethylsulfoxide (DMSO) in the oxidizing buffer has been well documented over the past decades. See, e.g., Tam et al., 1991. *J Am Chem Soc.* 113 (17):6657-62. Other oxidizing agents are also suitable in place of DMSO, including, but not limited to, disulfiram, cystine/cysteine, GSH-GSSG, trans-4,5-dihydroxy-1,2-dithiane, and the like.

In one embodiment, the oxidizing buffer may further comprise salts, buffering agents and/or solvents.

As used herein, the term "buffering agent" refers to an agent suitable for maintaining the pH of a solution, such as, e.g., the oxidizing buffer.

Examples of suitable buffering agents include, but are not limited to, N-(2-acetamido)-2-aminoethanesulfonic acid (ACES), acetamidoglycine, 2-[(2-amino-2-oxoethyl)-(carboxymethyl)amino]acetic acid (ADA), 2-amino-2-methyl-propan-1-ol (AMP), N,N-bis(2-hydroxyethyl)-2-aminoethanesulfonic acid (BES), 2-(bis(2-hydroxyethyl)amino)acetic acid (bicine), 2-[bis(2-hydroxyethyl)amino]-2-(hydroxymethyl)propane-1,3-diol (bis-tris methane), 2,2'-(propane-1,3-diyldiimino)bis[2-(hydroxymethyl)propane-1,3-diol](bis-tris propane), 3-(cyclohexylamino)-1-propanesulfonic acid (CAPS), N-cyclohexyl-2-hydroxyl-3-aminopropanesulfonic acid (CAPSO), 2-(cyclohexylamino)ethanesulfonic acid (CHES), 2-aminoethyl(trimethyl)azanium:chloride:hydrochloride (cholamine chloride), 2-aminoacetamide (glycinamide), 2-[(2-aminoacetyl)amino]acetic acid (glycylglycine), N-(2-hydroxyethyl)piperazine-N'-(4-butanesulfonic acid) (HEPBS), 2-[4-(2-hydroxyethyl)piperazin-1-yl]ethanesulfonic acid (HEPES), 3-[4-(2-hydroxyethyl)piperazin-1-yl]propane-1-sulfonic acid (HEPPS), 2-morpholin-4-ylethanesulfonic acid (MES), 3-morpholinopropane-1-sulfonic acid (MOPS), 2-hydroxy-3-morpholin-4-ylpropane-1-sulfonic acid (MOPSO), 1,4-piperazinediethanesulfonic acid (PIPES), 3-{[1,3-dihydroxy-2-(hydroxymethyl)propan-2-yl]amino}propane-1-sulfonic acid (TAPS), 3-[[1,3-dihydroxy-2-(hydroxymethyl)propan-2-yl]amino]-2-hydroxypropane-1-sulfonic acid (TAPSO), triethanolamine (TEA), 2-[[1,3-dihydroxy-2-(hydroxymethyl)propan-2-yl]amino]

ethanesulfonic acid (TES), N-(2-hydroxy-1,1-bis(hydroxymethyl)ethyl)glycine (tricine), 2-amino-2-(hydroxymethyl)propane-1,3-diol (Tris).

Further examples of suitable buffering agents include salts of a weak acid and a weak base such as carbonate, bicarbonate, and phosphate buffers, in particular sodium phosphate.

In one embodiment, the buffering agent maintains the oxidizing buffer at a pH ranging from about 6 to about 10, preferably from about 7 to about 9, preferably at a pH of about 8.

In a preferred embodiment, the oxidizing buffer comprises or consists of water, sodium phosphate, guanidine hydrochloride (GuHCl) and DMSO.

In one embodiment, the methods of producing a monomer or an oligomer, preferably a dimer, trimer, tetramer or more preferably, pentamer, of the STxB protein or of the variant thereof, comprise a step of refolding the free synthetic peptide.

As used herein, the term "refolding" refers to a process of introducing or reintroducing secondary and tertiary structures to a protein that has had some or all of them removed, either in vitro or in vivo, as a result of, e.g., expression conditions or intentional denaturation and/or reduction. Consistently, a "refolded protein" is a protein that has had some or all of its native secondary or tertiary structure introduced or reintroduced.

In one embodiment, the step of refolding the free synthetic peptide comprise a substep of solubilizing the free synthetic peptide, thereby obtaining a solubilized free synthetic peptide.

The free synthetic peptide may be solubilized by combining it with a solubilization buffer that comprises a denaturing agent.

In one embodiment, the solubilization buffer comprises one or more agents for solubilizing proteins, such as denaturing (or chaotropic) agents.

Suitable examples of denaturing agents include, but are not limited to, guanidium, guanidium hydrochloride, guanidium chloride, guanidium thiocyanate, urea, thiourea, lithium perchlorate, magnesium chloride, phenol, betain, sarcosine, carbamoyl sarcosine, taurine, dimethylsulfoxide (DMSO), alcohols (such as propanol, butanol and ethanol), detergents (such as sodium dodecyl sulfate [SDS], N-lauroyl sarcosine, zwittergents, non-detergent sulfobetains [NDSB], Triton X-100, Nonidet™ P-40, Tween™, Brij™ and the like), hydroxides (such as sodium potassium hydroxide), and combinations thereof.

In one embodiment, the solubilization buffer comprises a denaturing agent at a concentration suitable for protein denaturation. The one skilled in the art is familiar with denaturing agents and knows at which concentration to use a given denaturing agent to achieve protein denaturation.

In one embodiment, the solubilization buffer comprises a denaturing agent at a concentration ranging from about 1 M to about 9 M, such as 1 M, 2 M, 3 M, 4 M, 5 M, 6 M, 7 M, 8 M or 9 M.

In a preferred embodiment, the solubilization buffer comprises guanidinium or a salt thereof, preferably guanidinium hydrochloride. In a preferred embodiment, the solubilization buffer comprises guanidinium or a salt thereof, preferably guanidinium hydrochloride at a concentration ranging from about 1 M to about 9 M, preferably from about 5 M to about 9 M, more preferably from about 6 M to about 7 M, even more preferably of about 6 M or 7 M.

In one embodiment, the substep of solubilizing the free synthetic peptide is combined with the step of oxidizing the free synthetic peptide. In this embodiment, the oxidizing buffer and the solubilization buffer are identical and both oxidization and solubilization of the free synthetic peptide are carried out simultaneously in a single step.

In one embodiment, the step of refolding the free synthetic peptide comprise a substep of dializing the free synthetic peptide.

As used herein, the terms "dialyzing" or "dialysis" refer to any method and/or device that separates substances in solution by means of their unequal diffusion through semi-permeable membranes and/or membranes having a specific pore size. The composition of one solution, the "dialysate", is used to deplete the composition of the other solution, the "feed solution", of one or more of its molecules.

In one embodiment, the feed solution comprises the solubilized free synthetic peptide.

In one embodiment, the substep of dialyzing the free synthetic peptide is carried out by any method known by the one skilled in the art, including, but not limited to, dialysis, electrodialysis, microfiltration, tangential flow microfiltration, ultrafiltration, tangential flow ultrafiltration, nanofiltration, tangential flow nanofiltration, reverse osmosis, pervaporation, gas permeation and membrane distillation.

In one embodiment, the substep of dialyzing the free synthetic peptide comprises a cascade dialysis, i.e., dialysis is stepwisely carried out against more than one dialysate.

In one embodiment, the cascade dialysis comprises 2, 3, 4, 5 or more dialysates. In one embodiment, all dialysates have the same or a similar composition (such as same constituents, at the same or different concentrations). In one embodiment, at least 2, such as 2, 3, 4 or 5 dialysates have a different composition (such as different constituents).

In one embodiment, a first dialysate may have the same or a similar, or a different composition than the solubilization buffer comprising a denaturing agent as described hereinabove. In this embodiment however, the first dialysate comprises a denaturing agent in a lower concentration than in the solubilization buffer.

For example, the first dialysate may comprise or consist of a denaturing agent at a concentration ranging from about 0 M to about 6 M, such as 0 M, 1 M, 2 M, 3 M, 4 M, 5 M or 6 M. The one skilled in art is familiar with protein refolding by dialysis and will readily know which concentration of denaturing agent to use, in order to achieve efficient yet adequate refolding.

In one embodiment, a last dialysate has a different composition than the solubilization buffer comprising a denaturing agent as described hereinabove. In particular, the last dialysate is devoid of denaturing agent, i.e., comprises 0 M of denaturing agent.

For example, the last dialysate may comprise or consist of any suitable salt, buffering agent and/or solvent known by the one skilled in the art, and which is/are suitable for maintaining a protein in a native state (i.e., in a folded state).

Between the first and the last dialysates, any number of intermediate dialysates can be used, with the proviso that a given dialysate comprises a denaturing agent—if at all—in a lower concentration than in the previous dialysate(s).

In other words, it will be apparent to the one skilled in the art that the substep of dialyzing the free synthetic peptide shall be carried out by stepwisely lowering the concentration of denaturing agent, until all denaturing agent has been depleted from the feed solution.

In a preferred embodiment, the substep of dialyzing the free synthetic peptide comprises:
(1) dialyzing the free synthetic peptide against a first dialysate comprising or consisting of a lower concentration of denaturing agent than in the solubilization buffer;
(2) optionally, dialyzing the free synthetic peptide against at least a second dialysate (such as a second dialysate; a second and a third dialysate; or a second, a third and a fourth dialysate) comprising or consisting of a lower concentration of denaturing agent than the previous dialysate; and
(3) dialyzing the free synthetic peptide against at least one last dialysate (such as one, two, three or more last dialysates) devoid of denaturing agent.

In one embodiment where more than one, such as two, three or more last dialysates are used, each of these dialysates may have the same composition or a different composition, with the proviso that they remain devoid of denaturing agent.

In a preferred embodiment, the substep of dialyzing the free synthetic peptide comprises:
(1) dialyzing the free synthetic peptide against a first dialysate comprising or consisting of 3 M of denaturing agent, preferably of guanidinium hydrochloride;
(2) dialyzing the free synthetic peptide against a second dialysate comprising or consisting of 1 M of denaturing agent, preferably of guanidinium hydrochloride;
(3) dialyzing the free synthetic peptide against at least one last dialysate (such as one, two, three or more last dialysates) comprising or consisting of 0 M of denaturing agent, preferably comprising or consisting of phosphate-buffered saline (PBS).

In a preferred embodiment, the substep of dialyzing the free synthetic peptide comprises:
(1) dialyzing the free synthetic peptide against a first dialysate comprising or consisting of 3 M of guanidinium hydrochloride, sodium phosphate and EDTA;
(2) dialyzing the free synthetic peptide against a second dialysate comprising or consisting of 1 M of guanidinium hydrochloride, sodium phosphate and EDTA;
(3) subsequently dialyzing the free synthetic peptide against three last dialysates, each comprising or consisting of phosphate-buffered saline (PBS).

In one embodiment, the methods of producing a monomer or an oligomer, preferably a dimer, trimer, tetramer or more preferably, pentamer, of the STxB protein or of the variant thereof, do not comprise a step of purifying the STxB protein or the variant thereof.

Purification techniques are well known from the skilled artisan, and include, without limitation, affinity chromatography, column chromatography, displacement chromatography, electrochromatography, gas chromatography, high-performance liquid chromatography (HPLC), capillary electrochromatography, ion chromatography, micellar electrokinetic chromatography, normal-phase chromatography, paper chromatography, reversed-phase chromatography, size-exclusion chromatography, thin-layer chromatography, two-dimensional chromatography, gas chromatography-mass spectrometry, liquid chromatography-mass spectrometry, pyrolysis-gas chromatography-mass spectrometry, and combinations thereof.

In one embodiment, the methods of producing a monomer or an oligomer, preferably a dimer, trimer, tetramer or more preferably, pentamer, of the STxB protein or of the variant thereof, do not comprise a step of purifying the STxB protein or the variant thereof by chromatography.

The present invention further relates to a monomer of a Shiga toxin B-subunit (STxB) protein or of a variant thereof according to the present invention, obtainable, obtained or directly obtained by the method of producing a monomer of the STxB protein or of the variant thereof according to the present invention.

The present invention further relates to an oligomer (including homomers and heteromers), such as a dimer (including homodimers and heterodimers), trimer (including homotrimers and heterotrimers), tetramer (including homotetramers and heterotetramers) or preferably, a pentamer (including homopentamers and heteropentamers), of a Shiga toxin B-subunit (STxB) protein or of a variant thereof according to the present invention, obtainable, obtained or directly obtained by the method of producing an oligomer of the STxB protein or of the variant thereof according to the present invention.

The present invention further relates to a composition comprising at least one oligomer (including homomers and heteromers), such as at least one dimer (including homodimers and heterodimers), trimer (including homotrimers and heterotrimers), tetramer (including homotetramers and heterotetramers) or preferably, at least one pentamer (including homopentamers and heteropentamers) of a Shiga toxin B-subunit (STxB) protein or of a variant thereof, obtainable, obtained or directly obtained by the method of producing a composition comprising an oligomer of the STxB protein or of the variant thereof according to the present invention.

The present disclosure relates to a monomer of a Shiga toxin B-subunit (STxB) protein or of a variant thereof comprising at least one non-proteinogenic amino acid residue.

In one embodiment, said STxB protein or the variant thereof has an amino acid sequence with at least 60% identity to the amino acid sequence set forth in SEQ ID NO: 2.

In one embodiment, the variant thereof includes a homolog, a fragment, a mutant, and a conjugate of the STxB protein.

In one embodiment, the homolog of the STxB protein or the variant thereof has an amino acid sequence with at least 60% sequence identity to an amino acid sequence selected from the group comprising SEQ ID NO: 4, SEQ ID NO: 6, SEQ ID NO: 8, SEQ ID NO: 10, SEQ ID NO: 12, SEQ ID NO: 14, SEQ ID NO: 16, SEQ ID NO: 18 or SEQ ID NO: 20; and/or the conjugate of the STxB protein or the variant thereof comprises a payload, preferably selected from the group comprising chemotherapeutic agents, targeted therapy agents, cytotoxic agents, antibiotics, antivirals, cell cycle-synchronizing agents, ligands for cellular receptors, immunomodulatory agents, pro-apoptotic agents, anti-angiogenic agents, cytokines, growth factors, antibodies or antigen-binding fragments thereof, antigens, hormones, coding or non-coding oligonucleotides, photodetectable labels, contrast agents, and radiolabels.

In one embodiment, said STxB protein or the variant thereof is not a recombinant protein.

The present disclosure further relates to a composition comprising a pentamer of a Shiga toxin B-subunit (STxB) protein or of a variant thereof, wherein at least 50% of said pentamer comprises at least one monomer according to the present invention, preferably at least 50% of said pentamer comprises five monomers according to the present invention.

In one embodiment, the at least one non-proteinogenic amino acid residue is different in at least two of the five monomers of the STxB protein or of the variant thereof;

and/or at least two monomers of the STxB protein or of the variant thereof comprise a payload, preferably each payload is independently selected from the group comprising chemotherapeutic agents, targeted therapy agents, cytotoxic agents, antibiotics, antivirals, cell cycle-synchronizing agents, ligands for cellular receptors, immunomodulatory agents, pro-apoptotic agents, anti-angiogenic agents, cytokines, growth factors, antibodies or antigen-binding fragments thereof, antigens, hormones, coding or non-coding oligonucleotides, photodetectable labels, contrast agents, and radiolabels.

In one embodiment, said composition is substantially free of impurities following the guidelines of the European Pharmacopoeia 9.8, preferably is substantially free of bacterial endotoxins following section 2.6.14 of the guidelines of the European Pharmacopoeia 9.8.

The present disclosure further relates to a method of producing the monomer according to the present invention; or the composition according to the present invention, by peptide chemical synthesis, preferably by solid-phase peptide synthesis, more preferably by stepwise solid-phase peptide synthesis.

In one embodiment, the method comprising the steps of:
a) stepwisely coupling amino acid residues onto a support following an amino acid sequence with at least 60% identity to the amino acid sequence set forth in SEQ ID NO: 2,
  wherein said amino acid residues comprise α amino-protecting groups and optionally side chain-protecting groups,
  wherein at least one amino acid residue is a non-proteinogenic amino acid residue, and
  wherein coupling is carried out in presence of at least one coupling agent and optionally, at least one base and/or at least one additive, thereby obtaining a synthetic peptide;
b) deprotecting the synthetic peptide obtained from step a) by removing:
  b1) the final α amino-protecting group, and
  b2) optionally, the side-chain protecting-groups,
  thereby obtaining a deprotected synthetic peptide; and
c) cleaving the deprotected synthetic peptide obtained from step b) from the support,
thereby obtaining a free monomer or pentamer of the STxB protein or of the variant thereof.

In one embodiment, step a) comprises the following sequence of substeps:
  a1) removing the α amino-protecting group from the support or from the N-terminal amino acid of the synthetic peptide;
  a2) optionally, washing the support;
  a3) coupling the next amino acid following an amino acid sequence with at least 60% identity to the amino acid sequence set forth in SEQ ID NO: 2 in a linear C- to N-terminal direction;
  a4) optionally, washing the support;
  a5) optionally, capping unreacted amino groups; and
  a6) optionally, washing the support.

In one embodiment, step a) is carried out at least twice to couple each amino acid at a given position of the amino acid sequence with at least 60% identity to the amino acid sequence set forth in SEQ ID NO: 2; and/or step a) is carried out up to four times to couple at least one amino acid at a given position selected from the group comprising Cys 4, Thr 12, Thr 21, Asn 35, Leu 36, Leu 39, Ile 45, Thr 49, Cys 57, and Val 65; with respect to SEQ ID NO: 2 numbering.

In one embodiment, the method further comprises one or more of the steps of:
d) precipitating the free monomer or pentamer of the STxB protein or of the variant thereof obtained from step c), and optionally air-drying and/or lyophilizing the precipitated STxB protein or the variant thereof;
e) oxidizing the free monomer or pentamer of the STxB protein or of the variant thereof obtained from step c) or d) under conditions suitable for the formation of an intramolecular disulfide bond between Cys 4 and Cys 57 with respect to SEQ ID NO: 2 numbering;
f) refolding the free monomer or pentamer of the STxB protein or of the variant thereof obtained from step c), d) or e) by dialyzing said protein or the variant thereof against at least one dialysate.

The present disclosure further relates to the monomer according to the present invention or the composition according to the present invention:
  for use in treating a disease in a subject in need thereof, optionally wherein the disease is selected from cancer, infectious diseases, immune disorders and inflammatory disorders; or
  for use in vaccinating in a subject in need thereof; or
  for use in an in vivo method of diagnosing a disease in a subject in need thereof, optionally wherein the disease is selected from cancer, infectious diseases, immune disorders and inflammatory disorders;
  preferably wherein the monomer or the pentamer of the STxB protein or of the variant thereof is conjugated to at least one payload,
  preferably the payload is selected from the group comprising or consisting of chemotherapeutic agents, targeted therapy agents, cytotoxic agents, antibiotics, antivirals, cell cycle-synchronizing agents, ligands for cellular receptors, immunomodulatory agents, pro-apoptotic agents, anti-angiogenic agents, cytokines, growth factors, antibodies or antigen-binding fragments thereof, antigens, hormones, coding or non-coding oligonucleotides, photodetectable labels, contrast agents and radiolabels.

The present disclosure further relates to a use of the monomer according to the present invention or the composition according to the present invention, as a contrast agent;
  preferably wherein the monomer or the pentamer of the STxB protein or of the variant thereof is conjugated to at least one payload,
  preferably the payload is selected from the group comprising or consisting of photodetectable labels, contrast agents and radiolabels.

BRIEF DESCRIPTION OF THE DRAWINGS

FIGS. 1A to 1D are four chromatograms illustrating the UPLC-MS analysis of crude STxB peptides from two independent synthesis batches (1A and 1B, respectively, with absorption wavelength=214 nm, and x-axis=time, in minutes) after cleavage. 1C and 1D show the mass spectrum of the portion underlined in black in 1A and 1B, respectively, with x-axis=m/z.

STxB was labelled with mouse monoclonal anti-STxB antibodies (clone 13C4) (left panels). Golgi was labelled with rabbit polyclonal anti-giantin antibodies (center panels). Merge (right panels): STxB channel in green, Golgi channel in red.

Figure 7:
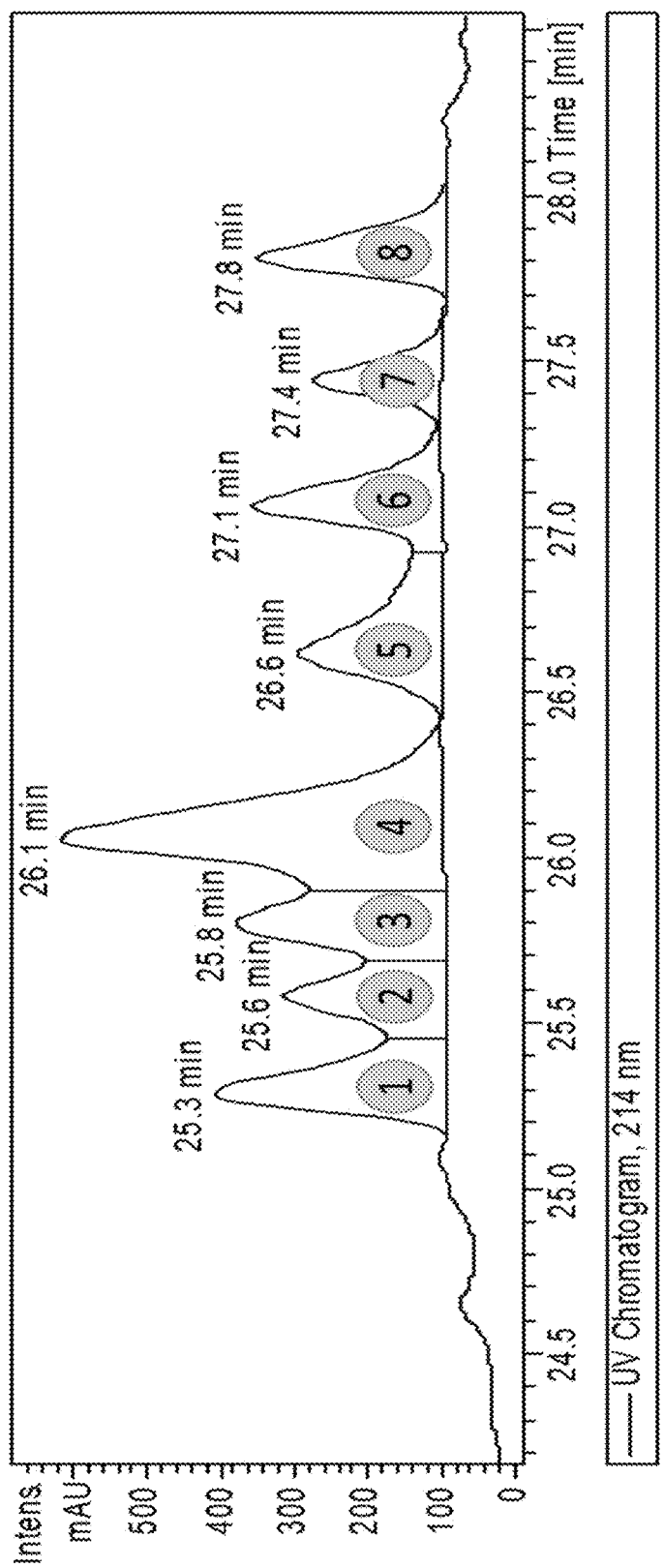
Figure 8A:
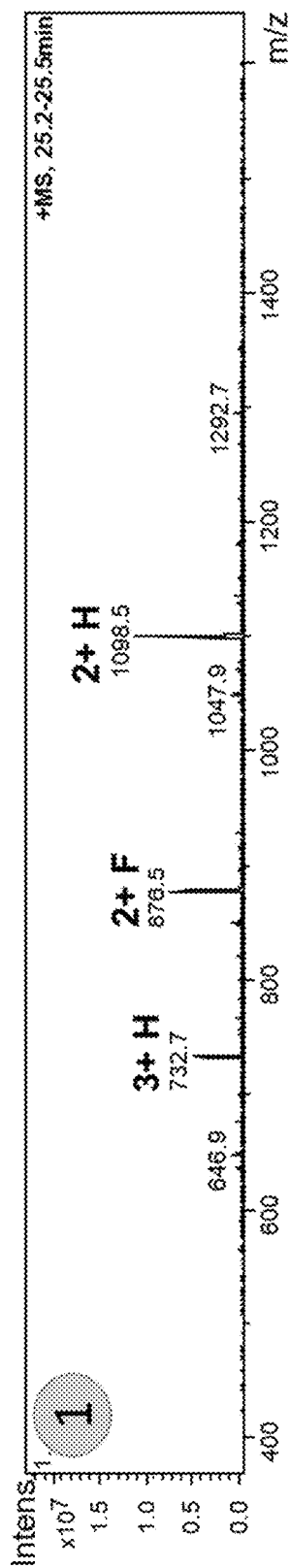
Figure 8B:
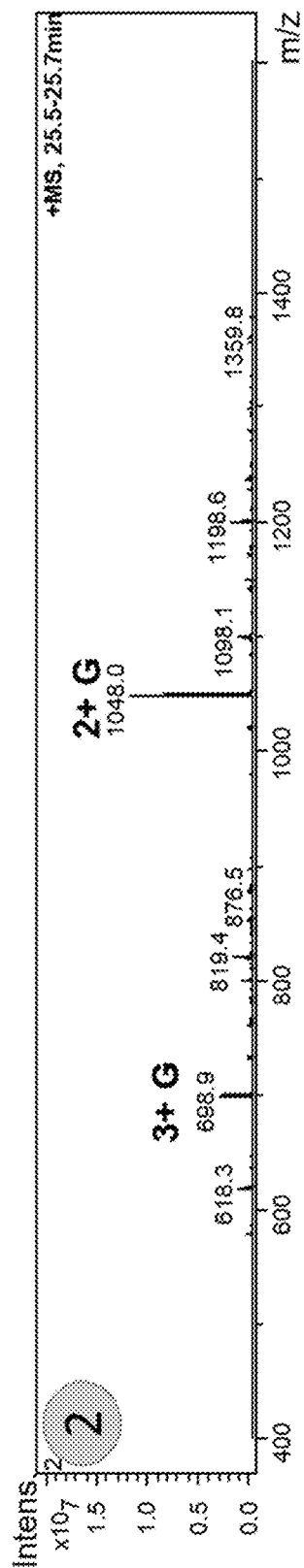
Figure 8C:
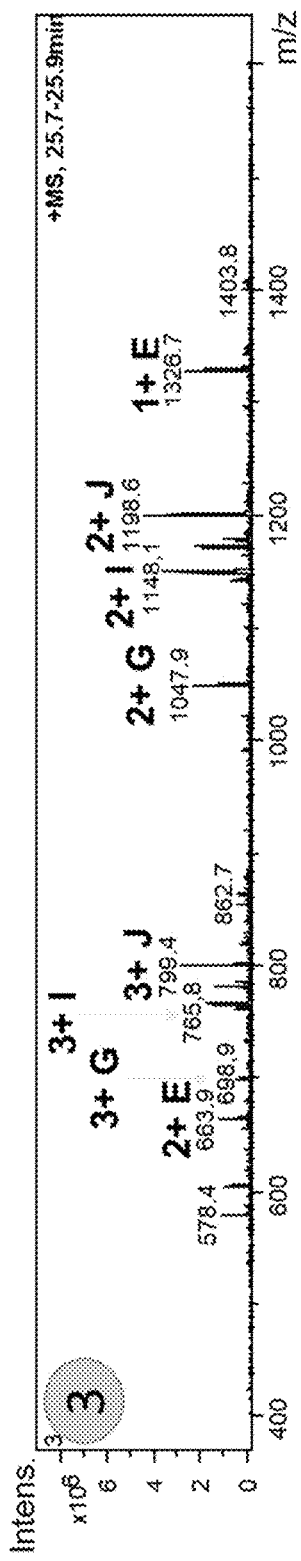
Figure 8D:
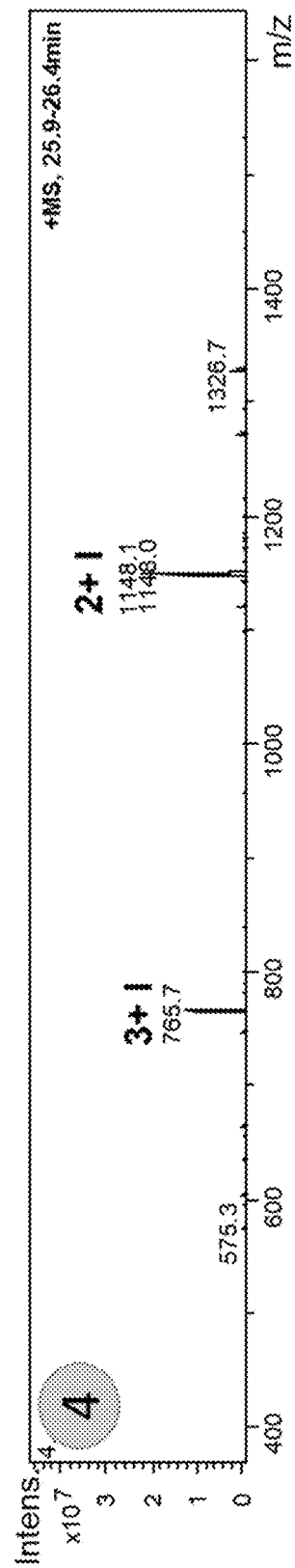
Figure 8E:
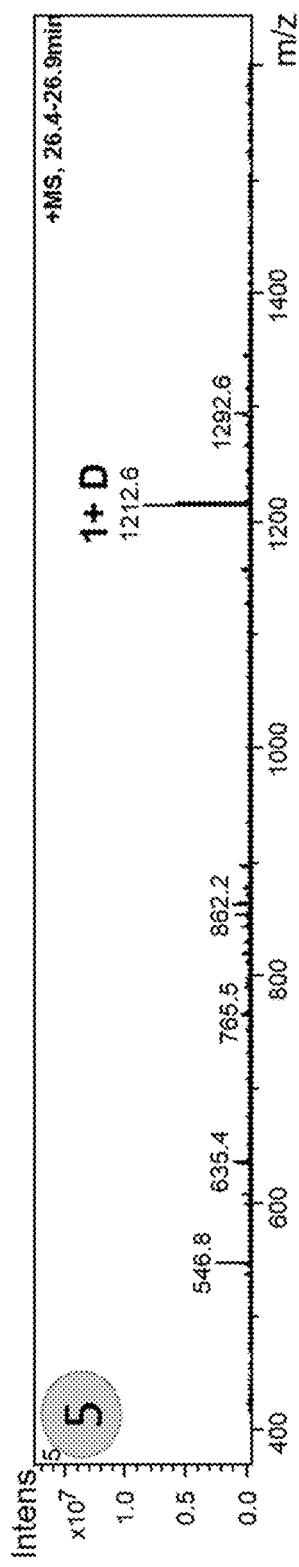
Figure 8F:
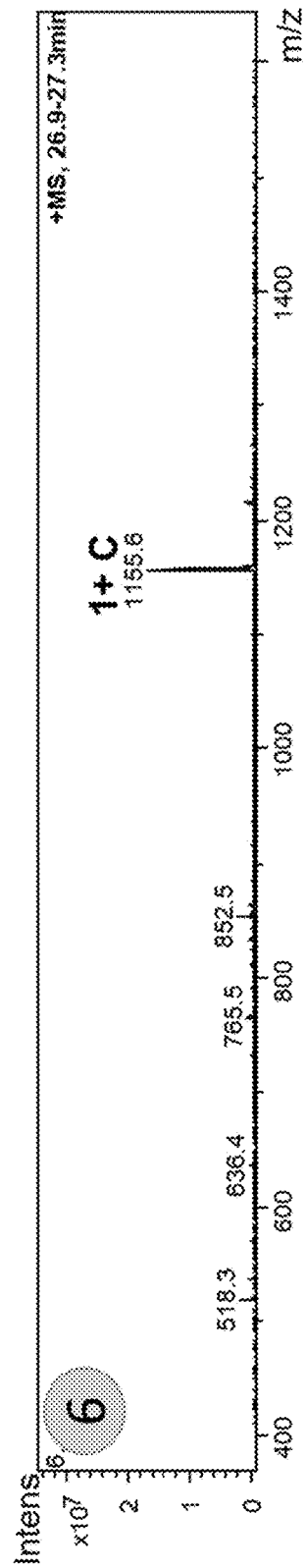
Figure 8G:
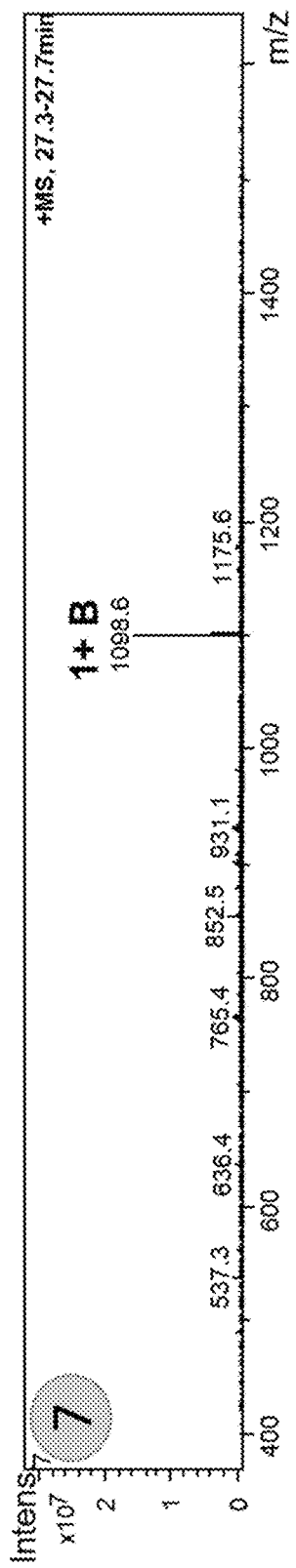
Figure 8H:
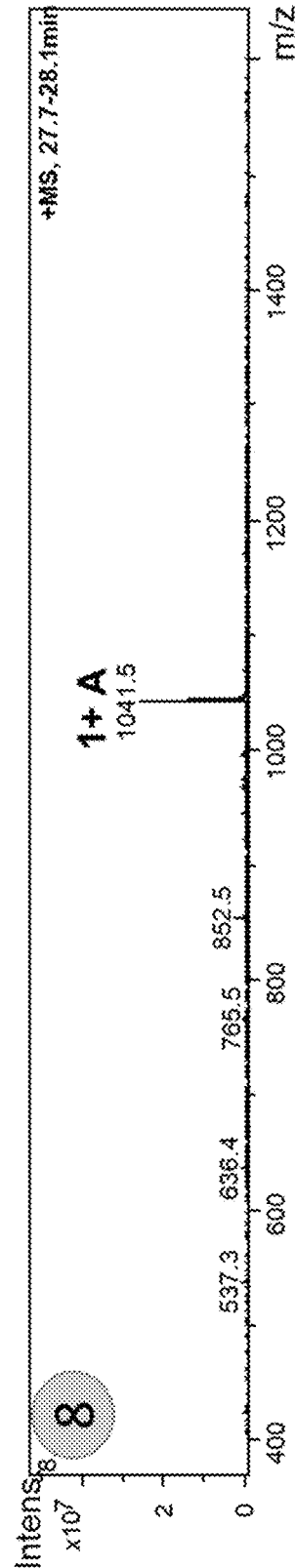

FIG. 7 is a chromatogram illustrating the HPLC-MS analysis of the STxB-Cys-amide synthetized without pseudoprolines and with double coupling, with absorption wavelength=214 nm, and x-axis=time, in minutes. The eight detection peaks are numbered in grey circles.

FIGS. 8A to 8H are eight chromatograms illustrating the ESI+ spectra from each of the chromatogram detection peaks numbered 1 to 8 in FIG. 7, with x-axis=m/z. 8A: detection peak 1; 8B: detection peak 2; 8C: detection peak 3; 8D: detection peak 4; 8E: detection peak 5; 8F: detection peak 6; 8G: detection peak 7; 8H: detection peak 8.

Figure 9A:
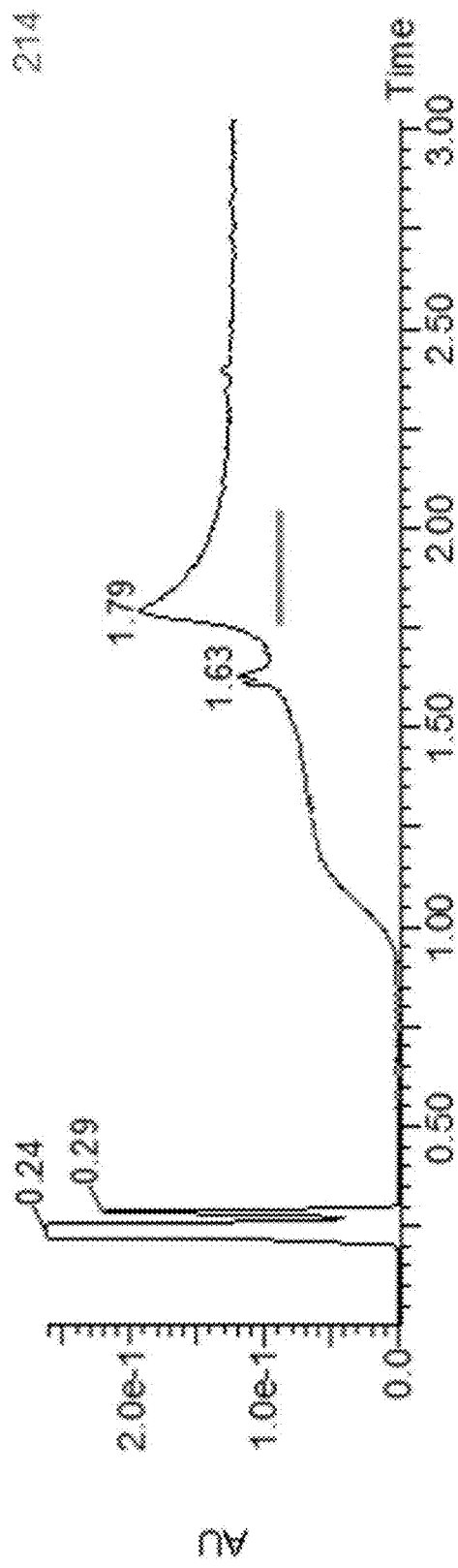
Figure 9B:
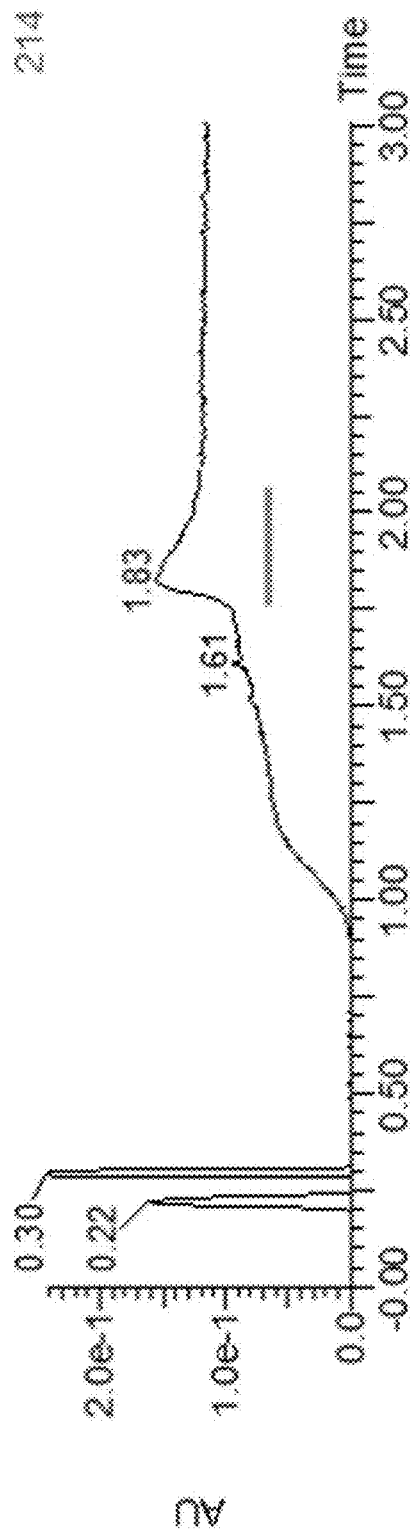

FIGS. 9A and 9B are two chromatograms illustrating the UPLC-MS analysis of crude STxB-Cys-amide peptide (9A) and folded STxB-Cys-amide peptide (9B) after synthesis with 6 pseudoprolines and double or quadruple coupling. Absorption wavelength: 214 nm, x-axis: time, in minutes.

Figure 10:
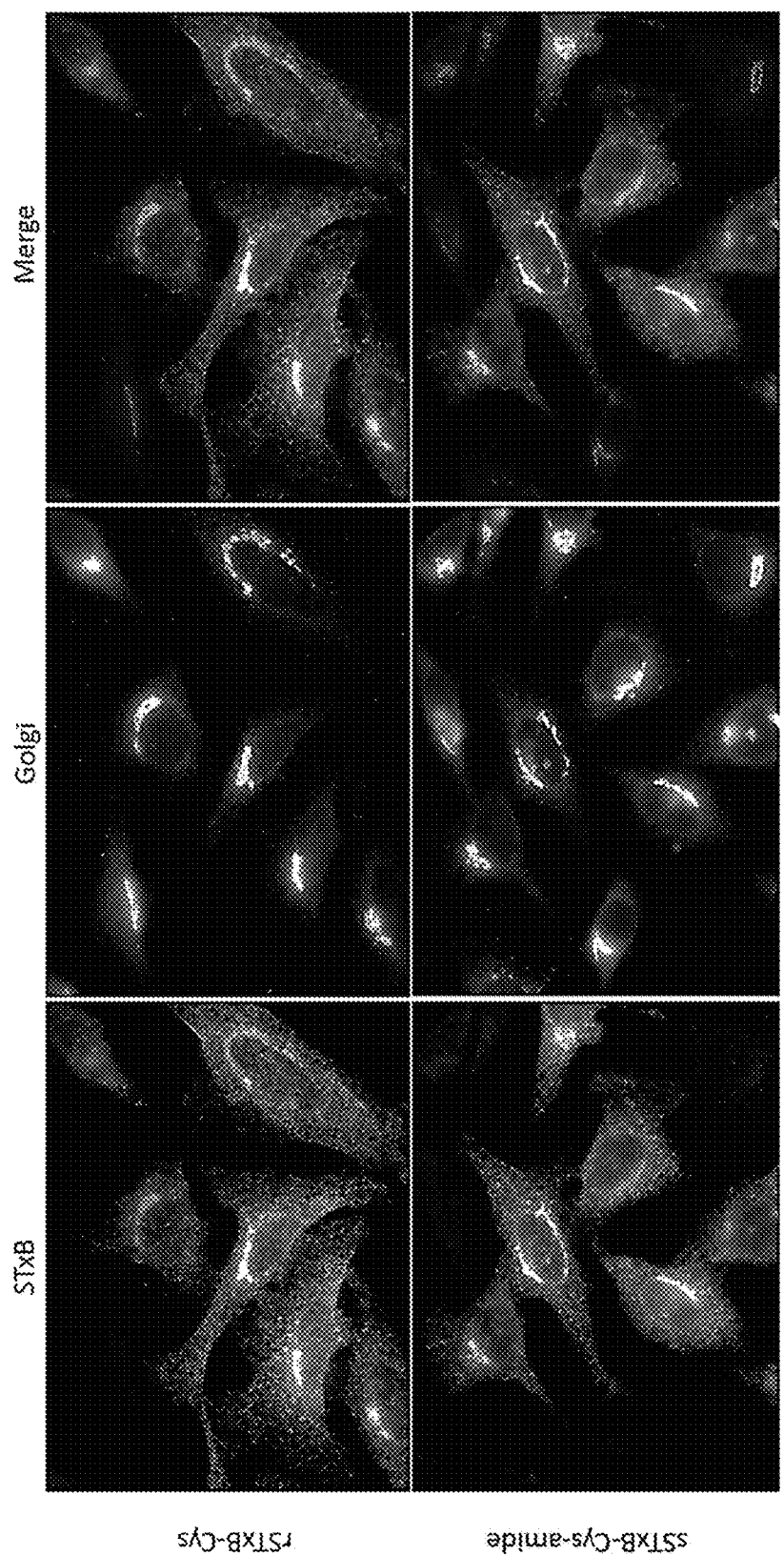

FIG. 10 (filed in color) is a set of 6 photographs, showing colocalization of recombinant [rSTxB-Cys] or synthetic [sSTxB-Cys-amide]STxB-Cys protein with the Golgi. Merge: STxB channel in green, Golgi channel in red.

EXAMPLES

The present invention is further illustrated by the following examples.

Example 1

Solid-Phase Synthesis of Shiga Toxin B-Subunit (STxB) Protein

Material and Methods

Reagents

Solid-phase synthesis of full length monomeric STxB with SEQ ID NO: 2 was performed on a Prelude Instrument (Gyros protein Technologies), at 12.5 µmol scale, using a Fmoc-Arg(Pbf)-Wang low loading resin (Novabiochem). This resin is pre-loaded with a arginine residue comprising an α amino-protecting group (fluorenylmethyloxycarbonyl; Fmoc), and a side-chain protecting-group (2,2,4,6,7-pentamethyldihydrobenzofuran-5-sulfonyl; Pbf).

```
                                        SEQ ID NO: 2
TPDCVTGKVEYTKYNDDDTFTVKVGDKELFTNRWNLQSLLLSAQITGMTV
TIKTNACHNGGGFSEVIFR
```

Amino acids and pseudoprolines were purchased from Novabiochem.

N-methylmorpholine (NMM), acetic anhydride ($Ac_2O$), acetic acid, thioanisole, anisole, triisopropylsilane (TIS), sodium phosphate monobasic, sodium phosphate dibasic and dimethyl sulfoxide (DMSO) were obtained from Sigma Aldrich.

2-(6-chloro-1H-benzotriazol-1-yl)-N,N,N',N'-tetramethylaminium hexafluorophosphate (HCTU) was obtained from VWR.

Dichloromethane (DCM), piperidine and diethyl ether were purchased from Carlo Erba.

Dimethylformamide (DMF) was obtained from Merck Millipore.

N-methyl-2-pyrrolidone (NMP) was obtained from BDH Chemicals.

Trifluoroacetic acid (TFA) was purchased from Fisher Scientific.

Guanidine hydrochloride (GuHCl) was purchased from Calbiochem.

Synthesis

The resin was swelled twice in 3 mL DCM for 30 seconds with mixing, then once in 3 mL NMP for 5 minutes with mixing.

Standard Synthesis Cycle

The synthesis workflow was set as follows on the Prelude Instrument, with one cycle being defined as substeps (1) to (6) defined below, each cycle leading to the addition of one amino acid to the growing peptide, in a linear C- to N-terminal direction following SEQ ID NO: 2.

(1) Deprotection

This substep was carried out twice in a row per cycle, with 2 mL of 20% piperidine in NMP for 3 minutes each time, with mixing.

(2) Washes

This substep was carried out three times in a row per cycle, with 3 mL of NMP for 30 seconds each time, with mixing.

(3) Coupling

This substep was carried out twice in a row per cycle, with 1300 µL of Fmoc-protected amino acid (200 mM in NMP=20.8 eq.; except for cysteine residues: 200 mM in DMF=20.8 eq), 1000 µL of HCTU (250 mM in NMP=20 eq.) and 500 µL of NMM (1 M in NMP=40 eq.) for 10 minutes each time, with mixing.
(4) Washes This substep was carried out twice in a row per cycle, with 3 mL of NMP for 30 seconds each time, with mixing.
(5) Capping This substep was carried out once per cycle, with 2000 µL of Ac$_2$O (250 mM in NMP) and 500 µL of NMM (1 M in NMP=40 eq.) for 5 minutes, with mixing.
(6) Washes This substep was carried out three times in a row per cycle, with 3 mL of NMP for 30 seconds each time, with mixing.

This synthesis workflow therefore includes a systematic double coupling (substep (3)) per amino acid residue.
Adjusted Synthesis Cycle In the course of the synthesis protocol setup, difficult positions were identified (i.e., amino acid positions in SEQ ID NO: 2 where one cycle with double coupling does not yield satisfactory levels of amino acid addition).

For the following positions, a quadruple coupling (substep (3)) was implemented: Cys 4, Thr 12, Thr 21, Asn 35, Leu 36, Leu 39, Ile 45, Thr 49, Cys 57, and Val 65 (with respect to SEQ ID NO: 2 numbering). The synthesis workflow was therefore adapted as follows for these difficult positions:
(1) Deprotection This substep was carried out twice in a row per cycle, with 2 mL of 20% piperidine in NMP for 3 minutes each time, with mixing.
(2) Washes This substep was carried out three times in a row per cycle, with 3 mL of NMP for 30 seconds each time, with mixing.
(3) Coupling This substep was carried out four times in a row per cycle, with 1300 µL of Fmoc-protected amino acid (200 mM in NMP=20.8 eq.; except for cysteine residues: 200 mM in DMF=20.8 eq), 1000 µL of HCTU (250 mM in NMP=20 eq.) and 500 µL of NMM (1 M in NMP=40 eq.) for 10 minutes each time, with mixing.
(4) Washes This substep was carried out twice in a row per cycle, with 3 mL of NMP for 30 seconds each time, with mixing.
(5) Capping This substep was carried out once per cycle, with 2000 µL of Ac$_2$O (250 mM in NMP) and 500 µL of NMM (1 M in NMP=40 eq.) for 5 minutes, with mixing.
(6) Washes This substep was carried out three times in a row per cycle, with 3 mL of NMP for 30 seconds each time, with mixing.
Final Deprotection Once the whole STxB peptide with SEQ ID NO: 2 was synthetized, the final α amino-protecting group (i.e., the Fmoc protecting group borne by the threonine residue in position 1 of SEQ ID NO: 2), were removed, according to the following substeps:
(1) Deprotection This substep was carried out twice in a row, with 2 mL of 20% piperidine in NMP for 3 minutes each time, with mixing.
(2) NMP Wash This substep was carried out once, with 3 mL of NMP for 30 seconds, with mixing.

(3) DCM Washes

This substep was carried out four times in a row, with 3 mL of DCM for 30 seconds each time, with mixing.
Cleavage The resin was cleaved in 5 mL TFA:thioanisole:anisole:TIS:H$_2$O (82.5:5:5:2.5:5) for 2 hours under stirring. Under these conditions, side-chain protecting groups optionally borne by the amino acid residues (in particular non-aliphatic amino acid residues) were also removed.

The cleavage solution was then precipitated in 40 mL cold diethyl ether.

After 3 washes with 45 mL cold diethyl ether, the precipitate was air dried. The precipitate was then mixed in 15 mL 10% acetic acid in water/acetonitrile mix and lyophilized.
Purification After dissolution in 6 M of guanidinium chloride (GndHCl) containing a small amount of tris(2-carboxyethyl) phosphine (TCEP) and acidification with 1% TFA solution, crude STxB peptides were purified with a Waters HPLC (comprising a Waters 2545 Quaternary Gradient Module, a Waters 2998 Photodiode Array Detector and a Waters FlexInject).

The column used was a Water XBridge BEH 300 Prep C18 5 µm 30×150 mm column, with:
Solvent A: 99.9% H$_2$O, 0.1% TFA;
Solvent B: 90% acetonitrile, 9.99% H$_2$O, 0.1% TFA;
Program:
95% A+5% B for 8 minutes (to eliminate guanidinium salts), and Linear gradient from 5% to 100% B in 20 minutes.

Analyse

All samples were analyzed with a Waters UPLC-MS (comprising an ACQUITY UPLC H-Class sample manager, an ACQUITY UPLC PDA eLambda Detector, and a Single Quadrupole Detector 2 for electron spray ionization/mass spectra [ESI-MS]]).

The column used was an ACQUITY UPLC BEH C18 column, 130 Å, 1.7 µm, 2.1 mm×50 mm, with:

Solvent A: 0.1% formic acid in Milli-Q water;

Solvent B: 0.1% formic acid in acetonitrile;

Program:

5% B for 0.2 minutes,

Linear gradient from 5% to 95% B in 2.3 minutes,

100% B for 0.5 minutes, and

5% B for 1 minute.

Samples were dissolved in 6 M GndHCl, acidified with 1% formic acid aqueous solution and filtered before injection. All analyses are shown at 214 nm (characteristic absorption wavelength for amide bond of peptides).

Oxidation Analyses

Samples were acidified with 1% formic acid aqueous solution and analyzed with a Waters UPLC-MS (comprising an ACQUITY UPLC H-Class sample manager and an ACQUITY UPLC PDA eLambda Detector).

The column used was an ACQUITY UPLC BEH C18 column, 130 Å, 1.7 µm, 2.1 mm×50 mm, with:

Solvent A: 0.1% formic acid in Milli-Q water;

Solvent B: 0.1% formic acid in acetonitrile;

Program:

5% B for 0.2 minutes,

Isocratic flow at 33% B for 2.3 minutes,

100% B for 0.5 minutes, and

5% B for 1 minute.

Oxidation and Folding Purified lyophilized STxB peptide was dissolved to 0.5 mg/mL in oxidation buffer (7 M GndHCl, 50 mM sodium phosphate, 2% DMSO, pH adjusted to 8).

The solution was then incubated under stirring at 37° C. for 24 hours, to form a disulfide bond between Cys 4 and Cys 57 of SEQ ID NO: 2.

The solution was then dialyzed at 4° C. with Slide-A-Lyzer™ G2 Dialysis Cassettes, 3.5 kD MWCO from Thermo Scientific against the following:
- 3 M GndHCl, 50 mM sodium phosphate pH 8.0, 5 mM EDTA, for 6 to 10 hours;
- 1 M GndHCl, 50 mM sodium phosphate pH 8.0, 1 mM EDTA, overnight;
- PBS for 4 hours;
- PBS for 4 hours; and
- PBS overnight.

After removal from the dialysis cassette, the solution was centrifuged to remove the precipitate. Supernatant was kept and concentrated using centrifugal filters (Amicon Ultra Centrifugal filters, 10 kD MWCO).

Concentration was measured with Nanodrop 2000, using $F=8250\ M^{-1}\cdot cm^{-1}$.

Small aliquots were flash-freezed and stored at −20° C.

Intracellular Trafficking Assay by Immunofluorescence

Intracellular trafficking assays were performed on HeLa cells, cultured at 37° C. under 5% $CO_2$ in Dulbecco's modified Eagle's medium (DMEM, Invitrogen), supplemented with 10% heat-inactivated fetal bovine serum (FBS), 0.01% penicillin-streptomycin, 4 mM glutamine and 5 mM pyruvate.

Cells were plated the day before on lamellae in 4-well plates, 60 000 cells/well.

Binding

Cells were incubated for 30 minutes at 4° C. in presence of 500 μL STxB dilution in cold complete medium (0.2 μM or 1 μM), then washed 3 times with 500 μL PBS with $Ca^{2+}$ and $Mg^{2+}$ ($PBS^{++}$).

Internalization

500 μL of complete medium preheated at 37° C. was added on cells. Cells were incubated for 50 minutes at 37° C., then washed 3 times with $PBS^{++}$.

Fixation

Cells were treated with 500 μL of 4% paraformaldehyde (PFA) during 20 minutes, then washed once with 50 mM of $NH_4Cl$, and incubated with 50 mM of $NH_4Cl$ for at least 30 minutes.

Permeabilization

Cells were washed 3 times with 500 μL of PBS/BSA/Saponin 1× (1×PBS/1.0% BSA/0.1% Saponin), and then incubated at room temperature for 30 minutes in presence of 500 μL of PBS/BSA/Saponin 1×.

Incubation with Antibodies

Lamellae were incubated with 30 μL of primary antibody dilution into PBS/BSA/Saponin 1× for 30 minutes at room temperature, then washed 3 times with PBS/BSA/Saponin 1×.

Primary antibodies used were the mouse monoclonal clone 13C4 anti-STxB antibody (Strockbine et al., 1985. *Infect Immun.* 50 (3):695-700), at 1/250 dilution; and a home-made rabbit polyclonal antibody against the Golgi marker Giantin, used at 1/100 dilution.

Same was done with the secondary antibodies (anti-mouse Cy3 and anti-rabbit A488 used at 1/100 dilution each).

Slide Preparation

Lamellae were washed in water and then added on slides on 6 μL of Fluoromount-G™+Hoechst. Polymerization was allowed for 30 minutes at 37° C.

Microscope Observation

Slides were observed with the following equipment from the Biomaging Cell and Tissue Core Facility of the Institut Curie in Paris, France (PICT-IBiSA): upright Leica DM6000 microscope (with a CCD 1392×1040 CoolSnap HQ2 camera from Photometrics, pixel: 6.45 μm; and a Lumen 200 lamp illumination source from Prior Scientific). A Leica HCX PL Apo 63×oil objective was used for pictures.

Results

Synthesis

The full length STxB monomeric sequence (SEQ ID NO: 2) was synthetized on a 12.5 μmol scale, starting from a preloaded low loading Fmoc-Arg(Pbf) resin.

Coupling was carried out twice for 10 minutes with 20.8 equivalents of amino acids, 20 equivalents of HCTU coupling agent and 40 equivalents of N-methylmorpholine (NMM) in N-methyl-2-pyrrolidone (NMP). Coupling was then followed by a 5-minute capping substep with acetic anhydride and NMM in NMP.

Six different pseudoprolines were also used along the sequence to prevent β-chain formation and aggregation (Val 5-Thr 6, Asp 18-Thr 19, Phe 30-Thr 31, Leu 41-Ser 42, Val 50-Thr 51, and Phe 63-Ser 64 with respect to SEQ ID NO: 2 numbering).

For some positions which have been identified as "difficult positions", coupling was repeated four times instead of two (Cys 4, Thr 12, Thr 21, Asn 35, Leu 36, Leu 39, Ile 45, Thr 49, Cys 57, and Val 65 with respect to SEQ ID NO: 2 numbering).

Yield

Figure 1D:
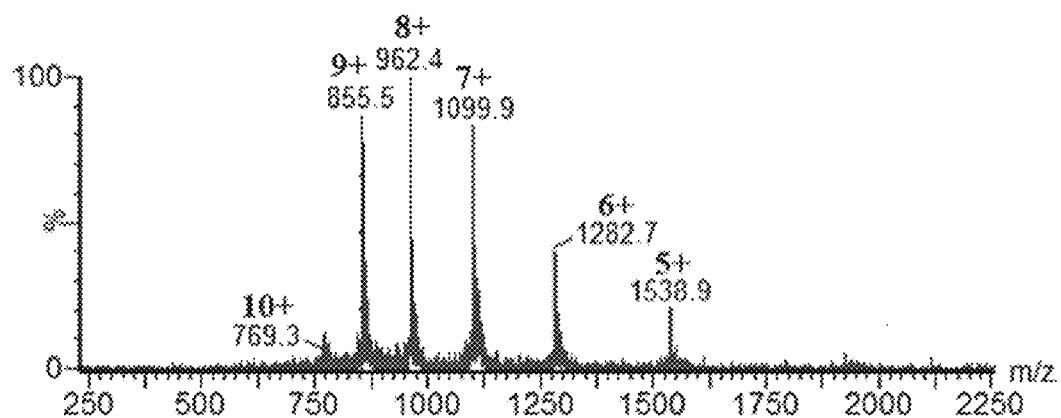

UPLC-MS analysis of the resulting product shows a dominant peak (FIGS. 1A & 1B, at 1.71 minutes) corresponding to the expected mass of the monomeric STxB peptide (FIGS. 1C & 1D); and small contaminant peaks (FIG. 1A, at 1.57 and 1.79 minutes) which are more or less present depending on the synthesis batch (see the absence of contaminant picks on FIG. 1B).

65.7 mg of peptide were recovered from the second synthesis batch after cleavage (corresponding to FIG. 1B), representing approximately 70% yield in mass.

Purification

After cleavage, the monomeric STxB peptide could either be purified through reverse-phase high pressure liquid chromatography (RP-HPLC); or alternatively, could directly be oxidized and refolded.

Figure 2:
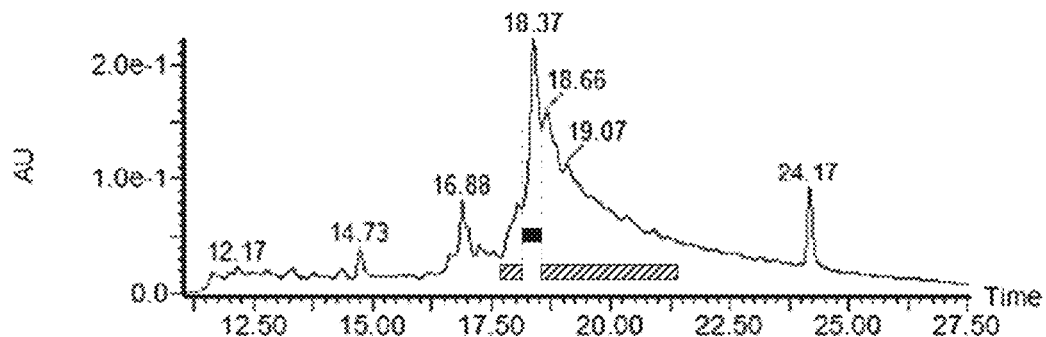
FIG. 2 is a chromatogram illustrating the RP-HPLC purification of crude STxB peptides from the second batch of synthesis (corresponding to FIG. 1B) on a Water XBridge BEH 300 Prep C18 5 μm 30×150 mm column. 11.4 mg of crude peptide was injected in 2 mL guanidinium chloride comprising little amount of TCEP+1 mL 1% TFA. The program consisted of 8 minutes 95% A (99.9% $H_2O$, 0.1% TFA)+5% B (90% acetonitrile, 9.99% $H_2O$, 0.1% TFA) to eliminate salts (not shown) followed by a 20-minute linear gradient from 5% to 100% B. "Clean" (solid black line) and "unclean" (hatched black lines) fractions were collected from several injections. Absorption wavelength: 214 nm, x-axis: time, in minutes.

RP-HPLC purification on a C18 column led to high peptide loss: out of 43.8 mg of crude peptide (from the second synthesis batch, dissolved in 2 mL of 6 M GndHCl containing little amount of TCEP and 1 mL 1% TFA) injected onto the column, only 0.8 mg of "clean" and 3.8 mg of "unclean" fractions were recovered (FIG. 2), corresponding to a 10.5% yield when considering the sum of the two fractions recovered.

Much of the peptide remained stuck on the column and had to be removed through extensive washes via DMSO followed by a short gradient from 5 to 100% of B solvent. 16 mg were recovered with these successive washes.

Figure 3A:
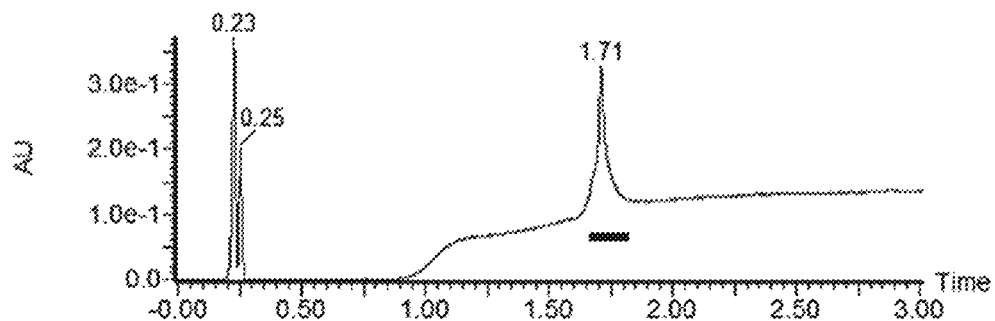
FIGS. 3A to 3D are four chromatograms illustrating the UPLC-MS analysis of the lyophilized compound obtained from the "clean" fraction (3A) and "unclean" fraction (3B) with absorption wavelength=214 nm, and x-axis=time, in minutes; and mass spectra of the portion underlined in black in 3A (3C) and in 3B (3D), with x-axis=m/z.
Figure 3B:
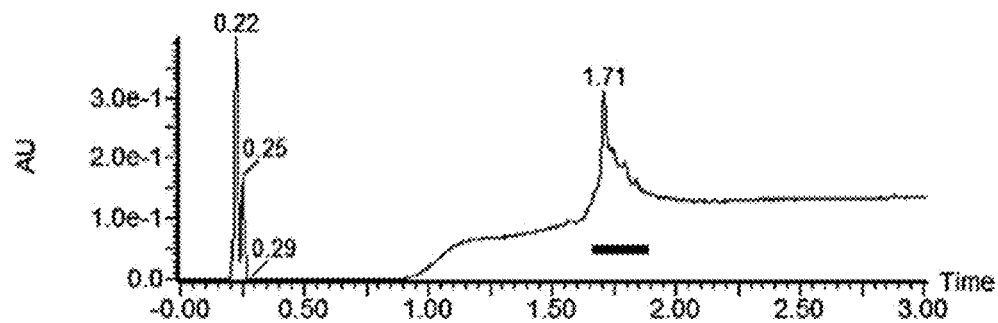
Figure 3C:
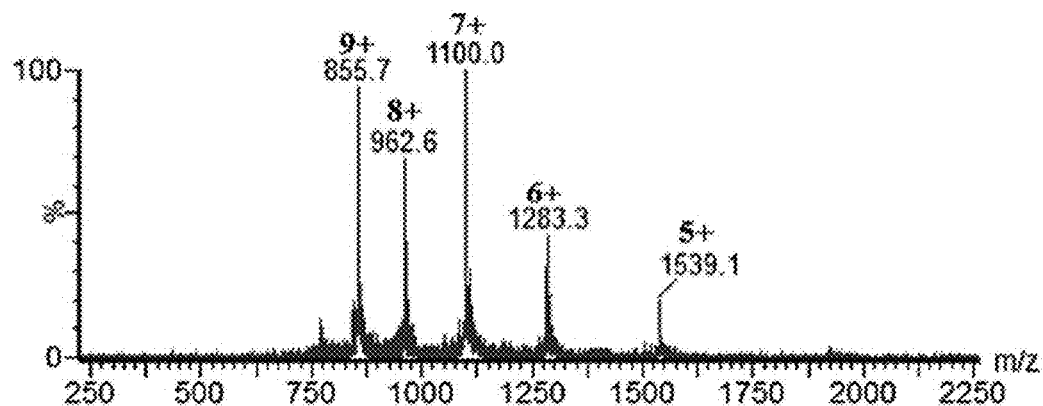
Figure 3D:
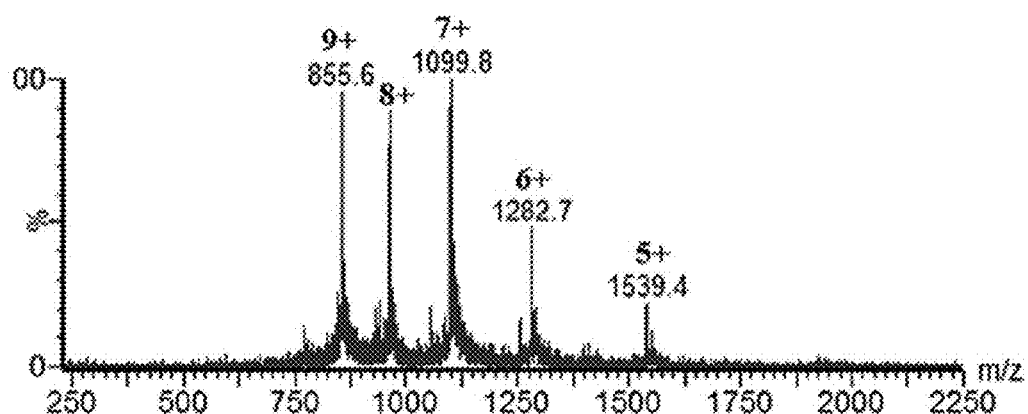

UPLC-MS analysis of the lyophilized STxB peptide from the "clean" fraction show a single, sharp peak at 1.71 minutes (FIG. 3A), corresponding to the expected mass of the monomeric STxB peptide (FIG. 3C). On the other hand, UPLC-MS analysis of the lyophilized STxB peptide from the "unclean" fraction show a saw-teeth peak at 1.71 minutes extending to 1.9 minutes (FIG. 3B), also corresponding to the expected mass of the monomeric STxB peptide (FIG. 3D).

Oxidation Analyses

The crude STxB peptide, either directly after synthesis and cleavage (i.e., without purification step), or the "clean" and "unclean" fractions obtained after RP-HPLC purification, could then be oxidized to form the intramolecular disulfide bond between Cys 4 and Cys 57 of SEQ ID NO: 2, and folded to yield a functional protein.

Figure 4A:
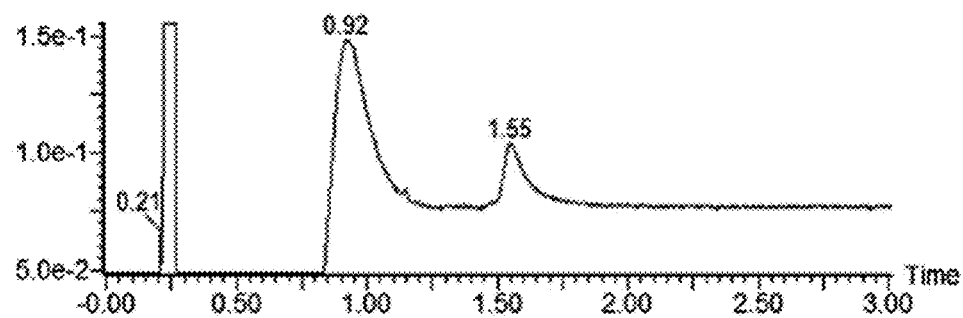
FIGS. 4A to 4F are six chromatograms illustrating UPLC analysis upon oxidation of STxB. 4A and 4B are control chromatograms, showing characteristic peaks of STxB in reduced form in the presence of TCEP (4A) and in oxidized form in absence of TCEP (4B). 4C to 4F show oxidation analyses of STxB at different time points (4C: t=0 h; 4D: t=4 h; 4E: t=8 h; 4F: t=24 h). Absorption wavelength: 214 nm, x-axis: time, in minutes.
Figure 4B:
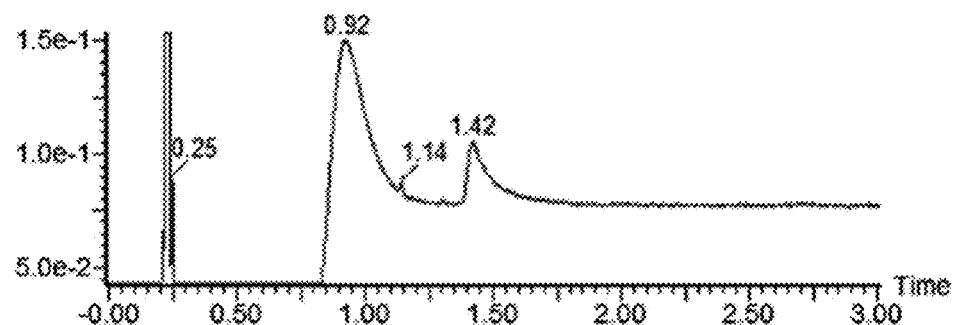

As a control, oxidized STxB peptide was analyzed by UPLC, after incubation at room temperature for 1 hour before analysis in 3 M GndHCl in presence of 100 mM TCEP (FIG. 4A) or in absence of TCEP (FIG. 4B).

In presence of TCEP, the reduced form of the STxB peptide is expected (i.e., without the intramolecular disulfide bond), corresponding to the peak seen at 1.55 minutes. In absence of TCEP, the oxidized form of the STxB peptide is expected (i.e., with the intramolecular disulfide bond), corresponding to the peak seen at 1.42 minutes.

Figure 4C:
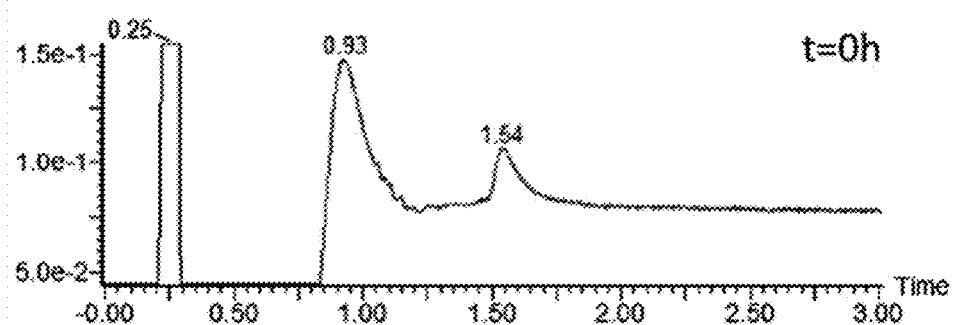
Figure 4D:
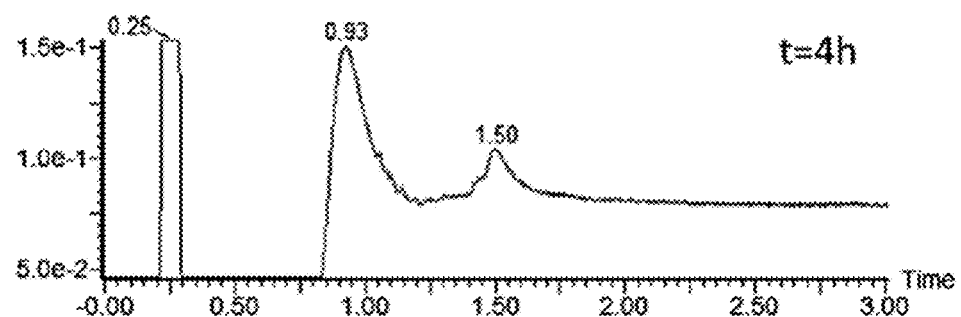
Figure 4E:
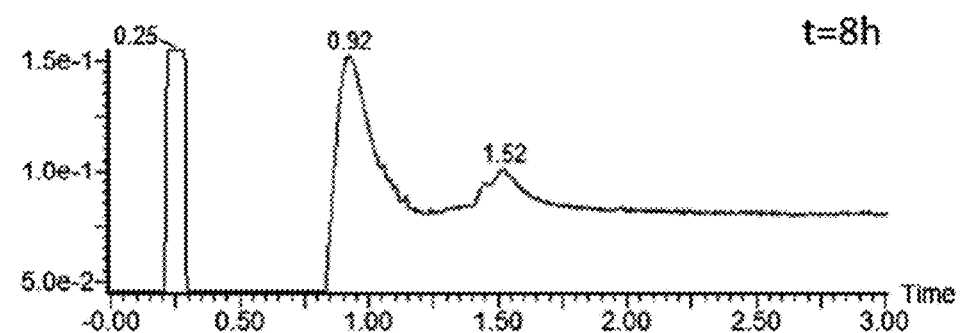
Figure 4F:
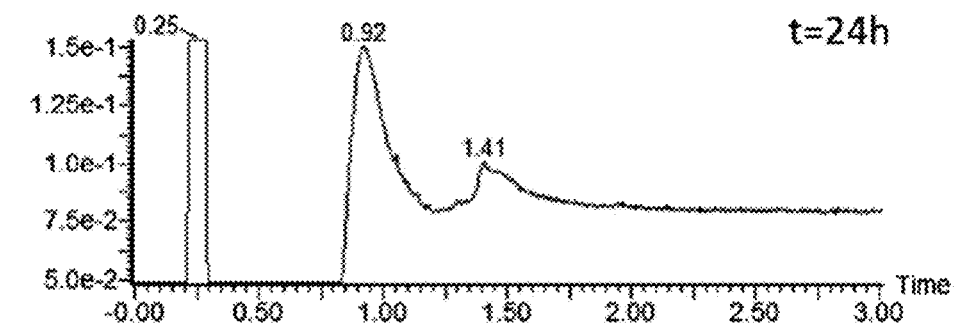

Oxidation could be followed by UPLC analyses using an isocratic flow, at different time points (FIG. 4C: t=0 h; FIG. 4D: t=4 h; FIG. 4E: t=8 h; FIG. 4F: t=24 h). It can be clearly seen from FIGS. 4C to 4F that the amount of oxidized form increases over time and is dominant at t=24 h (peak at 1.41 minutes on FIG. 4F), when oxidation is stopped to start the folding step.

Folding

Folding was achieved via stepwise dialyses, in buffers successively comprising 6 M, 3 M and 1 M GndHCl, and ending up with buffers comprising PBS but no GndHCl.

After centrifugation, the supernatant was recovered, concentrated and analyzed by UPLC-MS.

Figure 5A:
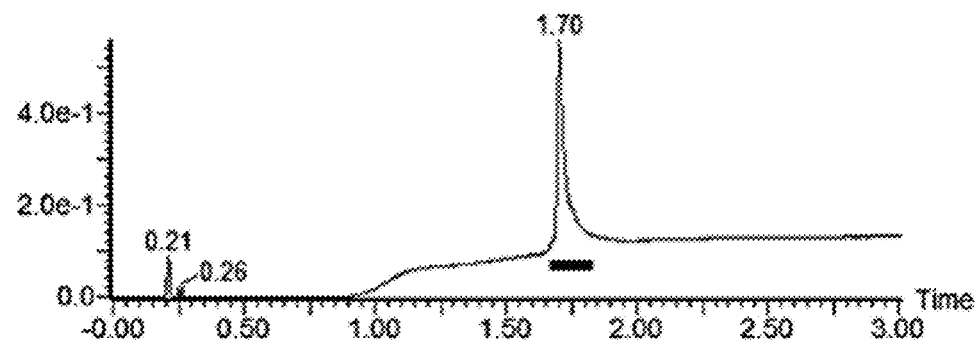
FIGS. 5A to 5F are six chromatograms, illustrating UPLC-MS analysis of folded STxB samples. 5A shows folded STxB protein obtained from crude peptide (i.e., without HPLC purification step); 5B shows folded STxB protein obtained from the "clean" fraction; and 5C shows folded STxB protein obtained from the "unclean" fraction; with absorption wavelength=214 nm, and x-axis=time, in minutes. 5D, 5E and 5F show the mass spectrum of the portion underlined in black in 5A, 5B and 5C, respectively, with x-axis=m/z.
Figure 5B:
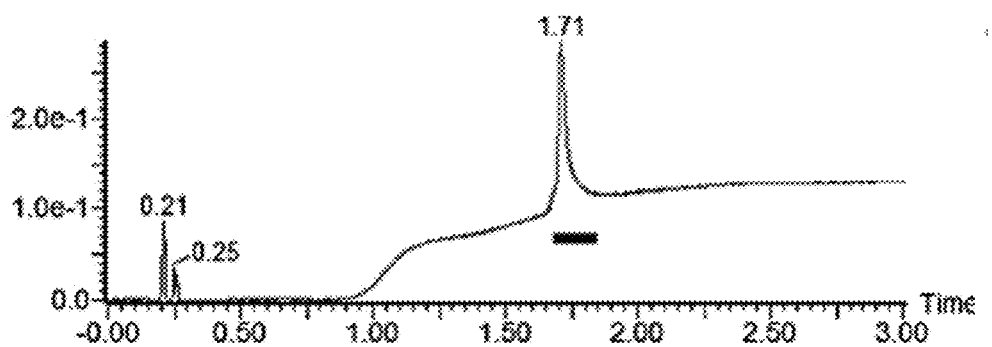
Figure 5C:
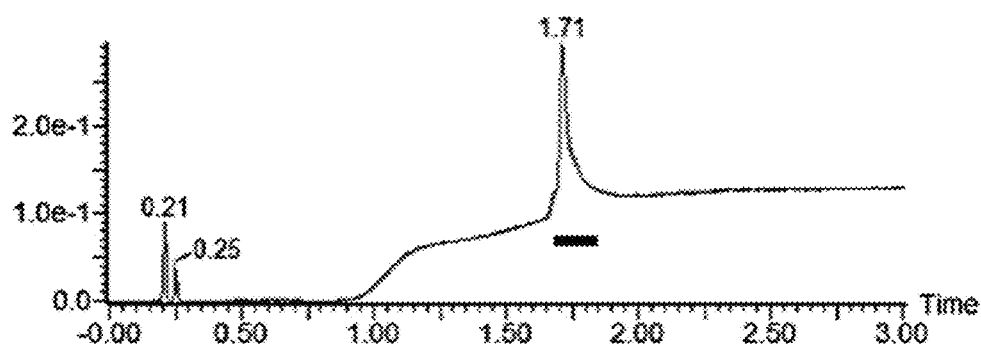
Figure 5D:
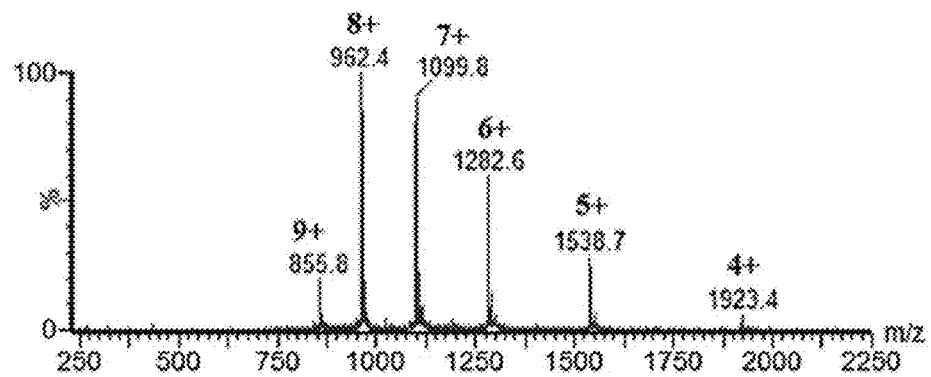
Figure 5E:
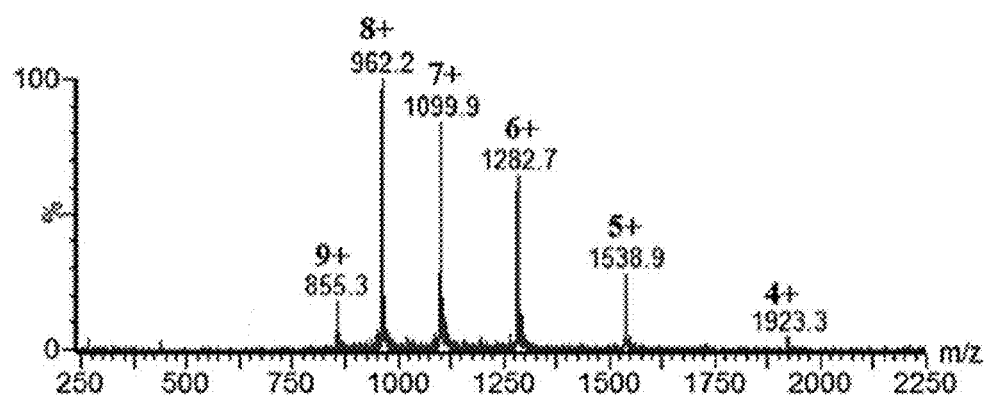
Figure 5F:
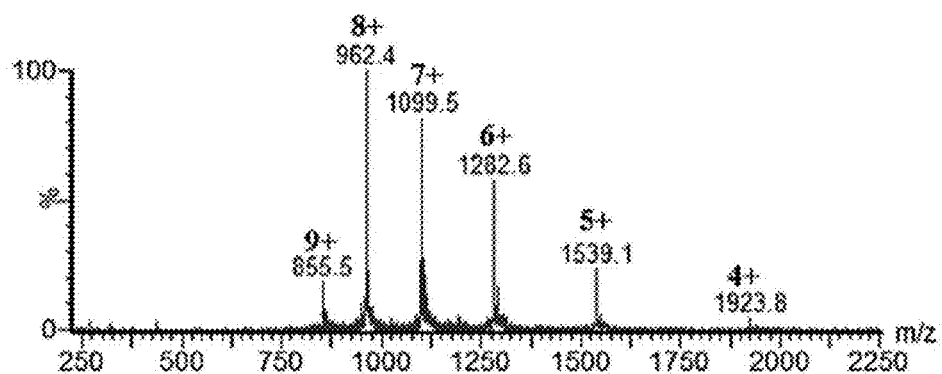

Folded samples obtained after oxidation from the crude STxB peptide (i.e., directly after synthesis and cleavage, without purification step), or from the "clean" and "unclean" fractions obtained after RP-HPLC purification, are very pure and comparable in quality (FIGS. 5A to 5C), and exhibit the expected mass of the monomeric STxB peptide (FIGS. 5D to 5F).

Their concentration was assessed by measuring absorbance at 280 nm and using monomeric STxB extinction coefficient $F=8250$ $M^{-1} \cdot cm^{-1}$.

About 2.34 mg of folded STxB was obtained from 6 mg of crude peptide without purification, corresponding to a 39%-yield.

About 0.24 mg of folded STxB was obtained from 0.8 mg of the "clean" fraction obtained after RP-HPLC purification, corresponding to a 30%-yield.

About 0.72 mg of folded STxB was obtained from 3.8 mg of the "unclean" fraction obtained after RP-HPLC purification, corresponding to a 19%-yield.

Oligomerization and Intracellular Trafficking Assay by Immunofluorescence

Folded samples were than tested for oligomerization and functionality using an immunofluorescence assay. This assay relies on the fact that upon normal trafficking, STxB in its pentameric form should be in the Golgi after 50 minutes of incubation at 37° C.

Several STxB samples were tested and compared:
"rSTxB", corresponding to STxB obtained by recombinant expression;
"sSTxB-HPLC", corresponding to STxB obtained by chemical synthesis as described herein, without a RP-HPLC purification step;
"sSTxB+HPLC clean", corresponding to the "clean" fraction of STxB obtained by chemical synthesis as described herein, after a RP-HPLC purification step; and
"sSTxB+HPLC unclean", corresponding to the "unclean" fraction of sSTxB obtained by chemical synthesis as described herein, after a RP-HPLC purification step.

Cells were incubated with 0.1 μM of the STxB samples for 30 minutes at 4° C. for binding to their receptor Gb3 (no internalization can occur at 4° C.).

After several washings to remove unbound STxB, cells were incubated for 50 minutes at 37° C. for synchronized internalization, and then fixed and labelled with antibodies.

Figure 6:
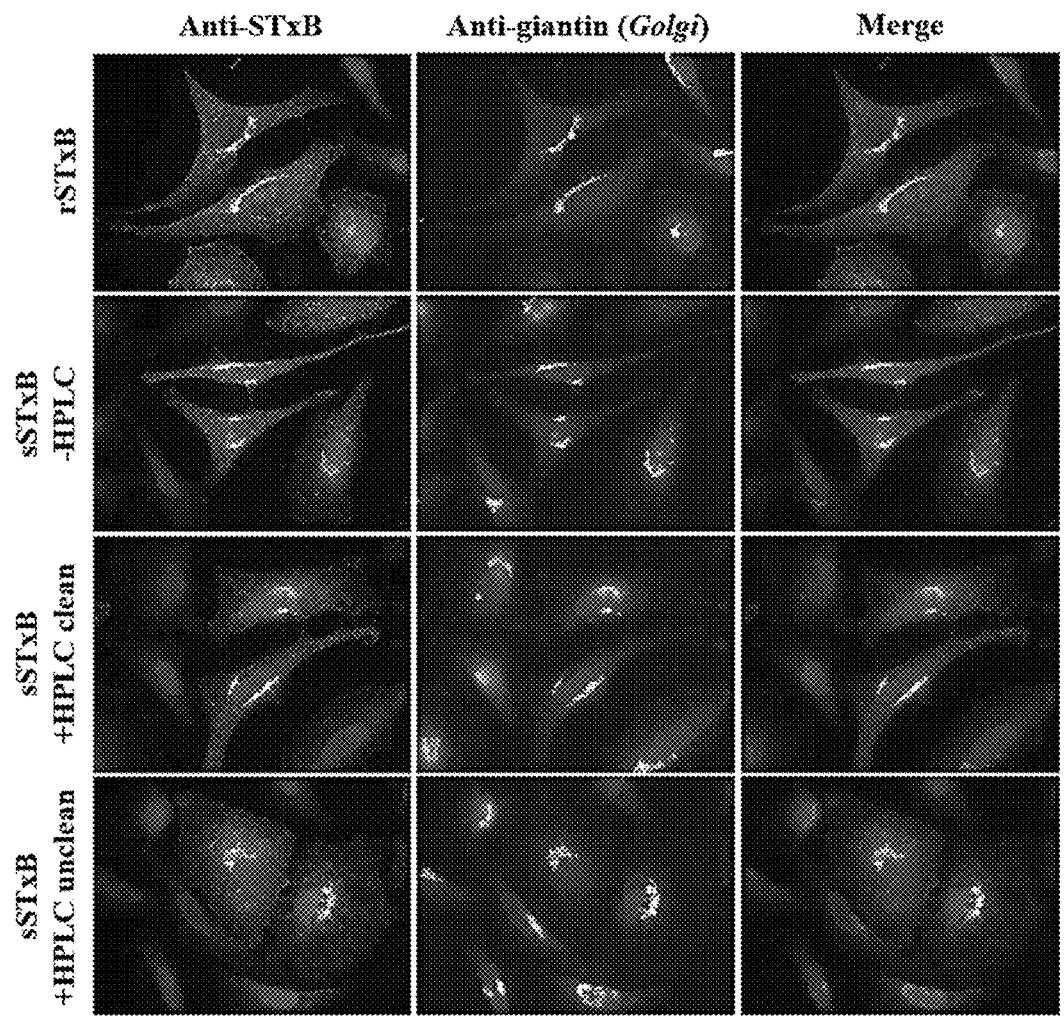
FIG. 6 (filed in color) is a set of eight photographs, showing colocalization of recombinant STxB (rSTxB) and synthetic STxB (STxB protein obtained from crude peptide, without RP-HPLC purification [sSTxB-HPLC]; STxB protein obtained from the "clean" fraction after RP-HPLC purification [sSTxB+HPLC clean]; and STxB protein obtained from the "unclean" fraction after RP-HPLC purification [sSTxB+HPLC unclean]), with the Golgi after 50 minutes of incubation at 37° C.

FIG. 6 shows colocalization of recombinant and synthetic STxB from the different samples with the Golgi (labelled with anti-giantin antibodies) after 50 minutes of incubation at 37° C., meaning that these samples contain functional STxB pentamers.

CONCLUSION

In conclusion, the data presented hereinabove show that a functional STxB pentamer could be obtained via solid-phase synthesis.

Upon setup of the synthesis method, some improvements were brought to the method, in order to ensure high synthesis yields and avoid incomplete syntheses of intermediate products. In that sense, some "difficult positions" have been identified in SEQ ID NO: 2, for which coupling of the amino acid was carried out 4 times in a row instead of 2. Pseudoprolines have also been used along the sequence, to prevent β-chain formation and aggregation.

Moreover, the Inventors have shown that no purification step was required to eliminate contaminants from the sample, saving thereby one step in the process and important material losses. Indeed, a functional STxB peptide could be efficiently obtained directly by oxidizing and folding the crude STxB peptide, without purification step, with a final yield close to 40%.

Bacterial Endotoxins Levels

The level of bacterial endotoxins was assessed in various batches of STxB protein, recombinantly or synthetically produced, in "lab conditions" or "GLP/GMP-like conditions". These measurements were carried out by Inovalys (Angers, France). When synthetically produced, the STxB protein was oxidized and folded directly from lyophilized peptide obtained after synthesis and cleavage, without purification step.

Bacterial endotoxins in these samples were measured using the chromogenic kinetic method described in the European Pharmacopoeia 9.8, section 2.6.14 (method D).

This technique is used to measure the chromophore released from a suitable chromogenic peptide by the reaction of endotoxins with the lysate. It measures either the time (onset time) needed for the reaction mixture to reach a predetermined absorbance, or the rate of color development. The test is carried out at the incubation temperature recommended by the lysate manufacturer (usually 37±1° C.).

Table 1 shows the results of these measurements, in endotoxin unit per mg of STxB protein.

TABLE 1

| Samples | Recombinant "Lab conditions" | Recombinant "GLP-like" | Synthetic "Lab conditions" | Synthetic "GMP-like" |
|---|---|---|---|---|
| Cc (EU/mg) | 480 | 20 | 23 | 4 |

Cc: concentration; EU: endotoxin unit

Example 3

Role of Pseudoproline and Multiple Coupling in the Efficiency of the STxB Synthesis
1) STxB-Cys-Amide Synthesis without Pseudoproline, with Double Coupling and Capping
Material and Methods
Reagents Solid-phase synthesis of a full length monomeric mutant of the STxB protein with SEQ ID NO: 2 comprising a cysteine residue at the C-terminus (SEQ ID NO: 21) was performed on a Prelude Instrument (Gyros protein Technologies), at 12.5 µmol scale, using a ChemMatrix rink amide matrix resin.

SEQ ID NO: 21
TPDCVTGKVEYTKYNDDDTFTVKVGDKELFTNRWNLQSLLLSAQITGMTV
TIKTNACHNGGGFSEVIFRC

Synthesis

The resin was swelled twice in 3 mL DCM for 30 seconds with mixing, then once in 3 mL NMP for 5 minutes with mixing.
Synthesis Cycle The synthesis workflow was set as follows on the Prelude Instrument, with one cycle being defined as substeps (1) to (6) defined below, each cycle leading to the addition of one amino acid to the growing peptide, in a linear C- to N-terminal direction following SEQ ID NO: 21.

(1) Deprotection

This substep was carried out twice in a row per cycle, with 2 mL of 20% piperidine in NMP for 3 minutes each time, with mixing.

(2) Washes

This substep was carried out three times in a row per cycle, with 3 mL of NMP for 30 seconds each time, with mixing.

(3) Coupling

This substep was carried out twice in a row per cycle, with 1300 µL of Fmoc-protected amino acid (200 mM in NMP=20.8 eq.; except for cysteine residues: 200 mM in DMF=20.8 eq), 1000 µL of HCTU (250 mM in NMP=20 eq.) and 500 µL of NMM (1 M in NMP=40 eq.) for 10 minutes each time, with mixing.

(4) Washes

This substep was carried out twice in a row per cycle, with 3 mL of NMP for 30 seconds each time, with mixing.

(5) Capping

This substep was carried out once per cycle, with 2000 µL of $Ac_2O$ (250 mM in NMP) and 500 µL of NMM (1 M in NMP=40 eq.) for 5 minutes, with mixing.

(6) Washes

This substep was carried out three times in a row per cycle, with 3 mL of NMP for 30 seconds each time, with mixing.

This synthesis workflow therefore includes a systematic double coupling (substep (3)) per amino acid residue.
Final Deprotection Once the whole STxB peptide with SEQ ID NO: 21 was synthetized, the final α amino-protecting group (i.e., the Fmoc protecting group borne by the threonine residue in position 1 of SEQ ID NO: 21), were removed, according to the following substeps:

(1) Deprotection

This substep was carried out twice in a row, with 2 mL of 20% piperidine in NMP for 3 minutes each time, with mixing.

(2) NMP Wash

This substep was carried out once, with 3 mL of NMP for 30 seconds, with mixing.

(3) DCM Washes

This substep was carried out four times in a row, with 3 mL of DCM for 30 seconds each time, with mixing.
Cleavage The resin was cleaved in 5 mL TFA:thioanisole:anisole:TIS:$H_2O$ (82.5:5:5:2.5:5) for 2 hours under stirring. Under these conditions, side-chain protecting groups optionally borne by the amino acid residues (in particular non-aliphatic amino acid residues) were also removed.

The cleavage solution was then precipitated in 40 mL cold diethyl ether.

After 3 washes with 45 mL cold diethyl ether, the precipitate was air dried. The precipitate was then mixed in 15 mL 10% acetic acid in water/acetonitrile mix and lyophilized.
Analyses The crude peptide was analysed using Agilent 1100 series HPLC (Santa Clara, USA), with a Vydac $C_4$ (214 TP) column (300 Å, 5 µm, 4.6 mm i.d.×250 mm; Cat. No. 214 TP54 S/N E980716-1-4), coupled online to an Esquire ion trap mass spectrometer equipped with an AP-ESI source (Bruker, Germany). The gradient used was from 5 to 100% acetonitrile with 0.1% TFA for 60 minutes at 1 mL/minute.
Results Table 2 and FIG. 7 show the truncated products identified from a STxB-Cys-amide synthesis without pseudoprolines and with double coupling.

TABLE 2

| Truncated product | Detection peak (Figure) | m/z detected | Calculated mass | Sequence identification (theoretical mass) |
|---|---|---|---|---|
| A | 8 (FIG. 8H) | 1041.5 1+ | 1040.5 | Ac-FSEVIFRC-$NH_2$ Residues 63-70 of SEQ ID NO: 21 (m=1040.51) |
| B | 7 (FIG. 8G) | 1098.6 1+ | 1097.6 | Ac-GFSEVIFRC-$NH_2$ Residues 62-70 of SEQ ID NO: 21 (m=1097.53) |

TABLE 2-continued

| Truncated product | Detection peak (Figure) | m/z detected | Calculated mass | Sequence identification (theoretical mass) |
|---|---|---|---|---|
| C | 6 (FIG. 8F) | 1155.6 1+ | 1154.6 | Ac-GGFSEVIFRC-NH$_2$ Residues 61-70 of SEQ ID NO: 21 (m=1154.55) |
| D | 5 (FIG. 8E) | 1212.6 1+ 606.9 2+ | 1211.6 | Ac-GGGFSEVIFRC-NH$_2$ Residues 60-70 of SEQ ID NO: 21 (m=1211.58) |
| E | 3 (FIG. 8C) | 1326.7 1+ 663.9 2+ | 1325.7 | Ac-NGGGFSEVIFRC-NH$_2$ Residues 59-70 of SEQ ID NO: 21 (m=1325.62) |
| F | 1 (FIG. 8A) | 876.5 2+ | 1751.0 | Ac-NACHNGGGFSEVIFRC-NH$_2$ Residues 55-70 of SEQ ID NO: 21 (m=1750.77) |
| G | 2 (FIG. 8B) | 1048.0 2+ 698.9 3+ | 2093.7 | Ac-IKTNACHNGGGFSEVIFRC-NH$_2$ Residues 52-70 of SEQ ID NO: 21 (m=2092.99) |
| H | 1 (FIG. 8A) | 1098.5 2+ 732.7 3+ | 2195.0 | Ac-TIKTNACHNGGGFSEVIFRC-NH$_2$ Residues 51-70 of SEQ ID NO: 21 (m=2194.04) |
| I | 3 (FIG. 8C) 4 (FIG. 8D) | 1148.1 2+ 765.8 3+ | 2294.2 | Ac-VTIKTNACHNGGGFSEVIFRC-NH$_2$ Residues 50-70 of SEQ ID NO: 21 (m=2293.11) |
| J | 3 (FIG. 8C) | 1198.6 2+ 799.43 3+ | 2395.2 | Ac-TVTIKTNACHNGGGFSEVIFRC-NH$_2$ Residues 49-70 of SEQ ID NO: 21 (m=2394.16) |
| K | 5 (FIG. 8E) | 1292.6 2+ 862.2 3+ | 2583.2 | Ac-GMTVTIKTNACHNGGGFSEVIFRC-NH$_2$ Residues 47-70 of SEQ ID NO: 21 (m=2582.22) |

The synthesis without pseudoprolines and with double coupling is therefore not working (chemical collapse observed at Thr46). The full length product is not detected. Many truncated products are formed at the beginning of the synthesis.

2) STxB Wild Type Synthesis: With 6 Pseudoprolines, Single Coupling for all Residues Except Extra Double Coupling for all Thr Residues, and Capping Material and Methods Reagents Solid-phase synthesis of a full length monomeric mutant of the STxB protein with SEQ ID NO: 2 was performed on a Prelude Instrument (Gyros protein Technologies), at 12.5 µmol scale, using a Fmoc-Arg (pbf)-Wang LL resin.

SEQ ID NO: 2

```
TPDC(VT)GKVEYTKYNDD(DT)FTVKVGDKEL(FT)NRWNLQSLL(LS)
TAQITGM(VT)IKTNACHNGGG(FS)EVIFR
```

Parenthesis correspond to amino acid residues coupled in a pseudoproline dipeptide form (positions 5-6, 18-19, 30-31, 41-42, 50-51, and 63-64 of SEQ ID NO: 2).

Synthesis

The resin was swelled twice in 3 mL DCM for 30 seconds with mixing, then once in 3 mL NMP for 5 minutes with mixing.

Standard Synthesis Cycle

The synthesis workflow was set as follows on the Prelude Instrument, with one cycle being defined as substeps (1) to (6) defined below, each cycle leading to the addition of one amino acid to the growing peptide, in a linear C- to N-terminal direction following SEQ ID NO: 2.

(1) Deprotection

This substep was carried out twice in a row per cycle, with 2 mL of 20% piperidine in NMP for 3 minutes each time, with mixing.

(2) Washes

This substep was carried out three times in a row per cycle, with 3 mL of NMP for 30 seconds each time, with mixing.

(3) Coupling

This substep was carried out once per cycle, with 1300 µL of Fmoc-protected amino acid (200 mM in NMP=20.8 eq.; except for cysteine residues: 200 mM in DMF=20.8 eq), 1000 µL of HCTU (250 mM in NMP=20 eq.) and 500 µL of NMM (1 M in NMP=40 eq.) for 10 minutes, with mixing.

(4) Washes

This substep was carried out twice in a row per cycle, with 3 mL of NMP for 30 seconds each time, with mixing.

(5) Capping

This substep was carried out once per cycle, with 2000 µL of $Ac_2O$ (250 mM in NMP) and 500 µL of NMM (1 M in NMP=40 eq.) for 5 minutes, with mixing.

(6) Washes

This substep was carried out three times in a row per cycle, with 3 mL of NMP for 30 seconds each time, with mixing.

This synthesis workflow therefore includes a single coupling (substep (3)) per amino acid residue, except for all threonine residues for which an adjusted synthesis cycle was carried out as outlined below.

Adjusted Synthesis Cycle

As the coupling of threonine residues has been reported in the art to be difficult, possibly due to steric hindrance, we have tested an alternative protocol where the substep of coupling threonine residues was repeated twice, and was extended to 20 minutes instead of 10. The synthesis workflow was therefore adapted as follows for threonine residues:

(1) Deprotection

This substep was carried out twice in a row per cycle, with 2 mL of 20% piperidine in NMP for 3 minutes each time, with mixing.

(2) Washes

This substep was carried out three times in a row per cycle, with 3 mL of NMP for 30 seconds each time, with mixing.

(3) Coupling

This substep was carried out twice in a row per cycle, with 1300 µL of Fmoc-protected threonine (200 mM in NMP=20.8 eq.), 1000 µL of HCTU (250 mM in NMP=20 eq.) and 500 µL of NMM (1 M in NMP=40 eq.) for 20 minutes each time, with mixing.

(4) Washes

This substep was carried out twice in a row per cycle, with 3 mL of NMP for 30 seconds each time, with mixing.

(5) Capping

This substep was carried out once per cycle, with 2000 µL of Ac$_2$O (250 mM in NMP) and 500 µL of NMM (1 M in NMP=40 eq.) for 5 minutes, with mixing.

(6) Washes

This substep was carried out three times in a row per cycle, with 3 mL of NMP for 30 seconds each time, with mixing.

Final Deprotection

Once the whole STxB peptide with SEQ ID NO: 2 was synthetized, the final α amino-protecting group (i.e., the Fmoc protecting group borne by the threonine residue in position 1 of SEQ ID NO: 2), were removed, according to the following substeps:

(1) Deprotection

This substep was carried out twice in a row, with 2 mL of 20% piperidine in NMP for 3 minutes each time, with mixing.

(2) NMP Wash

This substep was carried out once, with 3 mL of NMP for 30 seconds, with mixing.

(3) DCM Washes

This substep was carried out four times in a row, with 3 mL of DCM for 30 seconds each time, with mixing.

Cleavage

The resin was cleaved in 5 mL TFA:thioanisole:anisole:TIS:H$_2$O (82.5:5:5:2.5:5) for 2 hours under stirring. Under these conditions, side-chain protecting groups optionally borne by the amino acid residues (in particular non-aliphatic amino acid residues) were also removed.

The cleavage solution was then precipitated in 40 mL cold diethyl ether.

After 3 washes with 45 mL cold diethyl ether, the precipitate was air dried. The precipitate was then mixed in 15 mL 10% acetic acid in water/acetonitrile mix and lyophilized.

Analyses

The crude peptide was analysed using Agilent 1100 series HPLC (Santa Clara, USA), with a Vydac C$_4$ (214 TP) column (300 Å, 5 µm, 4.6 mm i.d.×250 mm; Cat. No. 214 TP54 S/N E980716-1-4), coupled online to an Esquire ion trap mass spectrometer equipped with an AP-ESI source (Bruker, Germany). The gradient used was from 5 to 100% acetonitrile with 0.1% TFA for 60 minutes at 1 mL/minute.

Results

Despite the use of pseudoprolines and a long double coupling for all threonine residues, we observed the presence of deletion peptides (reported in Table 3) corresponding to:

(i) the absence of threonine residue incorporation at positions 49 and 54 of SEQ ID NO: 2;

(ii) the lack of incorporation of the pseudoproline FT at position 30-31 of SEQ ID NO: 2, and (iii) the lack of incorporation of cysteine at position 57 and isoleucine at position 52 of SEQ ID NO: 2.

TABLE 3

| Products | Calculated mass | Sequence identification |
| --- | --- | --- |
| A | 1361 | Ac-HNGGGFSEVIFR<br>No coupling of Cys 57<br>Residues 58-69 of SEQ ID NO: 2 |
| B | 1648.7 | Ac-NACHNGGGFSEVIFR<br>No coupling of Thr 54<br>Residues 55-69 of SEQ ID NO: 2 |
| C | 1878.2 | Ac-KTNACHNGGGFSEVIFR<br>No coupling of Ile 52<br>Residues 53-69 of SEQ ID NO: 2 |
| D | 2192.1 | Ac-VTIKTNACHNGGGFSEVIFR<br>No coupling of Thr 49<br>Residues 50-69 of SEQ ID NO: 2 |
| E | 4220.5 | Ac-NRWNLQSLLLSAQITGMTVTIKTNACHNGGGFSEVIFR<br>No coupling of pseudoproline (FT) 30-31<br>Residues 32-69 of SEQ ID NO: 2 |
| F | 7690.3 | Ac-TPDCVTGKVEYTKYNDDDTFTVKVGDKELFTNRWNLQSLLL SAQITGMTVTIKTNACHNGGGFSEVIFR<br>Residues 1-69 of SEQ ID NO: 2 |

3) STxB-Cys-Amide Synthesis with 6 Pseudoprolines, Double or Quadruple Coupling and Capping Material and Methods Reagents Solid-phase synthesis of a full length monomeric mutant of the STxB protein with SEQ ID NO: 2 comprising a cysteine residue at the C-terminus (SEQ ID NO: 21) was performed on a Prelude Instrument (Gyros protein Technologies), at 12.5 µmol scale, using a ChemMatrix rink amide matrix resin.

SEQ ID NO: 21
TPDC(VT)GKVEYTKYNDD(DT)FTVKVGDKEL(FT)NRWNLQSLL(LS)
AQITGMT(VT)IKTNACHNGGG(FS)EVIFRC

Parenthesis correspond to amino acid residues coupled in a pseudoproline dipeptide form (positions 5-6, 18-19, 30-31, 41-42, 50-51, and 63-64 of SEQ ID NO: 21).

Synthesis

The resin was swelled twice in 3 mL DCM for 30 seconds with mixing, then once in 3 mL NMP for 5 minutes with mixing.

Standard Synthesis Cycle

The synthesis workflow was set as follows on the Prelude Instrument, with one cycle being defined as substeps (1) to (6) defined below, each cycle leading to the addition of one amino acid to the growing peptide, in a linear C- to N-terminal direction following SEQ ID NO: 21.

(1) Deprotection

This substep was carried out twice in a row per cycle, with 2 mL of 20% piperidine in NMP for 3 minutes each time, with mixing.

(2) Washes

This substep was carried out three times in a row per cycle, with 3 mL of NMP for 30 seconds each time, with mixing.

(3) Coupling

This substep was carried out twice in a row per cycle, with 1300 μL of Fmoc-protected amino acid (200 mM in NMP=20.8 eq.; except for cysteine residues: 200 mM in DMF=20.8 eq), 1000 μL of HCTU (250 mM in NMP=20 eq.) and 500 μL of NMM (1 M in NMP=40 eq.) for 10 minutes each time, with mixing.

(4) Washes

This substep was carried out twice in a row per cycle, with 3 mL of NMP for 30 seconds each time, with mixing.

(5) Capping

This substep was carried out once per cycle, with 2000 μL of Ac$_2$O (250 mM in NMP) and 500 μL of NMM (1 M in NMP=40 eq.) for 5 minutes, with mixing.

(6) Washes

This substep was carried out three times in a row per cycle, with 3 mL of NMP for 30 seconds each time, with mixing.

This synthesis workflow therefore includes a systematic double coupling (substep (3)) per amino acid residue.

Adjusted Synthesis Cycle

Although it was known in the art that threonine residues were difficult to couple, a repeating the coupling step twice in a row for an extended time of 20 minutes each time was not sufficient to synthesis STxB with no truncated products, as shown above.

Extensive experiments were thereof carried out to identify so-called "difficult positions", for which a quadruple coupling (substep (3)) was implemented: Cys 4, Thr 12, Thr 21, Asn 35, Leu 36, Leu 39, Ile 45, Thr 49, Cys 57, and Val 65 (with respect to SEQ ID NO: 21 numbering). The synthesis workflow was therefore adapted as follows for these difficult positions:

(1) Deprotection

This substep was carried out twice in a row per cycle, with 2 mL of 20% piperidine in NMP for 3 minutes each time, with mixing.

(2) Washes

This substep was carried out three times in a row per cycle, with 3 mL of NMP for 30 seconds each time, with mixing.

(3) Coupling

This substep was carried out four times in a row per cycle, with 1300 μL of Fmoc-protected amino acid (200 mM in NMP=20.8 eq.; except for cysteine residues: 200 mM in DMF=20.8 eq), 1000 μL of HCTU (250 mM in NMP=20 eq.) and 500 μL of NMM (1 M in NMP=40 eq.) for 10 minutes each time, with mixing.

(4) Washes

This substep was carried out twice in a row per cycle, with 3 mL of NMP for 30 seconds each time, with mixing.

(5) Capping

This substep was carried out once per cycle, with 2000 μL of $Ac_2O$ (250 mM in NMP) and 500 μL of NMM (1 M in NMP=40 eq.) for 5 minutes, with mixing.

(6) Washes

This substep was carried out three times in a row per cycle, with 3 mL of NMP for 30 seconds each time, with mixing.

Final Deprotection

Once the whole STxB peptide with SEQ ID NO: 21 was synthetized, the final α amino-protecting group (i.e., the Fmoc protecting group borne by the threonine residue in position 1 of SEQ ID NO: 21), were removed, according to the following substeps:

(1) Deprotection

This substep was carried out twice in a row, with 2 mL of 20% piperidine in NMP for 3 minutes each time, with mixing.

(2) NMP Wash

This substep was carried out once, with 3 mL of NMP for 30 seconds, with mixing.

(3) DCM Washes

This substep was carried out four times in a row, with 3 mL of DCM for 30 seconds each time, with mixing.

Cleavage

The resin was cleaved in 5 mL TFA:thioanisole:anisole:TIS:$H_2O$ (82.5:5:5:2.5:5) for 2 hours under stirring. Under these conditions, side-chain protecting groups optionally borne by the amino acid residues (in particular non-aliphatic amino acid residues) were also removed.

The cleavage solution was then precipitated in 40 mL cold diethyl ether.

After 3 washes with 45 mL cold diethyl ether, the precipitate was air dried. The precipitate was then mixed in 15 mL 10% acetic acid in water/acetonitrile mix and lyophilized.

Analyses

The STxB peptide was analyzed with a Waters UPLC-MS (comprising an ACQUITY UPLC H-Class sample manager, an ACQUITY UPLC PDA eLambda Detector, and a Single Quadrupole Detector 2 for electron spray ionization/mass spectra [ESI-MS]]).

The column used was an ACQUITY UPLC BEH C18 column, 130 Å, 1.7 μm, 2.1 mm×50 mm, with:

Solvent A: 0.1% formic acid in Milli-Q water;

Solvent B: 0.1% formic acid in acetonitrile;

Program:

- 5% B for 0.2 minutes,
- Linear gradient from 5% to 95% B in 2.3 minutes,
- 100% B for 0.5 minutes, and
- 5% B for 1 minute.

The lyophilized STxB peptide was dissolved in 6 M GndHCl, acidified with 1% formic acid aqueous solution and filtered before injection. Analysis is shown at 214 nm (characteristic absorption wavelength for amide bond of peptides).

Oxidation Analyses

The STxB peptide was acidified with 1% formic acid aqueous solution and analyzed with a Waters UPLC-MS (comprising an ACQUITY UPLC H-Class sample manager and an ACQUITY UPLC PDA eLambda Detector).

The column used was an ACQUITY UPLC BEH C18 column, 130 Å, 1.7 μm, 2.1 mm×50 mm, with:

Solvent A: 0.1% formic acid in Milli-Q water;

Solvent B: 0.1% formic acid in acetonitrile;

Program:

- 5% B for 0.2 minutes,
- Isocratic flow at 33% B for 2.3 minutes,
- 100% B for 0.5 minutes, and
- 5% B for 1 minute.

Oxidation and Folding Lyophilized STxB peptide was dissolved to 0.5 mg/mL in oxidation buffer (7 M GndHCl, 50 mM sodium phosphate, 2% DMSO, pH adjusted to 8).

The solution was then incubated under stirring at 37° C. for 24 hours, to form a disulfide bond between Cys 4 and Cys 57 of SEQ ID NO: 21.

The solution was then dialyzed at 4° C. with Slide-A-Lyzer™ G2 Dialysis Cassettes, 3.5 kD MWCO from Thermo Scientific against the following:
- 3 M GndHCl, 50 mM sodium phosphate pH 8.0, 5 mM EDTA, for 6 to 10 hours;
- 1 M GndHCl, 50 mM sodium phosphate pH 8.0, 1 mM EDTA, overnight;
- PBS for 4 hours;
- PBS for 4 hours; and
- PBS overnight.

After removal from the dialysis cassette, the solution was centrifuged to remove the precipitate. Supernatant was kept and concentrated using centrifugal filters (Amicon Ultra Centrifugal filters, 10 kD MWCO).

Concentration was measured with Nanodrop 2000, using $\varepsilon = 8250$ $M^{-1} \cdot cm^{-1}$.

Small aliquots were flash-freezed and stored at −20° C.

Intracellular Trafficking Assay by Immunofluorescence

Intracellular trafficking assays were performed on HeLa cells, cultured at 37° C. under 5% CO2 in Dulbecco's modified Eagle's medium (DMEM, Invitrogen), supplemented with 10% heat-inactivated fetal bovine serum (FBS), 0.01% penicillin-streptomycin, 4 mM glutamine and 5 mM pyruvate.

Cells were plated the day before on lamellae in 4-well plates, 60 000 cells/well.

Binding and Internalization

Cells were incubated for 45 minutes at 37° C. in presence of 0.2 µM STxB in complete medium, then washed 3 times with 500 µL PBS with $Ca^{2+}$ and $Mg^{2+}$ ($PBS^{++}$).

Fixation

Cells were treated with 500 µL of 4% paraformaldehyde (PFA) during 20 minutes, then washed once with 50 mM of $NH_4Cl$, and incubated with 50 mM of $NH_4Cl$ for at least 30 minutes.

Permeabilization

Cells were washed 3 times with 500 µL of PBS/BSA/Saponin 1× (1×PBS/1.0% BSA/0.1% Saponin), and then incubated at room temperature for 30 minutes in presence of 500 µL of PBS/BSA/Saponin 1×.

Incubation with Antibodies

Lamellae were incubated with 30 µL of primary antibody dilution into PBS/BSA/Saponin 1× for 30 minutes at room temperature, then washed 3 times with PBS/BSA/Saponin 1×.

Primary antibodies used were the mouse monoclonal clone 13C4 anti-STxB antibody (Strockbine et al., 1985. *Infect Immun.* 50 (3):695-700), at 1/250 dilution; and a home-made rabbit polyclonal antibody against the Golgi marker Giantin, used at 1/100 dilution.

Same was done with the secondary antibodies (anti-mouse Cy3 and anti-rabbit A488 used at 1/100 dilution each).

Slide Preparation Lamellae were washed in water and then added on slides on 6 µL of Fluoromount-G™+ Hoechst. Polymerization was allowed for 30 minutes at 37° C.

Microscope Observation

Slides were observed with the following equipment from the Biomaging Cell and Tissue Core Facility of the Institut Curie in Paris, France (PICT-IBiSA): upright Leica DM6000 microscope (with a CCD 1392×1040 CoolSnap HQ2 camera from Photometrics, pixel: 6.45 µm; and a Lumen 200 lamp illumination source from Prior Scientific). A Leica HCX PL Apo 63×oil objective was used for pictures.

Results

Synthesis

This strategy of synthesis is very effective. Only few truncated synthesis products were observed (minor peak at 1.63 min in FIG. 9A), the main UPLC peak mass corresponding to the expected product (peak at 1.79 min in FIG. 9A).

42.7 mg of STxB peptide were recovered after cleavage, representing approximately 44% yield in mass.

Oxidation and Folding

Directly after synthesis and cleavage, the crude STxB peptide could then be oxidized to form the intramolecular disulfide bond between Cys 4 and Cys 57 of SEQ ID NO: 21, and folded to yield a functional protein.

Folding was achieved via stepwise dialyses, in buffers successively comprising 6 M, 3 M and 1 M GndHCl, and ending up with buffers comprising PBS but no GndHCl.

After centrifugation, the supernatant was recovered, concentrated and analyzed by UPLC-MS. Folded STxB peptide obtained after oxidation is very pure, as seen on FIG. 9B, and represents a 15%-yield (on average from 4 separate experiments).

Oligomerization and Intracellular Trafficking Assay by Immunofluorescence

Folded STxB was than tested for oligomerization and functionality using an immunofluorescence assay. This assay relies on the fact that upon normal trafficking, STxB in its pentameric form should be in the Golgi after 50 minutes of incubation at 37° C.

Two STxB samples were tested and compared:
- "rSTxB-Cys", corresponding to STxB with SEQ ID NO: 21 obtained by recombinant expression; and
- "sSTxB-Cys-amide", corresponding to STxB with SEQ ID NO: 21 obtained by chemical synthesis as described herein.

Cells were incubated with 0.2 µM of the STxB samples for 45 minutes at 37° C. for binding to their receptor Gb3 and internalization; then fixed and labelled with antibodies.

FIG. 10 shows colocalization of recombinant and synthetic STxB with the Golgi (labelled with anti-giantin antibodies) after 45 minutes of incubation at 37° C., meaning that both STxB samples contain functional STxB pentamers. Note that synthetic STxB-Cys [sSTxB-Cys-amide] was transported as efficiently as recombinant STxB-Cys [rSTxB-Cys] by retrograde trafficking from the plasma membrane to the Golgi apparatus.

CONCLUSION

In conclusion, this synthesis strategy with 6 pseudoprolines, systematic double coupling and quadruple coupling at difficult positions, is very effective, and the STxB protein that was obtained after refolding is biologically active in a highly selective intracellular trafficking assay.

Moreover, it is conceivable to reduce the number of coupling substep iterations in favour of an equally extended time of coupling (e.g., double coupling for twice 10 minutes can be replaced by a single coupling for 20 minutes once only).

Example 4

STxB Synthesis by Native Chemical Ligation (NCL) with 4 or 5 Pseudoprolines, Single/Double Coupling and No Capping As an alternative to the full-length synthesis procedure described above, STxB synthesis was also performed using a native chemical ligation (NCL) approach.

For this, STxB was divided into two segments ("STxB-N" with SEQ ID NO: 22; and "STxB-C" with SEQ ID NO: 23), and several pseudoprolines were used in the synthesis of the longer STxB-N segment.

SEQ ID NO: 22
TPDCVTGKVEYTKYNDDDTFTVKVGDKELFTNRWNLQSLLLSAQITGMTV
TIKTNA

SEQ ID NO: 23
CHNGGGFSEVIFR

STxB-N with SEQ ID NO: 22 was synthesized as a C-terminal hydrazide ( . . . Thr-Asn-Ala-NH—NH$_2$) for NCL. STxB-C was synthesized with a C-terminal acid using standard Fmoc-SPPS.

1) STxB-N Synthesis with 4 Pseudoprolines and Simple/Double Coupling

STxB-N with SEQ ID NO: 22 was synthesized as described above, with amino acid residues coupled in a pseudoproline dipeptide form at positions 5-6, 18-19, 30-31, and 41-42 of SEQ ID NO: 22 (in parenthesis below).

SEQ ID NO: 22
TPDC(VT)GKVEYTKYNDD(DT)FTVKVGDKEL(FT)NRWNLQSLL(LS)
AQITGMTVTIKTNA

A 10 minutes single coupling was performed for each amino acid residue, except for positions Thr 1, Cys 4, Tyr 11, Thr 12, Thr 21, Asn 35, Leu 36, Ile 45 and Thr 46 of SEQ ID NO: 22, where a double coupling (twice 10 minutes) was performed.

Fmoc deprotection was monitored using the Gyros-PTI Prelude X peptide synthesizer, which allows UV monitoring to measure Fmoc deprotection.

The UV images show incomplete Fmoc deprotection at the amino acids . . . LLLSAQIT . . . (positions 39-46 of SEQ ID NO: 22), leading to presumed deletions at those positions based on MS data:

6300 Da: STxB-N with SEQ ID NO: 22, no deletion
6187 Da (Δ 113 Da): isoleucine deletion
6172 Da (Δ 128 Da): glutamine deletion
6100 Da (Δ 199 Da): LS pseudoproline deletion 2) STxB-N Synthesis with 5 Pseudoprolines and Simple/Double Coupling The same strategy was implemented, but STxB-N with SEQ ID NO: 22 was synthesized with amino acid residues coupled in a pseudoproline dipeptide form at positions 5-6, 18-19, 30-31, 41-42, and 50-51 of SEQ ID NO: 22 (in parenthesis below).

SEQ ID NO: 22
TPDC(VT)GKVEYTKYNDD(DT)FTVKVGDKEL(FT)NRWNLQSLL(LS)
AQITGMT(VT)IKTNA

A 10 minutes single coupling was performed for each amino acid residue, except for positions 1, 4, 11, 12, 21, 35, 36, 45 and 46 of SEQ ID NO: 22, where a double coupling (twice 10 minutes) was performed.

Again, Fmoc deprotection was monitored using the Gyros-PTI Prelude X peptide synthesizer, which allows UV monitoring to measure Fmoc deprotection.

The addition of a fifth VT pseudoproline in the STxB-N sequence resolves the problem of deletions, and highlights the crucial role of this additional modification in the efficiency of the STxB-N synthesis. Mass spectroscopy analysis showed 5 peaks:

6300 Da: STxB-N with SEQ ID NO: 22, no deletion
6356 Da (Δ 56 Da): tBu protecting group
6400 Da (Δ 100 Da): unknown—commonly seen with hydrazide resin peptides
6414 Da (Δ 114 Da): unknown
6453 Da (Δ 153 Da): dimethoxybenzyl modification 3) Native Chemical Ligation of STxB-N and STxB-C Native chemical ligation was performed according to standard methods (Dawson et al., 1994. *Science*. 266 (5186): 776-779; Johnson & Kent, 2006. *J Am Chem Soc*. 128 (20):6640-6646) using 4-mercaptophenylacetic acid (MPAA) as thiol catalyst and TCEP as reducing agent. The hydrazide method was used to generate C-terminal thioesters (Zheng J S, Tang S, Qi Y K, Wang Z P, Liu L. Nat Protoc. 2013; 8 (12):2483-2495; Zheng J S, Tang S, Guo Y, Chang H N, Liu L. Chembiochem. 2012; 13 (4):542-546; Fang G M, Li Y M, Shen F, et al. Angew Chem Int Ed Engl. 2011; 50 (33):7645-7649).

One equivalent of StxB-N(0.7 μmol) was dissolved in 675 μL of "activation buffer" (6 M GuHCl, 100 mM NaPO$_4$, pH 3) and activated (conversion of hydrazide to acyl azide) with freshly prepared sodium nitrite (20 mM final concentration NaNO2) for 20 minutes at −20° C.

In parallel, 3 equivalents of StxB-C(2.1 μmol) were dissolved in 675 μL of a solution containing 200 mM MPAA in "ligation buffer" (6 M GuHCl, 200 mM phosphate, pH 7).

Both solutions were combined, and the final pH was adjusted to 7.0-7.2 to initiate the ligation after activation of the hydrazide. After 15 minutes, 150 μL of 0.5 M TCEP in pH 7 ligation buffer was added to the reaction to a final concentration of 50 mM.

Finally, 3 mL of 10% AcOH was added. The solution was centrifuged at 5000 g to remove any aggregates. The supernatant was then filtered with 0.2 μm nylon filter before HPLC purification and subsequent analysis.

The invention claimed is:

1. A method of producing a monomer of a Shiga toxin B-subunit (STxB) protein or a variant thereof by peptide chemical synthesis, comprising the steps of:
   a) stepwisely coupling amino acid residues onto a support following an amino acid sequence of the STxB protein or the variant thereof, wherein said amino acid residues comprise α amino-protecting groups and optionally side chain-protecting groups, thereby obtaining a synthetic peptide;
   b) deprotecting the synthetic peptide obtained from step a) by removing:
      b1) the final α amino-protecting group, and
      b2) optionally, the side-chain protecting-groups, thereby obtaining a deprotected synthetic peptide; and
   c) cleaving the deprotected synthetic peptide obtained from step b) from the support, thereby obtaining a free monomer of the STxB protein or the variant thereof, wherein said amino acid sequence of the STxB protein is SEQ ID NO: 2, said variant thereof consists of one of the peptides with amino acid sequence selected from SEQ IDs NO: 1 and 3 to 21,
   wherein the monomer of the STxB protein or the variant thereof is produced by peptide chemical synthesis of at least two fragments of said STxB protein or variant thereof, wherein said at least two fragments are ligated to obtain the monomer of the STxB protein or the variant thereof, and wherein said at least two fragments consist of SEQ ID NO: 22 and SEQ ID NO: 23.

2. The method according to claim 1, wherein step a) comprises the following sequence of substeps:
   a1) removing the α amino-protecting group from the support or from the N-terminal amino acid of the synthetic peptide;
   a2) optionally, washing the support;
   a3) coupling the next amino acid following an amino acid sequence set forth in SEQ ID NO: 2 in a linear C- to N-terminal direction;
   a4) optionally, washing the support;
   a5) optionally, capping unreacted amino groups; and
   a6) optionally, washing the support.

3. The method according to claim 2, wherein:
   Substep a3) is reiterated more times and/or is carried out for a longer period of time to couple amino acid residues Cys 4, Thr 12, Thr 21, Asn 35, Leu 36, and Ile 45 with respect to SEQ ID NO: 2 numbering than to couple the other amino acid residues of the STxB protein; and
   dipeptides Val 5-Thr 6, Asp 18-Thr 19, Phe 30-Thr 31, Leu 41-Ser 42, and Val 50-Thr 51 with respect to SEQ ID NO: 2 numbering are coupled in substep a3) in a pseudoproline dipeptide form.

4. The method according to claim 2, wherein substep a3) is reiterated more times and/or carried out for a longer period of time to couple amino acid residues Cys 4, Thr 12, Thr 21, Asn 35, Leu 36, Leu 39, Ile 45, Cys 57, and Val 65 with respect to SEQ ID NO: 2 numbering than to couple the other amino acid residues of the STxB protein or of the variant thereof.

5. The method according to claim 2, wherein substep a3) is reiterated more times and/or carried out for a longer period of time to couple amino acid residues Cys 4, Thr 12, Thr 21, Asn 35, Leu 36, Leu 39, Ile 45, Thr 49, Cys 57, and Val 65 with respect to SEQ ID NO: 2 numbering than to couple the other amino acid residues of the STxB protein or of the variant thereof.

6. The method according to claim 2, wherein substep a3) is reiterated more times and/or carried out for a longer period of time to couple amino acid residues Thr 1, Cys 4, Tyr 11, Thr 12, Thr 21, Asn 35, Leu 36, Leu 39, Ile 45, Thr 46, Thr 49, Cys 57, and Val 65 with respect to SEQ ID NO: 2 numbering than to couple the other amino acid residues of the STxB protein or of the variant thereof.

7. The method according to claim 2, wherein dipeptides Val 5-Thr 6, Asp 18-Thr 19, Phe 30-Thr 31, Leu 41-Ser 42, Val 50-Thr 51, and Phe 63-Ser 64 with respect to SEQ ID NO: 2 numbering are coupled in substep a3) in a pseudoproline dipeptide form.

8. The method according to claim 1, wherein the method further comprises one or more of the steps of:

d) precipitating the free monomer of the STxB protein or of the variant thereof obtained from step c), and optionally air-drying and/or lyophilizing the precipitated STxB protein or the variant thereof, e) oxidizing the free monomer of the STxB protein or of the variant thereof obtained from step c) or d) under conditions suitable for the formation of an intramolecular disulfide bond between Cys 4 and Cys 57 with respect to SEQ ID NO: 2 numbering.

9. The method according to claim 1, wherein the method does not comprise a purification step by chromatography.

10. A monomer of a Shiga toxin B-subunit (STxB) protein or of a variant thereof obtained by the method according to claim 1, wherein dipeptides Val 5-Thr 6, Asp 18-Thr 19, Phe 30-Thr 31, Leu 41-Ser 42, and Val 50-Thr 51 with respite to SEQ ID NO: 2 numbering are coupled in a pseudoproline dipeptide form.

* * * * *

SEQUENCE LISTING

<160> NUMBER OF SEQ ID NOS: 23

<210> SEQ ID NO 1
<211> LENGTH: 89
<212> TYPE: PRT
<213> ORGANISM: Shigella dysenteriae
<220> FEATURE:
<223> OTHER INFORMATION: STxB from Shigella dysenteriae (Q7BQ98-1)

<400> SEQUENCE: 1

Met Lys Lys Thr Leu Leu Ile Ala Ala Ser Leu Ser Phe Phe Ser Ala

```
                1               5                  10                  15
Ser Ala Leu Ala Thr Pro Asp Cys Val Thr Gly Lys Val Glu Tyr Thr
                20                  25                  30

Lys Tyr Asn Asp Asp Asp Thr Phe Thr Val Lys Val Gly Asp Lys Glu
            35                  40                  45

Leu Phe Thr Asn Arg Trp Asn Leu Gln Ser Leu Leu Leu Ser Ala Gln
    50                  55                  60

Ile Thr Gly Met Thr Val Thr Ile Lys Thr Asn Ala Cys His Asn Gly
65                  70                  75                  80

Gly Gly Phe Ser Glu Val Ile Phe Arg
                85
```

<210> SEQ ID NO 2
<211> LENGTH: 69
<212> TYPE: PRT
<213> ORGANISM: Artificial Sequence
<220> FEATURE:
<223> OTHER INFORMATION: STxB from Shigella dysenteriae (Q7BQ98-1)
      devoid of its signal peptide

<400> SEQUENCE: 2

```
Thr Pro Asp Cys Val Thr Gly Lys Val Glu Tyr Thr Lys Tyr Asn Asp
1               5                   10                  15

Asp Asp Thr Phe Thr Val Lys Val Gly Asp Lys Glu Leu Phe Thr Asn
            20                  25                  30

Arg Trp Asn Leu Gln Ser Leu Leu Leu Ser Ala Gln Ile Thr Gly Met
        35                  40                  45

Thr Val Thr Ile Lys Thr Asn Ala Cys His Asn Gly Gly Gly Phe Ser
    50                  55                  60

Glu Val Ile Phe Arg
65
```

<210> SEQ ID NO 3
<211> LENGTH: 89
<212> TYPE: PRT
<213> ORGANISM: Escherichia coli
<220> FEATURE:
<223> OTHER INFORMATION: STx1cB from Escherichia coli (Q47641-1)

<400> SEQUENCE: 3

```
Met Lys Lys Ile Leu Leu Ile Ala Ala Ser Leu Ser Phe Phe Ser Ala
1               5                   10                  15

Ser Val Leu Ala Ala Pro Asp Cys Val Thr Gly Lys Val Glu Tyr Thr
            20                  25                  30

Lys Tyr Asn Asp Asp Asp Thr Phe Thr Val Lys Val Gly Asp Lys Glu
        35                  40                  45

Leu Phe Thr Asn Arg Trp Asn Leu Gln Ser Leu Leu Leu Ser Ala Gln
    50                  55                  60

Ile Thr Gly Met Thr Val Thr Ile Lys Thr Asn Ala Cys His Asn Gly
65                  70                  75                  80

Gly Gly Phe Ser Glu Val Ile Phe Arg
                85
```

<210> SEQ ID NO 4
<211> LENGTH: 69
<212> TYPE: PRT
<213> ORGANISM: Artificial Sequence
<220> FEATURE:
<223> OTHER INFORMATION: STx1cB from Escherichia coli (Q47641-1) devoid
      of its signal peptide -continued

<400> SEQUENCE: 4

Ala Pro Asp Cys Val Thr Gly Lys Val Glu Tyr Thr Lys Tyr Asn Asp
1               5                   10                  15

Asp Asp Thr Phe Thr Val Lys Val Gly Asp Lys Glu Leu Phe Thr Asn
            20                  25                  30

Arg Trp Asn Leu Gln Ser Leu Leu Leu Ser Ala Gln Ile Thr Gly Met
        35                  40                  45

Thr Val Thr Ile Lys Thr Asn Ala Cys His Asn Gly Gly Gly Phe Ser
    50                  55                  60

Glu Val Ile Phe Arg
65

<210> SEQ ID NO 5
<211> LENGTH: 89
<212> TYPE: PRT
<213> ORGANISM: Escherichia coli
<220> FEATURE:
<223> OTHER INFORMATION: STx1dB from Escherichia coli (Q83XK2-1)

<400> SEQUENCE: 5

Met Lys Lys Val Leu Leu Ile Ala Val Ser Leu Ser Phe Leu Ser Ala
1               5                   10                  15

Ser Val Leu Ala Ala Pro Asp Cys Val Thr Gly Lys Val Glu Tyr Thr
            20                  25                  30

Lys Tyr Asn Asp Asp Asp Thr Phe Thr Val Lys Val Ala Asp Lys Glu
35 40 45

Leu Phe Thr Asn Arg Trp Asn Leu Gln Ser Leu Leu Leu Ser Ala Gln
50 55 60

Ile Thr Gly Met Thr Val Thr Ile Lys Thr Thr Ala Cys His Asn Gly
65 70 75 80

Gly Gly Phe Ser Glu Val Ile Phe Arg
85

<210> SEQ ID NO 6
<211> LENGTH: 69
<212> TYPE: PRT
<213> ORGANISM: Artificial Sequence
<220> FEATURE:
<223> OTHER INFORMATION: STx1dB from Escherichia coli (Q83XK2-1) devoid of its signal peptide

<400> SEQUENCE: 6

Ala Pro Asp Cys Val Thr Gly Lys Val Glu Tyr Thr Lys Tyr Asn Asp
1 5 10 15

Asp Asp Thr Phe Thr Val Lys Val Ala Asp Lys Glu Leu Phe Thr Asn
20 25 30

Arg Trp Asn Leu Gln Ser Leu Leu Leu Ser Ala Gln Ile Thr Gly Met
35 40 45

Thr Val Thr Ile Lys Thr Thr Ala Cys His Asn Gly Gly Gly Phe Ser
50 55 60

Glu Val Ile Phe Arg
65

<210> SEQ ID NO 7
<211> LENGTH: 89
<212> TYPE: PRT
<213> ORGANISM: Escherichia coli
<220> FEATURE:
<223> OTHER INFORMATION: STx2B from Escherichia coli (Q8X531-1)

```
<400> SEQUENCE: 7

Met Lys Lys Met Phe Met Ala Val Leu Phe Ala Leu Ala Ser Val Asn
1               5                   10                  15

Ala Met Ala Ala Asp Cys Ala Lys Gly Lys Ile Glu Phe Ser Lys Tyr
            20                  25                  30

Asn Glu Asp Asp Thr Phe Thr Val Lys Val Asp Gly Lys Glu Tyr Trp
        35                  40                  45

Thr Ser Arg Trp Asn Leu Gln Pro Leu Leu Gln Ser Ala Gln Leu Thr
    50                  55                  60

Gly Met Thr Val Thr Ile Lys Ser Ser Thr Cys Glu Ser Gly Ser Gly
65                  70                  75                  80

Phe Ala Glu Val Gln Phe Asn Asn Asp
                85

<210> SEQ ID NO 8
<211> LENGTH: 70
<212> TYPE: PRT
<213> ORGANISM: Artificial Sequence
<220> FEATURE:
<223> OTHER INFORMATION: STx2B from Escherichia coli (Q8X531-1) devoid
      of its signal peptide

<400> SEQUENCE: 8

Ala Asp Cys Ala Lys Gly Lys Ile Glu Phe Ser Lys Tyr Asn Glu Asp
1               5                   10                  15

Asp Thr Phe Thr Val Lys Val Asp Gly Lys Glu Tyr Trp Thr Ser Arg
            20                  25                  30

Trp Asn Leu Gln Pro Leu Leu Gln Ser Ala Gln Leu Thr Gly Met Thr
        35                  40                  45

Val Thr Ile Lys Ser Ser Thr Cys Glu Ser Gly Ser Gly Phe Ala Glu
    50                  55                  60

Val Gln Phe Asn Asn Asp
65                  70

<210> SEQ ID NO 9
<211> LENGTH: 89
<212> TYPE: PRT
<213> ORGANISM: Escherichia coli
<220> FEATURE:
<223> OTHER INFORMATION: STx2cB from Escherichia coli (Q07871-1)

<400> SEQUENCE: 9

Met Lys Lys Met Phe Met Ala Val Le

<213> ORGANISM: Artificial Sequence
<220> FEATURE:
<223> OTHER INFORMATION: STx2cB from Escherichia coli (Q07871-1) devoid of its signal peptide

<400> SEQUENCE: 10

Ala Asp Cys Ala Lys Gly Lys Ile Glu Phe Ser Lys Tyr Asn Glu Asn
1               5                   10                  15

Asp Thr Phe Thr Val Lys Val Ala Gly Lys Glu Tyr Trp Thr Ser Arg
            20                  25                  30

Trp Asn Leu Gln Pro Leu Leu Gln Ser Ala Gln Leu Thr Gly Met Thr
        35                  40                  45

Val Thr Ile Lys Ser Ser Thr Cys Glu Ser Gly Ser Gly Phe Ala Glu
    50                  55                  60

Val Gln Phe Asn Asn Asp
65                  70

<210> SEQ ID NO 11
<211> LENGTH: 89
<212> TYPE: PRT
<213> ORGANISM: Escherichia coli
<220> FEATURE:
<223> OTHER INFORMATION: STx2dB from Escherichia coli (Q8GGL0-1)

<400> SEQUENCE: 11

Met Lys Lys Met Phe Met Ala Val Leu Phe Ala Leu Val Ser Val Asn
1               5                   10                  15

Ala Met Ala Ala Asp Cys Ala Lys Gly Lys Ile Glu Phe Ser Lys Tyr
            20                  25                  30

Asn Glu Asn Asp Thr Phe Thr Val Lys Val Asp Gly Lys Glu Tyr Trp
        35                  40                  45

Thr Ser Arg Trp Asn Leu Gln Pro Leu Leu Gln Ser Ala Gln Leu Thr
    50                  55                  60

Gly Met Thr Val Thr Ile Lys Ser Ser Thr Cys Ala Ser Gly Ser Gly
65                  70                  75                  80

Phe Ala Glu Val Gln Phe Asn Asn Asp
                85

<210> SEQ ID NO 12
<211> LENGTH: 70
<212> TYPE: PRT
<213> ORGANISM: Artificial Sequence
<220> FEATURE:
<223> OTHER INFORMATION: STx2dB from Escherichia coli (Q8GGL0-1) devoid of its signal peptide

<400> SEQUENCE: 12

Ala Asp Cys Ala Lys Gly Lys Ile Glu Phe Ser Lys Tyr Asn Glu Asn
1               5                   10                  15

Asp Thr Phe Thr Val Lys Val Asp Gly Lys Glu Tyr Trp Thr Ser Arg
            20                  25                  30

Trp Asn Leu Gln Pro Leu Leu Gln Ser Ala Gln Leu Thr Gly Met Thr
        35                  40                  45

Val Thr Ile Lys Ser Ser Thr Cys Ala Ser Gly Ser Gly Phe Ala Glu
    50                  55                  60

Val Gln Phe Asn Asn Asp
65                  70

<210> SEQ ID NO 13
<211> LENGTH: 87

```
<212> TYPE: PRT
<213> ORGANISM: Escherichia coli
<220> FEATURE:
<223> OTHER INFORMATION: STx2eB from Escherichia coli (Q47644-1)

<400> SEQUENCE: 13

Met Lys Lys Met Phe Ile Ala Val Leu Phe Ala Leu Val Ser Val Asn
1               5                   10                  15

Ala Met Ala Ala Asp Cys Ala Lys Gly Lys Ile Glu Phe Ser Lys Tyr
            20                  25                  30

Asn Glu Asp Asn Thr Phe Thr Val Lys Val Ser Gly Arg Glu Tyr Trp
        35                  40                  45

Thr Asn Arg Trp Asn Leu Gln Pro Leu Leu Gln Ser Ala Gln Leu Thr
    50                  55                  60

Gly Met Thr Val Thr Ile Ile Ser Asn Thr Cys Ser Ser Gly Ser Gly
65                  70                  75                  80

Phe Ala Gln Val Lys Phe Asn
                85

<210> SEQ ID NO 14
<211> LENGTH: 68
<212> TYPE: PRT
<213> ORGANISM: Artificial Sequence
<220> FEATURE:
<223> OTHER INFORMATION: STx2eB from Escherichia coli (Q47644-1) devoid
      of its signal peptide

<400> SEQUENCE: 14

Ala Asp Cys Ala Lys Gly Lys Ile Glu Phe Ser Lys Tyr Asn Glu Asp
1               5                   10                  15

Asn Thr Phe Thr Val Lys Val Ser Gly Arg Glu Tyr Trp Thr Asn Arg
            20                  25                  30

Trp Asn Leu Gln Pro Leu Leu Gln Ser Ala Gln Leu Thr Gly Met Thr
        35                  40                  45

Val Thr Ile Ile Ser Asn Thr Cys Ser Ser Gly Ser Gly Phe Ala Gln
    50                  55                  60

Val Lys Phe Asn
65

<210> SEQ ID NO 15
<211> LENGTH: 87
<212> TYPE: PRT
<213> ORGANISM: Escherichia coli
<220> FEATURE:
<223> OTHER INFORMATION: STx2fB from Escherichia coli (Q47646-1)

<400> SEQUENCE: 15

Met Lys Lys Met Ile Ile Ala Val Leu Phe Gly Leu Phe Ser Ala Asn
1               5                   10                  15

Ser Met Ala Ala Asp Cys Ala Val Gly Lys Ile Glu Phe Ser Lys Tyr
            20                  25                  30

Asn Glu Asp Asp Thr Phe Thr Val Lys Val Ser Gly Arg Glu Tyr Trp
        35                  40                  45

Thr Asn Arg Trp Asn Leu Gln Pro Leu Leu Gln Ser Ala Gln Leu Thr
    50                  55                  60

Gly Met Thr Val Thr Ile Ile Ser Asn Thr Cys Ser Ser Gly Ser Gly
65                  70                  75                  80

Phe Ala Gln Val Lys Phe Asn
                85
```

<210> SEQ ID NO 16
<211> LENGTH: 68
<212> TYPE: PRT
<213> ORGANISM: Artificial Sequence
<220> FEATURE:
<223> OTHER INFORMATION: STx2fB from Escherichia coli (Q47646-1) devoid
    of its signal peptide

<400> SEQUENCE: 16

Ala Asp Cys Ala Val Gly Lys Ile Gl

```
<210> SEQ ID NO 19
<211> LENGTH: 89
<212> TYPE: PRT
<213> ORGANISM: Escherichia coli
<220> FEATURE:
<223> OTHER INFORMATION: STx2gB from Escherichia coli (Q8VLE0-1)

<400> SEQUENCE: 19

Met Lys Lys Met Phe Met Ala Val Leu Phe Ala Leu Val Ser Val Asn
1               5                   10                  15

Ala Met Ala Ala Asp Cys Ala Lys Gly Lys Ile Glu Phe Ser Lys Tyr
            20                  25                  30

Asn Gly Asp Asn Thr Phe Thr Val Lys Val Asp Gly Lys Glu Tyr Trp
        35                  40                  45

Thr Asn Arg Trp Asn Leu Gln Pro Leu Leu Gln Ser Ala Gln Leu Thr
    50                  55                  60

Gly Met Thr Val Thr Ile Lys Ser Asn Thr Cys Glu Ser Gly Ser Gly
65                  70                  75                  80

Phe Ala Glu Val Gln Phe Asn Asn Asp
                85

<210> SEQ ID NO 20
<211> LENGTH: 70
<212> TYPE: PRT
<213> ORGANISM: Artificial Sequence
<220> FEATURE:
<223> OTHER INFORMATION: STx2gB from Escherichia coli (

```
<210> SEQ ID NO 22
<211> LENGTH: 56
<212> TYPE: PRT
<213> ORGANISM: Artificial Sequence
<220> FEATURE:
<223> OTHER INFORMATION: N-term fragment of STxB from Shigella
      dysenteriae (Q7BQ98-1) devoid of its signal peptide

<400> SEQUENCE: 22

Thr Pro Asp Cys Val Thr Gly Lys Val Glu Tyr Thr Lys Tyr Asn Asp
1               5                   10                  15

Asp Asp Thr Phe Thr Val Lys Val Gly Asp Lys Glu Leu Phe Thr Asn
            20                  25                  30

Arg Trp Asn Leu Gln Ser Leu Leu Ser Ala Gln Ile Thr Gly Met
        35                  40                  45

Thr Val Thr Ile Lys Thr Asn Ala
    50                  55

<210> SEQ ID NO 23
<211> LENGTH: 13
<212> TYPE: PRT
<213> ORGANISM: Artificial Sequence
<220> FEATURE:
<223> OTHER INFORMATION: C-term fragment of STxB from Shigella
      dysenteriae (Q7BQ98-1)

<400> SEQUENCE: 23

Cys His Asn Gly Gly Gly Phe Ser Glu Val Ile Phe Arg
1               5                   10
```